May 15, 1934.

O. MYERS 1,958,635

SENDER TESTING SYSTEM

Filed Dec. 20, 1932

67 Sheets—Sheet 1

FIG. I

Figure 4:
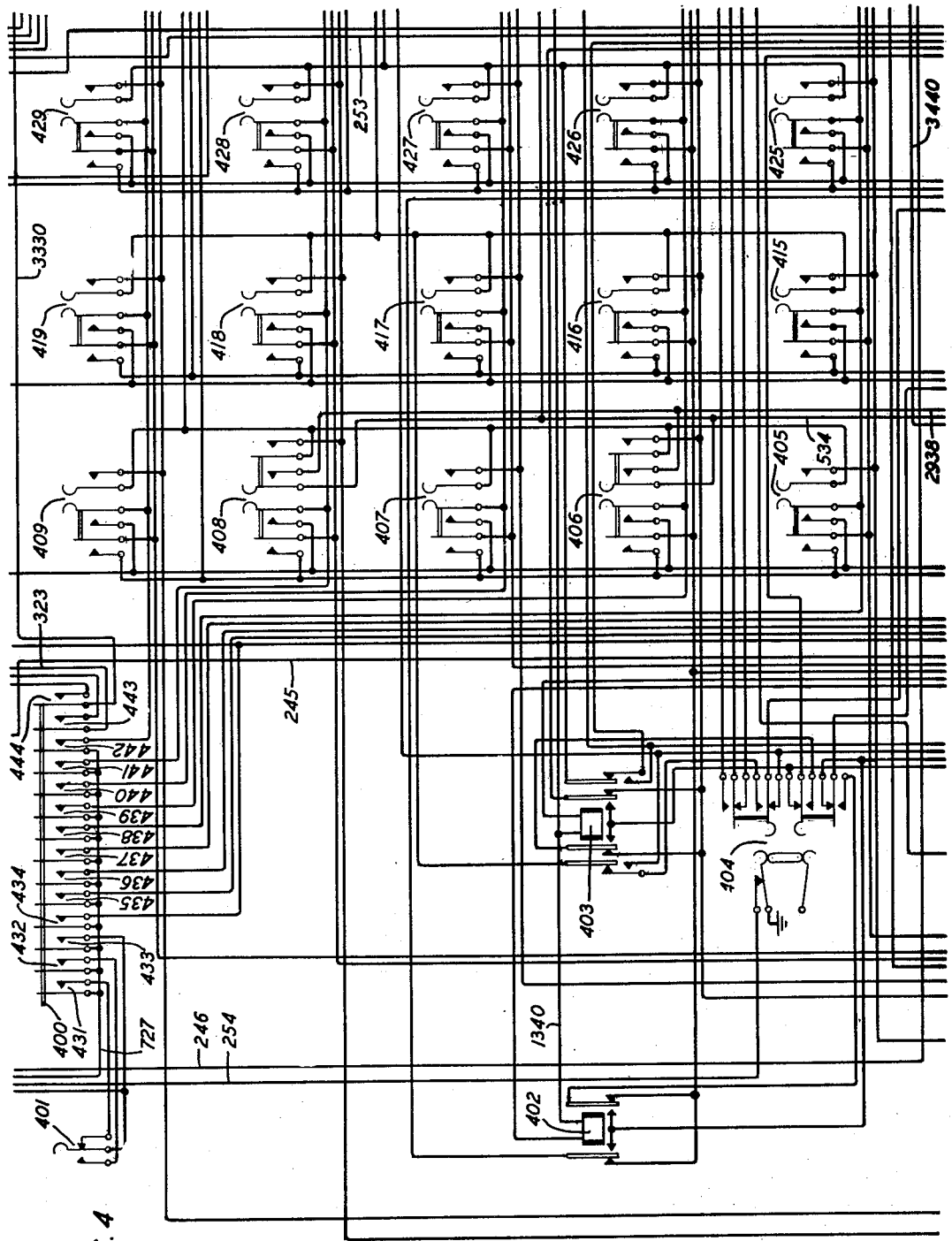
Figure 5:
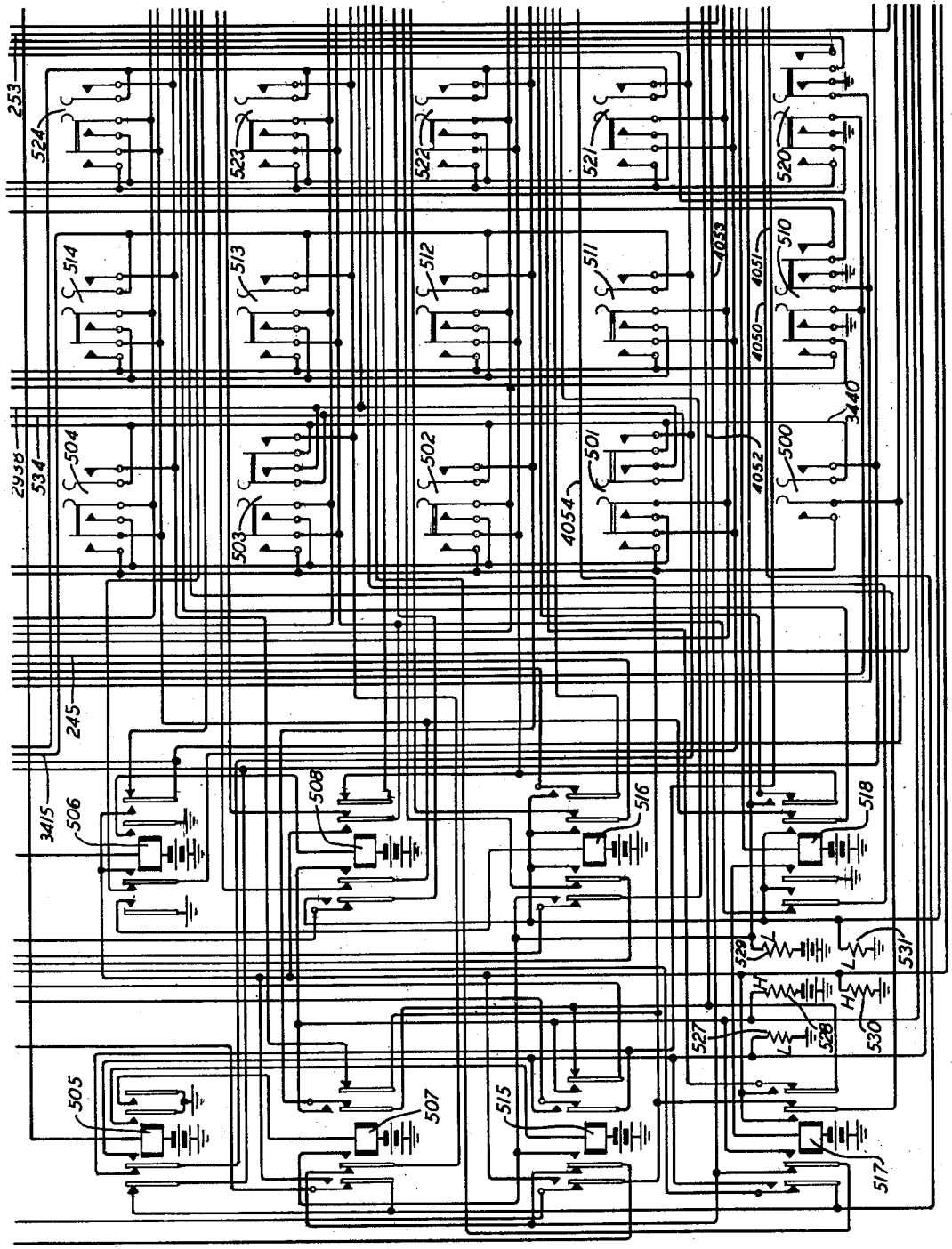
Figure 6:
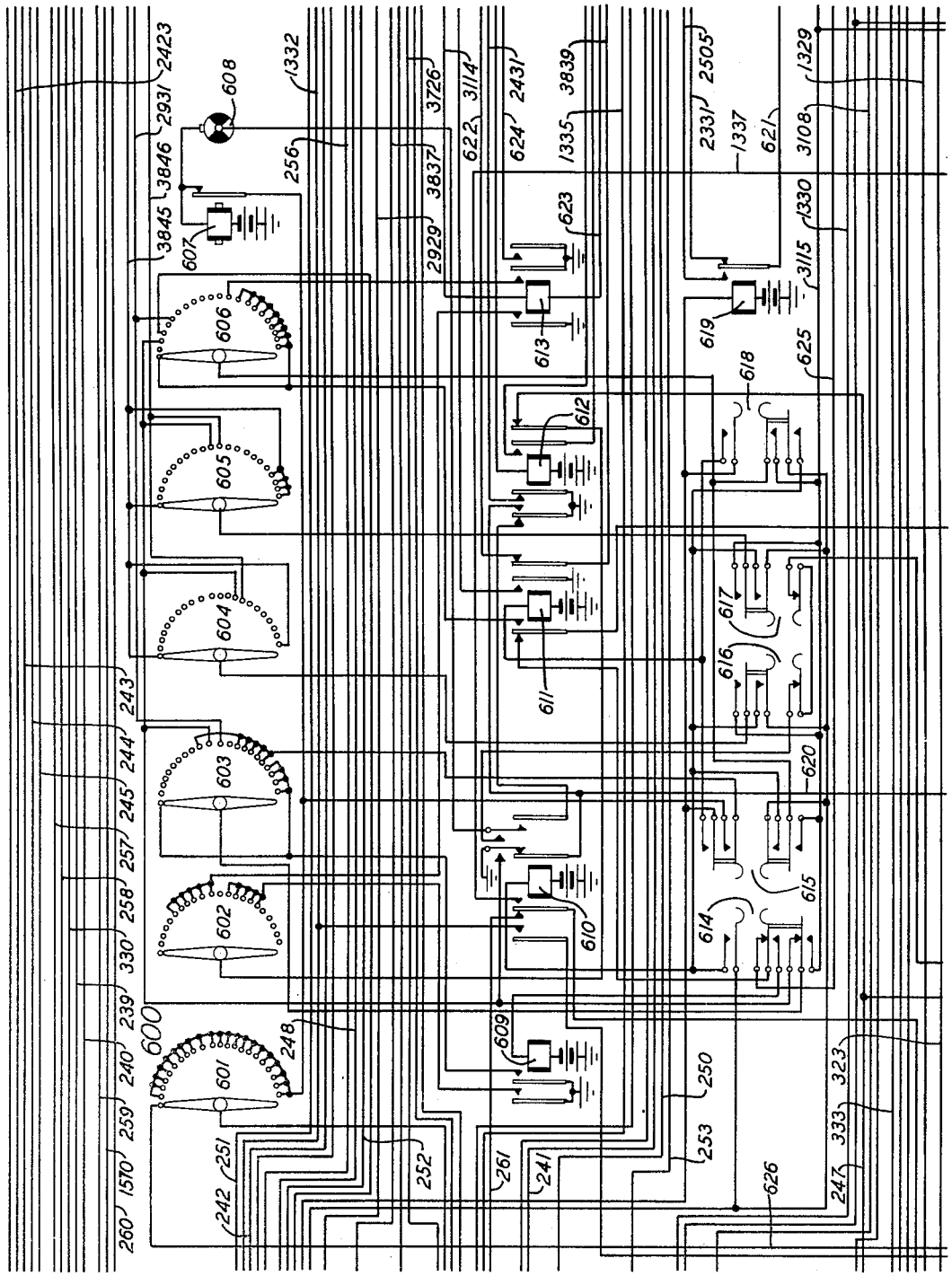
Figure 7:
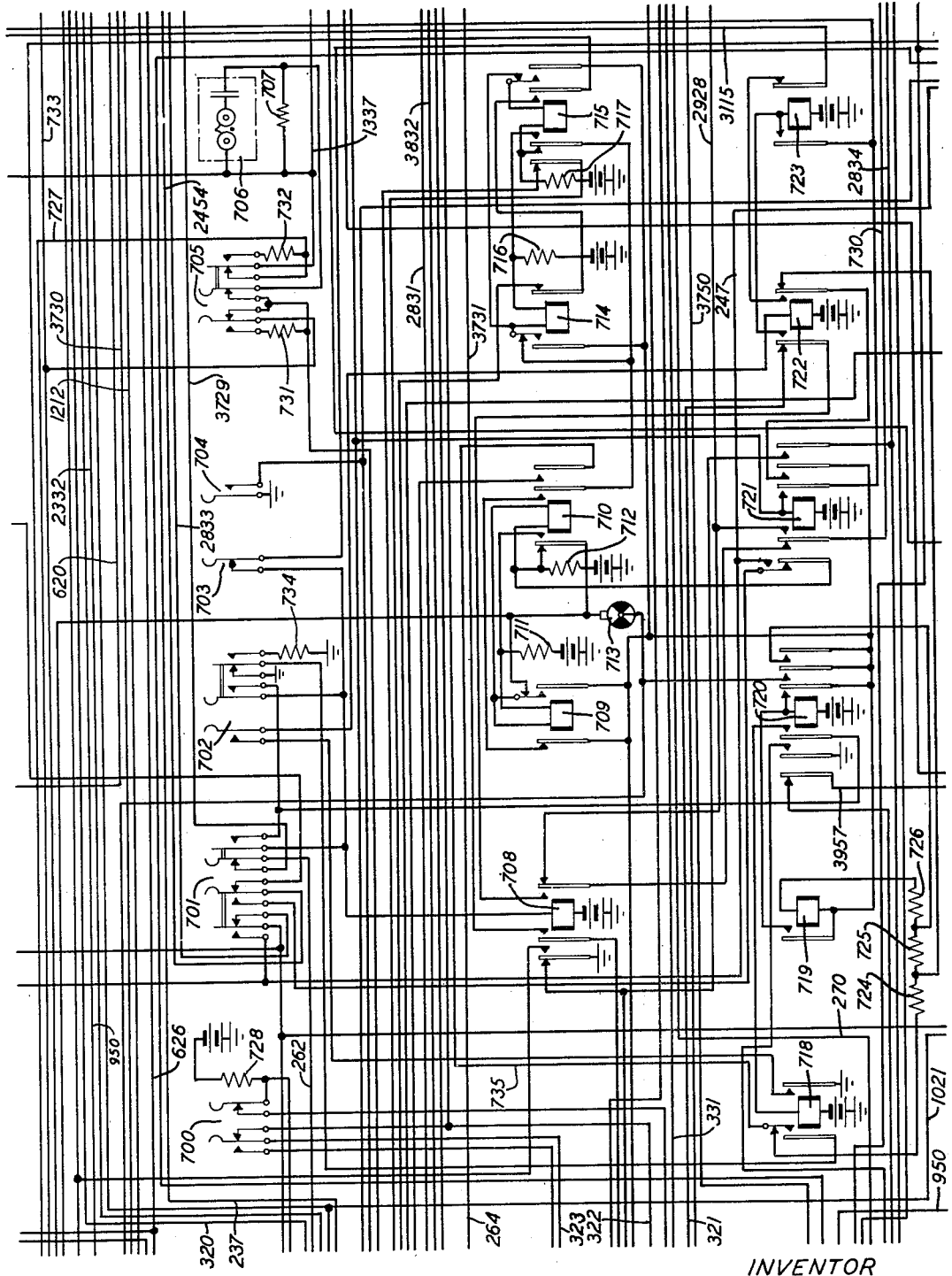
Figure 8:
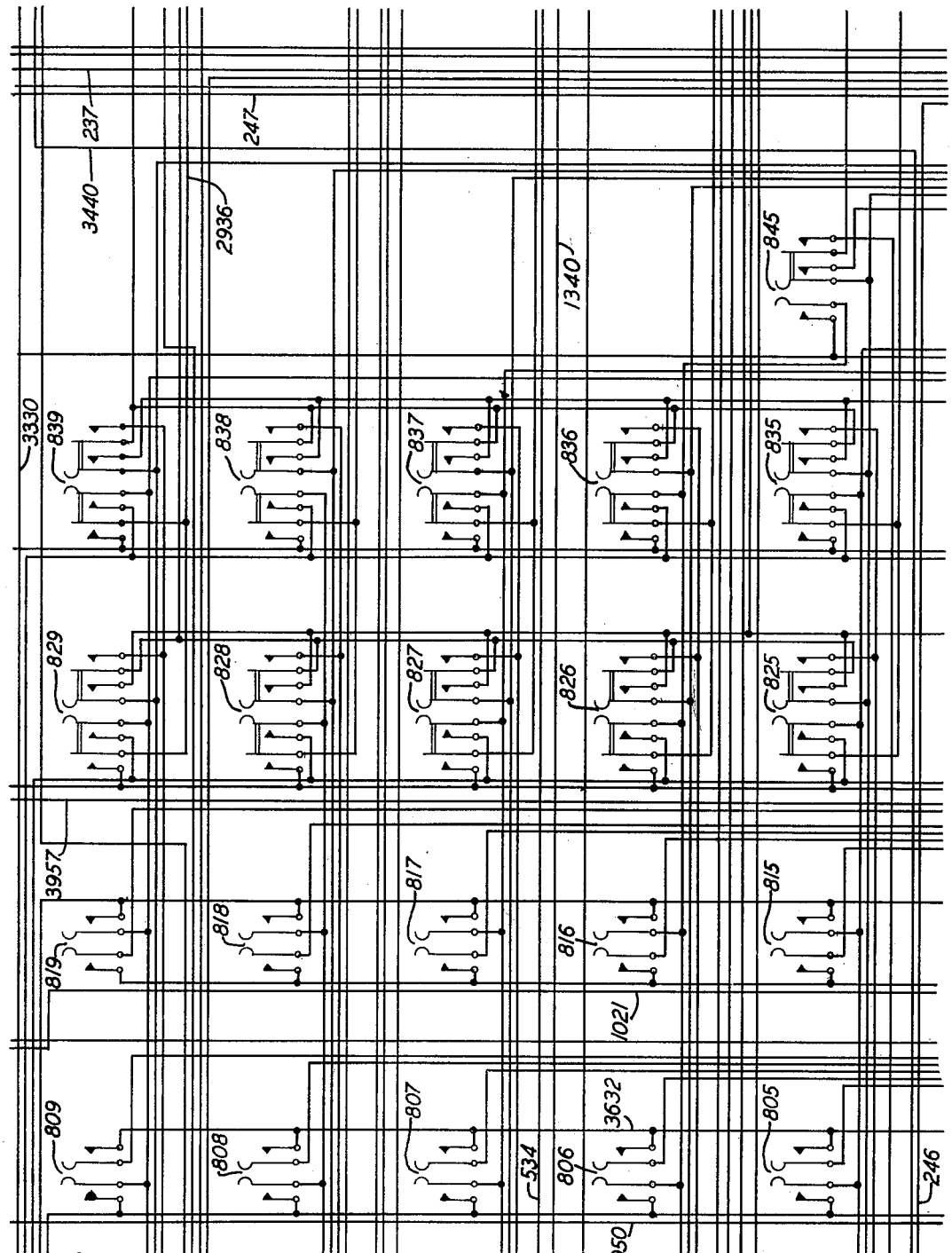
Figure 9:
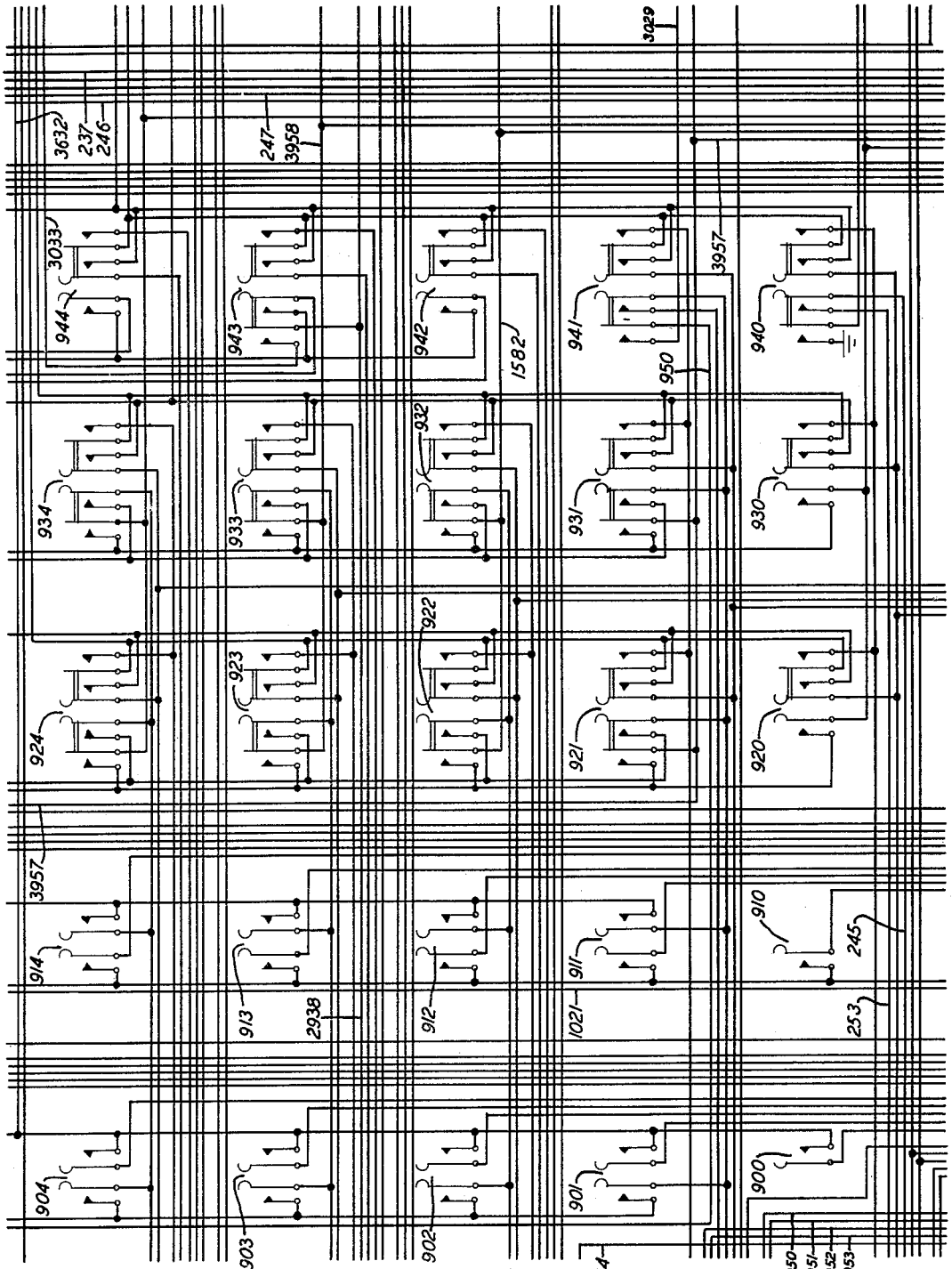
Figure 10:
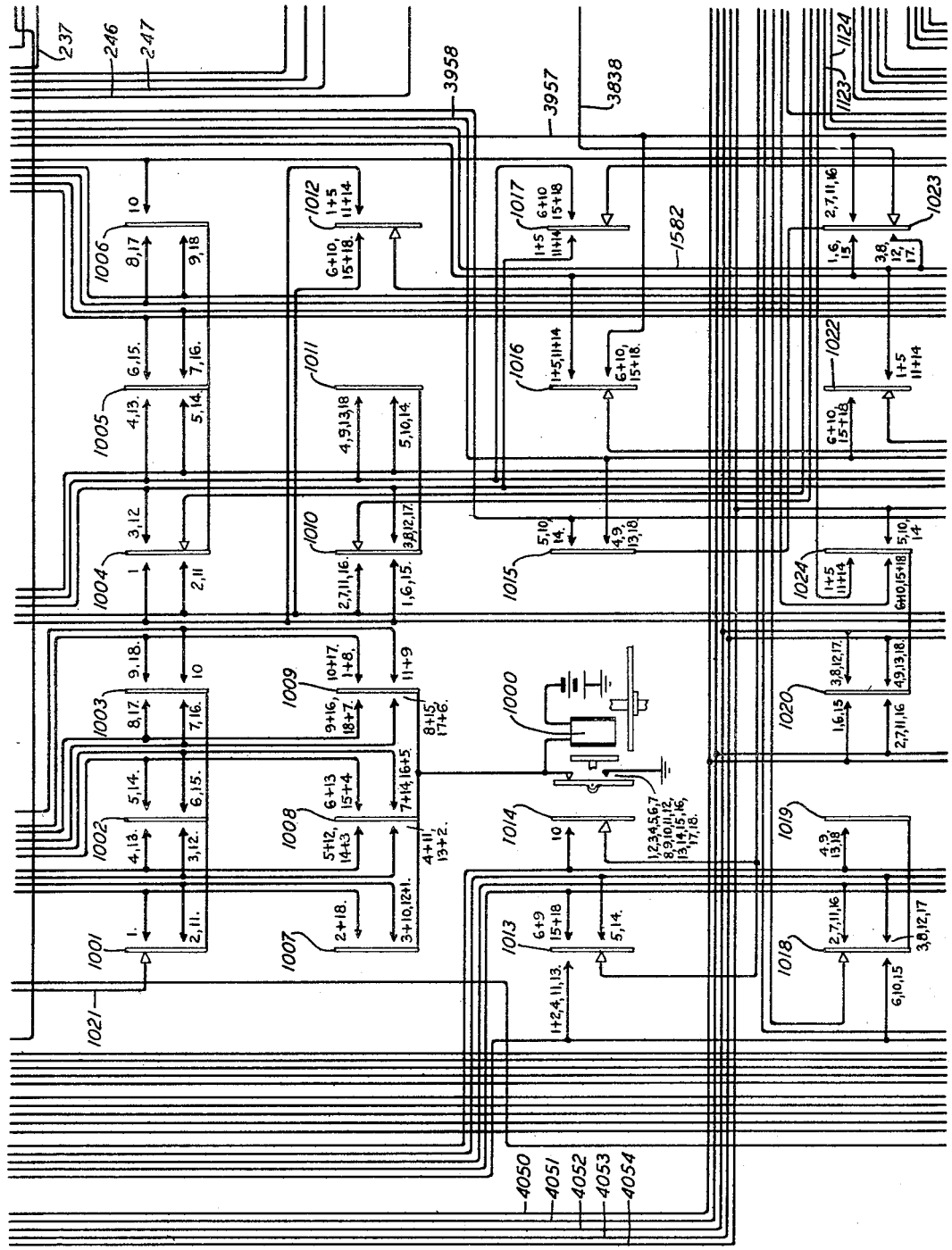
Figure 11:
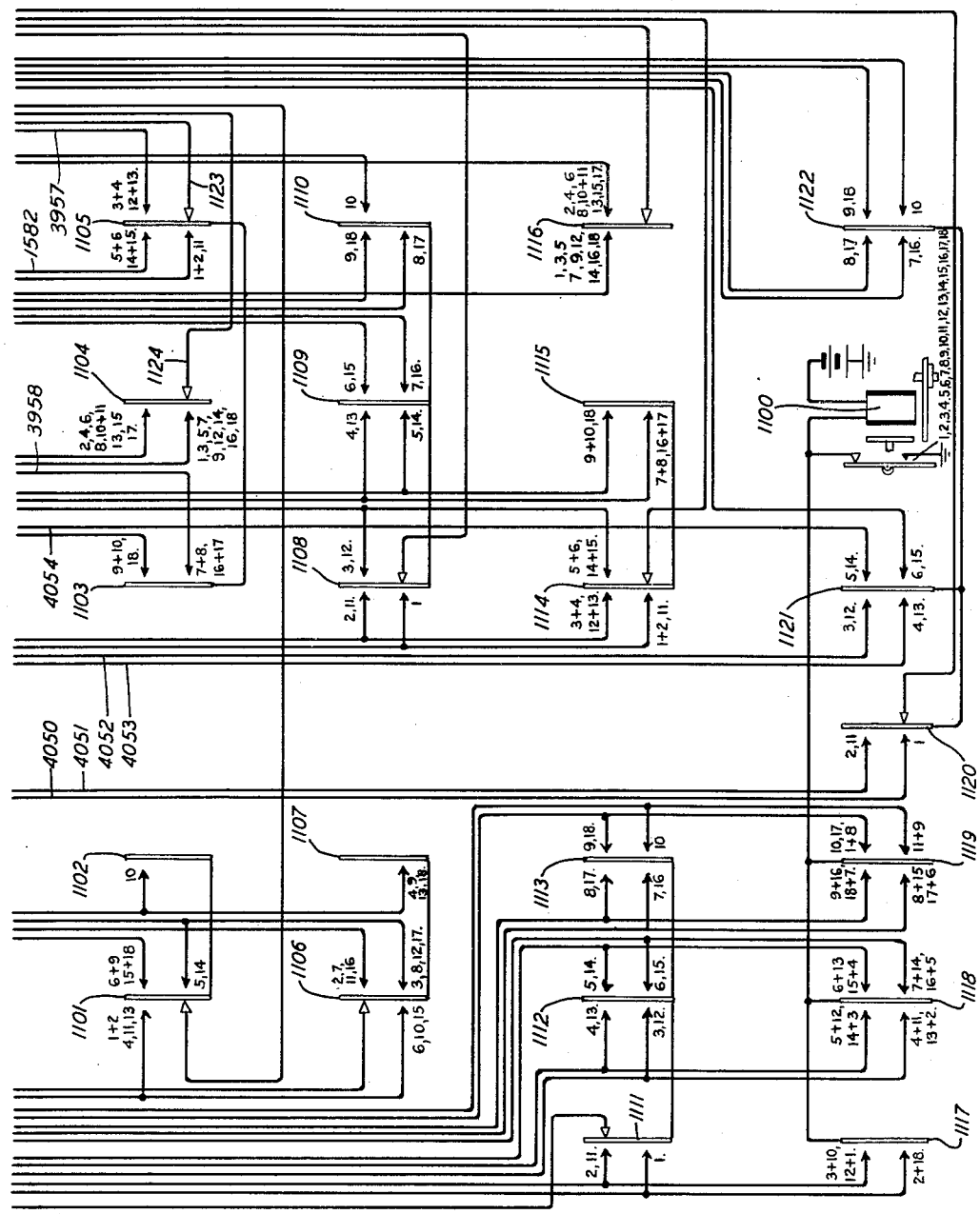
Figure 12:
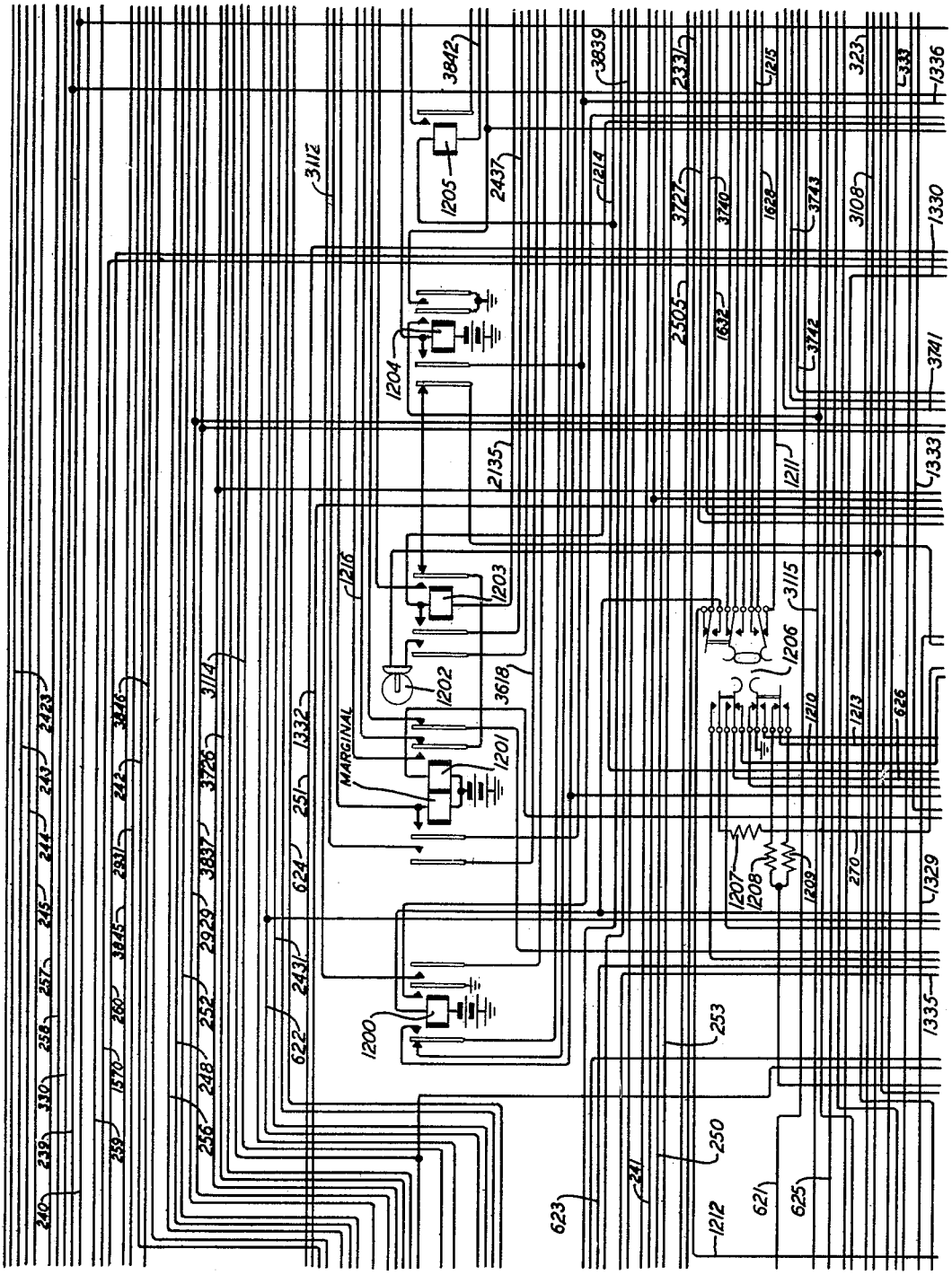
Figure 13:
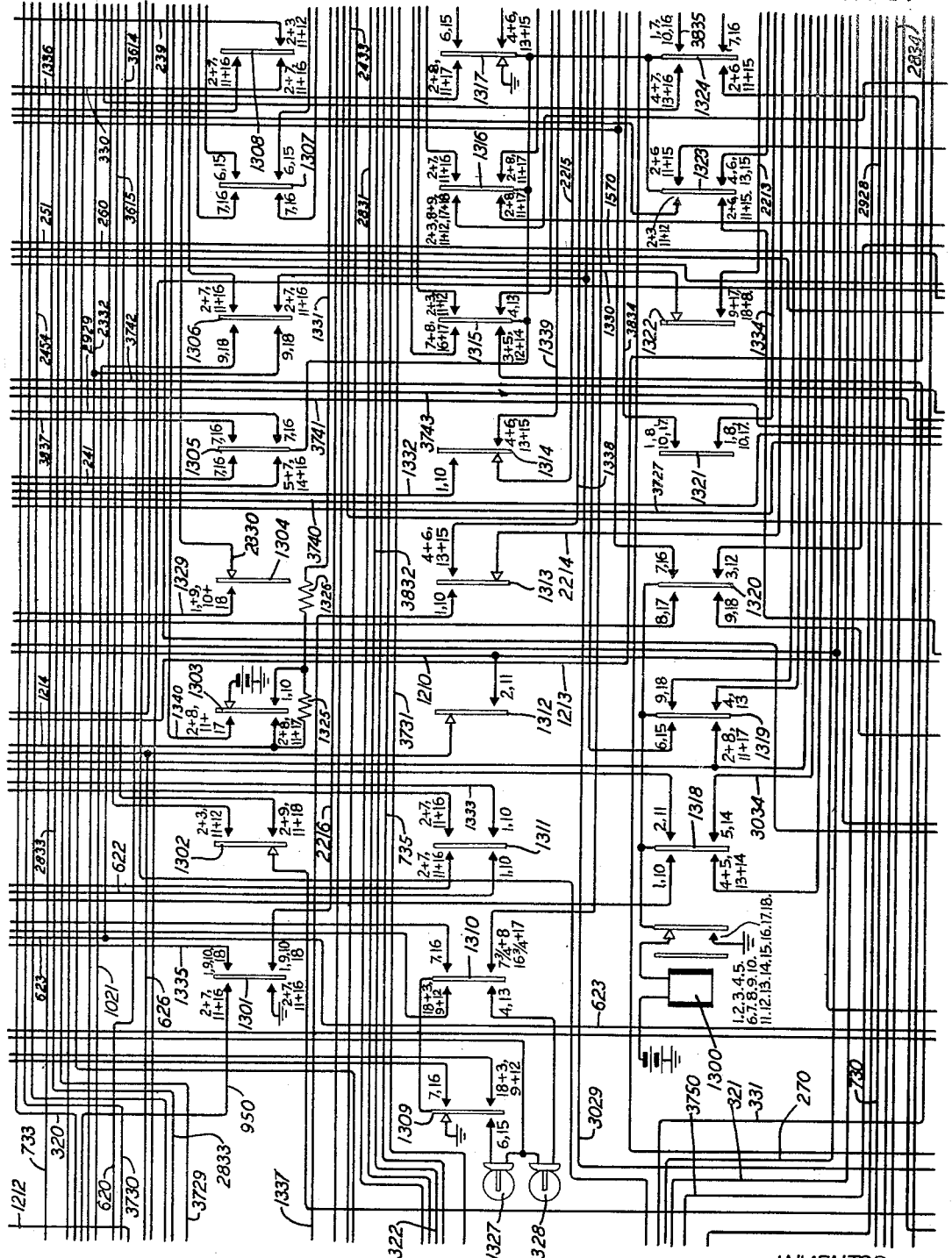
Figure 14:
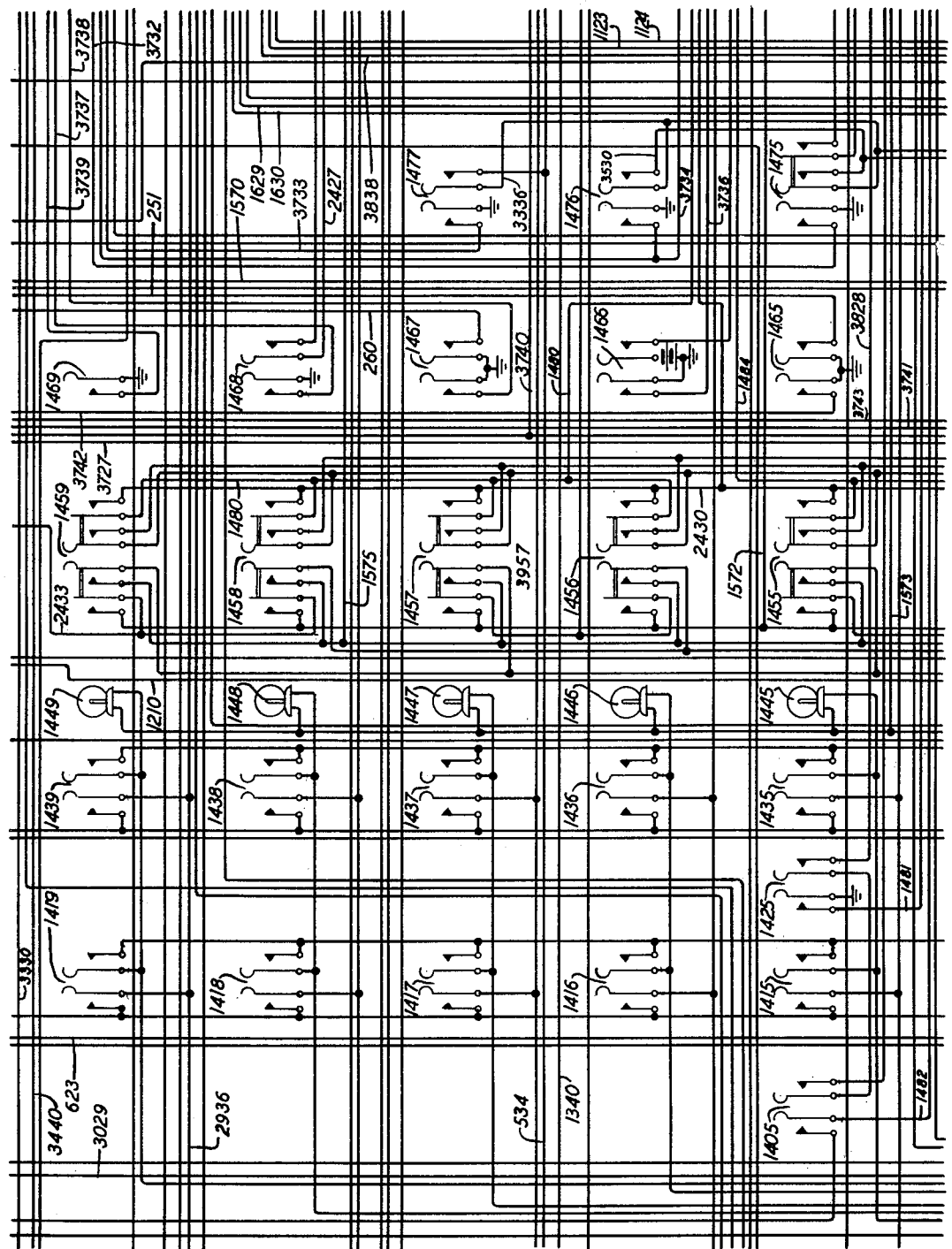
Figure 15:
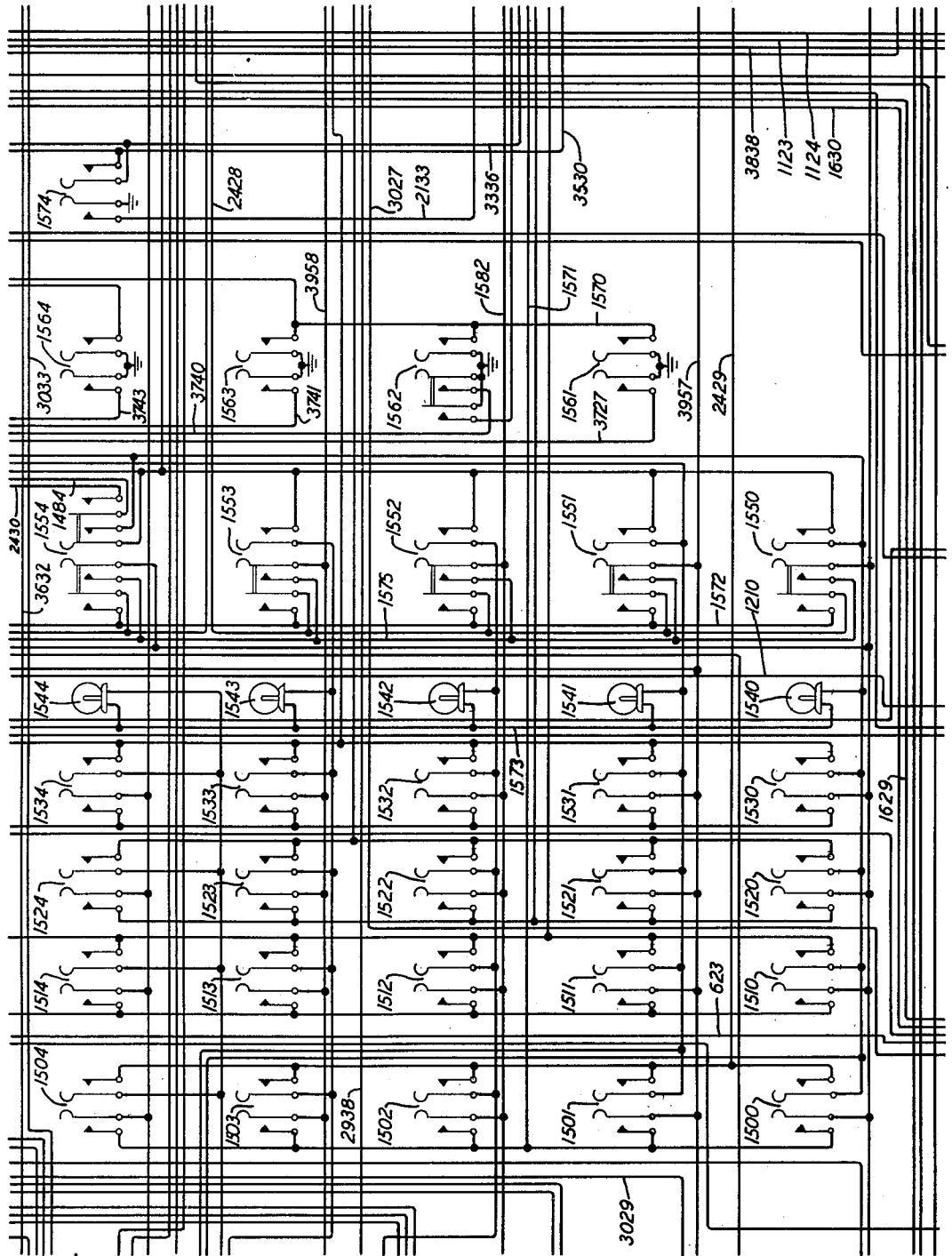
Figure 16:
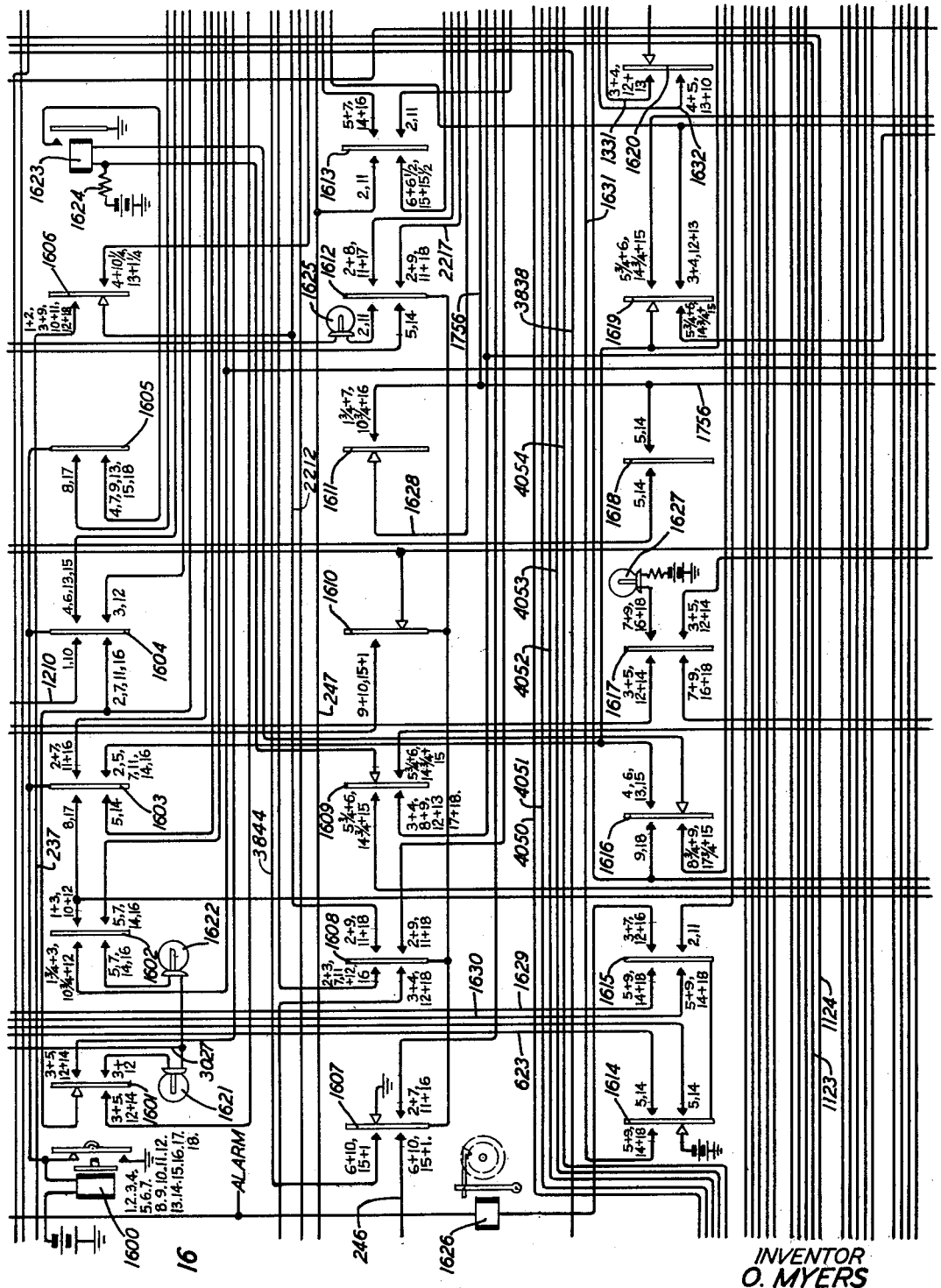
Figure 17:
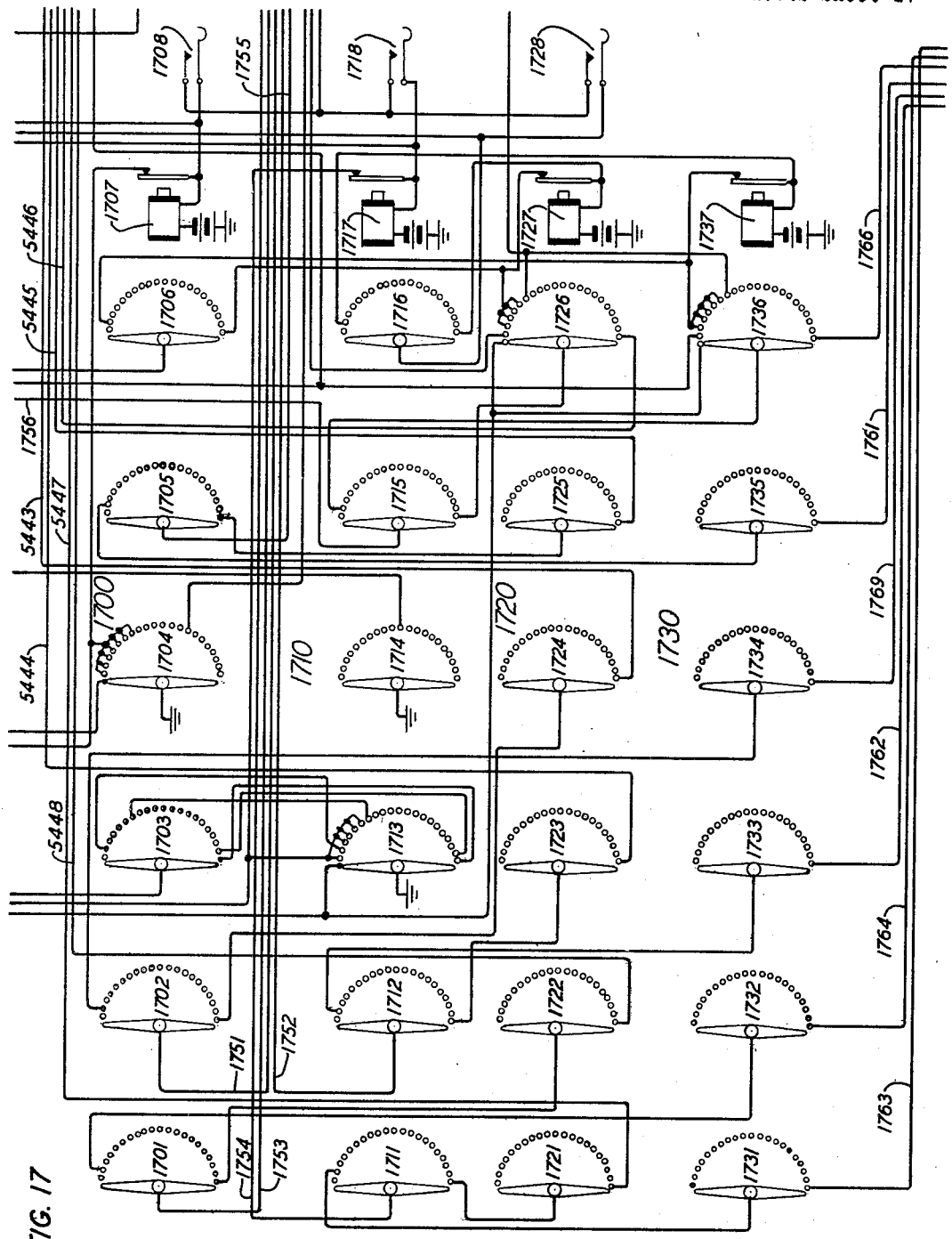
Figure 18:
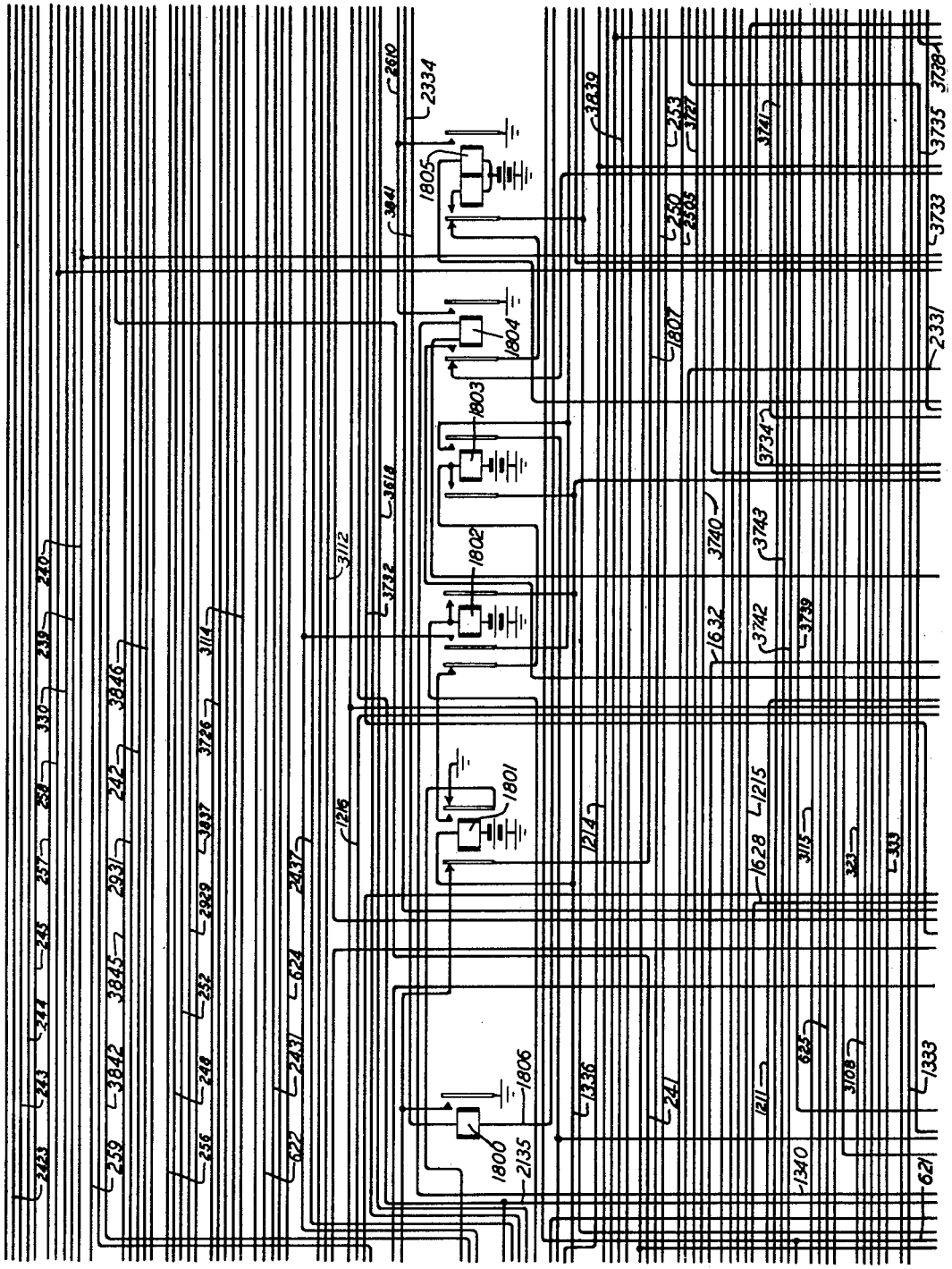
Figure 19:
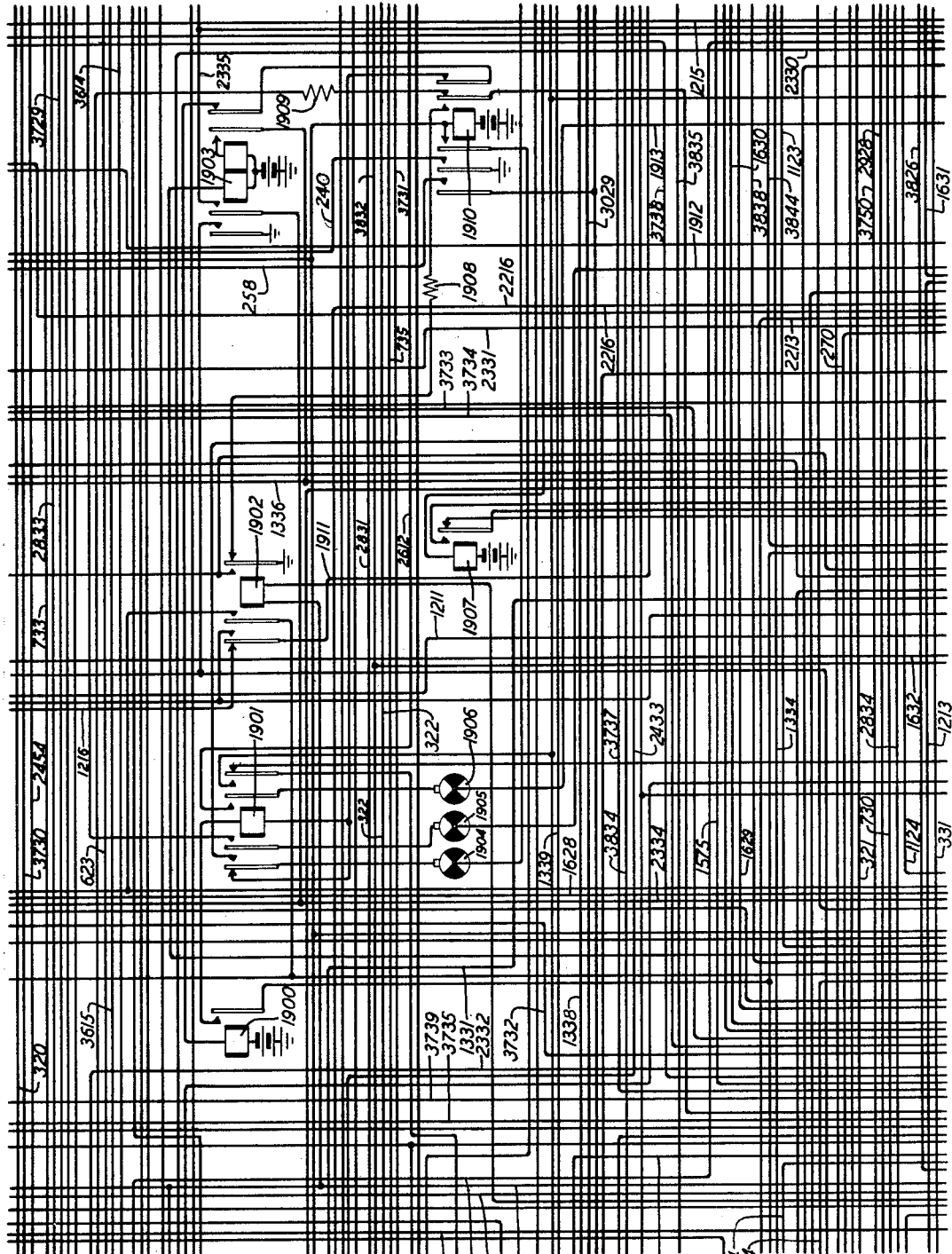
Figure 20:
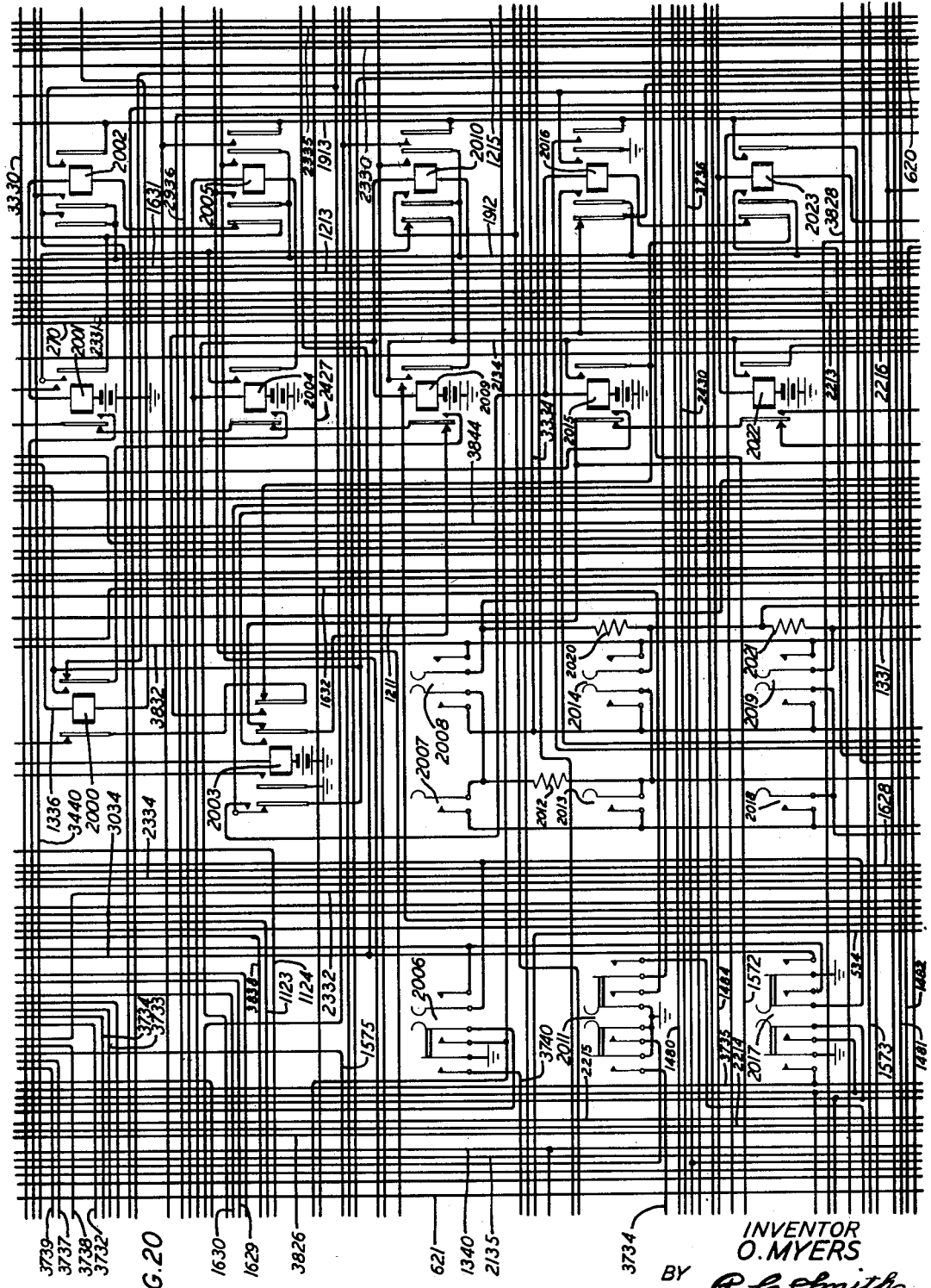
Figure 21:
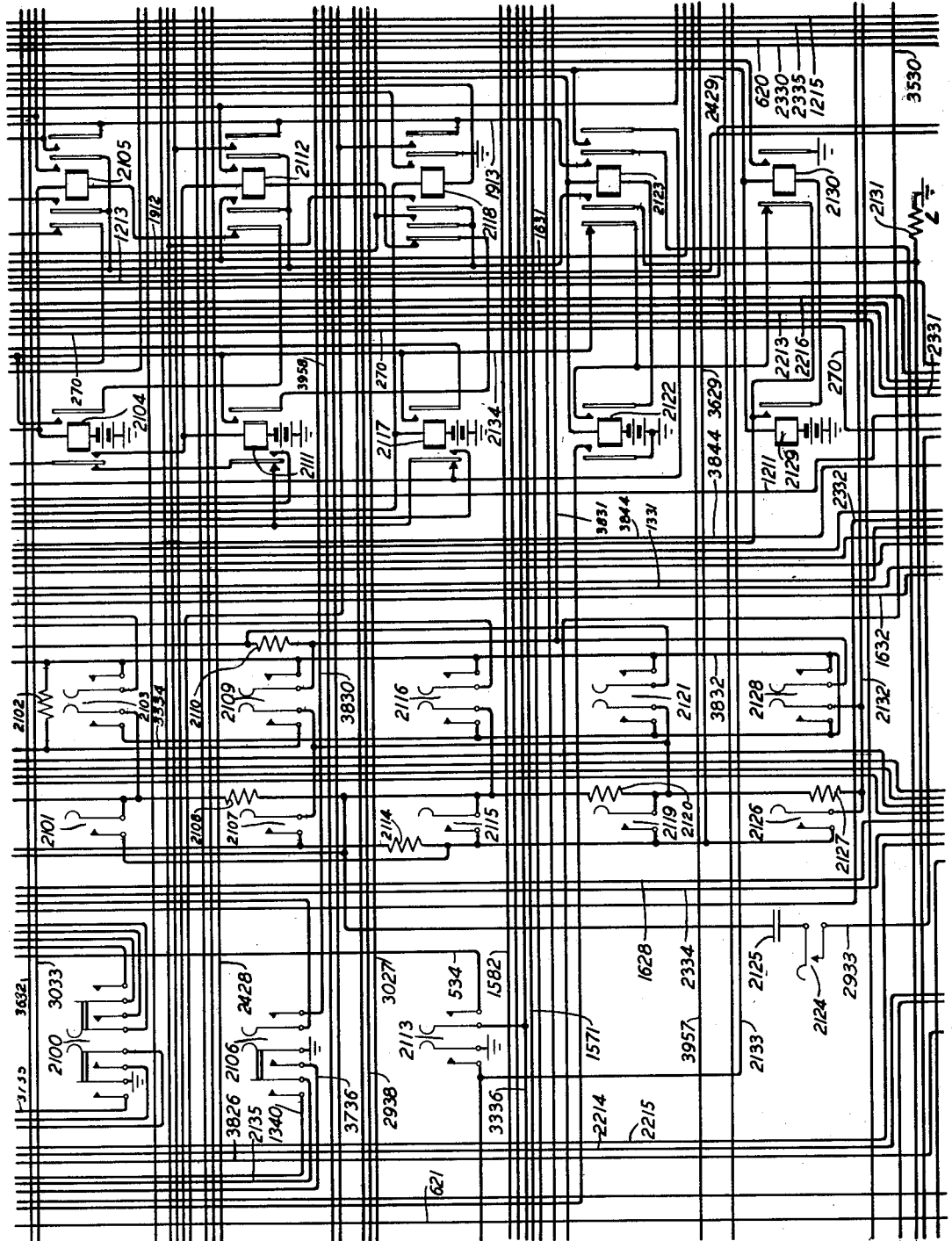
Figure 22:
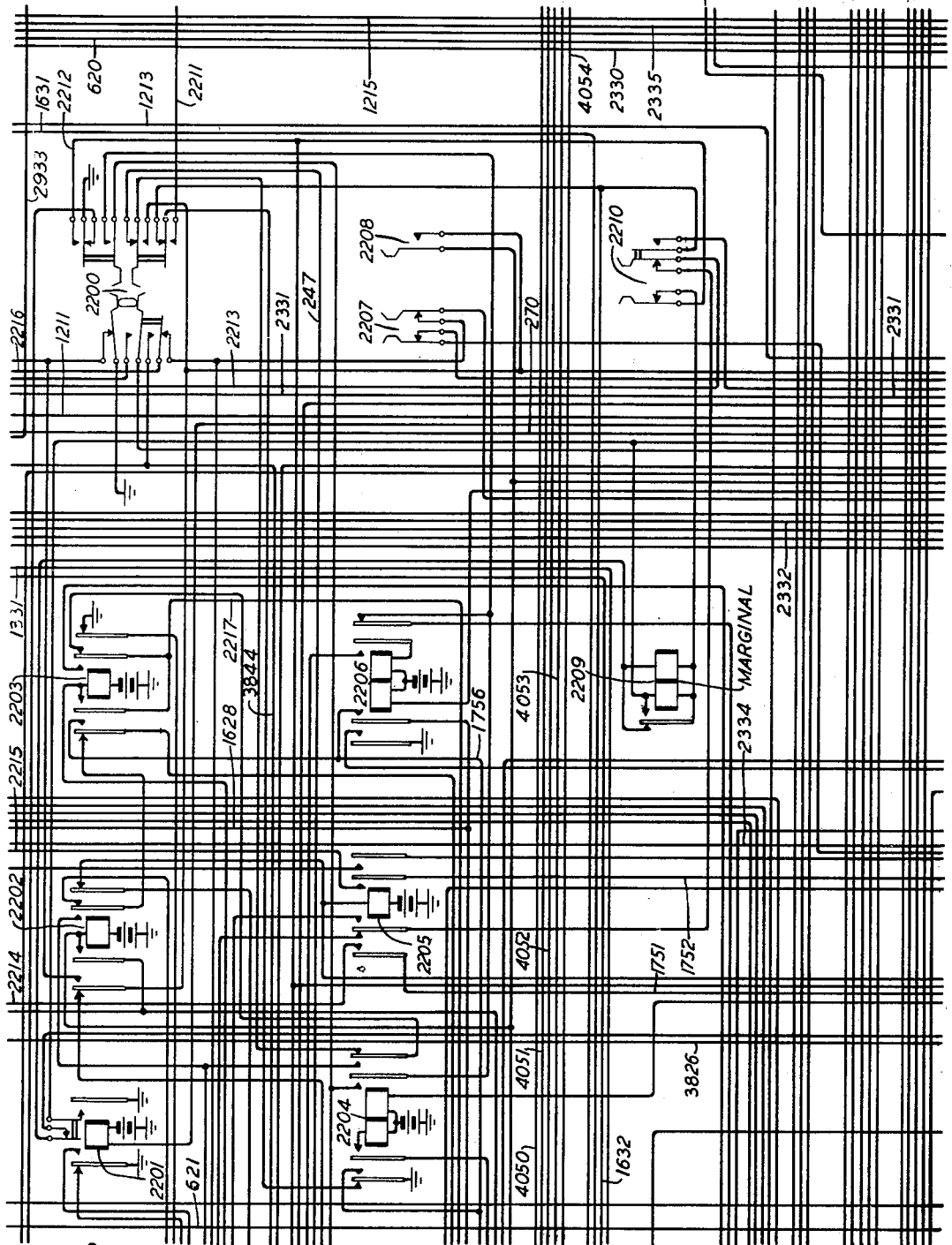
Figure 23:
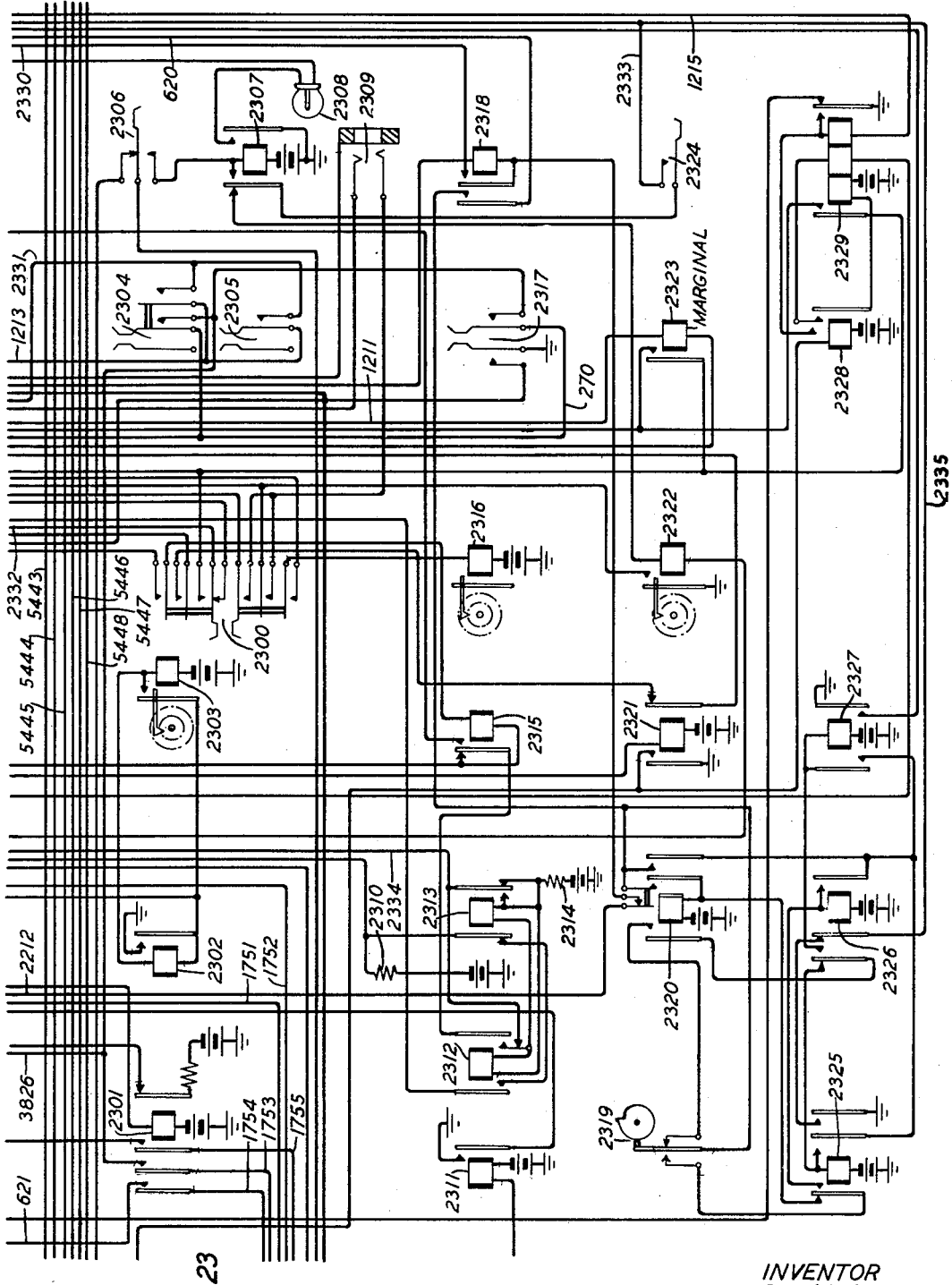
Figure 24:
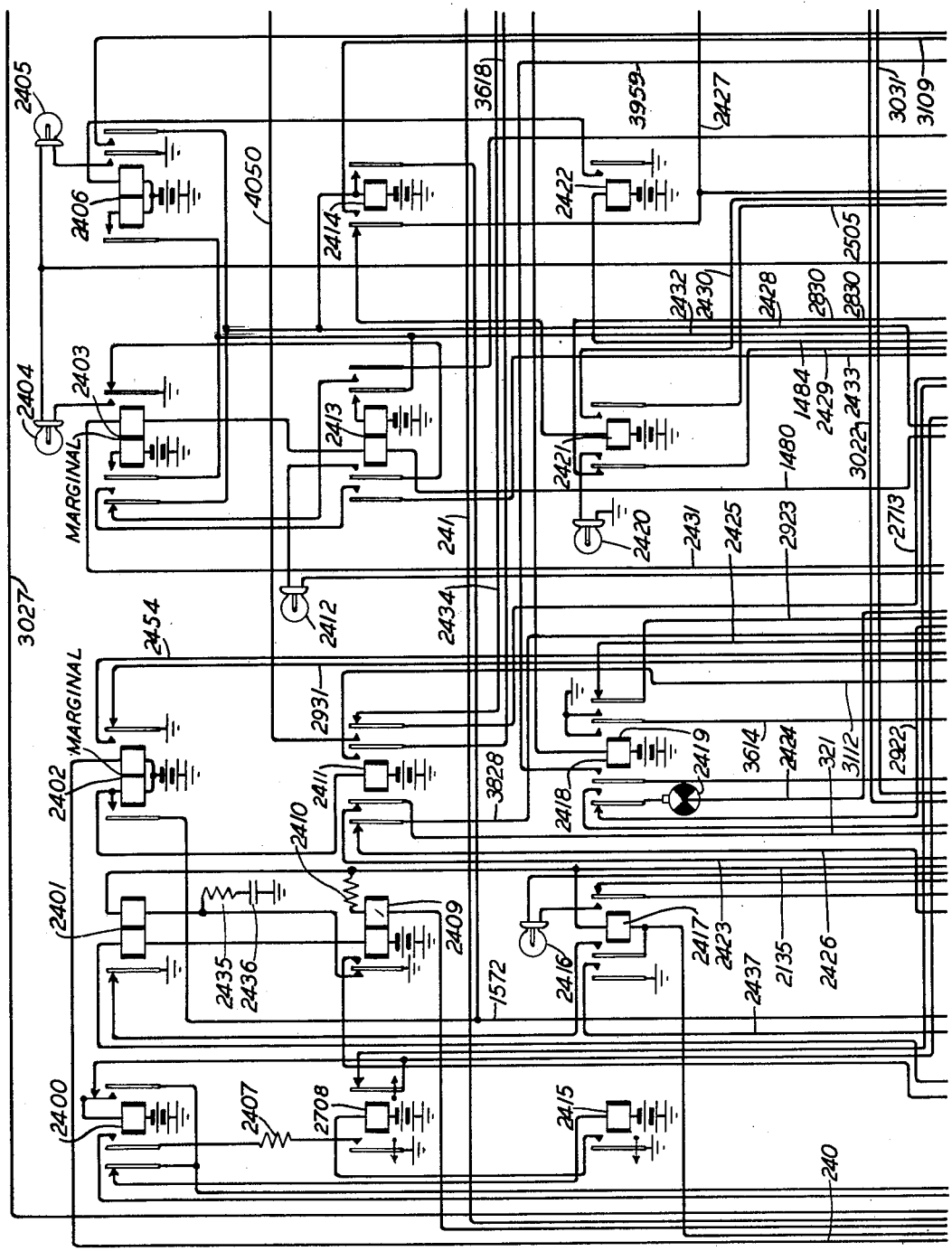
Figure 25:
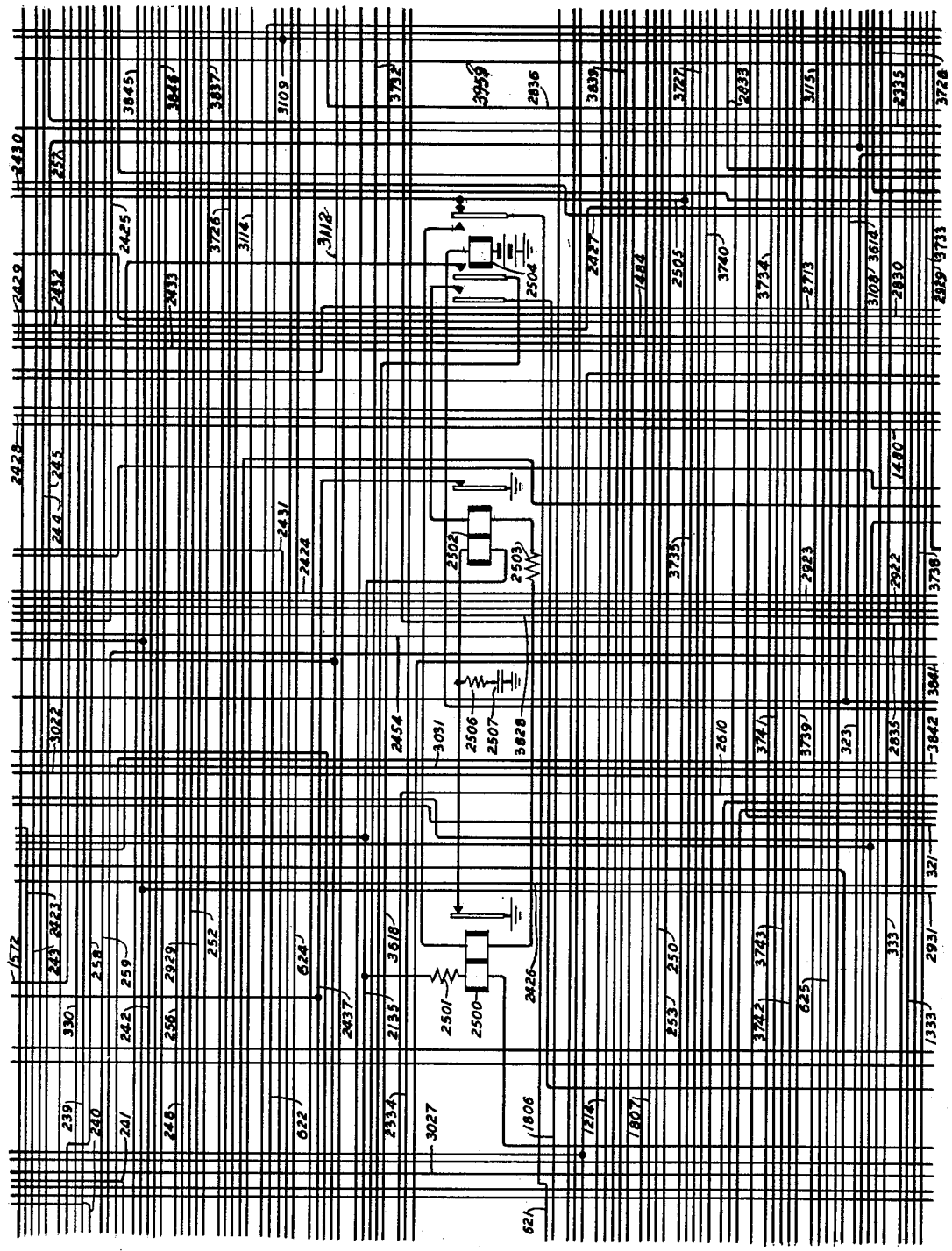
Figure 26:
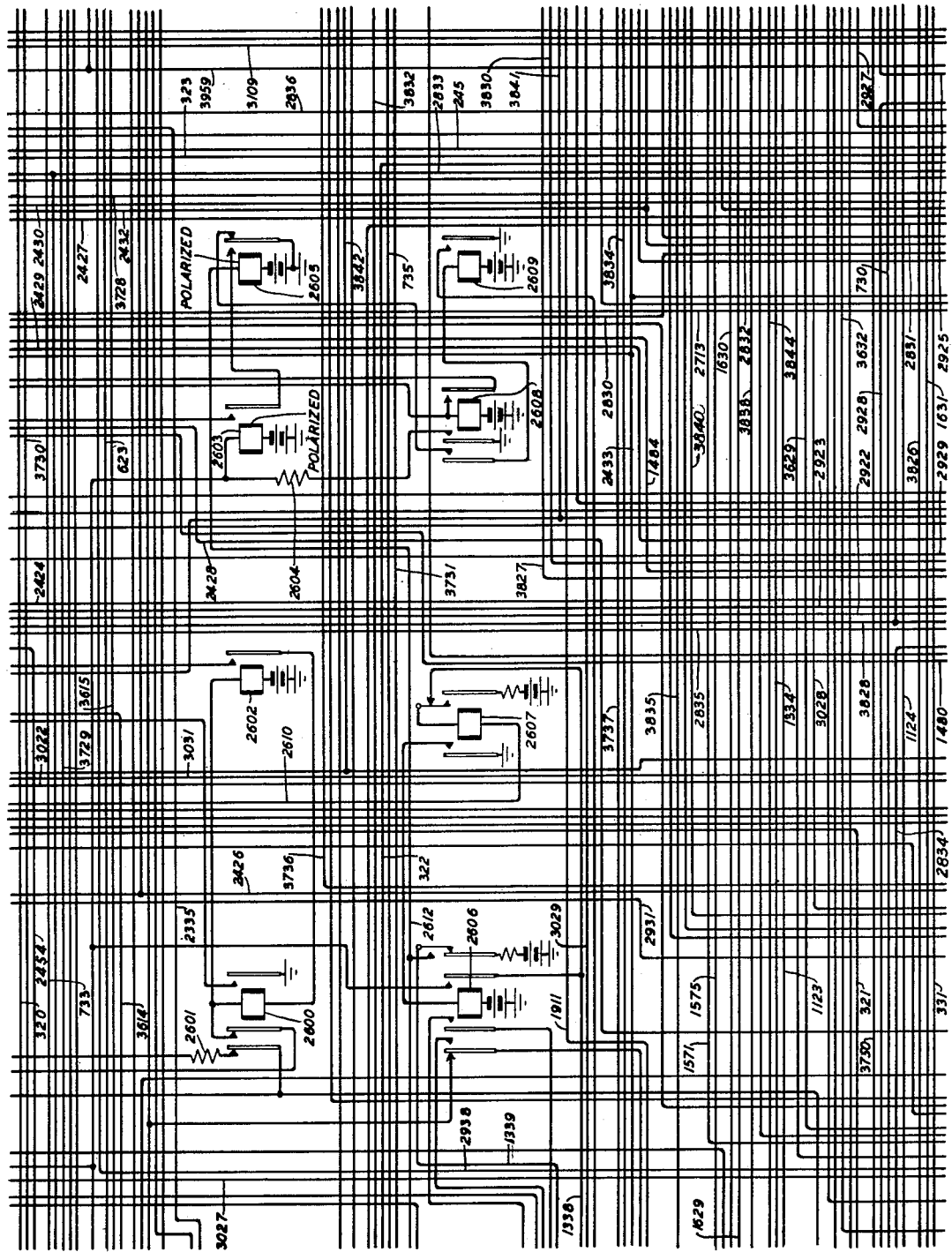
Figure 27:
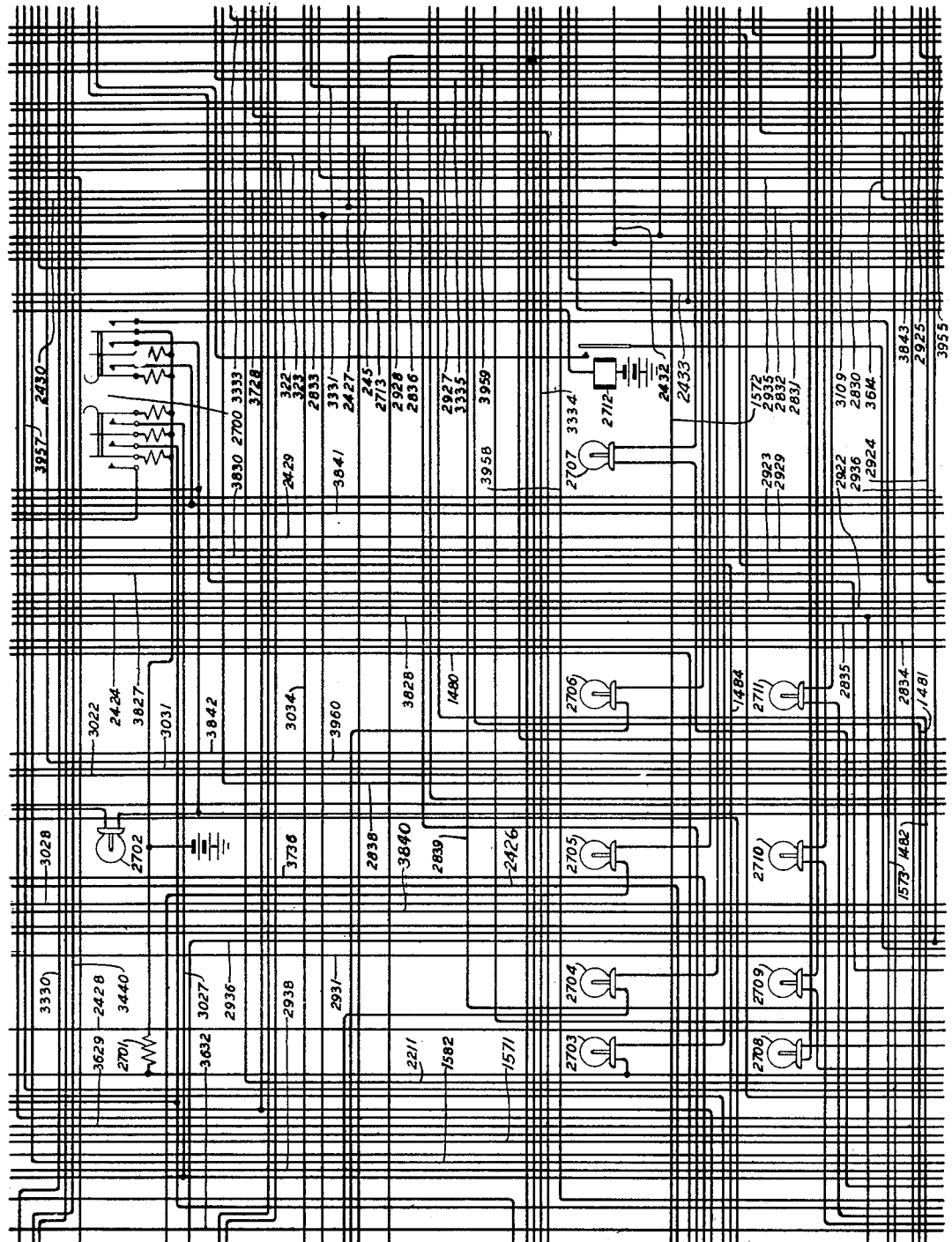
Figure 28:
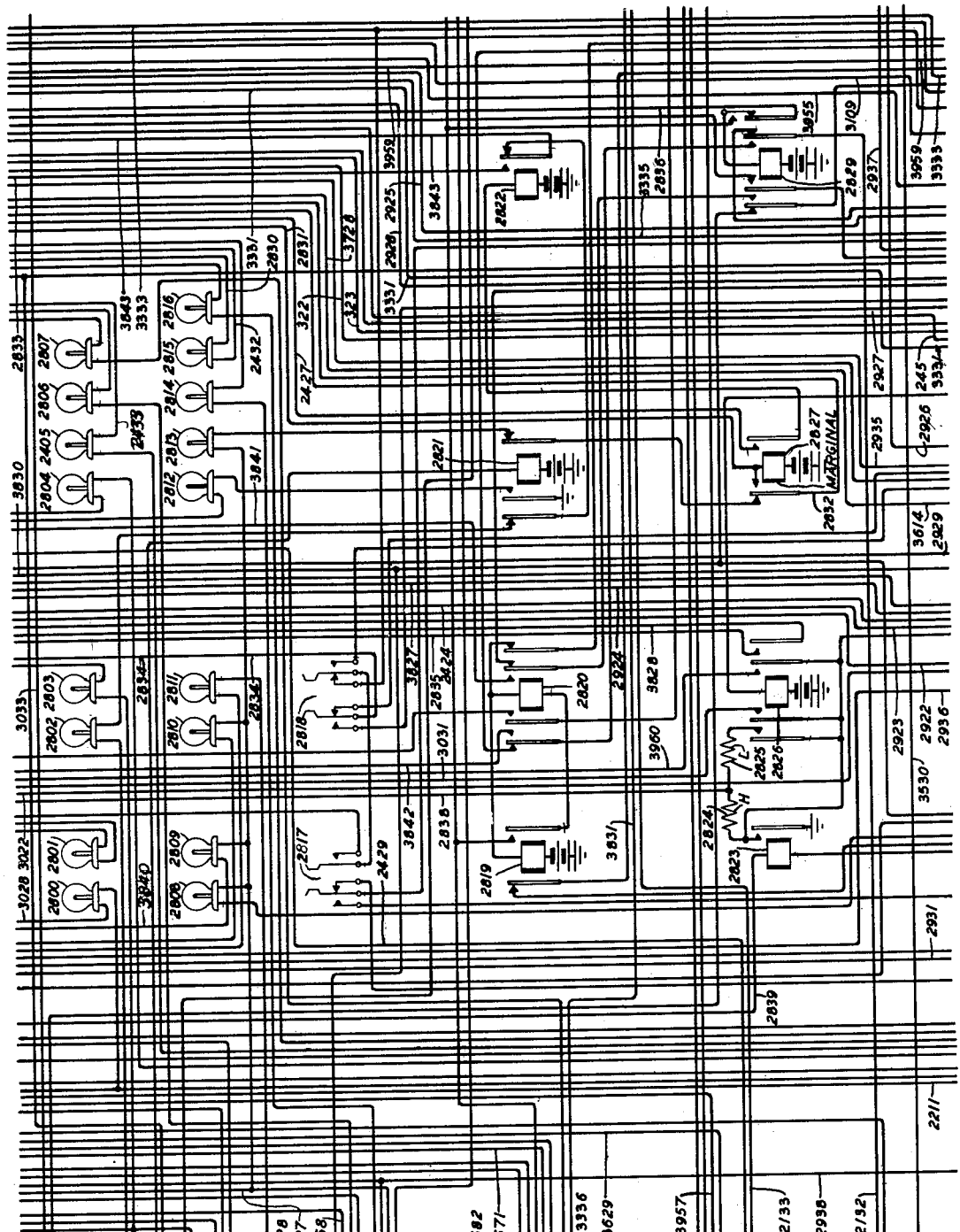
Figure 29:
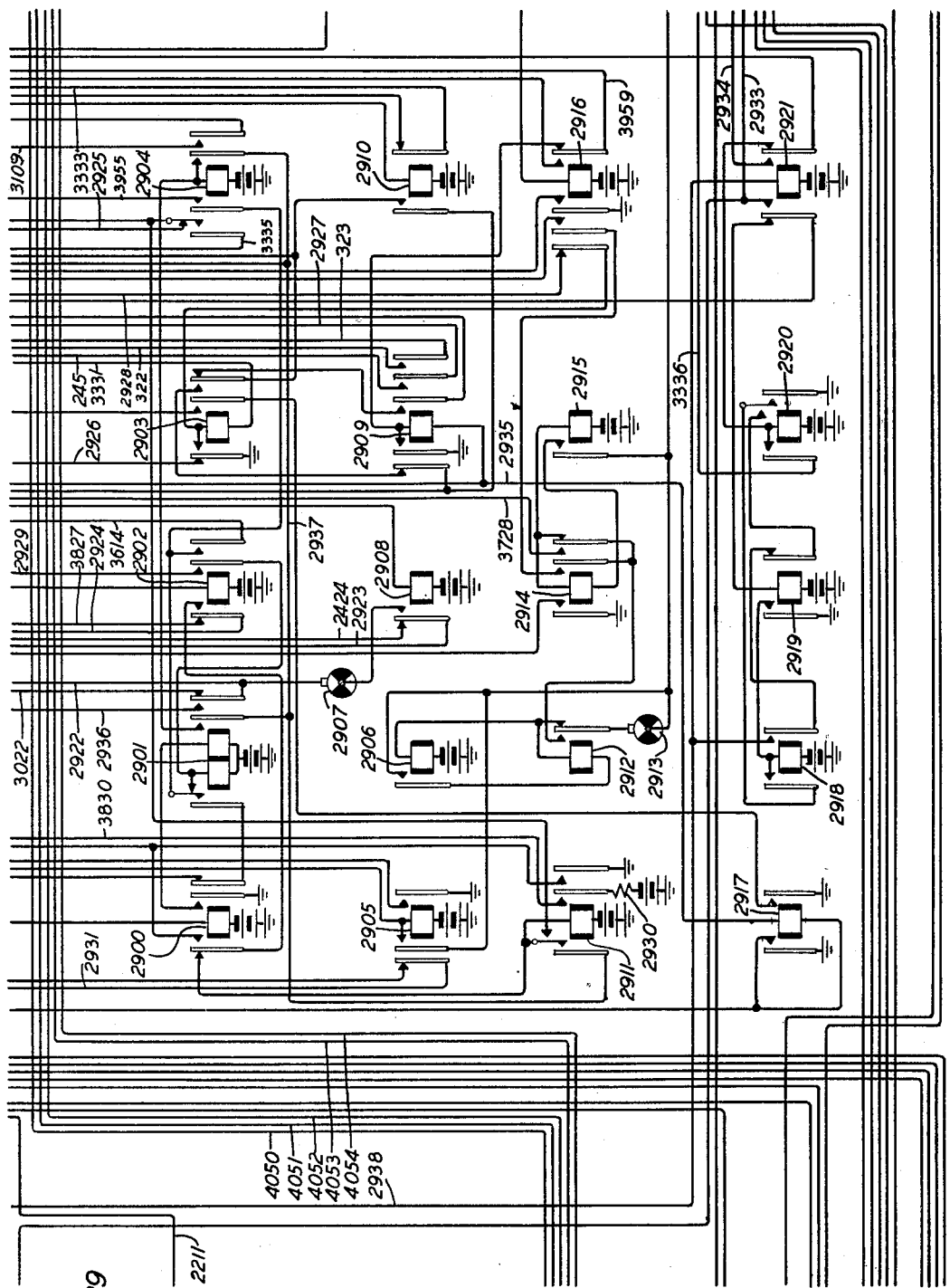
Figure 30:
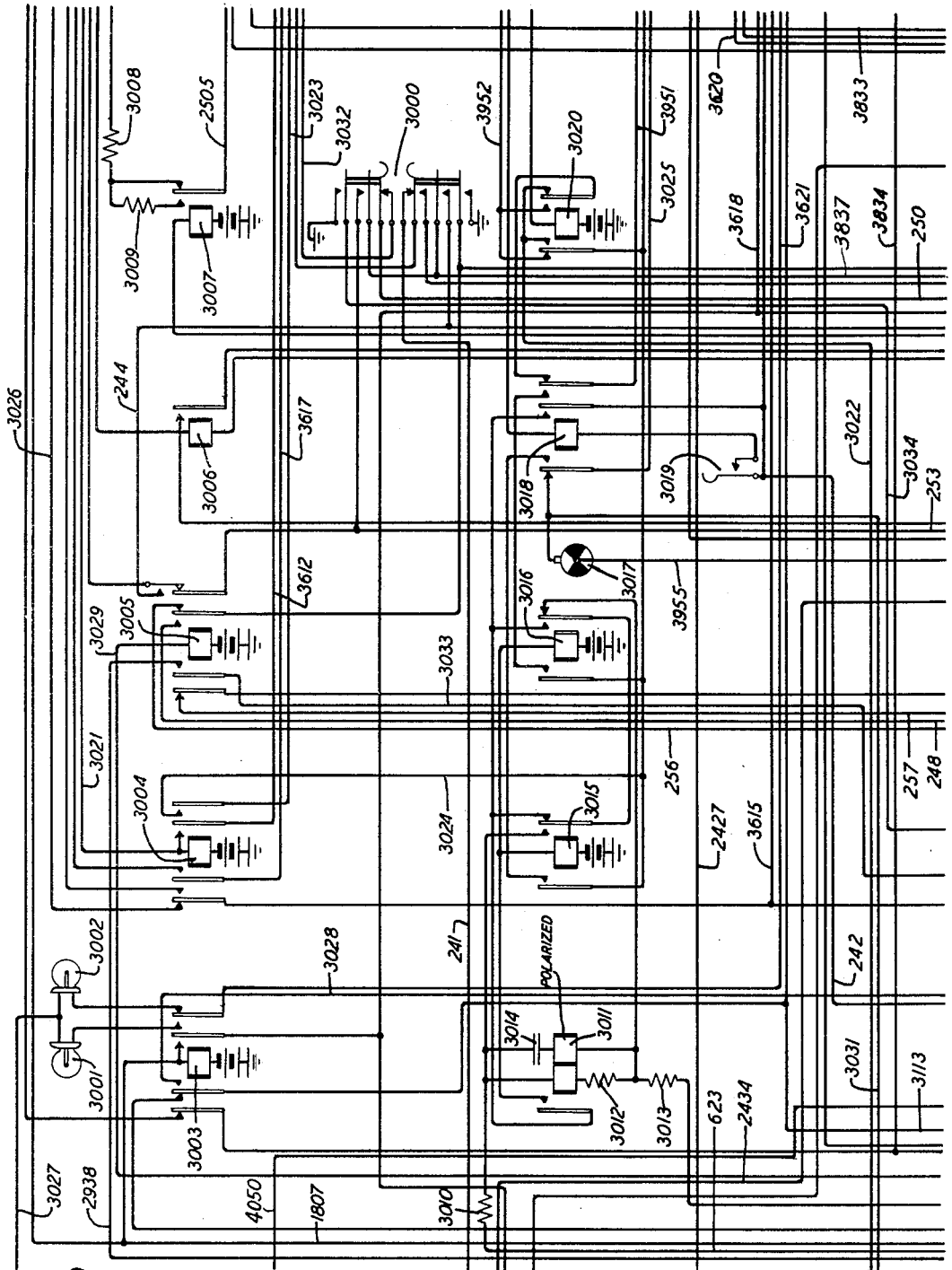
Figure 31:
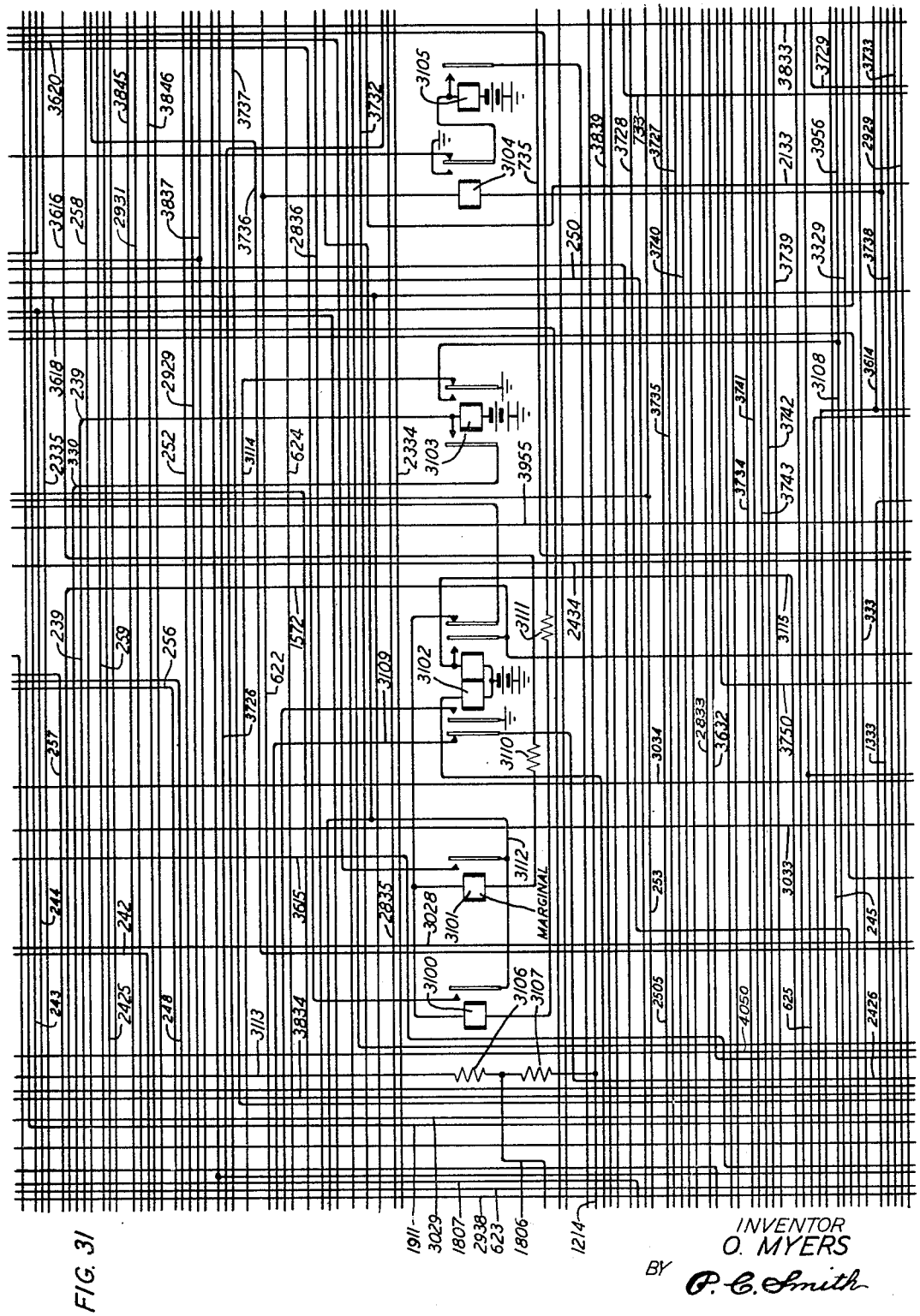
Figure 32:
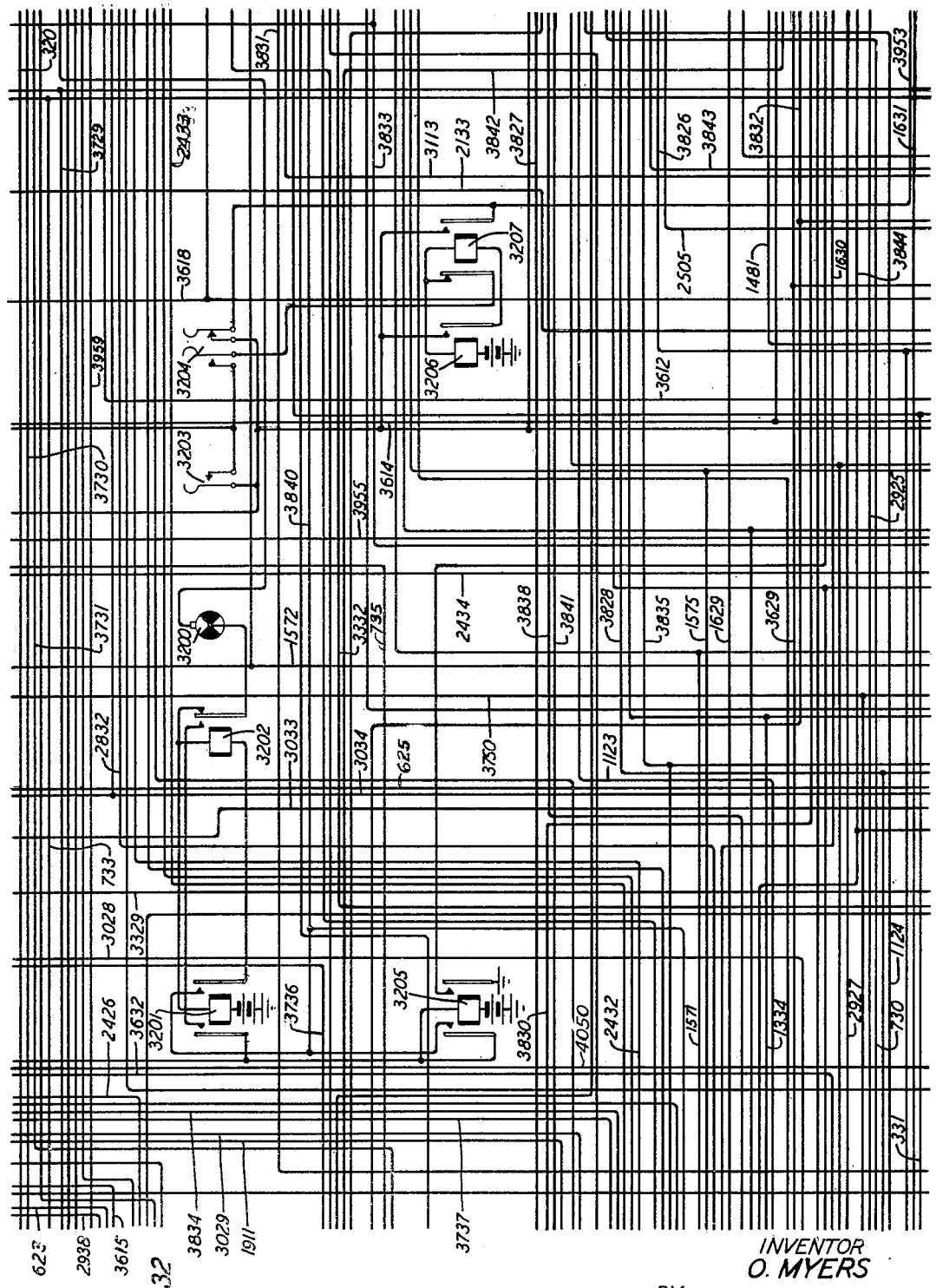
Figure 33:
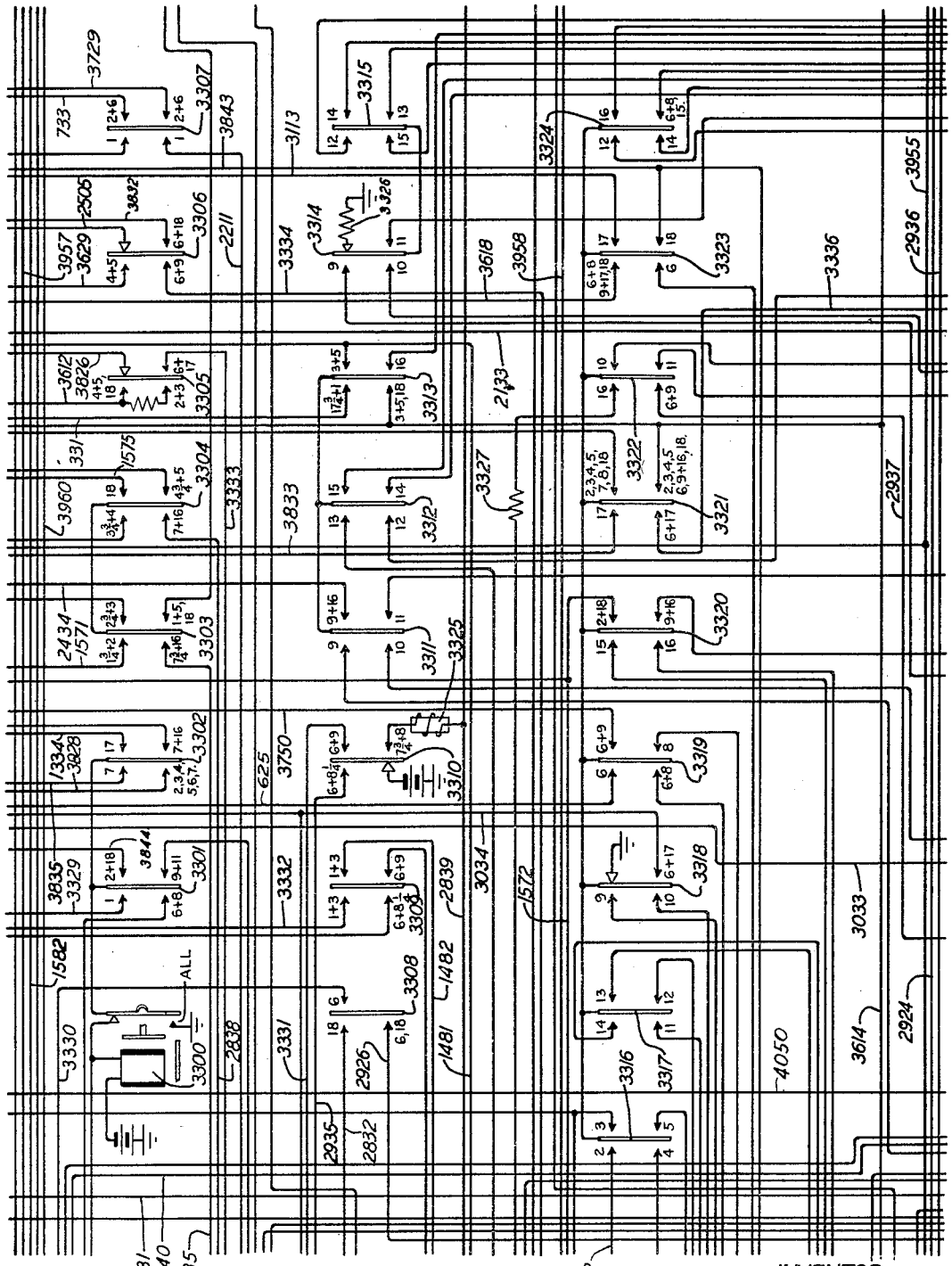
Figure 34:
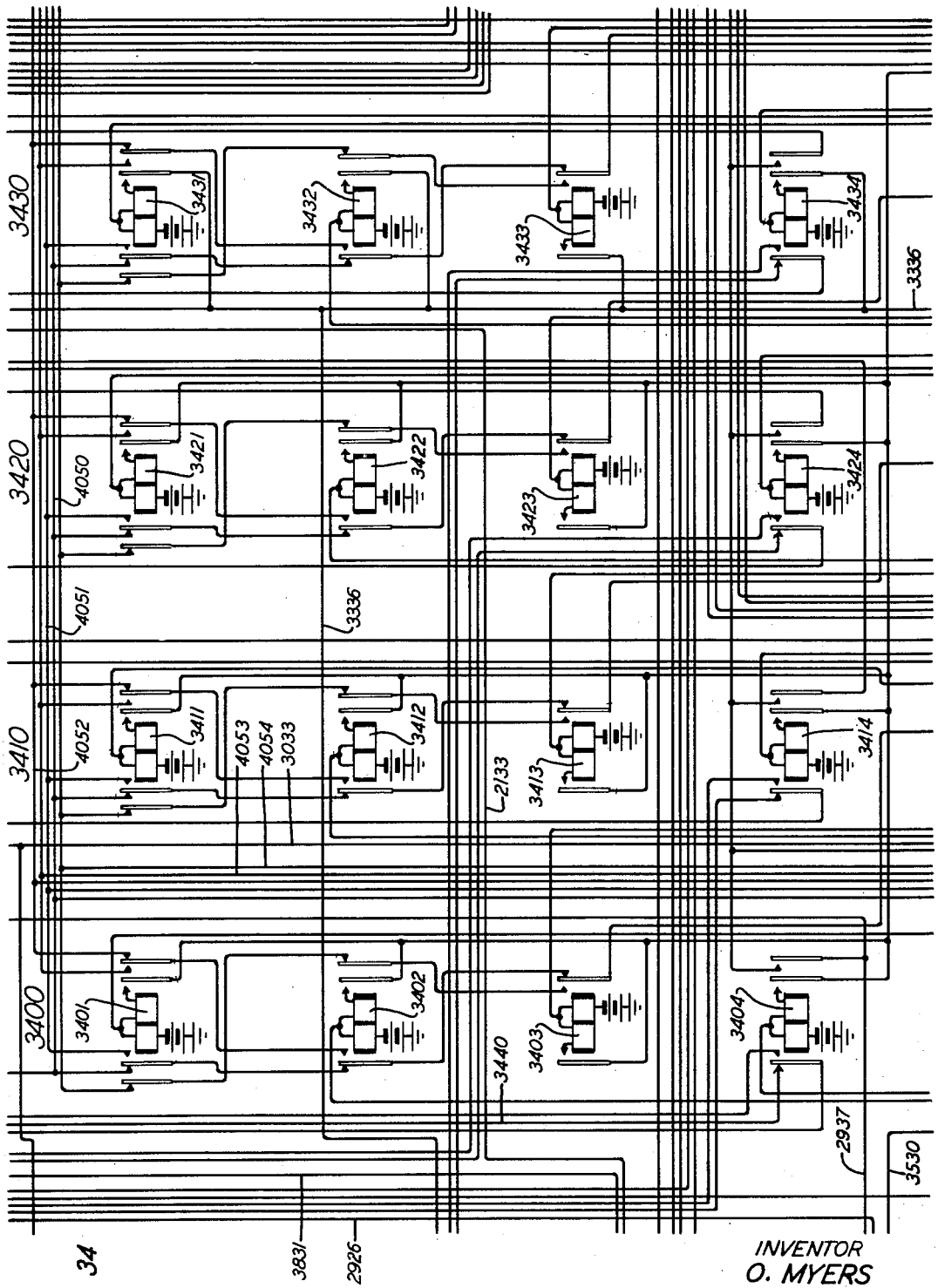
Figure 35:
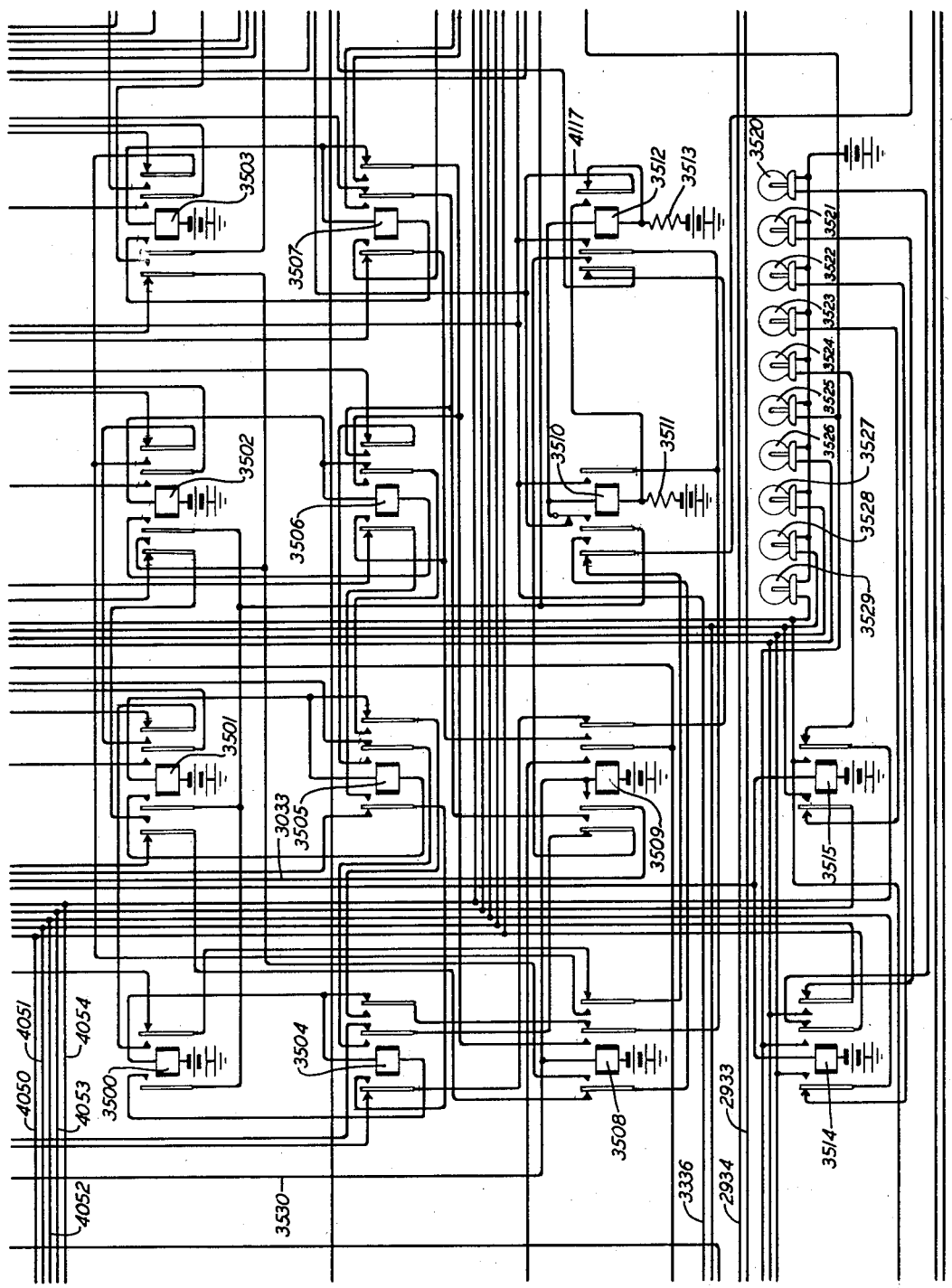
Figure 36:
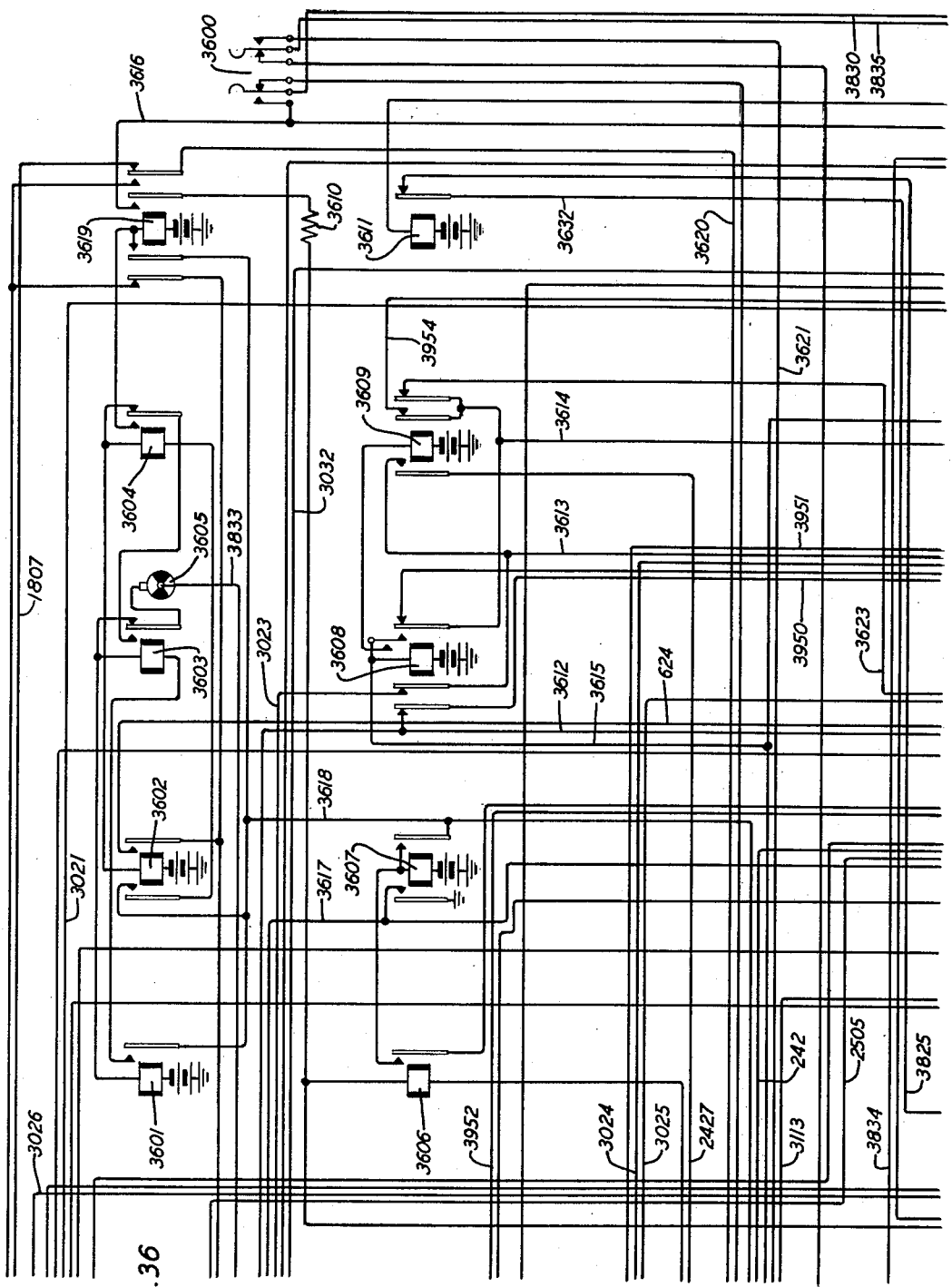
Figure 37:
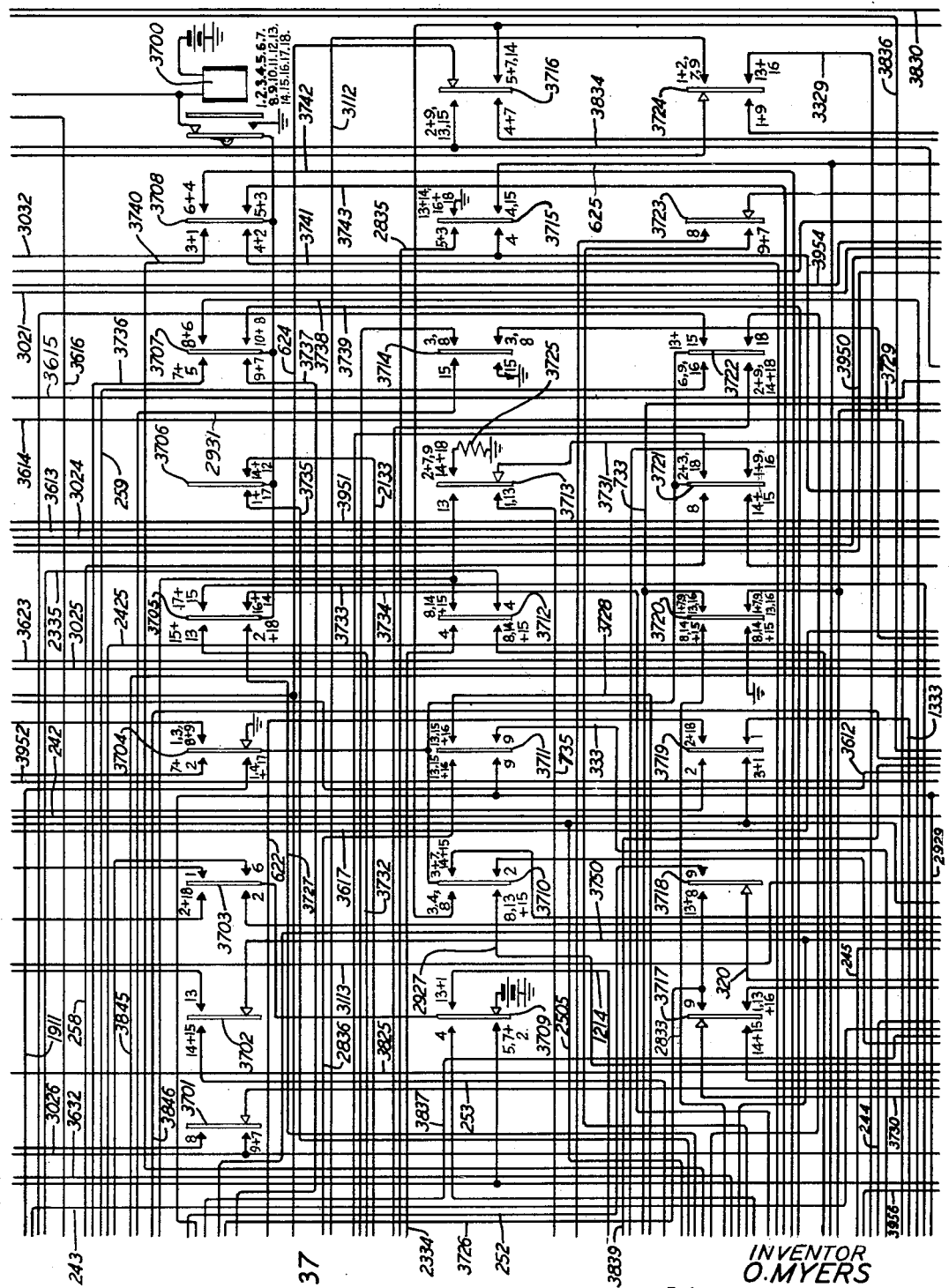
Figure 38:
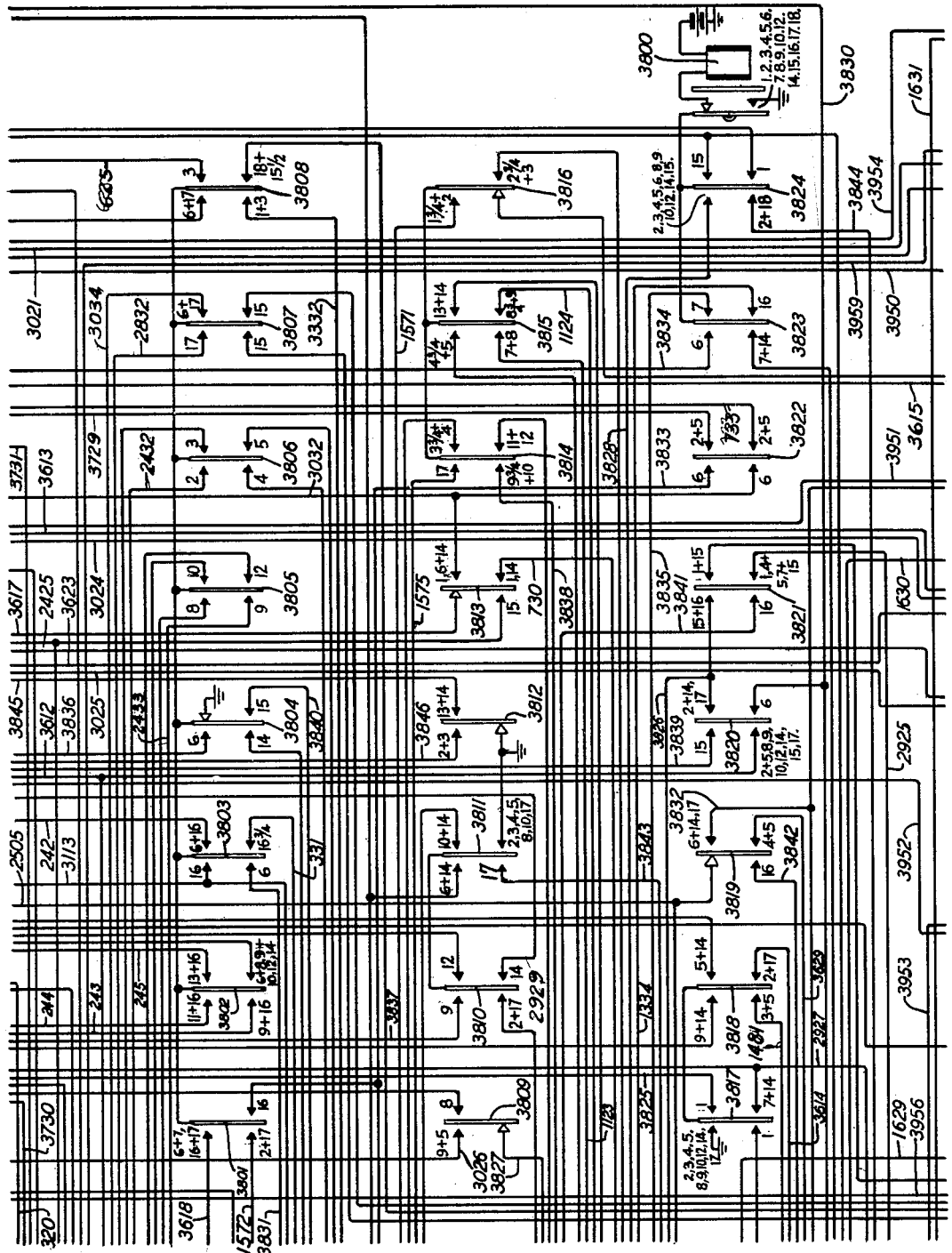
Figure 39:
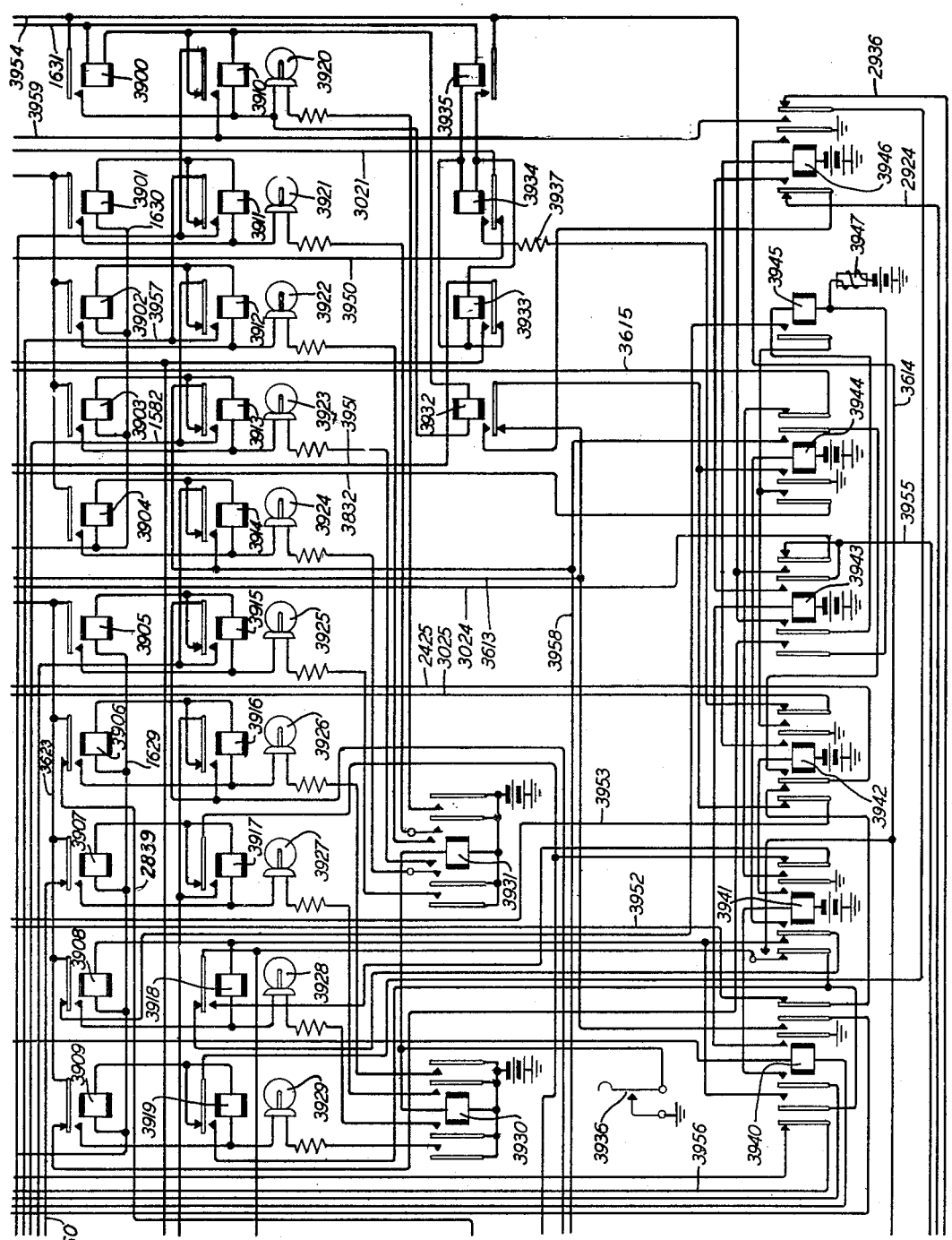
Figure 40:
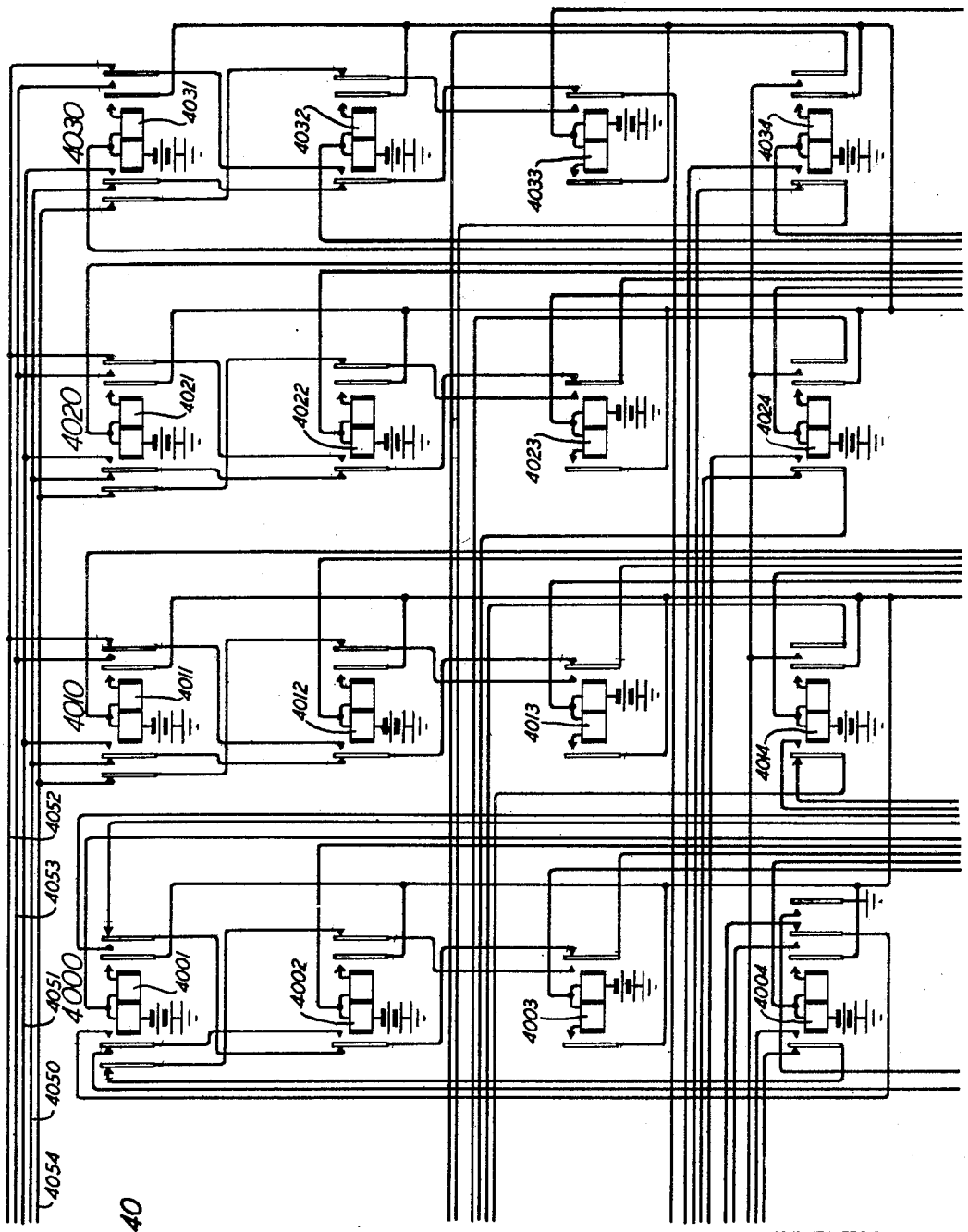
Figure 41:
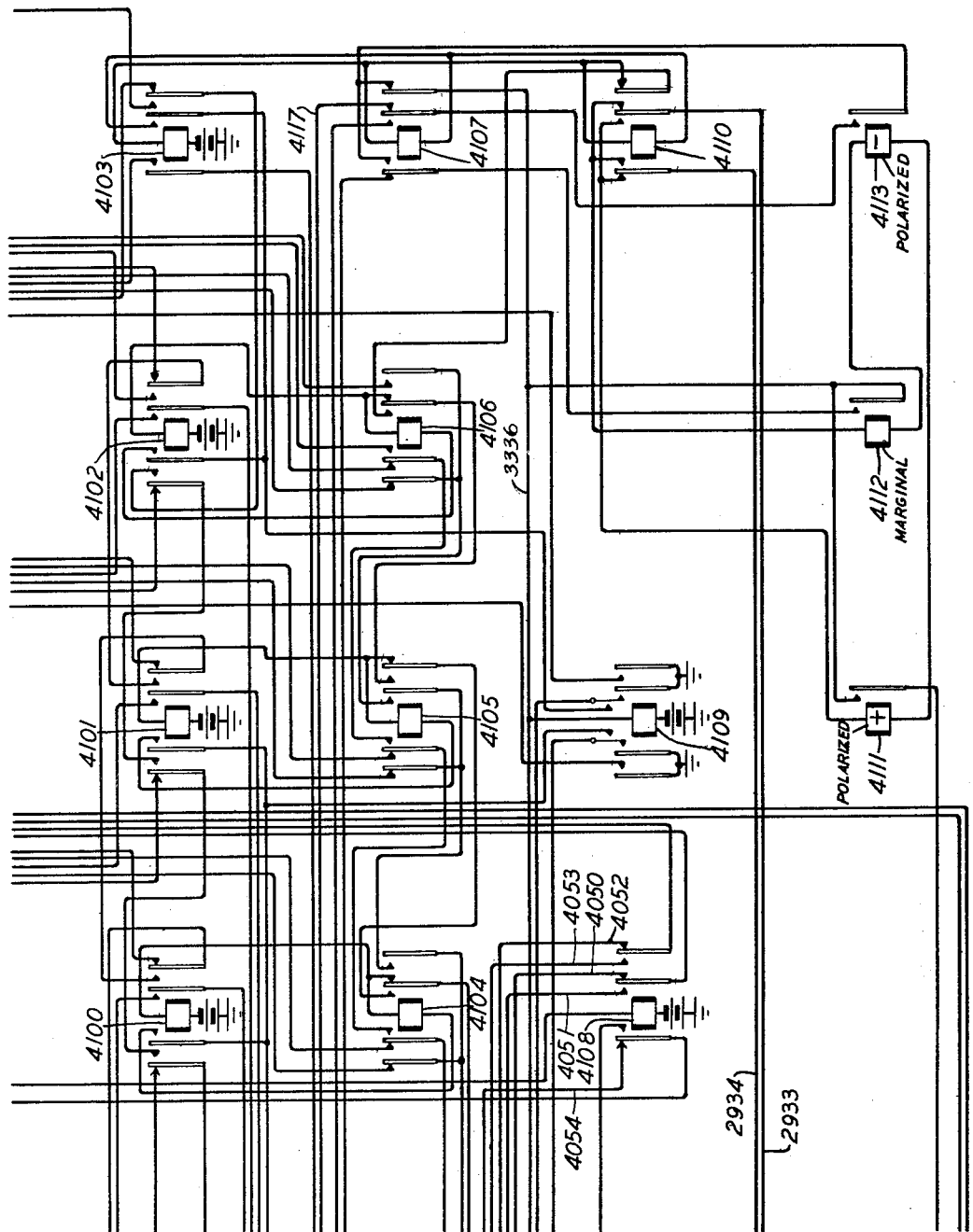
Figure 42:
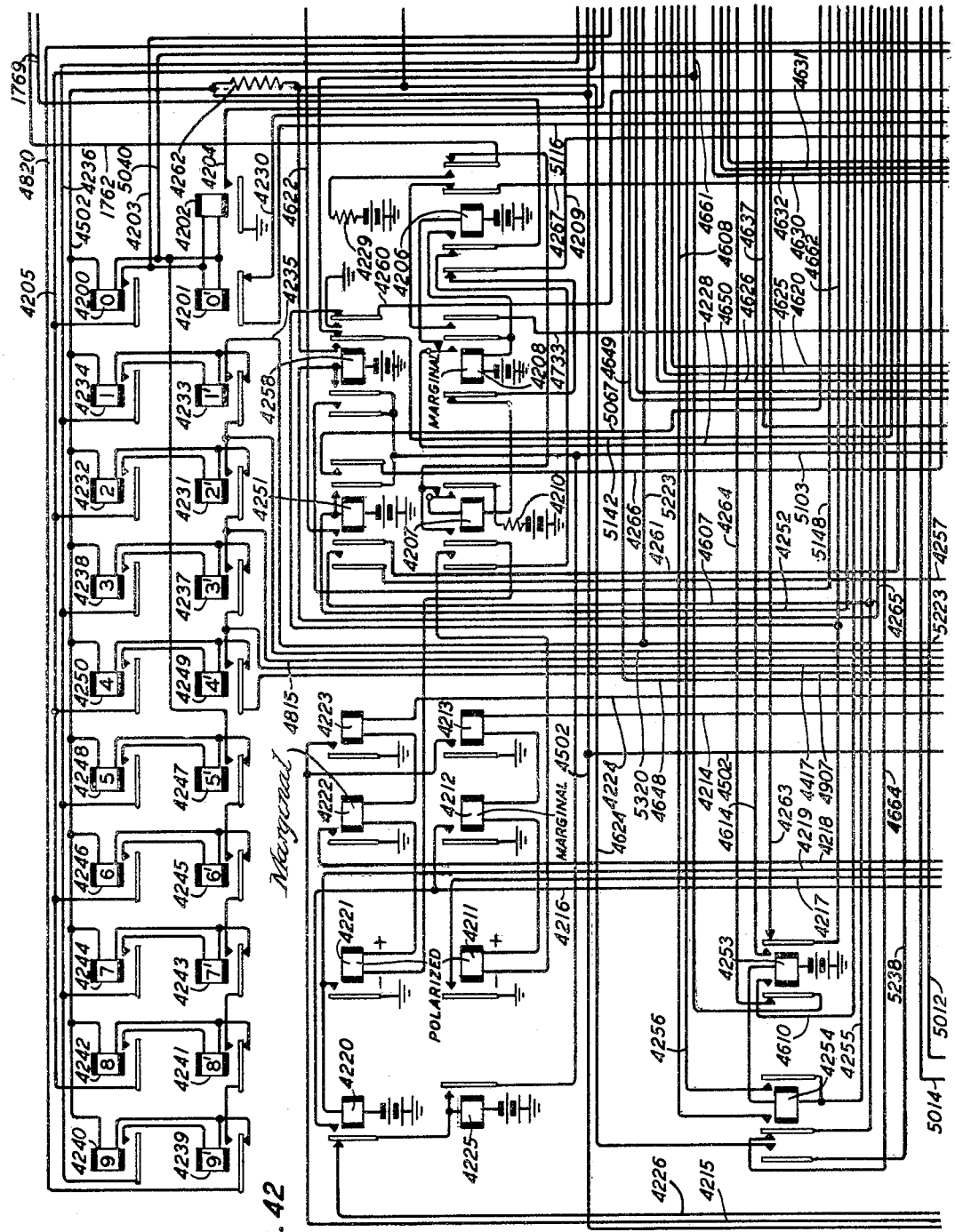
Figure 43:
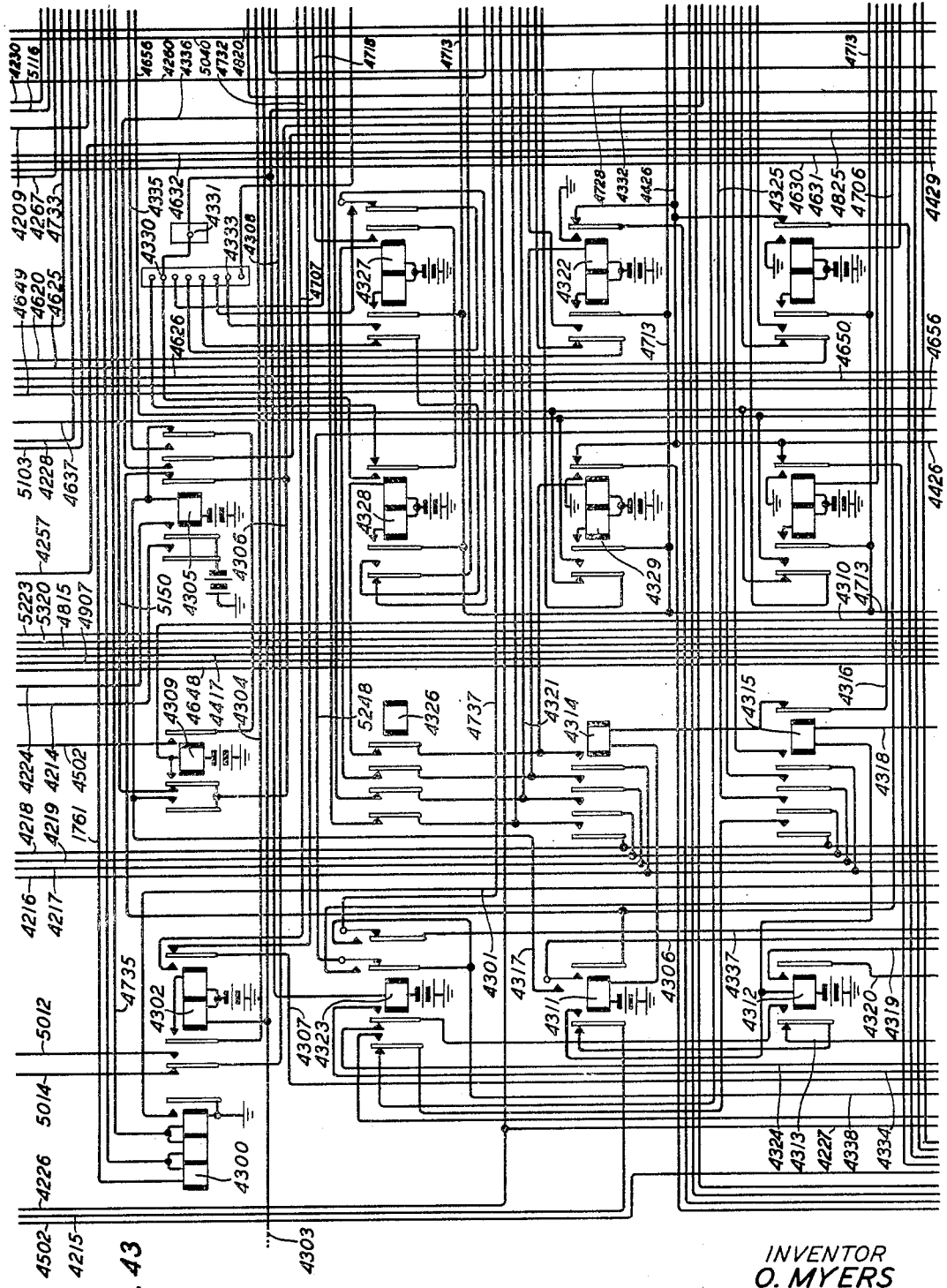
Figure 44:
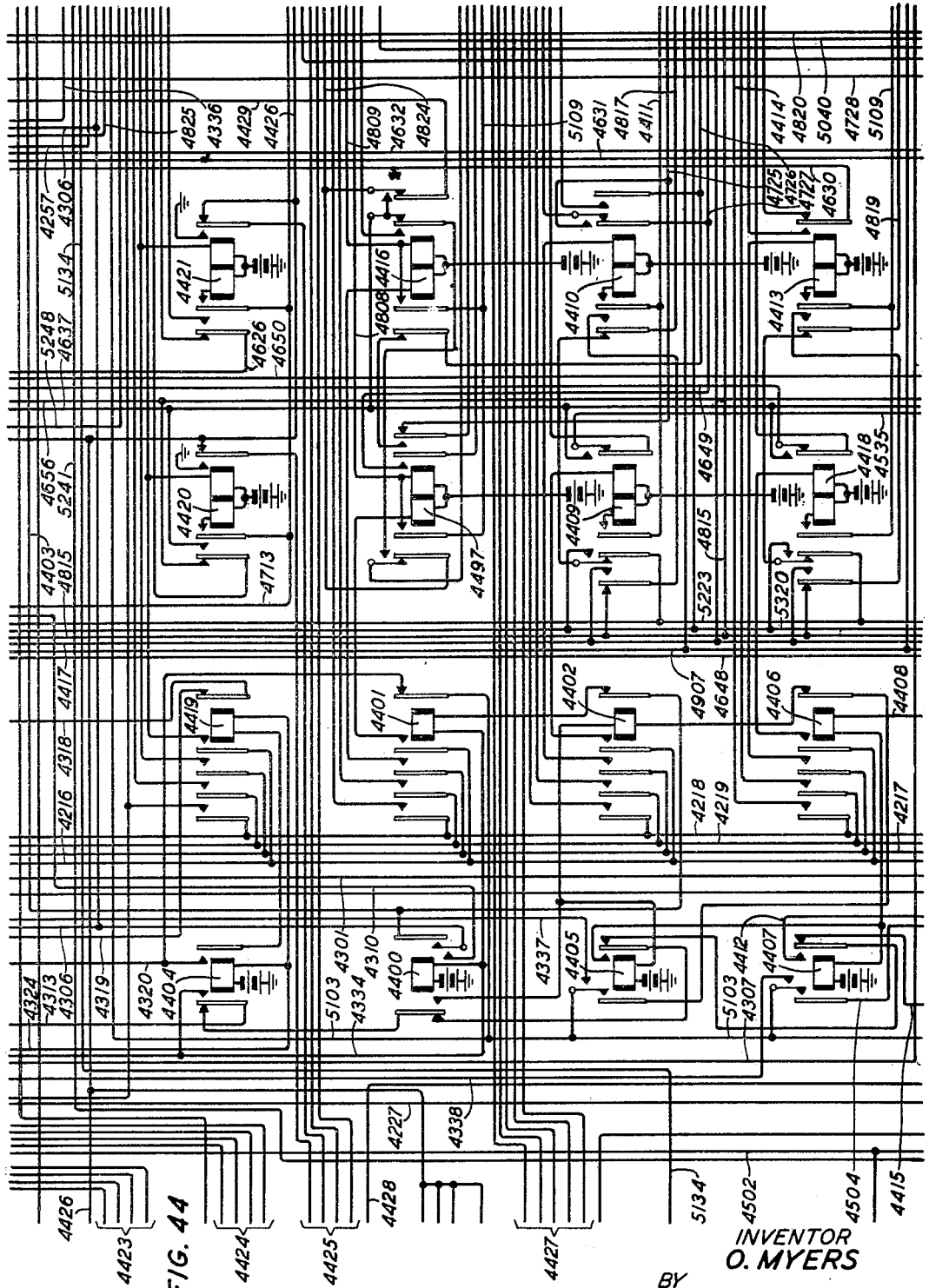
Figure 45:
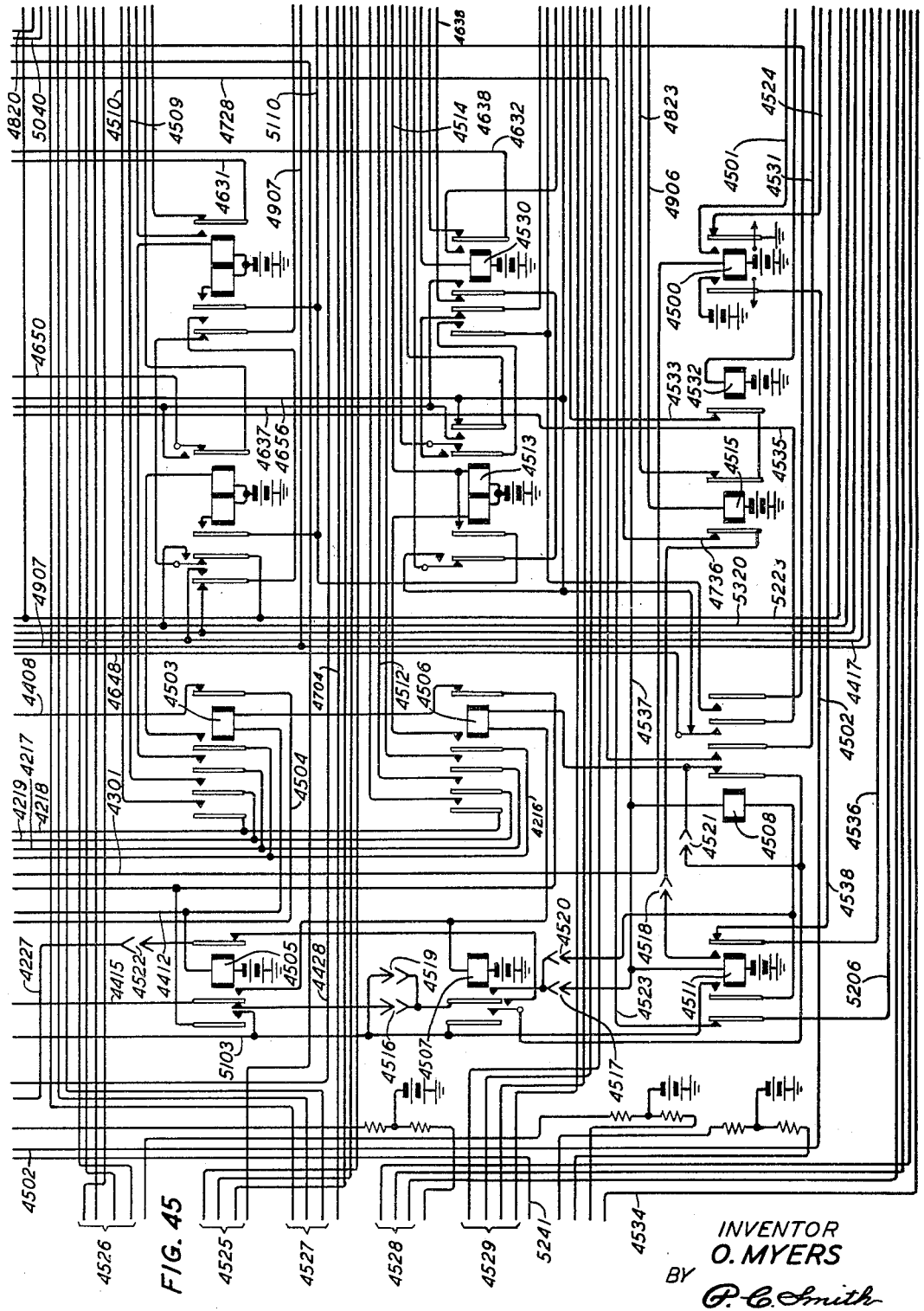
Figure 46:
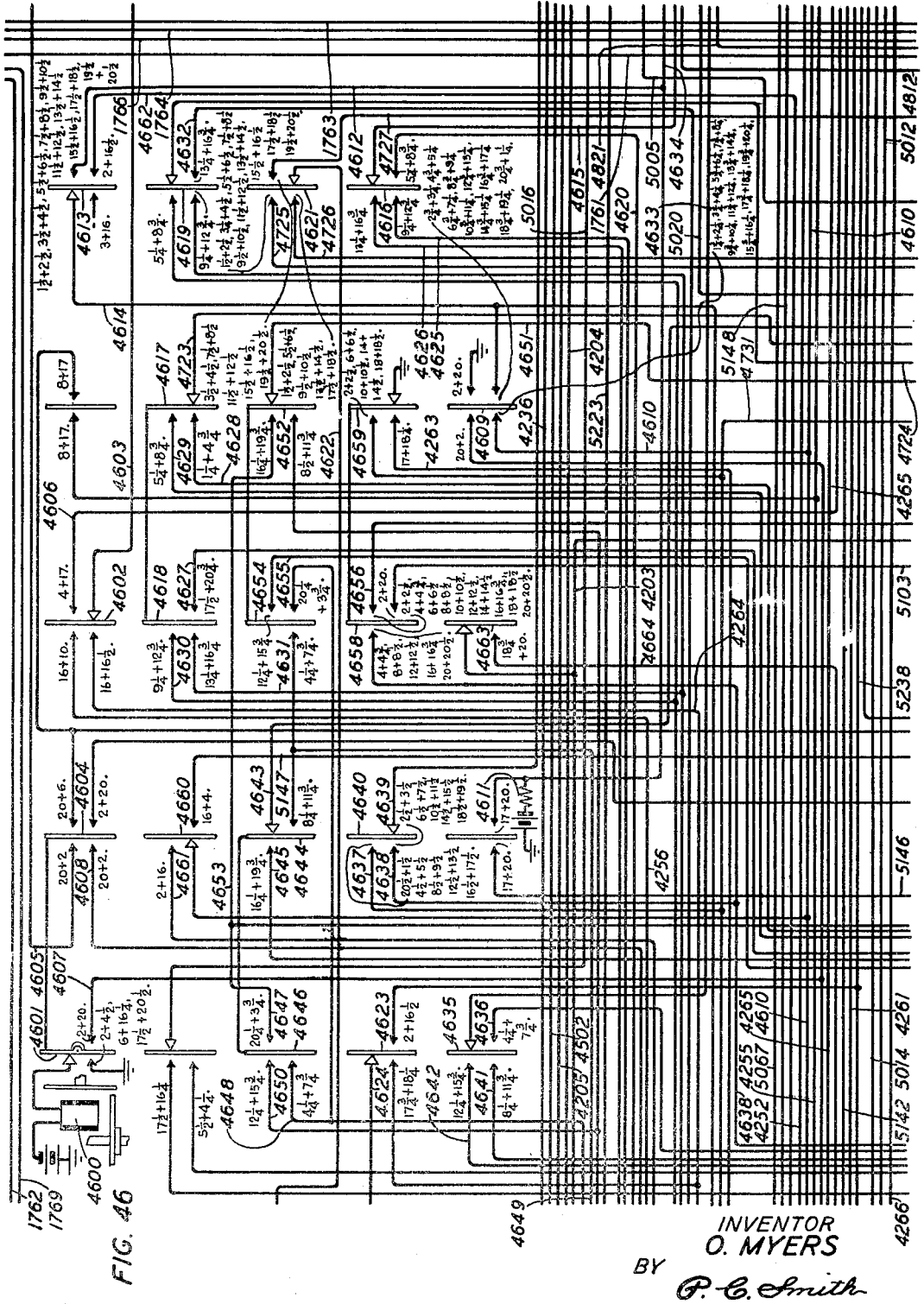
Figure 47:
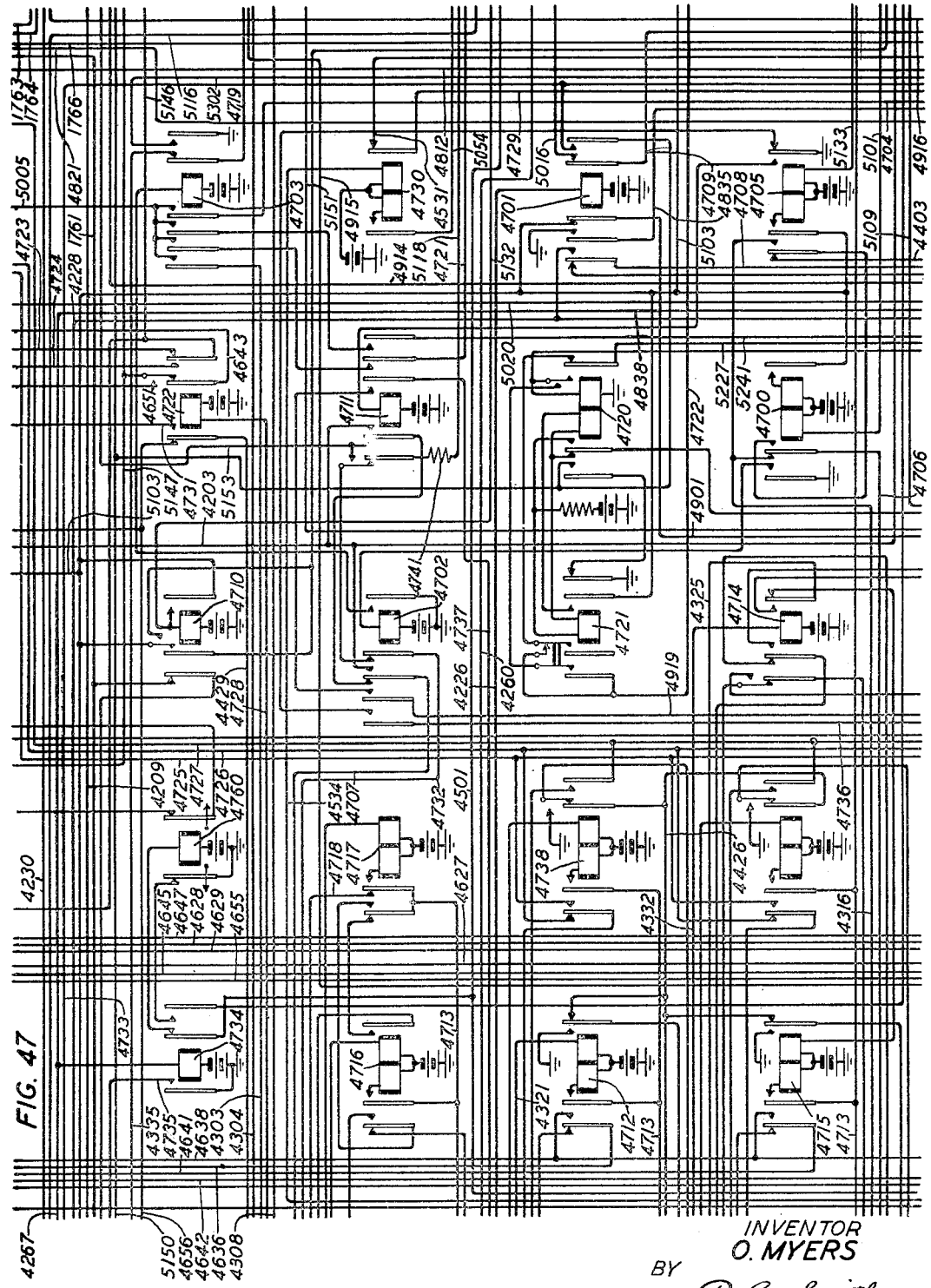
Figure 48:
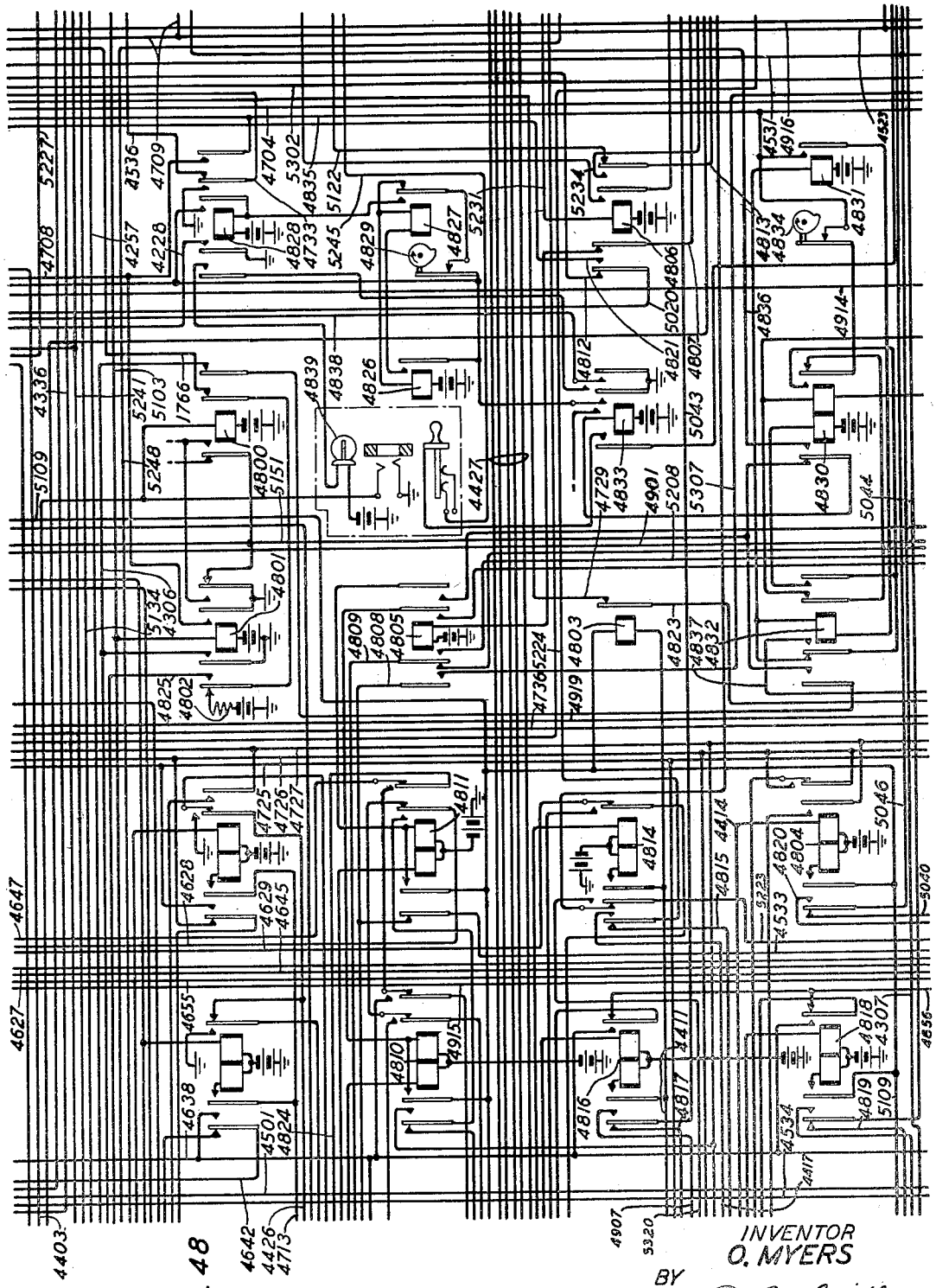
Figure 49:
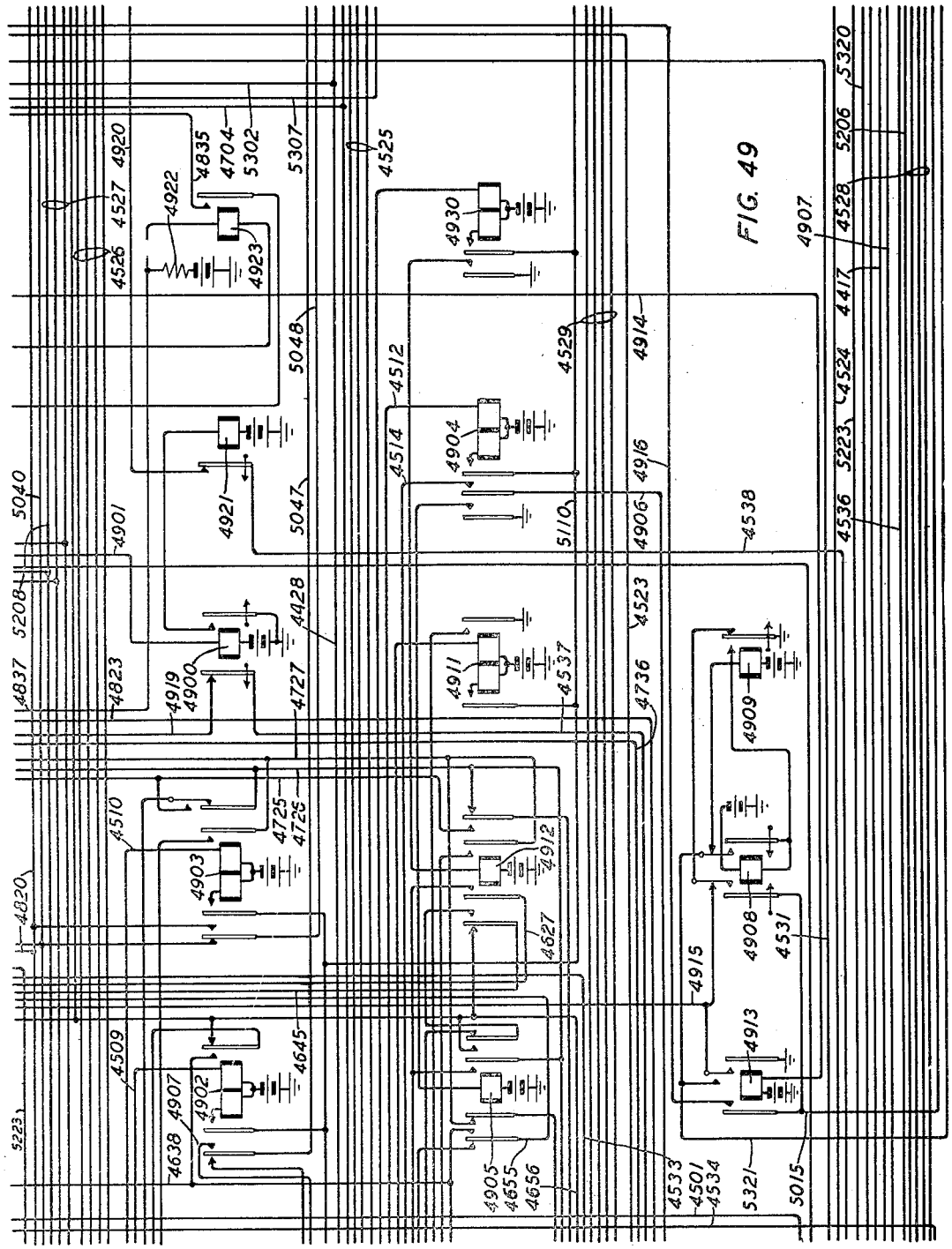
Figure 50:
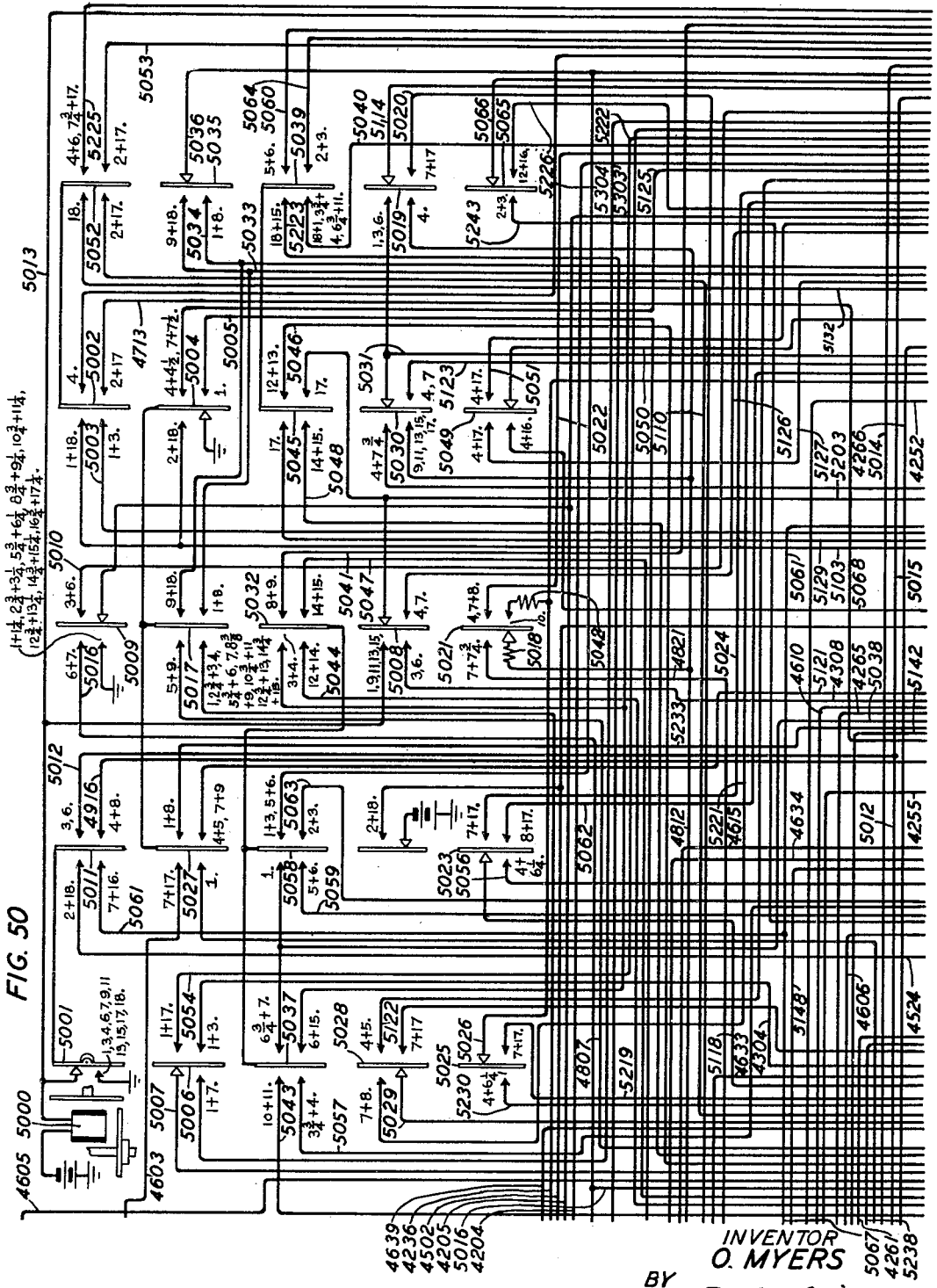
Figure 51:
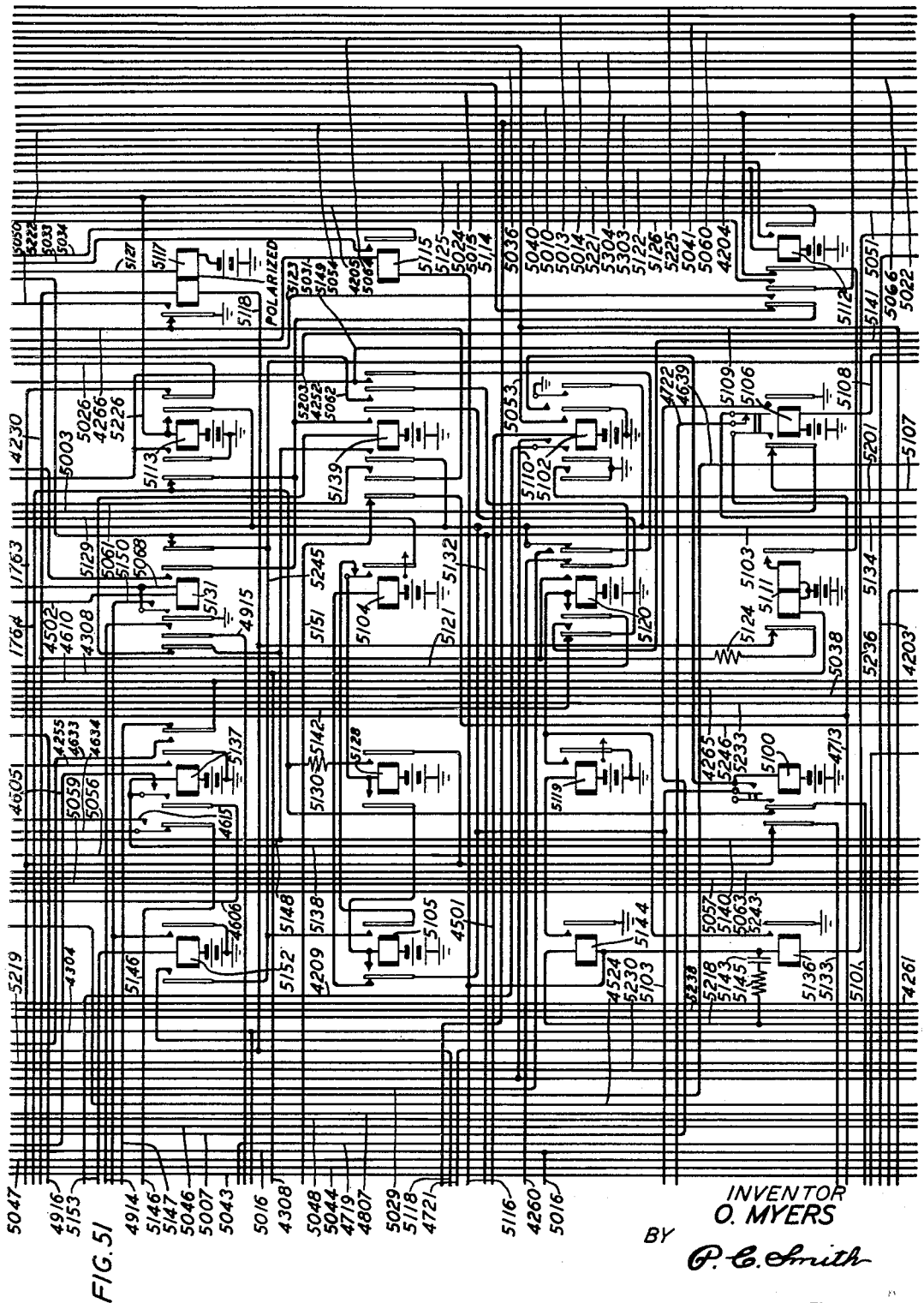
Figure 52:
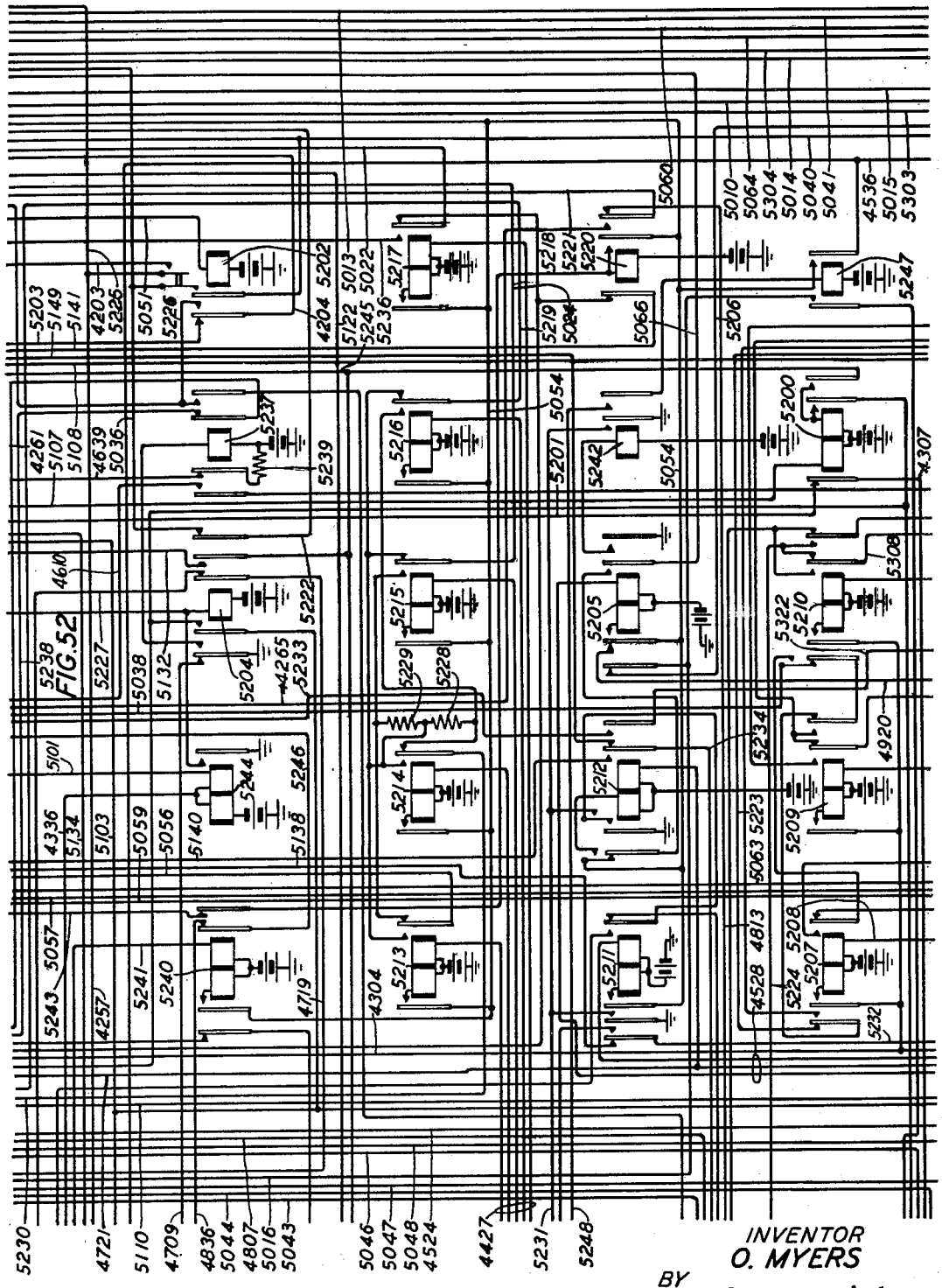
Figure 53:
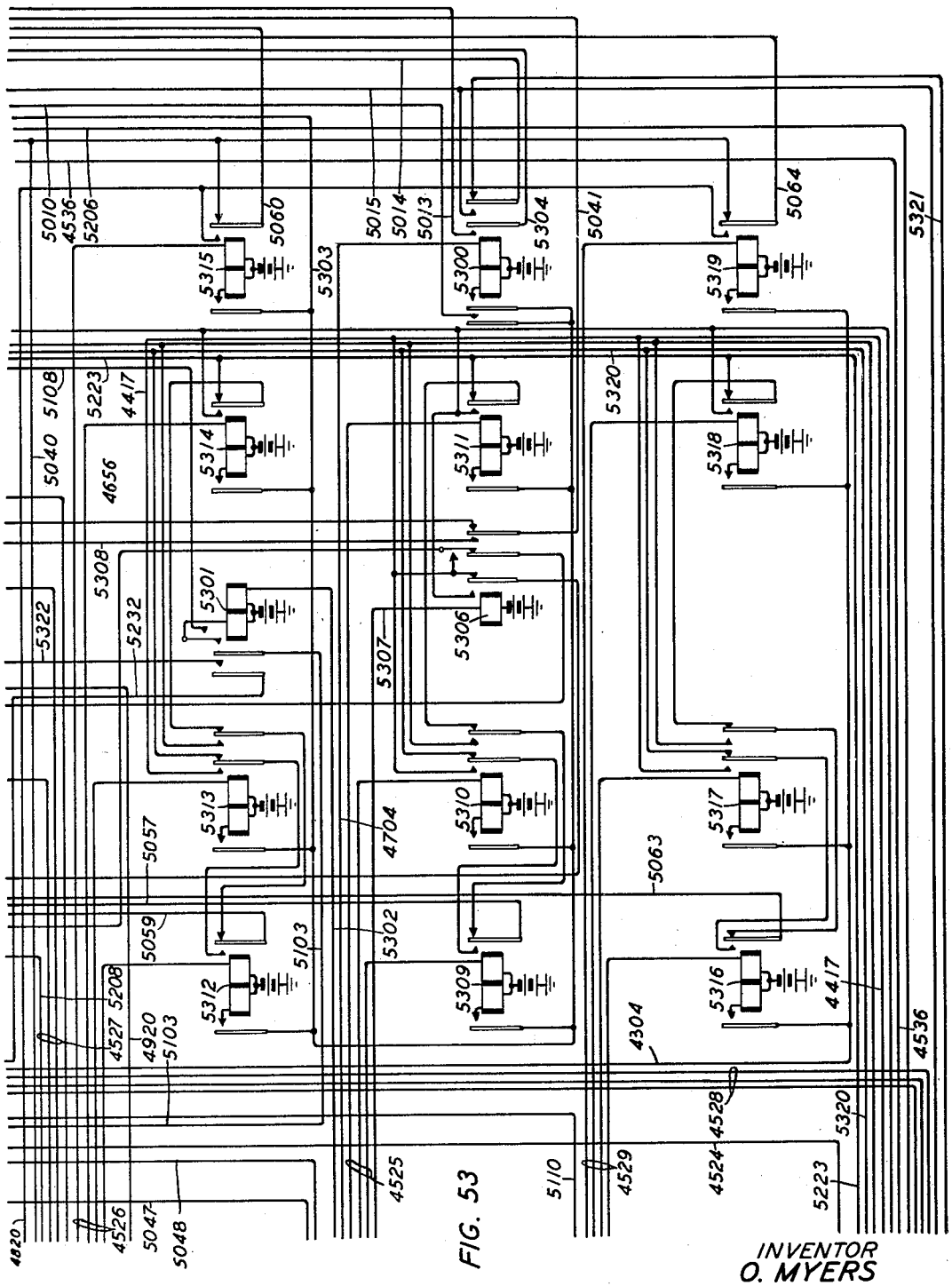
Figure 54:
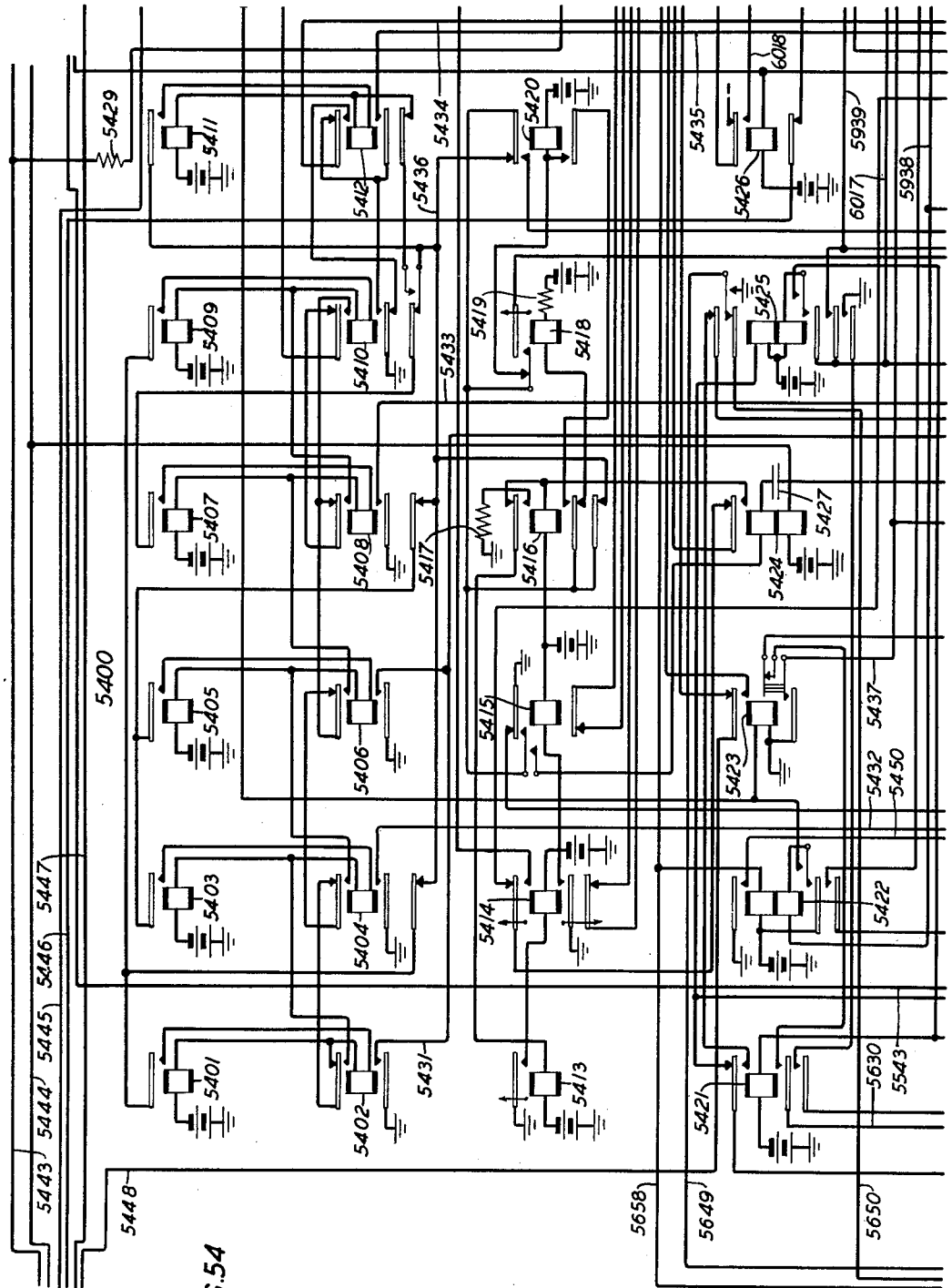
Figure 55:
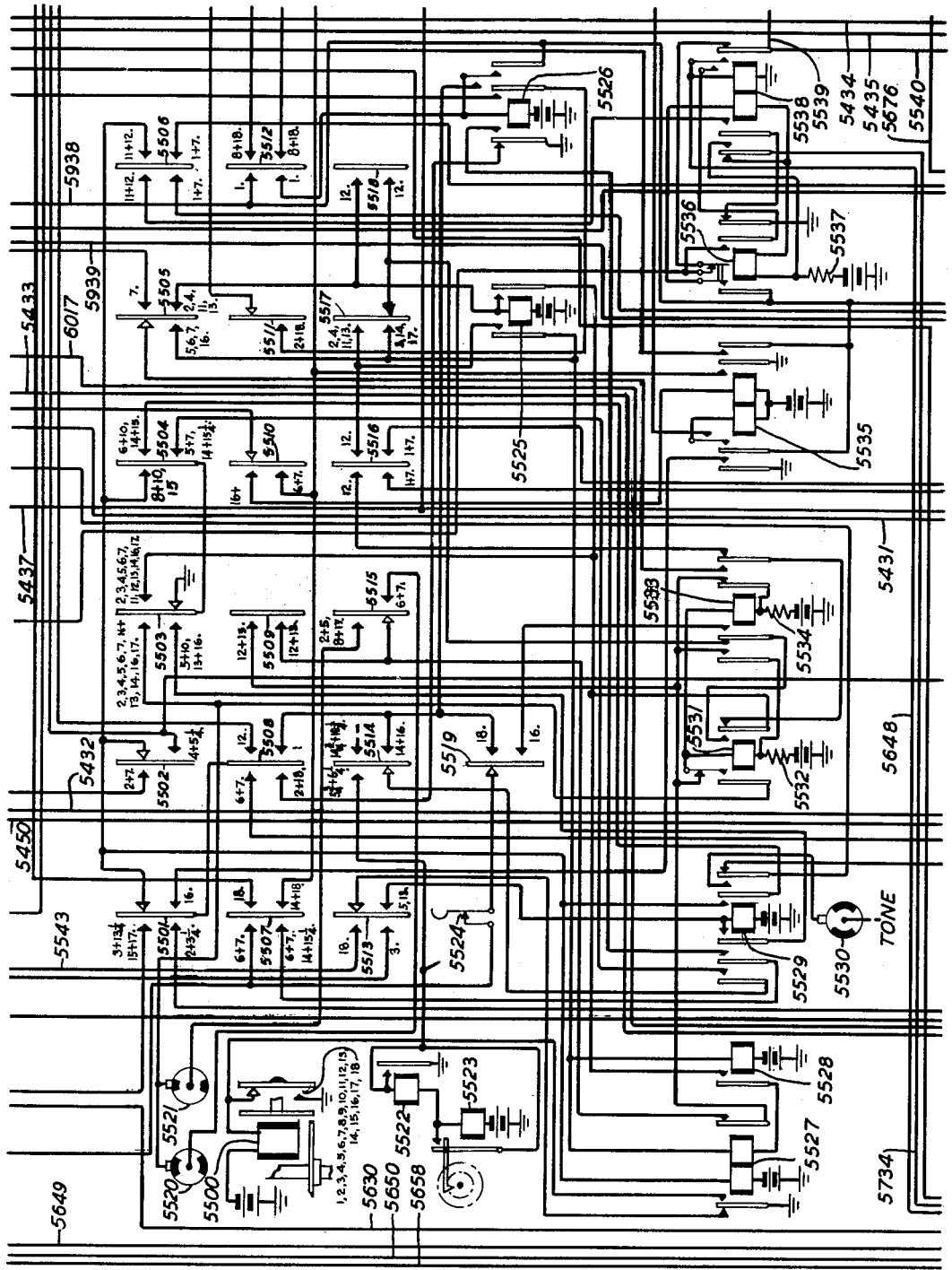
Figure 56:
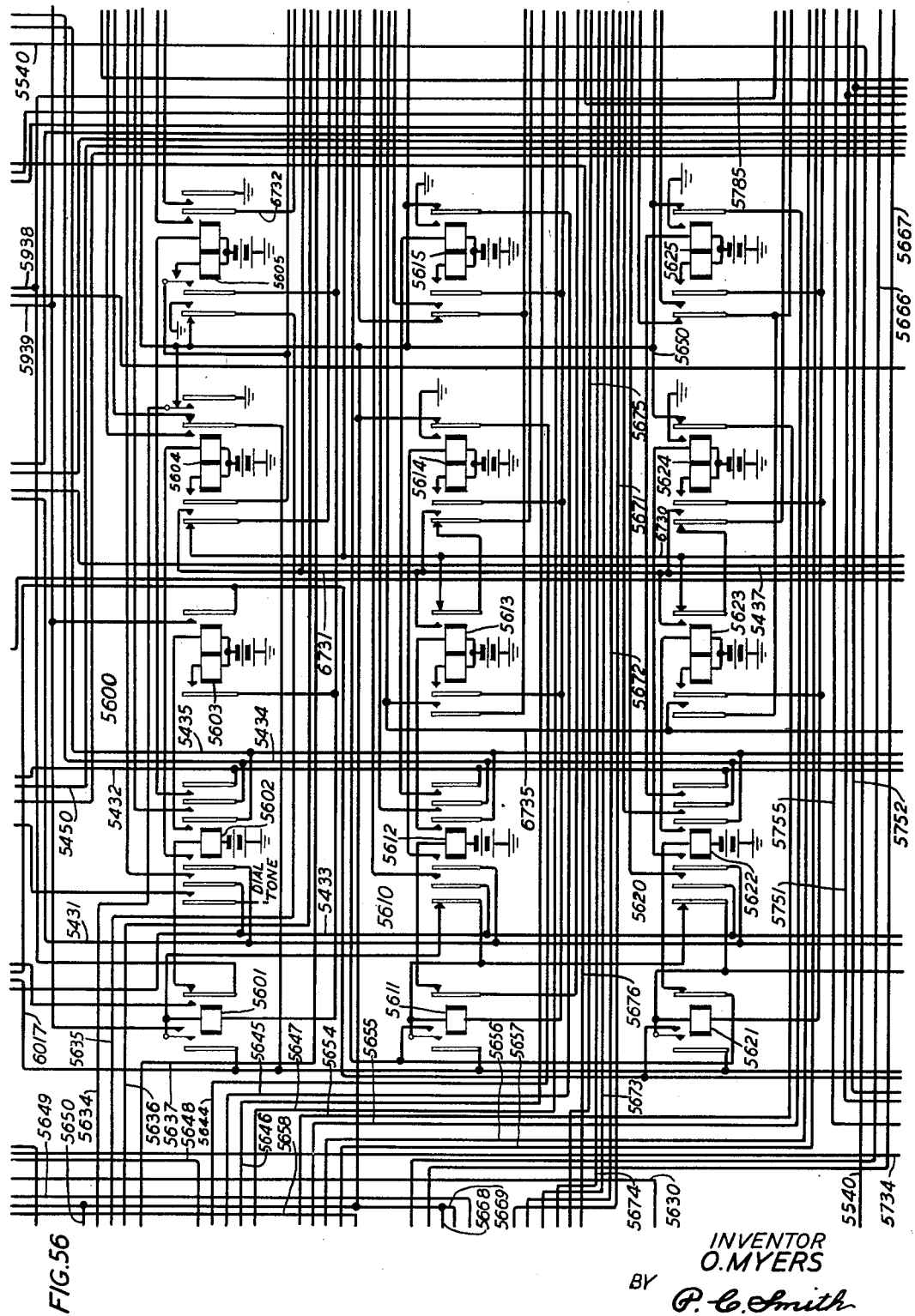
Figure 57:
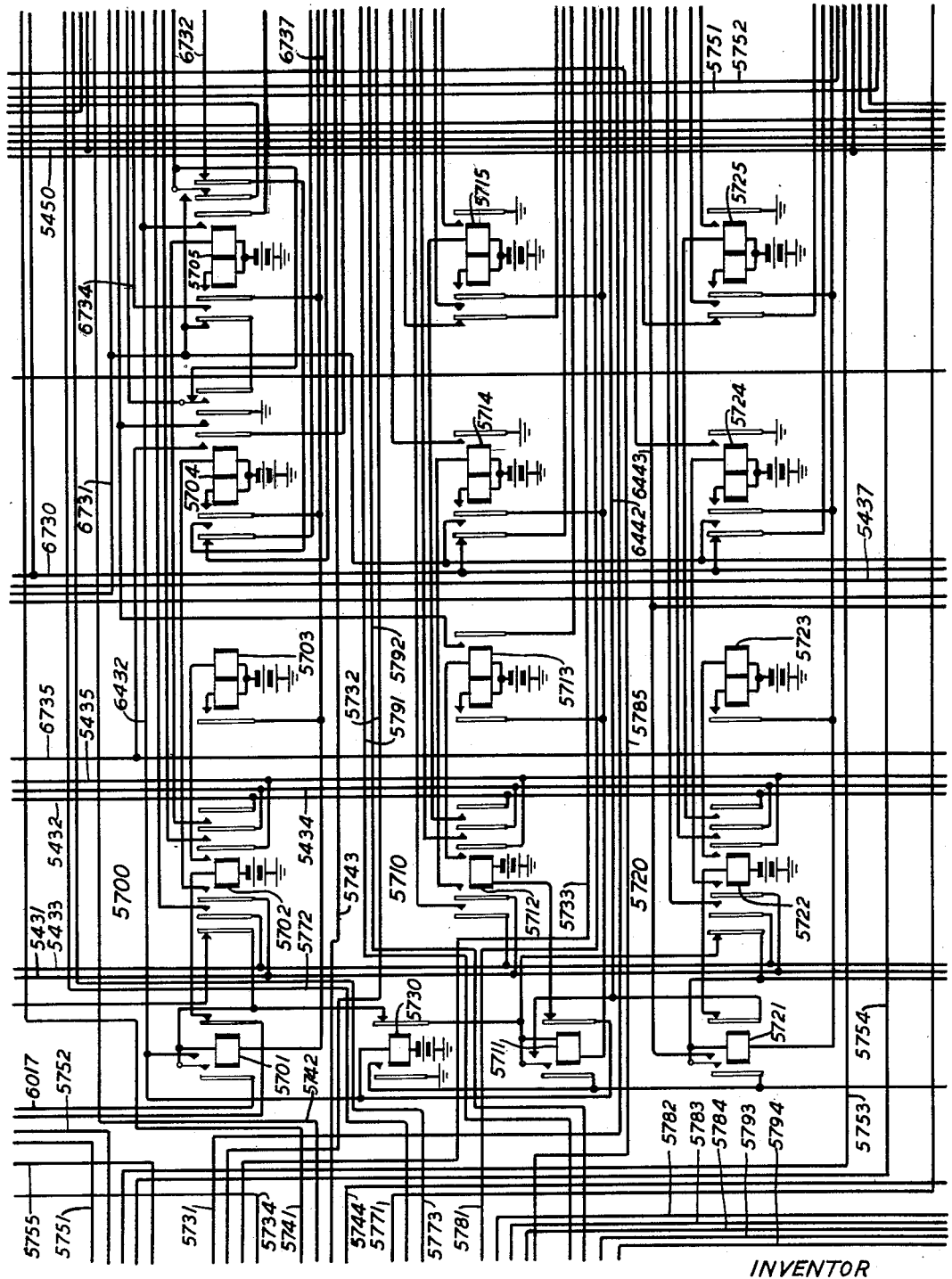
Figure 58:
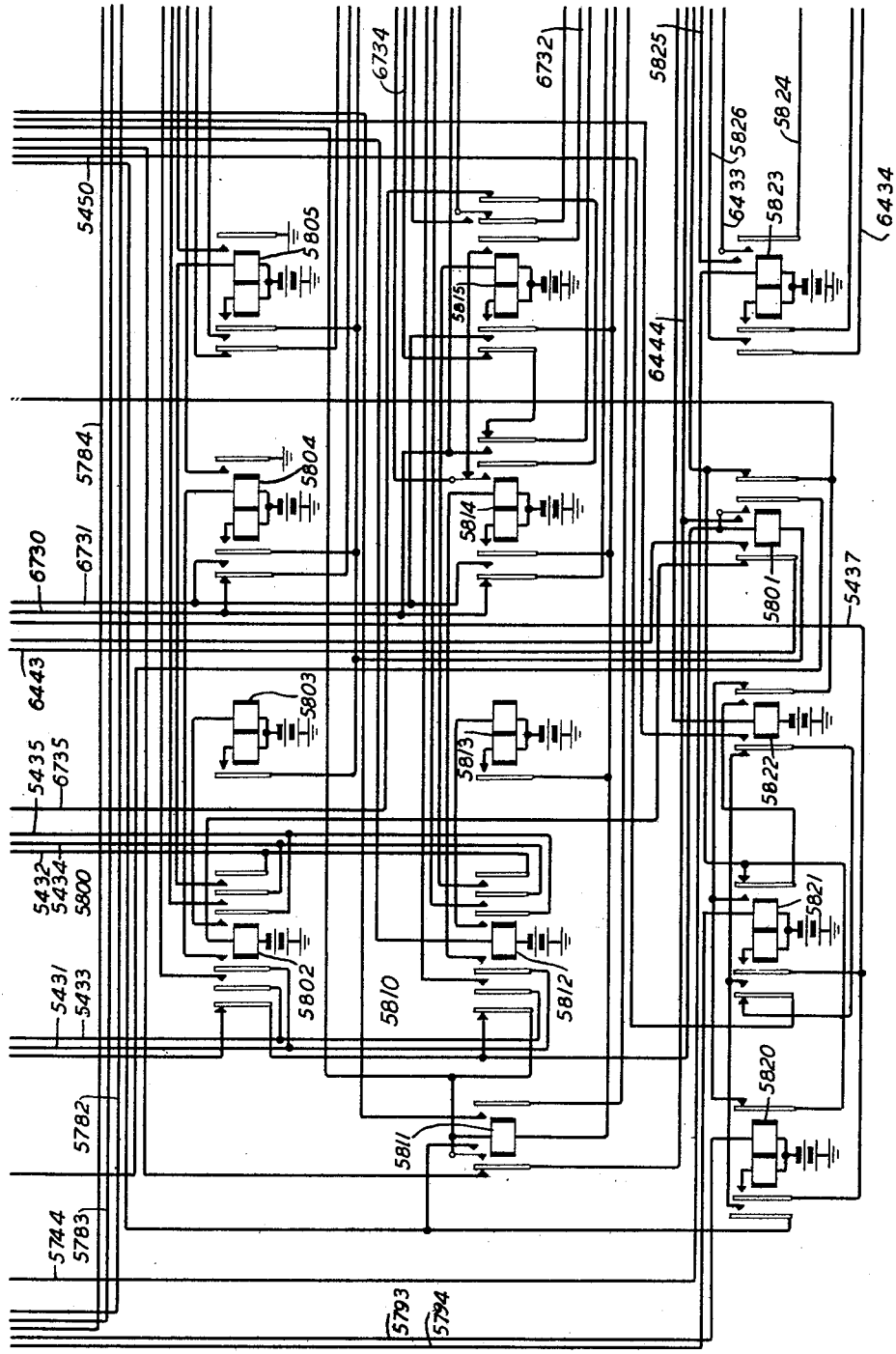
Figure 59:
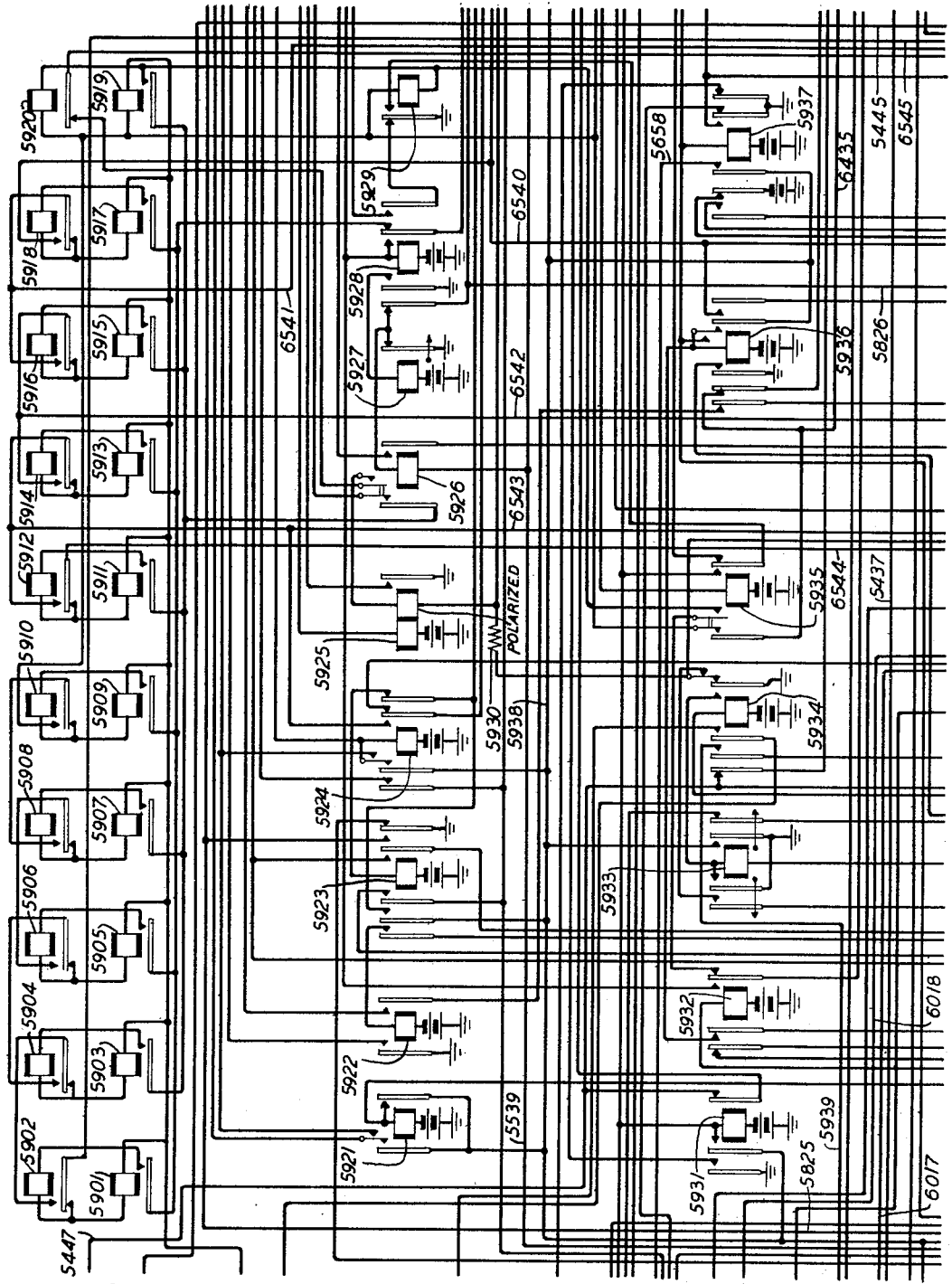
Figure 60:
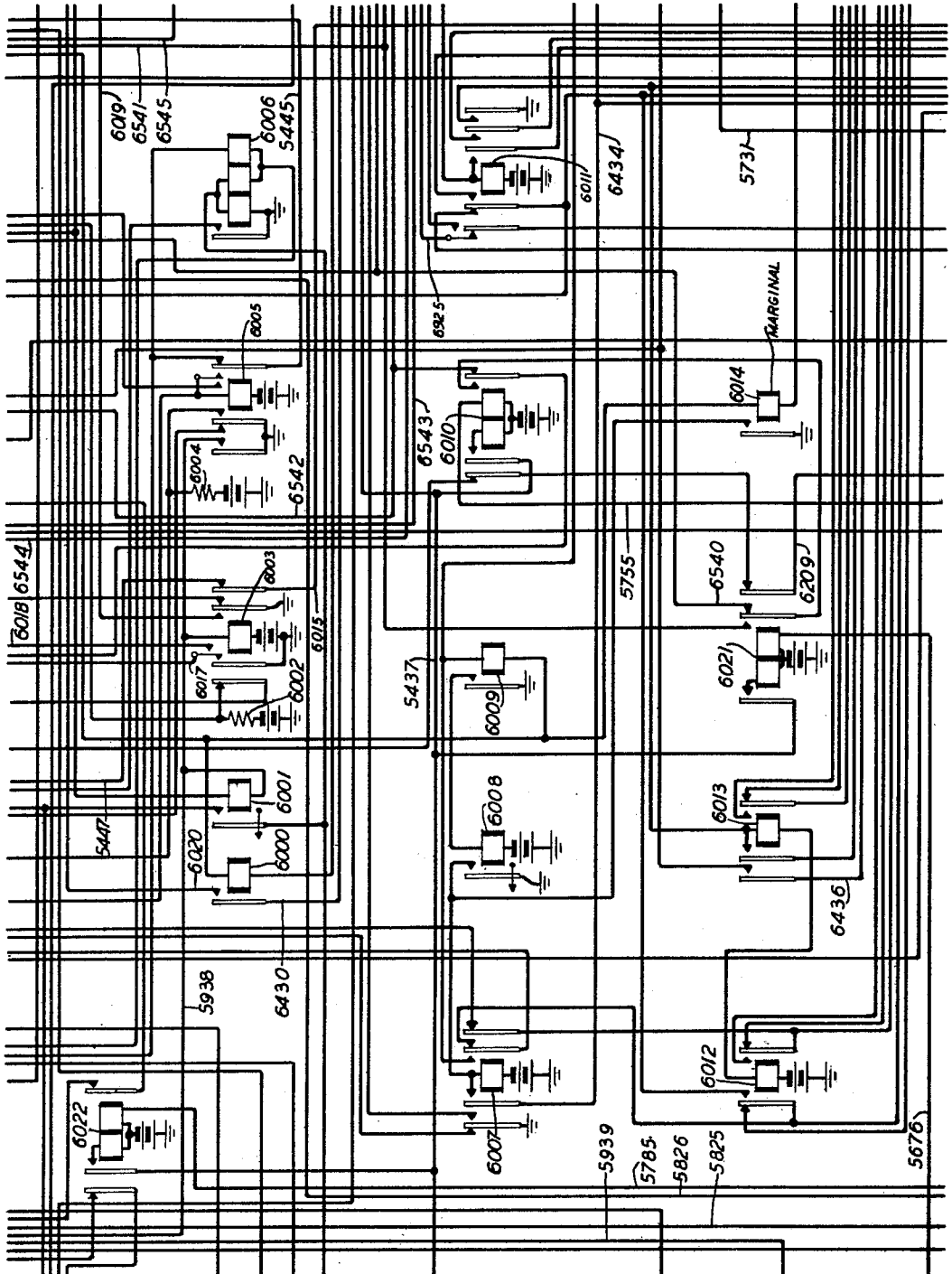
Figure 61:
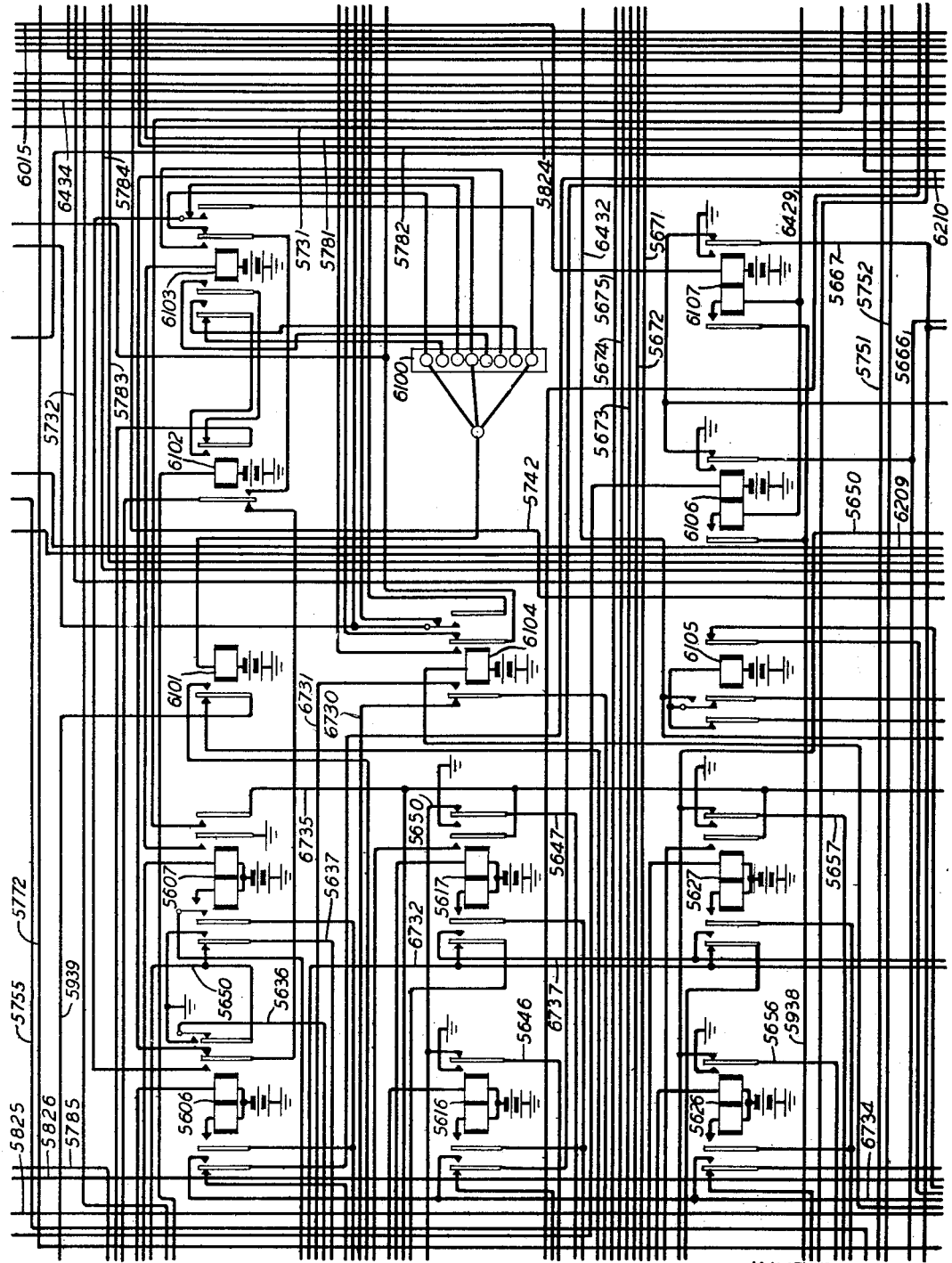
Figure 62:
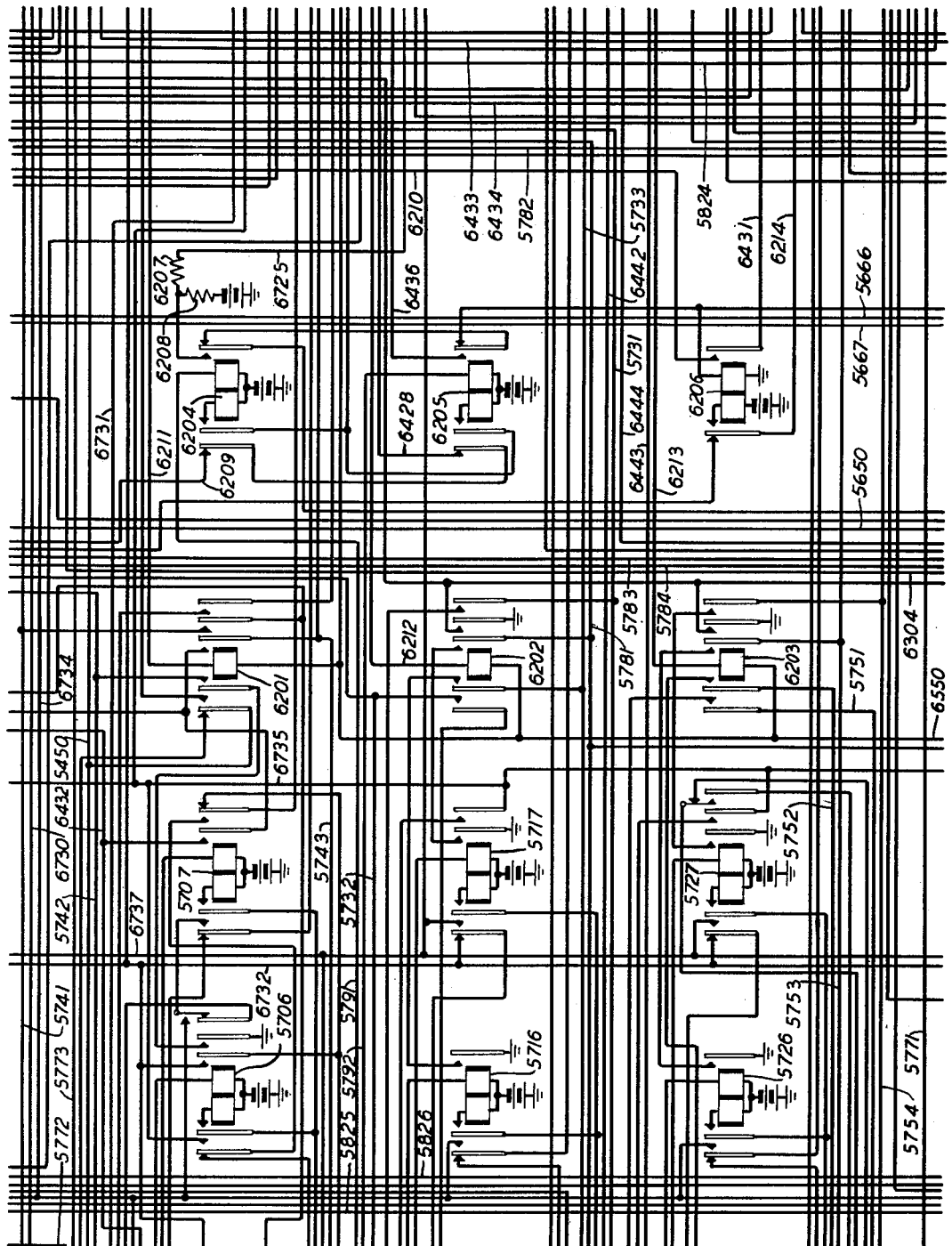
Figure 63:
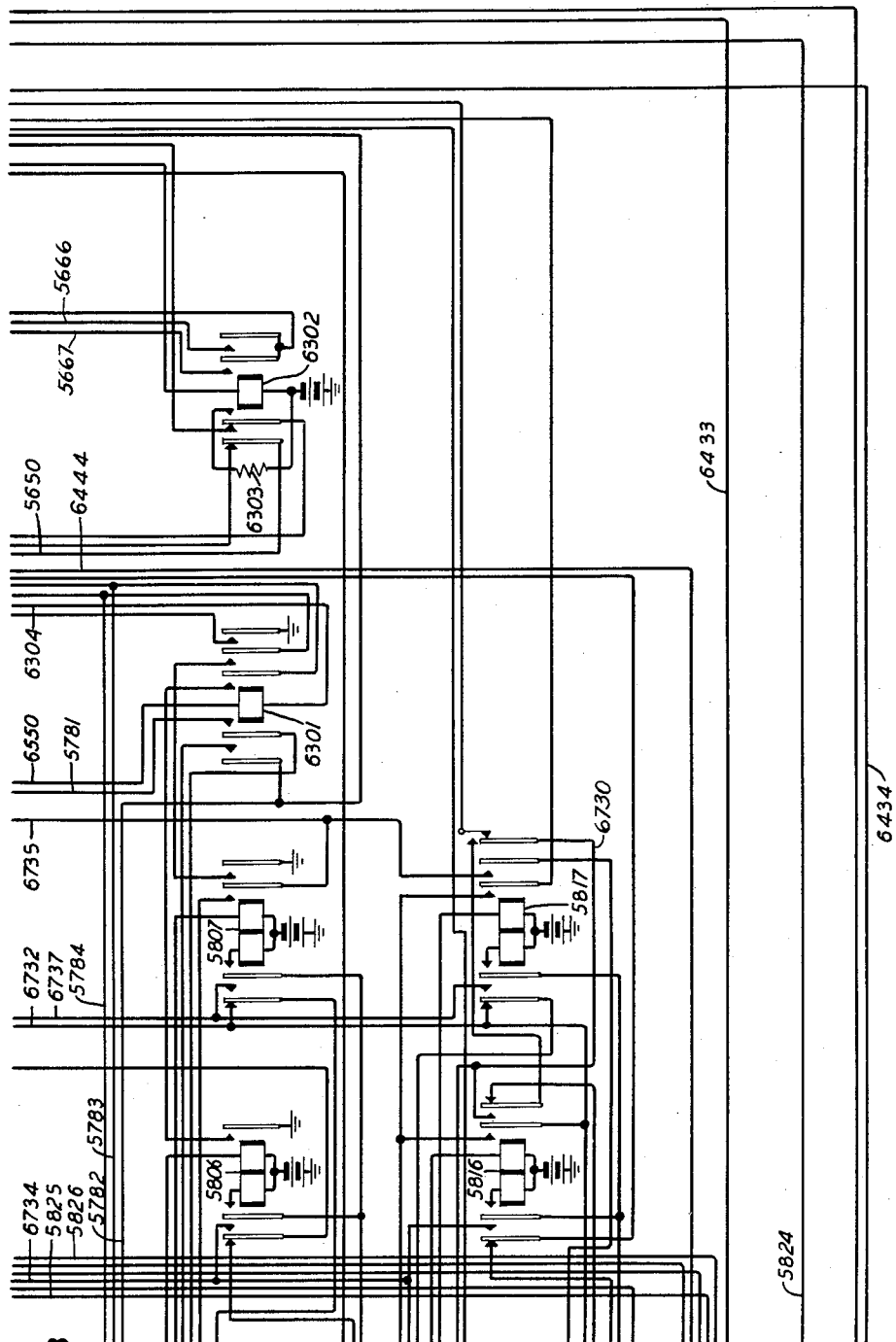
Figure 64:
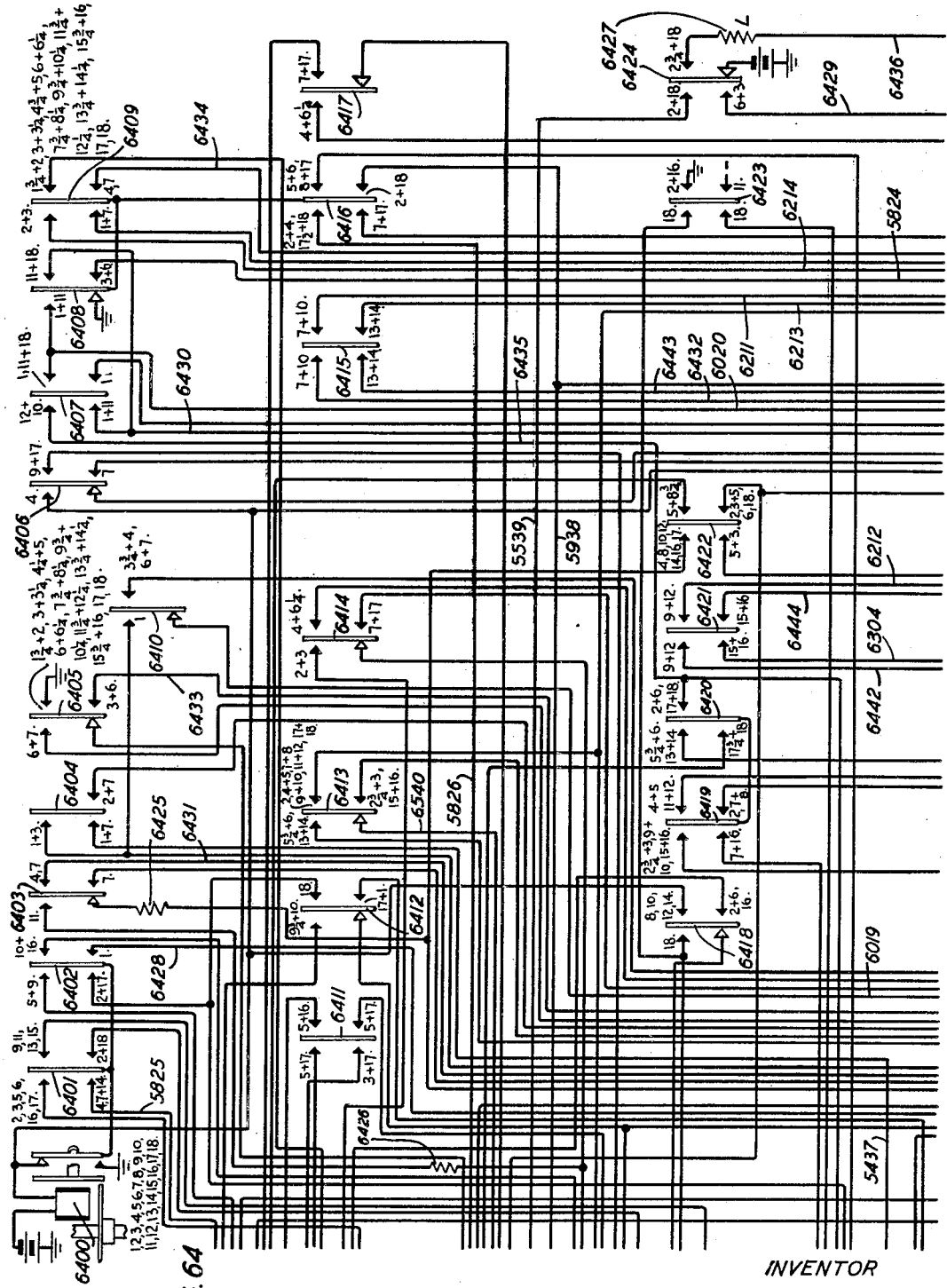
Figure 65:
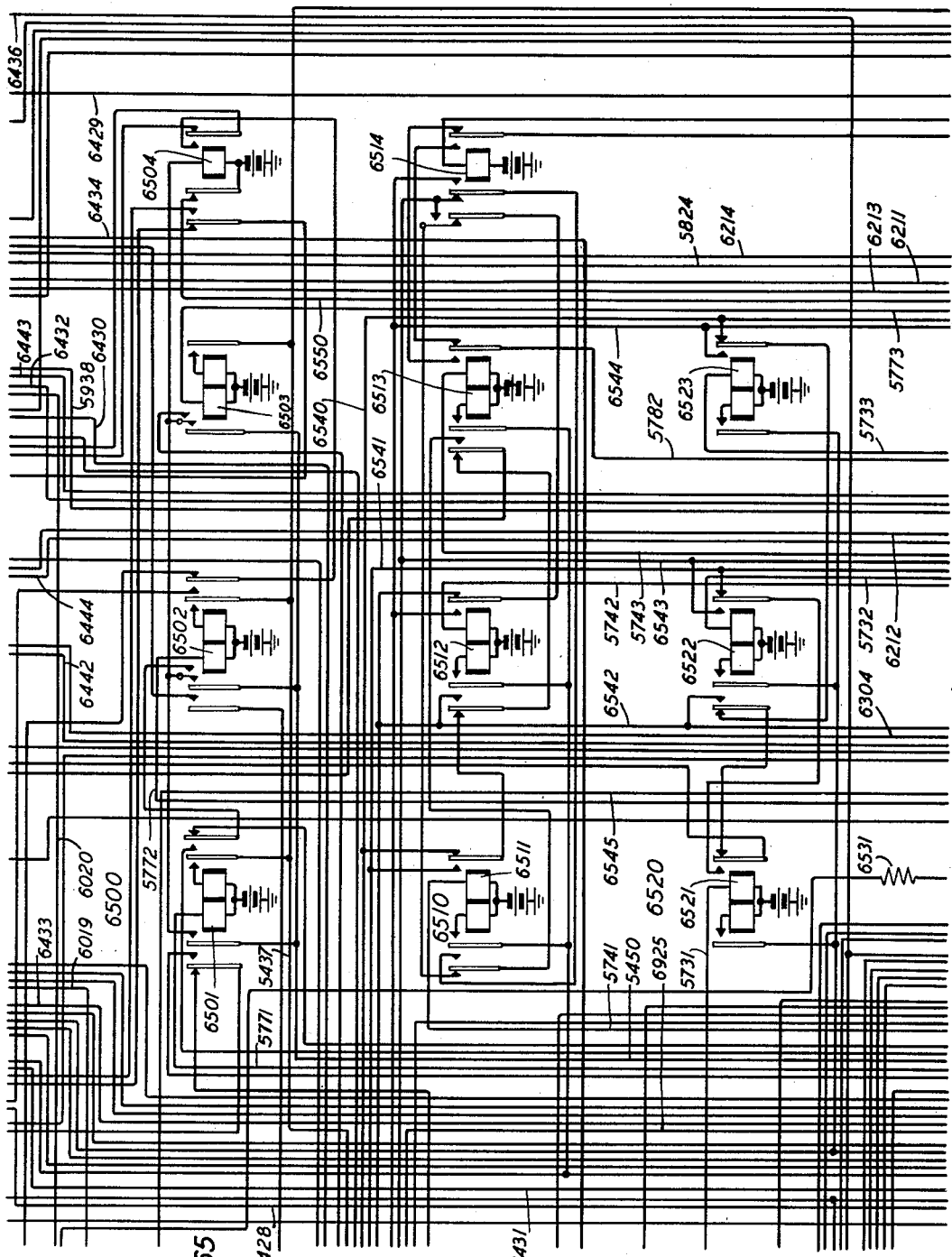
Figure 66:
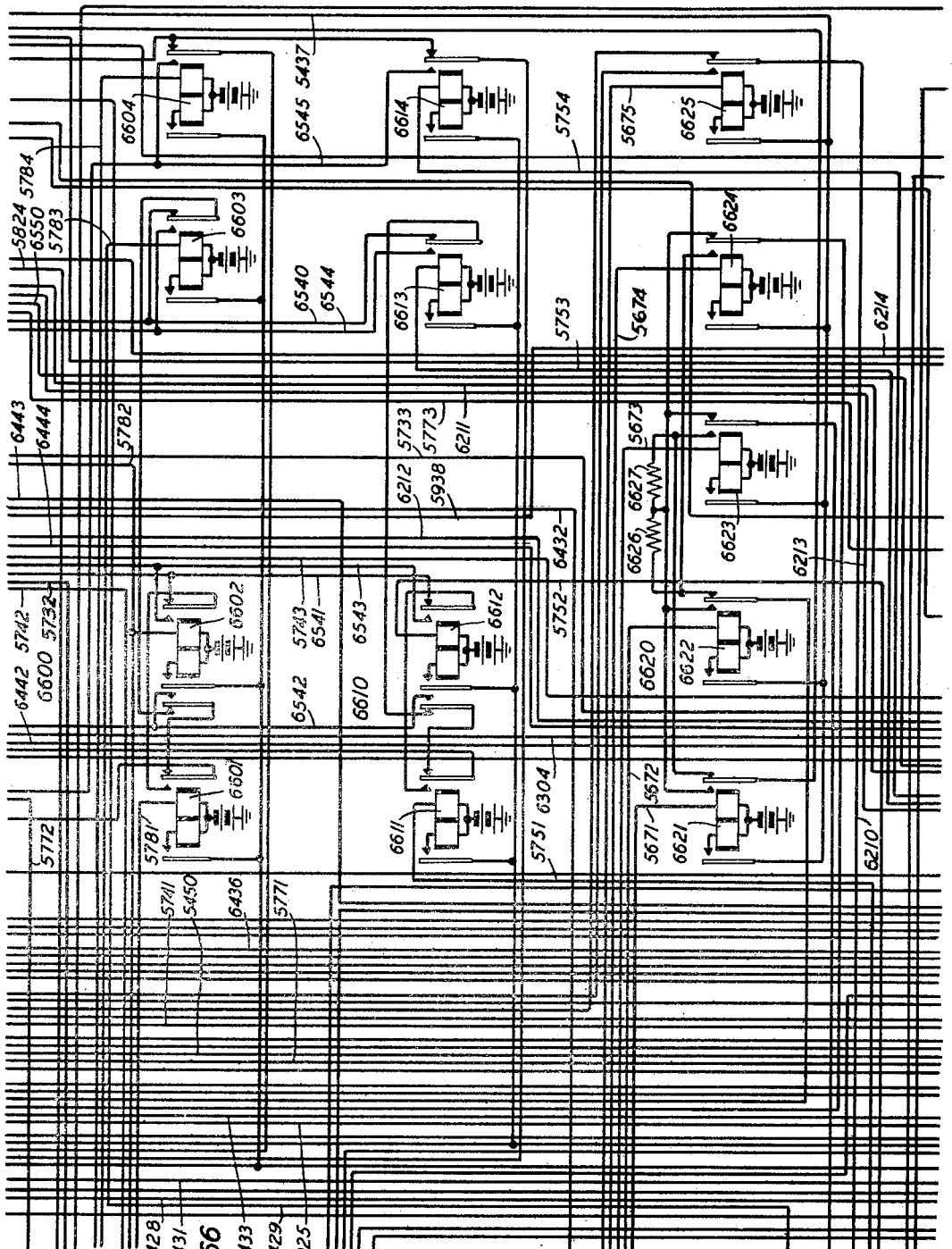
Figure 67:
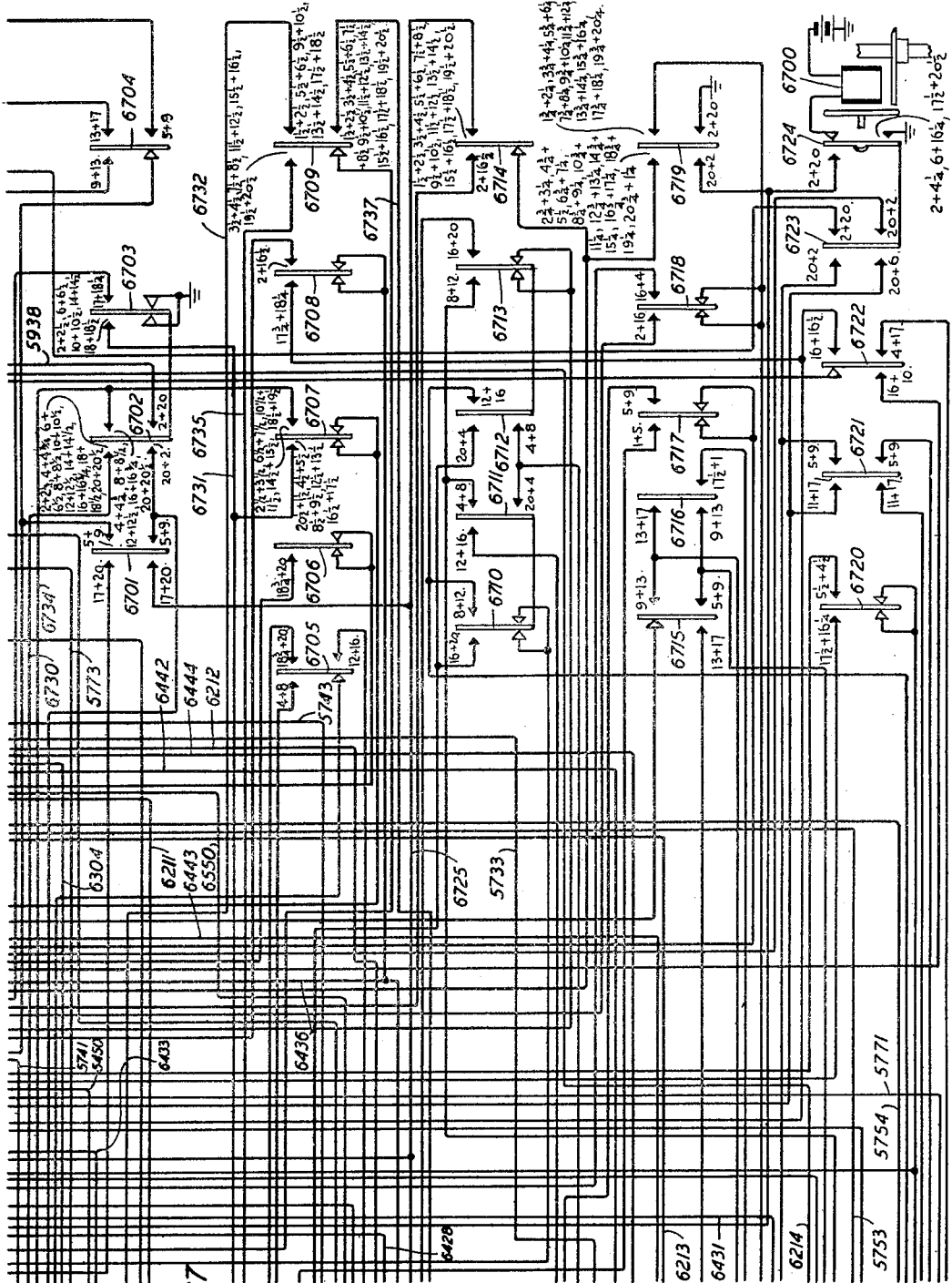

| FIG. 2 | FIG. 6 | | | | | | | | | | |
|---|---|---|---|---|---|---|---|---|---|---|---|
| FIG. 3 | FIG. 7 | FIG. 12 | | | | | | | | | |
| FIG. 4 | FIG. 8 | FIG. 13 | FIG. 18 | | | | | | | | |
| FIG. 5 | FIG. 9 | FIG. 14 | FIG. 19 | | | | | | | | |
| | FIG. 10 | FIG. 15 | FIG. 20 | FIG. 24 | | | | | | | |
| | FIG. 11 | FIG. 16 | FIG. 21 | FIG. 25 | FIG. 30 | FIG. 36 | | | | | |
| | FIG. 42 | FIG. 17 | FIG. 22 | FIG. 26 | FIG. 31 | FIG. 37 | | | | | |
| | FIG. 43 | FIG. 46 | FIG. 23 | FIG. 27 | FIG. 32 | FIG. 38 | | | | | |
| | FIG. 44 | FIG. 47 | FIG. 50 | FIG. 28 | FIG. 33 | FIG. 39 | | | | | |
| | FIG. 45 | FIG. 48 | FIG. 51 | FIG. 29 | FIG. 34 | FIG. 40 | | | | | |
| | | FIG. 49 | FIG. 52 | FIG. 54 | FIG. 35 | FIG. 41 | | | | | |
| | | | FIG. 53 | FIG. 55 | FIG. 59 | FIG. 64 | | | | | |
| | | | | FIG. 56 | FIG. 60 | FIG. 65 | | | | | |
| | | | | FIG. 57 | FIG. 61 | FIG. 66 | | | | | |
| | | | | FIG. 58 | FIG. 62 | FIG. 67 | | | | | |
| | | | | | FIG. 63 | | | | | | |

INVENTOR
O. MYERS
BY P. C. Smith
ATTORNEY

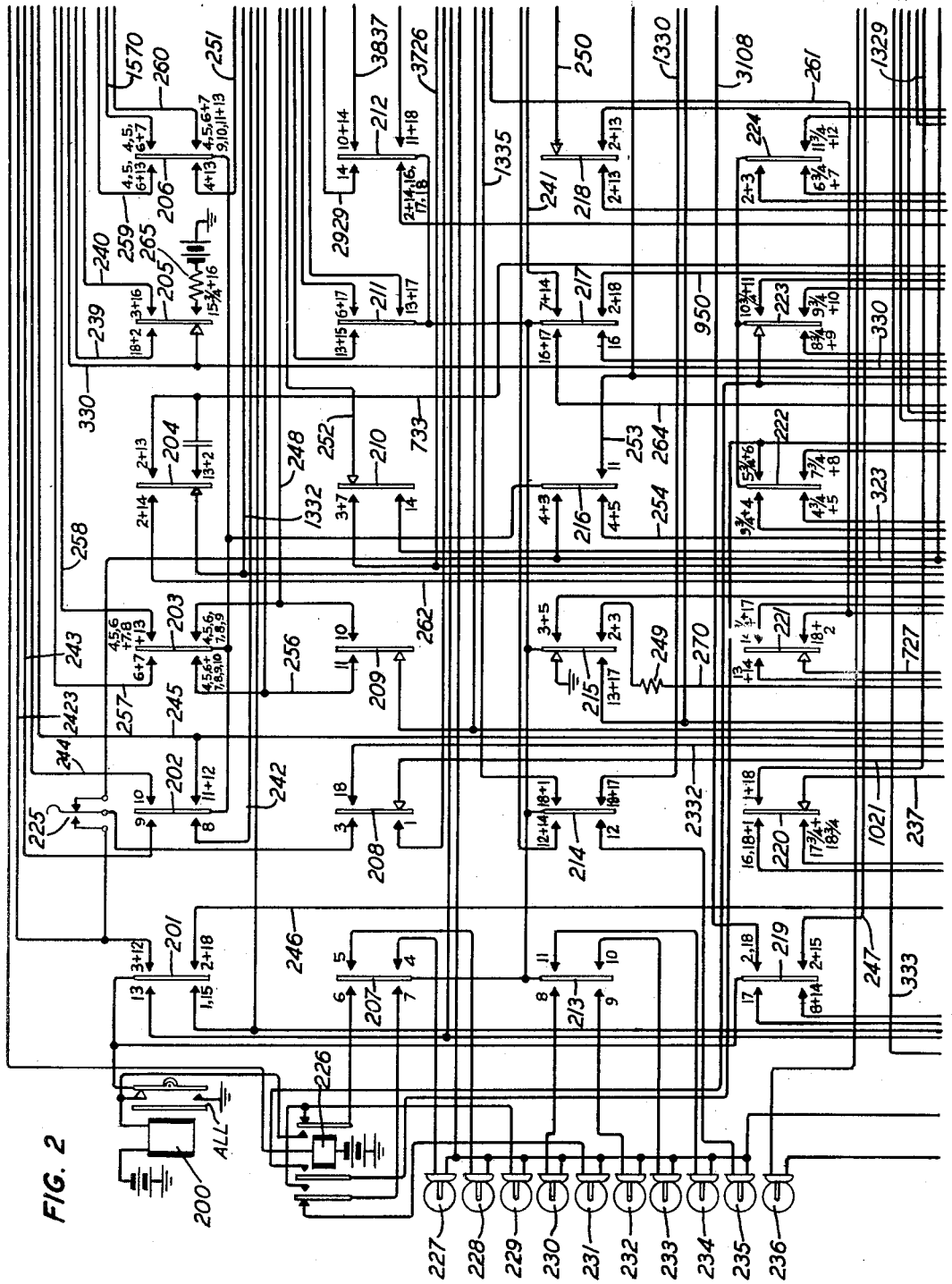

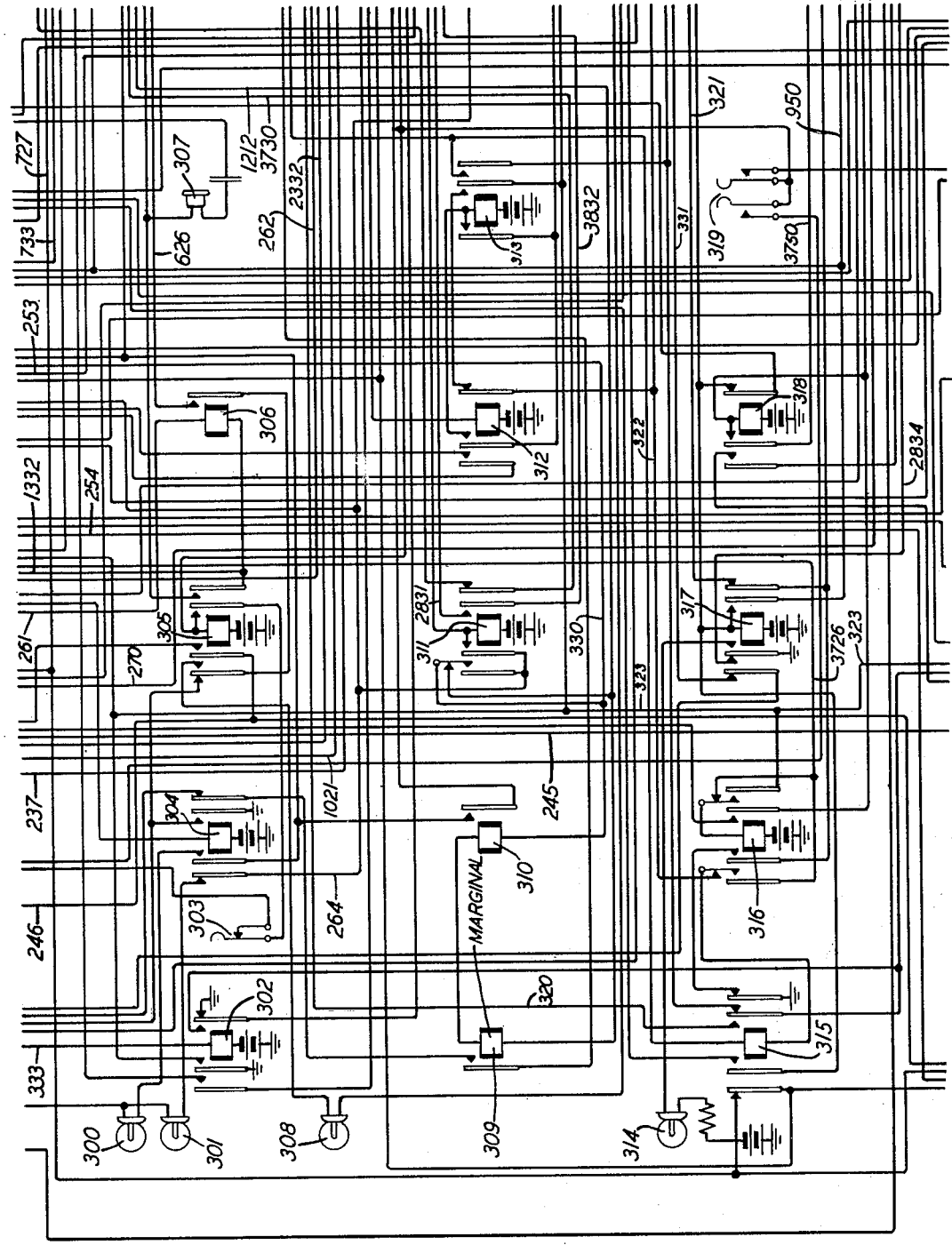

May 15, 1934.　　　O. MYERS　　　1,958,635
SENDER TESTING SYSTEM
Filed Dec. 20, 1932　　67 Sheets-Sheet 4

INVENTOR
O. MYERS
BY P. B. Smith
ATTORNEY

May 15, 1934.  O. MYERS  1,958,635
SENDER TESTING SYSTEM
Filed Dec. 20, 1932   67 Sheets-Sheet 6

INVENTOR
O. MYERS
BY P. C. Smith
ATTORNEY

May 15, 1934.  O. MYERS  1,958,635
SENDER TESTING SYSTEM
Filed Dec. 20, 1932  67 Sheets-Sheet 14

INVENTOR
O. MYERS
BY P.C. Smith
ATTORNEY

INVENTOR
O. MYERS
BY P. C. Smith
ATTORNEY

May 15, 1934.  O. MYERS  1,958,635

SENDER TESTING SYSTEM

Filed Dec. 20, 1932   67 Sheets-Sheet 20

INVENTOR
O. MYERS
BY P. C. Smith
ATTORNEY

INVENTOR
O. MYERS
BY P. C. Smith
ATTORNEY

May 15, 1934.   O. MYERS   1,958,635
SENDER TESTING SYSTEM
Filed Dec. 20, 1932   67 Sheets-Sheet 24

INVENTOR
O. MYERS
BY P. C. Smith
ATTORNEY

May 15, 1934.  O. MYERS  1,958,635
SENDER TESTING SYSTEM
Filed Dec. 20, 1932  67 Sheets-Sheet 27

INVENTOR
O. MYERS
BY
P. C. Smith
ATTORNEY

May 15, 1934.  O. MYERS  1,958,635
SENDER TESTING SYSTEM
Filed Dec. 20, 1932  67 Sheets-Sheet 30

INVENTOR
O. MYERS
BY P. C. Smith
ATTORNEY

May 15, 1934.  O. MYERS  1,958,635
SENDER TESTING SYSTEM
Filed Dec. 20, 1932   67 Sheets-Sheet 33

INVENTOR
O. MYERS
BY P. C. Smith
ATTORNEY

May 15, 1934.  O. MYERS  1,958,635

SENDER TESTING SYSTEM

Filed Dec. 20, 1932  67 Sheets-Sheet 39

INVENTOR
O. MYERS
BY
P. C. Smith
ATTORNEY

May 15, 1934. O. MYERS 1,958,635

SENDER TESTING SYSTEM

Filed Dec. 20, 1932 67 Sheets-Sheet 40

INVENTOR
O. MYERS
BY P. C. Smith
ATTORNEY

May 15, 1934.  O. MYERS  1,958,635

SENDER TESTING SYSTEM

Filed Dec. 20, 1932  67 Sheets-Sheet 46

INVENTOR
O. MYERS
BY
P. C. Smith
ATTORNEY

May 15, 1934.   O. MYERS   1,958,635
SENDER TESTING SYSTEM
Filed Dec. 20, 1932   67 Sheets-Sheet 48

INVENTOR
O. MYERS
BY
P. C. Smith
ATTORNEY

May 15, 1934.   O. MYERS   1,958,635
SENDER TESTING SYSTEM
Filed Dec. 20, 1932   67 Sheets-Sheet 50

INVENTOR
O. MYERS
BY P. C. Smith
ATTORNEY

May 15, 1934.  O. MYERS  1,958,635
SENDER TESTING SYSTEM
Filed Dec. 20, 1932   67 Sheets-Sheet 57

INVENTOR
O. MYERS
BY
P.C. Smith
ATTORNEY

May 15, 1934.　　　　O. MYERS　　　　1,958,635
SENDER TESTING SYSTEM
Filed Dec. 20, 1932　　　67 Sheets-Sheet 58

INVENTOR
O. MYERS
BY
P. C. Smith
ATTORNEY

May 15, 1934.　　　　O. MYERS　　　　1,958,635
SENDER TESTING SYSTEM
Filed Dec. 20, 1932　　　67 Sheets-Sheet 61

INVENTOR
O. MYERS
BY
P. C. Smith
ATTORNEY

May 15, 1934.  O. MYERS  1,958,635
SENDER TESTING SYSTEM
Filed Dec. 20, 1932   67 Sheets-Sheet 63

INVENTOR
O. MYERS
BY
P. C. Smith
ATTORNEY

May 15, 1934.   O. MYERS   1,958,635

SENDER TESTING SYSTEM

Filed Dec. 20, 1932   67 Sheets-Sheet 67

INVENTOR
O. MYERS
BY
P. C. Smith
ATTORNEY

Patented May 15, 1934

1,958,635

UNITED STATES PATENT OFFICE 1,958,635

SENDER TESTING SYSTEM

Oscar Myers, Brooklyn, N. Y., assignor to Bell Telephone Laboratories, Incorporated, New York, N. Y., a corporation of New York Application December 20, 1932, Serial No. 648,060

23 Claims. (Cl. 179—175.23)

This invention relates to a system for making routine tests of dial telephone equipment and has for its object to increase the efficiency and flexibility of such a testing system.

Heretofore, it has been customary to predetermine a number of test conditions for a piece of apparatus to be tested and to submit all of the similar pieces of apparatus to all of these test conditions in turn. In the arrangement embodying the present invention, it is possible to set up any desired test condition and apply this condition to a particular piece of apparatus or to all of them in turn. Furthermore, the arrangement is such that two or more types of apparatus may be tested although the test conditions must be reset for each type of apparatus and the testing operation is arrested whenever the testing of the particular type has been completed.

Specifically the invention resides in an improved testing arrangement for testing register senders adapted to function under the control of a subscriber's dial and register senders adapted to function under the control of an operator's key set. The testing arrangement includes a key set which controls the transmission of designations to either type of sender and tests the accuracy of the designations as sent out by the senders.

Among the specific improvements provided are means for testing short circuits around the contacts of the relays which control the transfer of the numerical registration to the selection control registers. The subscriber's sender is arranged to recognize certain codes and numerical combinations as indicating the possibility of receiving a five digit number, and to respond thereto to delay the establishment of the selection control circuit for a predetermined length of time. The present testing circuit provides means in connection with a single type of test for transmitting designations including four or five digit numbers and for arranging the testing circuit to determine whether the sender does or does not delay the establishment of the selection control circuit correspondingly. The testing circuit also renders this testing means ineffective when testing operator's senders which do not provide such a delay. In addition a relay arrangement is provided in connection with certain tests to determine whether the selection control circuit is closed for a necessary minimum length of time. Other novel features will become apparent from the following description.

A sender controlled by a subscriber's dial is disclosed in Patent No. 1,862,549, granted to R. Raymond et al., June 14, 1932, while a sender for control by an operator's key set is disclosed in Patent No. 1,897,083, granted to W. B. Strickler, Feb. 14, 1933. Reference is made to these disclosures for details as to the operation of the senders.

The operation of the testing circuit will become more apparent from the detailed description which follows, read in connection with the accompanying drawings in which:

Fig. 1 shows a layout diagram for the remaining figures;

Figs. 2 to 41, inclusive, show the testing circuit;

Figs. 2, 3 and 7 showing the dialing control switch and associated apparatus;

Figs. 4, 5, 8 and 9, the designation keys;

Fig. 6, a timing arrangement;

Figs. 10 and 11, sequence switches for recording the thousand and hundreds digits of test designations;

Figs. 12, 18, 25, 30, 31, 32, 36, equipment for use with various tests;

Figs. 13, 19, 20, 21 and 26, the key pulsing control switch and associated apparatus;

Figs. 14 and 15, the selection control keys;

Figs. 16, 17, 22 and 23, the switches, keys, relays and sequence switch for controlling a connection to a sender to be tested;

Fig. 24, the relays for testing zone registration;

Figs. 27 and 28, lamps for identifying tests and selections as they are made;

Figs. 29, 33, 34, 35, 40 and 41, the apparatus for controlling and checking call indicator test calls;

Fig. 37, the class sequence switch, and

Figs. 38 and 39 showing the control sequence switch and counting relays for full mechanical test calls.

Figs. 42 to 53, inclusive, show an operator's sender;

Fig. 42 showing the counting relays;

Figs 43 to 45 and 47 to 49, the incoming registers and certain other equipment;

Fig. 46, the impulser sequence switch;

Fig. 50, the control sequence switch;

Fig. 51, a number of control relays; and

Figs. 52 and 53 showing the selection registers.

Figs 54 to 67, inclusive, show a subscriber's sender;

Fig. 54 showing the pulse receiving relays;

Fig. 55, the time alarm switch;

Figs. 56 to 58 and 61 to 63, the incoming registers;

Fig. 59, the counting relays;

Fig. 60, the stepping relay and other control relays;
Fig. 64, the control sequence switch;
Figs. 65 and 66, the selection control registers, and
Fig. 67 showing the impulser sequence switch.

As stated above this sender testing circuit is arranged for testing both full mechanical and operators' senders. It is connected with the senders by means of a pair of master selectors and sufficient sender selectors to connect with all of the senders to be tested, senders of different types being connected to different sender selectors.

The connection of the test circuit with a sender and the testing of the busy or idle condition of the sender is controlled by means of sequence switch 1600. Sequence switch 1600 goes through two similar cycles of operation in making one revolution, either one of which may be modified by the operation of relay 2203 to advance the master selectors, either at the beginning of a test or when all senders connected to a sender selector have been tested. For convenience only the positions of the first cycle will be used in the following description.

The operation of the test circuit itself is controlled by five sequence switches, switches 200, 1300, 3300, 3700 and 3800. Sequence switch 3700 is a class sequence switch and is positioned by the class keys of Figs. 14, 15, 20 and 21. Sequence switch 3700 modifies the operation of the other apparatus in accordance with the class or type of test call to be made.

The following table indicates the relationship between the class keys, positions of class sequence switch 3700 and the nature of the test call:

| Key | Position | Test call |
| --- | --- | --- |
| 1561 | 1 | Complete full mechanical call |
| 1562 | 2 | Incoming selector to overflow |
| 1563 | 3 | Office selector to overflow |
| 1564 | 4 | Permanent signal condition |
| 1465 | 5 | Call to special service operator |
| 1466 | 6 | Call to three digit operator |
| 2106 | 6 | Call to three digit operator through distant office selector |
| 1467 | 7 | Call to unassigned or restricted code |
| 1468 | 8 | Call abandoned after dialing thousands digit |
| 1469 | 9 | Test of register control equipment |
| 1574 | 13 | Direct call indicator call |
| 2113 | 13 | Tandem call indicator call |
| 1475 | 14 | Abandoned call indicator call, no distant office selector |
| 1476 | 15 | Abandoned call indicator call with distant office selector |
| 1477 | 16 | Tandem call indicator call to three digit operator |
| 2100 | 18 | Timed out call—Operator's sender |
| 2017 | 18 | Operator's errors—Trunk to office selector |
| 2011 | 15 | Operator's errors—Trunk to tandem district selector |
| 2006 | 2 | Operator's errors—Trunk to incoming selector |

Full mechanical senders are adapted to receive designations by means of dial impulses, that is interruptions of the talking circuit, and for setting such senders sequence switch 200 is provided. This sequence switch controls the transmission of pulses from interrupter bank 400. This interrupter is operated from a common drive shaft. The interrupter contacts 431 and 432 transmit ten pulses during each revolution of the drive shaft, while interrupter contact 433 maintains a shunt around all of the other interrupter contacts except during the positions in which the pulses are to be sent out. Interrupters 431 and 432 differ only in the relative duration of their open and closed periods, interrupter 432 having longer open periods. Key 401 determines which contact is to be used. Interrupters 434 to 442 maintain shunts around the dialing contacts under the control of the operated digit keys so that all but the desired number of pulses are shunted out. For example, with key 407 closed, the shunt through interrupter 440 is effective, and the first three pulses are shunted out so that only seven impulses are transmitted to the sender. Interrupter 443 is closed during the open period of interrupter 433 and controls relay 316 which in turn controls the advance of sequence switch 200.

Sequence switch 200 is arranged to transmit a digit in each position from position 3 to position 12, inclusive, by placing the interrupter bank under the control of the proper set of keys. Where the test call does not require a particular digit, the class switch or class key provides a circuit for passing the dialing sequence switch through the corresponding position. Circuits for lamps 227 to 236 are prepared by sequence switch 200 to indicate which digit is being transmitted.

The key pulsing or operator's sender is arranged to receive the designation by means of code pulses over the tip and ring conductors, the code pulses consisting of battery and ground through high or low resistances in accordance with a set code. This code is set forth in the Strickler patent, above mentioned. Sequence switch 1300 controls the transmission of these code pulses to the sender which are actually transmitted by means of the transmitting relays 2001 and 2002, 2004 and 2005, etc. This sequence switch performs two cycles of operation in making one revolution, but, in general, only the positions of the first cycle will be used in the following description. When a subscriber's sender is to be tested, key 1206 is normal, but when an operator's sender is to be tested, key 1206 is operated, resulting in the operation of relays 505 to 508 and 515 to 518 which rearrange the registering and checking conductors and prepare the circuits for supplying battery and ground through the proper resistances to the keys for use by the transmitting relays.

Sequence switch 3300 is used in testing full mechanical selections whether made by the subscriber's sender or by the operator's sender, and advances from position to position under control of the counting relays which are in turn controlled by relay 3004.

In the testing of the senders for their ability to handle call indicator calls, sequence switch 3300 is used in checking the accuracy of the operation. In its first few positions it checks the district and office selections in a manner similar to the full mechanical checking switch 3800 after which the number as transmitted from the sender is recorded on the relays of Figs. 34 and 40, the transfer relays appearing in Figs. 35 and 41. When one digit has been received, it is checked and sequence switch 3300 advances if it is received correctly. Lamps 3520 to 3529 are used to indicate the number received for any digit if it fails to check.

The lamps of Figs. 27 and 28 serve to indicate the point at which a call is at any given time, the circuits for these lamps being prepared by the appropriate apparatus and being completed by the operation of key 2700 which may remain operated throughout the tests or may only be operated when the time alarm indicates a failure.

A single set of keys, including ten for each of the code and numerical digits and six for the stations and ten thousands digits jointly are employed, these same keys being used for controlling the transmission of either code or dial pulses and for checking call indicator pulses from either type or sender. For checking selections a set of keys is provided for district brush, district group, office brush and office group selections. Due to the translation involved in full mechanical selections between the thousands and hundreds digits, these digits are transferred to the sequence switch type registers 1000 and 1100, respectively, which make the proper translation. The tens and units digits are checked both as to full mechanical and call indicator calls directly from the keys themselves. Talking selection keys are provided one for each of the normal talking positions and the remainder for use where the sender transmits a zone registration to the district selector. A series of compensating resistances are also provided with one set of keys for controlling the resistance to be included in the fundamental circuit during district and office selections while a different set of keys controls the resistance to be used in checking selections beyond office selections. The resistance to be used is complementary to the resistance expected in the sender.

Before starting a test, the test circuit must be prepared by the operation of the proper keys. A key for each digit of the test designation must be operated. Where a particular digit is not required, the zero key for that digit would usually be operated. For tests of subscribers' senders, district brush, district group, office brush, office group and talking selection keys would ordinarily be operated, although if skip office key 1425 is operated no other office key need be operated. For operators' senders the no district key 1405 may also be operated in lieu of other district keys. One of the class keys must also be operated to prepare the test circuit for the desired functions. Compensating resistance keys are closed to control the fundamental circuit resistance. One of the link or trunk class keys 2304, 2305 and 2317 may also be operated to transmit a corresponding indication to the sender. Key 1206 is or is not operated according as the senders to be tested are operators' or subscribers' senders; key 404 is operated or not depending on whether a two digit or a three digit code is to be used. Any other special test keys are then operated and finally start key 2200.

TESTS OF SUBSCRIBERS' SENDERS

*Full mechanical call—Completed*

Assuming that all subscribers' senders are to be tested for handling a full mechanical call and that the test number is Halifax 5-3678 the No. 4 A-code key 504 is operated, the No. 2 B-code key 512, the No. 5 C-code key 425 and the numerical keys 903, 816, 827 and 838. Since no stations digit is included in this number the zero stations key 940 is operated. Assuming that this number requires the selection of the third district brush, the fourth group of office trunks, the zero office brush and the eighth group of incoming selectors, district brush key 1502, district group key 1513, office brush key 1520 and office group key 1437 are operated. In addition talking selection key 1551, class key 1561, link class key 2305, compensating resistance keys 2115 and 2128 are operated. Key 3600 is also operated to prepare for testing the marginal trunk test relay of the sender which is only used on full mechanical calls. Key 404 is operated to indicate a three digit code. The operation of these keys sets up the conditions which must be met by the sender if it is operating correctly. Following the operation of these preparatory keys, start key 2200 is operated.

The operation of class key 1561 connects ground to conductor 3727, which extends over the lower left contact of cam 3705 to the windings of sequence switch magnet 3700 and relay 3611. Magnet 3700 advances the class sequence switch to position 1 where it is ready to control a full mechanical test call and relay 3611 holds the normal checking path open until the class sequence switch has come to rest, when it releases.

The operation of start key 2200 prepares the normal checking circuit by closing a circuit from ground at the left back contact of relay 2204, outer lower right alternate contact of key 2200, conductor 2211, left contacts of cam 3307 of the call indicator control sequence switch in normal position, lower left and upper right contacts of cam 3817 of the full mechanical control sequence switch in normal position, conductor 3825, back contact of class relay 3611, conductor 3632 to the right contacts of the thousands keys. Since key 903 was operated, this circuit is extended over the contact of key 903, to the upper left contacts of cams 1112 and 1118, of the thousands register sequence switch 1100. If sequence switch 1100 is standing in any position but 4, the circuit will extend over cam 1118 to the winding of sequence switch magnet 1100 and the switch will be advanced to that position and come to rest.

When sequence switch 1100 reaches position 4 the circuit above traced is extended over cam 1112, and the upper right contact of cam 1111 to the left contacts of the hundreds keys. With key 816 operated, the circuit continues over the contact of key 816 to the lower left contacts of cams 1003 and 1009. With the hundreds register sequence switch 1000 in any position but 7; the circuit extends to magnet 1000 and the sequence switch is advanced into position 7 where it comes to rest. In this position the normal checking circuit is extended over the lower left contact of cam 1003 and the upper left contact of cam 1001 to conductor 1021, lower contacts of cam 208 of the dial control sequence switch in normal position, brush 601 of the timed release switch 600 in its normal position, conductor 626, upper left normal contact of key 1206, conductor 1210, upper left contact of cam 1604 of the connector sequence switch in normal position, through the winding of sequence switch magnet 1600 to battery. The connector sequence switch is advanced by this circuit to position 2. The circuit for advancing the connector sequence switch from normal, therefore, serves as a test that the thousands and hundreds register sequence switches have been positioned to correspond with the operated keys, that the control sequence switches are in normal position, and that the class switch is not moving.

The operation of key 2200 also connects ground to conductor 2212, completing a circuit which may be traced over the normal contact of relay 2320, through the winding of time alarm relay 2318, left normal contact of time alarm key 2207, resistance 2310 to battery. Relay 2318 operates, locking over its inner contact, conductor 2330, contacts of cam 1304, conductor 1329, right contacts of cam 220, conductor 237, left contacts of cam 1606 to grounded conductor 2212. Relay 2318 connects ground from the right back contact of relay 610, over conductor 620, outer front contact of relay 2318 to interrupter 2319 for controlling the time alarm relays, which will be described hereinafter.

When sequence switch 1600 reaches position 2 with the master selectors normal, a circuit is closed from battery through the winding of relay 2203, upper contacts of cam 1602, normal contact of master selector brush 1713 to ground. Relay 2203 operates and locks to ground over conductor 2217, the lower right contact of cam 1612 and the upper right contact of cam 1607. Relay 2203 operated, closes a circuit from battery through the winding of sequence switch magnet 1600, lower right contact of cam 1603, right front contact of relay 2203 to ground over conductor 2217. Sequence switch 1600 is advanced to position 3 in this circuit and is immediately advanced to position 4 in a circuit over the lower right contact of cam 1604 to ground at the left back contact of relay 2201. With sequence switch 1600 in position 4, relay 2203 closes a circuit from battery through resistance 1624, winding of relay 1623, right contacts of cam 1616, right front contact of relay 2203 to grounded conductor 2217. Relay 1623 closes a circuit over the lower left contact of cam 1605 for advancing sequence switch 1600 to position 5. As sequence switch 1600 leaves position 4 relay 1623 is released. Since relay 2203 is still locked, the circuit closed in position 2, for advancing sequence switch 1600 is reclosed in position 5 and sequence switch 1600 is advanced to position 6. In this position a circuit is closed from battery through the winding of the magnet 1707 of the first master switch 1700, upper contacts of cam 1619, right front contact of relay 2203 to grounded conductor 2217. A similar circuit is closed from battery through the winding of stepping magnet 1717 of the second master switch 1710, right contacts of cam 1619 to ground over the contact of relay 2203. In position 6 the circuit of relay 1623 is closed as previously traced, but a circuit is closed in parallel with the winding of that relay extending from battery through resistance 1624, right contacts of cam 1609 and the back contact of magnet 1707 to the operating ground for that magnet and over the upper contacts of cam 1609 and the back contact of magnet 1717 to the operating ground for that magnet. Therefore relay 1623 can not operate. However, when magnets 1707 and 1717 have both operated sufficiently to open their back contacts, relay 1623 is operated and closes the previously traced circuit for advancing the sequence switch 1600, this time to position 7. As the sequence switch leaves position 6, the circuits of magnets 1707 and 1717 are opened and these magnets release advancing the master switches 1700 and 1710 into engagement with their first off-normal terminals. Relay 1623 is also released by the advance of sequence switch 1600. The continued operation of relay 2203 closes a circuit for advancing sequence switch 1600 into position 8. In position 8 a circuit is closed from battery through the winding of sequence switch magnet 1600, upper left contact of cam 1603, normal contact of brush 1726 of the first selector switch 1720, first off-normal terminal of brush 1715 of the master switch 1710, conductor 1756, outer left front contact of relay 2203, upper right contact of cam 1612 to ground, advancing sequence switch 1600 to position 9. This advance of sequence switch 1600 is therefore an indication that the sender selector is in normal position before starting the tests.

In position 9 a circuit is closed from battery through resistance 1624, winding of relay 1623, lower right and upper left contacts of cam 1616, brush 1703, in position 1, brush 1713 in position 1 to ground, thereby insuring that both master selectors are engaging the same sender selector before selecting a sender. At the same time a circuit is closed from battery through the winding of selector switch magnet 1727, brush 1716 in position 1, inner upper right contact of start key 2200, right back contact of relay 2206, right contacts of cam 1616, to ground over brushes 1703 and 1713 as above traced. At the same time a shunt circuit is closed from resistance 1624, upper right and lower left contacts of cam 1609, brush 1706, back contact of magnet 1727, to ground over the operating circuit of the magnet, shunting relay 1623 until magnet 1727 opens its back contact. When this occurs relay 1623 operates advancing sequence switch 1600 to position 10 which is the same as position 1, where it releases and magnet 1727 also releases, stepping the sender selector to its first off-normal position. In this position the brushes of selector switch 1720 engage conductors leading to the first sender to be tested. When sequence switch 1600 leaves position 9, the locking circuit of relay 2203 is opened and that relay releases. Sequence switch 1600 is advanced from position 1 as before.

In position 2, a test is made to determine whether the sender, with which selector 1720 is connected, is busy or idle. An idle sender is characterized by battery through a resistance of 270 ohms connected to the conductor engaged by brush 1726 so that, assuming the sender shown in Figs. 54 to 67 is the one to be tested and is idle, a circuit may be traced from battery through resistance 6002, left back contact of relay 6003, lower back contact of relay 5426, conductor 5446, brush 1726, brush 1715, conductor 1756, contacts of cam 1611, conductor 1628, lower right normal contact of key 1206, conductor 1211, winding of marginal relay 2323, left winding of relay 2209, left contact of key 2210 to grounded conductor 2212. Relay 2209 operates in this circuit and closes a short circuit around its left winding but is held operated in a circuit from grounded conductor 2212, left contact of key 2210, right winding of relay 2209, normal contact of relay 2201 to battery at the right back contact of relay 2301. The shunt around the left winding of relay 2209 permits marginal relay 2323 to operate in the previously traced circuit, in turn closing a circuit from battery through the winding of relay 2201, contact of relay 2323 to ground over the upper left contact of cam 1608. Relay 2201 in operating, opens the circuit through the right winding of relay 2209 and connects ground in shunt of the left winding of relay 2209 thereby releasing that relay but holding relay 2323 operated. Relay 2201 in operating closes a circuit for advancing sequence switch 1600 to position 3. When sequence switch 1600 reaches position 3, ground from the left front contact of relay 2201 is connected over the left contacts of cam 1601, right back contact of relay 2202, to the windings of relay 2205 and relay 2301 in parallel. Relay 2205 closes a locking circuit for these relays over the lower left and upper right contacts of cam 1601, inner left contact of relay 2205, right normal contact of key 2210, conductor 2213, contacts of cam 1322, conductor 1330, lower right contact of cam 214 to ground. Relays 2301 and 2205 extend conductors 1751 to 1755 which are connected through the master and sender selectors to the corresponding sender conductor through to the testing equipment with the exception of the busy test conductor which has already been connected through as above described.

As soon as relay 2301 operates a circuit is closed from ground over the upper left and lower right contacts of cam 1309, resistance 1208, outer lower left normal contact of key 1206, conductor 1213, contact of link class key 2305, conductor 2331, back contact of relay 619, conductor 621, outer left front contact of relay 2301, conductor 1754, master selector brush 1711, sender selector brush 1721, conductor 5447, outer right back contact of relay 6003, conductor 6015, right winding of relay 6107 to battery to record the link class in the sender. Relay 6107 when operated locks in a circuit from battery over the lower contacts of cam 6424, conductor 6429, left winding and left front contact of relay 6107 to grounded conductor 5938.

The operation of relay 2301 also closes a circuit from battery over the right contacts of cam 1303, resistance 1326, conductor 1331, upper contacts of cam 1620, inner left contact of relay 2301, conductor 1755, brush 1705, brush 1725, conductor 5445, right back contact of relay 6005, outer left back contact of relay 5932, middle and left windings of relay 6006 to ground. Relay 6006 operates in this circuit, operating relay 5934 which in turn operates relay 5933. Relay 5933 locks to ground at its inner left contact and connects ground to conductor 5938 to supply locking ground to various parts of the sender. The connection of ground to conductor 5938 operates relays 5602, 6001 and 6003, relay 5602 preparing the A register to receive the first digit and relay 6003 disconnecting battery through resistance 6002 from the conductor 5446, thereby releasing relay 2323 which in turn releases relay 2201. Resistance 1326 is of such value that the current flow in the circuit traced for relay 6006 gives an operate test to that relay. The release of relay 2201 closes a circuit over the lower right contact of cam 1604 to advance sequence switch 1600 to position 4. Since the master switches and the selector switches have advanced from normal at this time, the circuit for operating relay 2203 is open and that relay is not operated. Sequence switch 1600 is therefore advanced to position 5 in a circuit over the upper right contact of cam 1604 to ground at the right back contact of relay 2203. With sequence switch 1600 in position 5 battery is connected over cams 1614 and 1615 to conductors 1629, 1630 and 1631 and the counting relays of Fig. 39, the No. 0 counting relay receiving battery over conductor 1631, the Nos. 1 to 4 counting relays receiving battery over conductor 1630 and the remaining counting relays receiving battery over conductor 1629.

When sequence switch 1600 advances to position 5, the circuit of relay 6006 is transferred from conductor 1331 and battery through resistance 1326, to conductor 1632 which extends to the upper right normal contact of key 1206 and thence over conductor 1212, left normal contact of relay 311, conductor 330, left contacts of cam 205, conductor 239, to the winding of relay 3103 and battery. Relay 3103 operates in this circuit and locks over conductor 330 to ground through the windings of relay 6006 as above traced.

When relay 2205 operated it also completed the dialing circuit which extends from battery through the lower winding of relay 5424, conductor 5444, sender selector brush 1723, master selector brush 1712, conductor 1752, inner right contact of relay 2205, conductor 2215, left contacts of cam 1314, conductor 1332, winding of relay 306, conductor 261, lower contacts of cam 221, conductor 727, outer right normal contact of key 705, conductor 1337, upper left and lower right contacts of cam 1313, conductor 2214, outer left front contact of relay 2205, conductor 1751, master switch brush 1702, selector switch brush 1724, conductor 5443, resistance 5429, to ground at the outer right back contact of relay 5937. The operation of relay 306 in this circuit is an indication that the dialing circuit is complete and ready for the dialing of the test number. Relay 306 in operating closes a circuit from ground over the normal checking path to conductor 626, front contact of relay 306, left back contact of relay 305, lower left contact of cam 201 to the winding of sequence switch magnet 200 and battery, advancing the dial control sequence switch to position 2. When sequence switch 200 advances to position 2, a shunt is closed around the winding of relay 306 extending from conductor 1332 over the left back contact of pick-up relay 315, left normal contact of key 705, conductor 733, upper right and lower left contacts of cam 204, to conductor 1332 thereby releasing relay 306 and establishing a circuit in which relay 5424 of the sender may operate.

The operation of relay 5424 closes a circuit from battery through the winding of relay 5416, front contact of relay 5424 to ground at the inner right back contact of relay 5937. Relay 5416 in operating connects ground over its upper front contact through resistance 5417 to the winding of relay 5413 which operates, in turn operating relays 5414 and 5415. Relay 5414 prepares the pulsing circuit and since both it and relay 5413 are slow to release, they do not open their contacts during the pulsing of a digit. Relay 5415 connects ground over its inner upper contact, upper winding of relay 5424, condenser 5427, right back contact of relay 5529, outer left front contact of relay 5602 to the source of dial tone which is transmitted out over the dialing circuit as previously traced and to which the test man may listen by the use of key 319 and receiver 307. When sequence switch 200 reaches position 2, with relay 3103 operated, a circuit is closed from ground at the right front contact of relay 3103, conductor 3108, upper right contact of cam 219 to the winding of sequence switch magnet 200 and battery advancing the dial sequence switch to position 3. When sequence switch 200 reaches position 3, the operating circuit of relay 3103 is opened but the relay holds operated in its locking circuit. The circuit of relay 6006 is also extended over the upper right contact of cam 205 and conductor 240 to battery through the right winding of marginal relay 2402.

In position 3 of sequence switch 200 a preliminary pulse simulating a false preliminary pulse will or will not be transmitted depending on the position of the preliminary pulse key 225. If the key is operated ground over conductor 1021 is extended over the lower right and upper left contacts of cam 208, operated contact of key 225, upper right contact of cam 201 to the winding of sequence switch magnet 200, immediately advancing the sequence switch to position 4. If the key is normal the preliminary pulse will be sent out and sequence switch 200 remains in position 4 while it is transmitted.

Assuming the preliminary pulse is to be sent, the arrival of sequence switch 200 in position 3 closes a circuit from grounded conductor 1021 over the lower right and upper left contacts of cam 208, normal contact of key 225, conductor 323, left normal contact of key 700, conductor 322, left normal contact of relay 316, winding of relay 315, resistance 728 to battery. Relay 315 can not operate at once, due to the presence of a shunt extending from resistance 728 over the right contact of key 700, inner right back contact of relay 315, contact 443 of interrupter 400 and thence over conductor 323 to ground as previously traced. At a particular point in the cycle of interrupter 400 contact 443 is opened and relay 315 then operates. Relay 315 opens the dialing circuit at its left back contact but the circuit is held closed over contact 431 of interrupter 400, and the normal contact of key 401 during the open period of interrupter 443. When contact 443 recloses, with relay 315 operated, the circuit from grounded conductor 323 above traced is extended over the right front contact of relay 315, conductor 320, left contacts of cam 3718, conductor 3726, right normal contact and winding of relay 316 to battery. Relay 316 locks over its right alternate contact to ground over conductor 323 as previously traced. Relay 316 in operating closes a holding circuit for relay 315 over its outer left contact to the operating circuit of relay 316 so that relay 315 is now dependent on the contact of interrupter 443. Immediately after contact 443 closes, interrupter 431 starts its cycle of interruptions, but only the last one is effective since interrupter 434 shunts out the first nine pulses, the shunt extending from conductor 727, interrupter 434, upper left contacts of cams 224 and 223 to key 401. Therefore only a single simulated dial impulse is transmitted to the sender. Immediately following the transmission of this pulse interrupter contact 443 opens and releases relay 315 to again close the shunt around the dialing contact. The release of relay 315 closes a circuit from ground at its right back contact, inner left front contact of relay 316, right back contact of relay 317, conductor 321, inner left back contact of relay 2411, conductor 2423, upper right contact of cam 201 to the winding of sequence switch magnet 200, advancing the sequence switch to position 4. The advance of sequence switch 200 from position 3 opens the circuit of relay 316 which releases bringing the sequence switch to rest.

The single simulated dial impulse transmitted to the sender causes a single release of relay 5424. The release of relay 5424 closes a circuit from the inner right back contact of relay 5937, back contact of relay 5424, upper front contact of relay 5414, inner left front contact of relay 5934, upper back contacts of relays 5410, 5408, 5406, 5404 and 5402 to the winding of relay 5401 and battery. Relay 5401 closes a locking circuit for itself, through the winding of relay 5402 and the front contact of relay 5401, lower back contact of relay 5404, back contact of relay 5420 to ground at the upper front contact of relay 5415. Relay 5402 does not operate in this locking circuit until relay 5424 is reoperated at the close of the pulse. When relay 5402 operates, it transfers the pulsing circuit to relay 5403 and closes a circuit from ground at its lower front contact, over conductor 5431, inner left contact of relay 5402, right winding of relay 5604 to battery. Relay 5604 operates and attempts to close a locking circuit for itself over its inner left contact, but this circuit is ineffective since it is only closed when relay 5605, or 5607 is also operated. Since in this case only a single pulse is transmitted, relay 5604 can not lock. When relay 5424 releases, relay 5416 also releases and may or may not reoperate during pulsing The release of relay 5416 closes a circuit from battery through resistance 5419, winding of relay 5418, inner lower back contact of relay 5416, to ground at the upper front contact of relay 5415. Relay 5418 is slow to release so that it remains operated even though relay 5416 may momentarily break its operating path. After the pulse has been received, relays 5424 and 5416 remain operated for an appreciable length of time. The circuit of relay 5418 is therefore opened and a circuit closed from battery through the winding of relay 5420, upper normal contact of relay 5418 to ground at the front contact of relay 5415. Relay 5420 closes a holding circuit for itself under the control of relay 5416. It also connects ground from the front contact of relay 5415 over the front contact of relay 5420, outer left back contacts of relays 5812, 5802, 5722, 5730, 5702, 5622, 5612, winding of relay 5601 to the front contact of relays 5603, 5605, 5606 and 5607. The circuit is not completed over the front contact of relay 5604 thereby preventing the operation of relay 5601 and the transfer of the registering conductors to the next register. The operation of relay 5420 opens the locking circuit of relays 5401 and 5402 thereby releasing these relays and in turn releasing relay 5604 so that the sender is merely restored to condition to receive a first digit.

With sequence switch 200 in position 4, the circuit for the pick-up relay 315 extends as previously traced to conductor 323, upper left contact of cam 216, upper right contact of cam 206, conductor 1570 to ground at the right contact of class key 1561. As before, the winding of relay 315 is shunted over the contact of interrupter 443 so that relay 315 operates during the open period of relay 443. Contact 441 transmits the dialing pulses as before, all but the last four being shunted over interrupter contact 437, inner left operated contact of key 504, and the upper left contact of cam 222. Therefore, four pulses are transmitted to the sender. The operating circuit of relay 316 is the same as previously traced as far as conductor 323 whence it extends over the upper left contact of cam 216 to the operating ground for relay 315. After the last pulse has been transmitted, relay 315 is released advancing sequence switch 200 out of position 4 where relay 316 releases bringing the sequence switch to rest in position 5. In a similar manner the second code digit is transmitted, the same operating circuits being used for relays 315 and 316. All but two pulses are shunted over interrupter contact 435, inner left contact of key 512, and the lower left contact of cam 222. At the completion of the pulses, sequence switch 200 is advanced to position 6. In this position relay 315 is reoperated in the above traced circuit causing the transmission of five pulses to the sender, since the first five pulses are shunted over interrupter contact 438, contact of key 425 and the upper right contact of cam 222.

It will be noted that the circuit of relay 315 and therefore the operating circuit and locking circuit of relay 316 is maintained closed through position 7 so that, when the release of relay 315 starts sequence switch 200 out of position 6, it continues to advance until it reaches position 8 where the release of relay 316 brings it to rest. This position 7 is used for dialing a ten thousands digit which is only used in the case of a manual office and therefore is not needed in the present full mechanical type of call. The remaining digits can not be transmitted until the selections corresponding to the code digits have been checked.

Returning now to the sender, the first impulse of the first code digit causes the release of relay 5424, the operation and locking of relays 5401 and 5402 and the operation of relay 5604 as previously described. As set forth in detail in the above identified patent to Raymond et al. the next three pulses operate relays 5403 to 5408, releasing relays 5401 to 5406. Relay 5408 connects ground to conductor 5433, operating register relay 5606. At the end of the first digit, relays 5418 and 5420 operate as previously described. However, since relay 5606 is operated at the end of this digit, the circuit of relay 5601 previously traced is now completed through the left winding of relay 5606 to battery, so that relay 5601 operates, closing a locking circuit for itself and for relay 5606 over its outer left front contact, and conductor 6017 to ground at the outer left front contact of relay 6003. The operation of relay 5601 releases relay 5602 disconnecting the registration conductors from register 5600. Relay 5601 also operates relay 5612 to extend the registration conductors to register 5610.

In receiving the two pulses of the second digit relays 5401 to 5404 are operated in succession and relays 5401 and 5402 released. Relay 5404 connects ground over conductor 5432 to the winding of relay 5615 and battery. At the end of this digit, the operation of relays 5418 and 5420 connects ground to the circuit above traced for relay 5601, but this circuit is now open at the contact of relay 5612 and extends through the winding of relay 5611 to battery over the inner left front contact and left winding of relay 5615. Relay 5611 operates in this circuit and locks to conductor 6017, opening the circuit of relay 5612, which disconnects register 5610 from the receiving register 5400, and closing a circuit for relay 5622. With relay 5622 operated, the relays of register 5620 are prepared to receive the third code digit.

The first four impulses of the third digit are recorded in the manner previously described. The fifth pulse operates relays 5409 and 5410. Relay 5410 opens the locking circuit of relays 5407 and 5408 thereby releasing relay 5626, and closes a circuit through the right winding of register relay 5627 and through the winding of relay 5411. Relay 5411 locks in series with relay 5412 over its front contact to conductor 5436 independent of the remaining counting relays. Relay 5412 does not operate at this time being shunted by the operating circuit of relay 5411. At the close of this digit relays 5418 and 5420 function as previously described, operating relay 5621 to release relay 5622 and operate relay 5702. The register relay 5627 is also locked under the control of relay 5621. No further registration takes place at this time since, as above mentioned, the further dialing is dependent upon the accurate performance of the selections controlled by the code digits.

The operation of relay 5601, following the registration of the first digit, closes a circuit from battery through the winding of sequence switch magnet 6400, lower right contact of cam 6402, conductor 6428, left back contacts of relays 6205 and 6204, conductor 6209, outer right back contact of relay 6021, left back contact of relay 6010, outer left front contact of relay 5924, conductor 5929, inner left front contact of relay 5601, to grounded conductor 6017. Sequence switch 6400 advances to position 2 in this circuit, connecting ground over the lower left contact of cam 6408 and the lower right contact of cam 6416 to conductor 5938 as long as the switch remains out of position 1. At this time also, a circuit is closed from battery over the lower right and upper left contacts of cam 6424, conductor 5539, winding of relay 5926, back contact of relay 5927 to ground, operating relay 5926 to prepare for the closure of the fundamental circuit.

When the office code digits have been registered as indicated by the operation of relay 5621, a circuit is closed from battery through the winding of relay 5421, inner left front contact of relay 5621 to grounded conductor 6017. Relay 5421 is operated, initiating the operation of the decoder by completing a circuit from battery over the lower right and upper left contacts of cam 6424, conductor 5539, right back contact of relay 5538, left normal contact of relay 5536, normal contact of relay 5423, inner lower front contact of relay 5421 to conductor 5630 leading to the decoder. The decoder then functions as described in the above identified patent to R. Raymond et al. to bring about the setting of the selection control registers. Since register relays 5606, 5615 and 5627 are operated, they connect ground to conductors 5636, 5645, and 5657, respectively to pass the registered code designation to the decoder. A part of the registration required by the decoder is an indication of the class of district selector over which the call is originated as indicated by the operated condition of relays 6106 and 6107. Relay 6107 connects ground to conductor 5667 to transmit this information to the decoder.

If the decoder is operated correctly under the assumed conditions established by the sender registers, it should connect ground to conductor 5674 to operate relay 6624 indicating that a short trunk will be used and one which needs considerable compensating resistance; and to conductor 5675 to operate relay 6625 to indicate that marginal trunk guard relay 6014 is to be used. None of the relays of the class register 6500 will be operated, thus indicating a full mechanical type call. Conductor 5742 will be grounded, operating relay 6512 to indicate that the third district brush is to be selected. Conductors 5793 and 5794 operate relays 5820 and 5821 to indicate that the call is for an office employing neither stations digits nor five digit numbers. Conductors 5676 and 5755 will be grounded to operate relays 6021 and 6010 indicating that the district selector is to be advanced to the second talking position. Conductors 5781 and 5782 will be grounded to operate relays 6601 and 6602 to cause the selection of the fourth group of office selectors. Conductors 5752 and 5754 will be grounded to operate relays 6612 and 6614 to cause the selection of the eighth group of trunks outgoing from the office selector. None of the relays of the office brush register 6520 will be operated thereby causing the selection of the first or zero brush. Neither of the zone relays 6204 nor 6205 is operated.

When the decoder has completed the transfer of the registration to the selection control registers, it connects ground over conductor 5658, to the upper winding of relay 5422 and battery. Relay 5422 closes a locking circuit for itself from battery over its inner lower front contacts and lower winding to grounded conductor 5938. Relay 5422 also connects relay 5423 to battery in parallel with its lower winding. Relay 5423 at its upper contact, prepares the fundamental circuit and at its lower contact connects ground to conductor 5437 to provide a locking circuit for the stations delay relays 5820 and 5821, talking selection relays 6010 and 6021, two-wire office relay 6022, class register relays 6501, 6502 and 6503 and the compensating resistance relays 6621 to 6625. In addition this ground extends over the left contacts of cam 6404, in positions 1 to 3 of sequence switch 6400 to the locking circuit of the district brush register relays 6511 to 6513, the district group register relays 6601 to 6604 and the zone relays 6204 and 6205, while it extends over the lower contacts of cam 6404 in positions 2 to 7 of sequence switch 5400, to form the locking circuits of the office brush register relays 6521 to 6523, office group register relays 6611 to 6614 and the skip office relay 5823. Relay 5423 also disconnects battery from conductor 5630 thereby releasing the decoder.

When sequence switch 200 arrives in position 7 a circuit is closed from ground over the upper right contact of cam 217, conductor 241, inner lower normal contact of key 3000, left contacts of cam 3724, lower right contact of cam 3824 to the winding of sequence switch magnet 3800 and battery. This sequence switch which controls the checking of full mechanical selections is now advanced to position 2. Relay 2414 is operated when sequence switch 3800 advances to position 2 in a circuit from battery through the winding of that relay, conductor 2428, outer left operated contact of key 1551, conductor 1572 to ground at the lower left contact of cam 3801.

When the registration has been completed in the sender and relay 5423 operated, the fundamental circuit for district selections is established, which may be traced from battery through the winding of relay 3004, conductor 3021, lower back contact of relay 3934, conductor 3950, left back contact of relay 3608, conductor 3612, lower left and upper right contacts of cam 3820, conductor 3826, middle left contact of relay 2301, conductor 1753, master selector brush 1701, sender selector brush 1722, conductor 5448, upper front contact of relay 5423, lower contacts of cam 6422, winding of stepping relay 6000, back contact of relay 5920, inner left contact of relay 5926, right winding of overflow relay 5925, resistance 5930, right back contact of relay 6206, conductor 6214, upper left contact of cam 6409 to ground at the lower left contact of cam 6408. Relay 3004 operates in this circuit and locks over its inner right front contact to conductor 3612 and thence over the fundamental circuit as traced to ground in the sender. The stepping relay 6000 of the sender also operates and closes a circuit from ground over the left contacts of cam 6408, conductor 6020, front contact of relay 6000, conductor 6430, left contacts of cam 6407, conductor 6435, upper right contact of cam 6420, lower right contact of cam 6419, left back contact of relay 6513, left front contact of relay 6512, conductor 6542, back contact of counting relay 5916, winding of counting relay 5915, lower front contact of relay 5422 to battery. Relay 5915 locks through the winding of relay 5916 over the front contact of relay 5915, outer left contact of relay 5926, upper right contact of relay 6409, to ground. Relay 5916 does not operate at this time since it is shunted by the operating circuit for relay 5915.

Relay 3004 in operating supplies ground to interrupters 2419 and 3017 over circuits which may be traced from ground over the lower right contact of cam 3811, lower left contact of cam 3810, normal contact of key 3204, conductor 3953, outer left back contact of relay 3942, back contact of relay 3932, conductor 3613, inner left back contact of relay 3608, conductor 3023, to the outer right front contact of relay 3004, and thence over the left back contact of relay 3020, conductor 3952, right back contact of relay 3940, inner left back contact of relay 3942, conductor 2425, right back contact of relay 2418, conductor 2923, left back contact of relay 2908, and conductor 2424 to interrupter 2419, and in parallel from the front contact of relay 3004, over conductor 3024, right back contact of relay 3943, and conductor 3955, to interrupter 3017.

Relay 3935 is operated under the control of interrupter 2419 at its first closure in a circuit which may be traced from battery over conductor 1631, winding of relay 3935, lower back contact of relay 3933, conductor 3951, right back contacts of relays 3018 and 3020, conductor 3022, right back contact of relay 2901, conductor 2922, left back contact of relay 2418, to interrupter 2419, and ground. Relay 3935 closes a locking circuit for itself in parallel through the windings of relays 3934 and 3933, front contact of relay 3935, conductor 3954, inner right back contact of relay 3609, conductor 3614, lower right contact of cam 3818, upper left contact of cam 3817 to ground. Relays 3933 and 3934 operate when interrupter 2419 opens. These three relays act as a pick-up combination to insure that the first operative closures of the interrupters are of full length.

With relay 3934 operated the circuit controlled by interrupter 3017 extends over the left back contact of relay 3018, conductor 3025, right back contact of relay 3942, resistance 3937 and over the front contact of relay 3934 to conductor 3021 and thence through the winding of relay 3004 and over the front contact of that relay to the circuit of the stepping relay of the sender thereby shunting that relay in simulation of the action of the selector switches.

With relay 3933 operated, the next closure of interrupter 2419 closes a circuit for the counting relays which extends over the front contact of relay 3933, left contacts of cam 3816, conductor 1571, left operated contact of key 1502, conductor 1582, back contact of counting relay 3912, winding of counting relay 3902 to battery over conductor 1630. Relay 3902 locks through the winding of relay 3912 in the usual manner, the operation of relay 3912 being deferred until the opening of the contact of interrupter 2419. Interrupters 2419 and 3017 operate simultaneously so that at the same moment that the pulse is transmitted to the sender by interrupter 3017, interrupter 2419 recloses the counting relay circuit. The next two closures of interrupter 2419 cause the operation of relays 3901 and 3911, 3900 and 3910 and in parallel with relay 3910, relay 3932.

The connection of ground by interrupter 3017 to the fundamental circuit causes the release of stepping relay 6000 permitting relay 5916 to operate. Relay 6000 functions under the control of interrupter 3017 in the well known manner to operate relays 5917 to 5920 and 5929. The operation of relay 5920 opens the fundamental circuit releasing relay 6000 and opening the circuit of relay 3004 which is held by interrupter 3017. If the same number of pulses have caused the operation of relays 3932 and 5920, relay 3004 will release at the opening of interrupters 3017 and 2419 which permits the operation of relay 3932. If the sender has operated correctly so that relay 3004 is released and relay 3932 operated at the same time, a circuit is closed from battery through the winding of relay 3608, conductor 3615, left back contact of relay 3004, conductor 3026, left contacts of cam 3809, conductor 3827, left back contact of relay 2902, conductor 2924, left back contact of relay 3946, front contact of relay 3932, outer left back contact of relay 3942, conductor 3953, key 3204, to ground over the lower left contact of cam 3810 and the lower right contact of cam 3811. Relay 3608 locks to ground over conductor 3614 and also closes a circuit for relay 3609 at its inner right front contact to conductor 3614. These relays disconnect the locking ground from relays 3932 to 3935 as well as the counting relays 3900 to 3902 and 3910 to 3912, inclusive, permitting them all to release. With relay 3609 operated and relay 3932 released, a circuit is closed from battery through the winding of sequence switch magnet 3800, upper left contact of cam 3824, conductor 3823, outer left back contact of relay 2411, conductor 2426, left back contact of relay 3102, conductor 3109, left front contact of relay 2414, conductor 2427, left front contact of relay 3609, conductor 3613, back contact of relay 3932, to ground, as previously traced. Sequence switch 3800 advances to position 3 in this circuit. The advance of sequence switch 3800 opens the locking circuit for relay 3608 which releases, in turn releasing relay 3609.

If too few pulses have been sent to the sender so that relay 3932 operates, since ground is removed form the interrupter 3017 no action can take place in the sender to cause the operation of relay 5290 and relay 3004 will remain operated; relays 3608 and 3609 can not be operated; sequence switch 3800 is not advanced from position 2, and the test is blocked until the time alarm sounds and signals the attendant. On the other hand if the sender is satisfied with fewer pulses than the test circuit so that relay 5920 operates prematurely, relay 3004 releases before relay 3932 operates, removing ground from the interrupters and no further counting relays of the test circuit can be operated so that the call is also blocked. The test man on hearing the alarm may operate key 2700, if that key is normal, connecting battery to the lamp circuits. Assuming, for example, that the circuit failed at the present stage, a circuit would be completed extending from battery over the outer right operated contact of key 2700, conductor 1573, the No. 2 lamp 1542, the No. 2 district brush key 1502, conductor 2429, left back contact of relay 2421, conductor 2830, district brush lamp 2815, conductor 2432, upper left contact of cam 3806, to ground. Therefore the district brush lamp 2815 would be lighted indicating that the circuit failed during this first selection and the No. 2 lamp 1542 to indicate that the No. 2 district brush was to have been selected. Key 3936 may also be operated, to operate relays 3930 and 3931 and supply battery to lamps 3920 to 3929. The lamps correspondingly to operated counting relay pairs are lighted over the locking circuits of the relays.

Assuming that the circuit operates correctly, the operation of relay 5929 in the sender closes a circuit from battery through the winding of relay 5928, lower contacts of cam 6418, right back contact of relay 5935, front contact of relay 5929 to ground. Relay 5928 locks over its inner right contact to ground over the lower left and upper right contacts of cam 6405. Relay 5928 also closes an obvious circuit for relay 5927. When both relays 5928 and 5927 have operated, the circuit of relay 5926 is opened and that relay releases. The operation of relay 5928 opens the locking circuit of the odd numbered counting relays, while the release of relay 5926 opens the locking circuit of the even numbered counting relays including relays 5919, 5920 and 5929. The release of relay 5929, closes a circuit from ground over its back contact, outer right front contacts of relay 5928, upper left contact of cam 6401, winding of sequence switch magnets 6400 to battery, advancing sequence switch 6400 to position 3. As soon as sequence switch 6400 leaves position 2, the locking circuit of relay 5928 is opened and that relay releases. When relay 5928 recloses its back contact, relay 5926 reoperates over the back contact of relay 5928, upper left contact of cam 6416 and the lower left contact of cam 6408 to ground. The release of relay 5920, the reoperation of relay 5926 and the advance of sequence switch 5400 reclose the fundamental circuit in the sender. With sequence switch 3800 in position 3, the fundamental circuit is also reestablished in the test circuit and relays 3004 and 6000 may reoperate. The counting relay circuit in the sender is now under the control of register 6600 and since relays 6601 and 6602 are operated, the circuit extends over conductor 6543 to the winding of relay 5913 and battery. The operation of relay 3004 connects ground to the interrupters 2419 and 3017 as before. With sequence switch 3800 in position 3, the circuit from the front contact of relay 3933 extends over the lower contacts of cam 3816 to district group key 1513 and thence to the winding of relay 3903. The operation of the sender and the test circuit in checking district group selection is the same as described for district brush selection, after which the sequence switch 6400 is advanced to position 4 and sequence switch 3800 is also advanced to position 4. When sequence switch 6400 leaves position 3, the locking circuits for the relays of registers 6510 and 6600 are opened, thereby permitting these relays to release and prepare to receive the numerical designation from the incoming registers.

With sequence switch 3800 in position 4 the test circuit is ready for office brush selection but with sequence switch 6400 in position 4, the sender establishes a circuit for testing the condition of the selected trunk outgoing to the office selector.

When sequence switch 6400 reaches position 4, a circuit is closed from battery through the winding of relay 6302, upper right and lower left contacts of cam 6410 to grounded conductor 6019. Relay 6302 in operating, with neither relay 6204 nor relay 6205 operated, closes a circuit from battery through resistance 6303, inner left front contact of relay 6302, right back contacts of relays 6204 and 6205, right winding of relay 6206 to ground.

For office trunk test and subsequent selections both the tip and the ring conductors are included in the fundamental circuit.

With relay 6206 operated the office trunk test circuit extends in the test circuit from battery through relay 3004 to conductor 5448 as previously described and thence in the sender over the upper front contact of relay 5423, outer left back contact of relay 6504, resistance 6425, lower left and upper right contacts of cam 6403, conductor 6431, right front contact of relay 6206, conductor 6210, right front contact of relay 6625, winding of marginal trunk test relay 6014, back contact of relay 5920, inner left contact of relay 5926, right winding of relay 5925, lower right and upper left contacts of cam 6417, back contact of relay 6621, through resistances 6627 and 6626, back contact of relay 6622, upper right and lower left contacts of cam 6414, back contact of relay 5931, conductor 5447, sender selector brush 1721, master selector brush 1711, conductor 1754, outer left front contact of relay 2301, conductor 621, right back contact of relay 2504, conductor 2505, upper left and lower right contacts of cam 3819, conductor 3629, compensating resistance key 2115, resistances 2120 and 2127, conductor 2132, right back contact of relay 2829, left back contact of relay 2904, conductor 2925, right contacts of cam 3821, left back contact of relay 3940, conductor 3956, to ground at the right front contact of relay 3103.

If the circuit is properly closed through both the sender and the test circuit, relay 6014 operates but relays 3004 and 5925 do not. The presence of resistance 6425 prevents the premature operation of relay 3004 in this testing circuit. Relay 6014 closes an obvious circuit for relay 6007 which locks to ground over conductor 6434 and the lower right contact of cam 6409. Relay 6007 closes a circuit from ground at its left front contact, left contacts of cam 6406, through the winding of sequence switch magnet 6400 to battery, advancing the sequence switch to position 5. As soon as the switch leaves position 4 the locking circuit of relay 6007 is opened.

The advance from position 4 also opens the testing circuit and, as soon as position 5 is reached, the fundamental circuit is closed through the stepping relay 6000 extending over the circuit traced for district selections to the winding of relay 5925 whence it extends over the lower right and upper left contacts of cam 6417, right back contact of relay 6621, through resistances 6627 and 6626, right back contact of relay 6622, upper right and lower left contacts of cam 6414, right back contact of relay 5931 to conductor 5447 and thence to ground as traced for the trunk test circuit. Office selections are checked in exactly the same manner as district selections, the only difference being that office brush selections is under the control of register 6520 whereby the operation of relay 6000 grounds conductor 6540 operating relay 5919, and a single pulse is required to satisfy the sender, while for office group selections register 6610 is employed, the operation of relay 6612 causing the grounding of conductor 6542 and the operation of relay 5915. After two impulses the circuit controlled by the stepping relay is transferred over the contacts of cam 6413 to the armature of relay 6614 and over the front contact thereof to conductor 6545, the next five impulses causing the operation of relay 5901 and the subsequent counting relays to and including relays 5909 and 5910, the eighth impulse then being transferred to the winding of relay 5919.

In the test circuit, the operation is also essentially the same, the counting relay circuit in position 4 extending over the upper right contact of cam 3814, contact of key 1520 to relay 3900, and in position 5 over the upper left contact of cam 3815 and key 1437 to relay 3907.

In position 3 a circuit is prepared for lamps 1543 and 2807 to indicate that district group selections is being performed and that the third group is to be selected, whereas in position 4 a circuit is prepared for the office brush lamp 2814 and the No. 0 lamp 1540, and in position 5 for the office group lamp 2806 and the No. 8 lamp 1447.

Following office selections the sender makes a trunk guard test of the outgoing trunk. This test is made in position 6 of sequence switch 3800 and position 7 of sequence switch 6400. When sequence switch 6400 reaches position 6 relay 6302 is reoperated in the circuit previously traced, in turn operating relay 6206. A circuit is also closed from battery over the inner left back contact of relay 6504, conductor 6550, winding of relay 6201, conductor 6211, upper contacts of cam 6415, conductor 6432, to the inner left front contact of relay 5701 which extends to grounded conductor 6017. However, this circuit is not completed at relay 5701 since the thousands digit has not been received as yet.

The circuit for checking the trunk test feature of the sender may be traced as follows: battery over the lower contacts of cam 3709, winding of relay 3606, right back contact of relay 3102, winding of relay 3101, resistance 3110, conductor 3616, left operated contact of key 3600, conductor 3830, right contacts of cam 3820, conductor 3826, middle left front contact of relay 2301, conductor 1753, master selector brush 1701, sender selector brush 1722, conductor 5448, front contact of relay 5423, back contact of relay 6504, resistance 6425, lower left and upper right contacts of cam 6403, conductor 6431, front contact of relay 6206, conductor 6210, front contact of relay 6625, winding of marginal trunk test relay 6014, back contact of relay 5920, front contact of relay 5926, right winding of relay 5925, right contacts of cam 6417, back contact of relay 6623 through resistance 6626, front contact of relay 6624, lower contacts of cam 6414, back contact of relay 5931, conductor 5447, sender selector brush 1721, master selector brush 1711, conductor 1754, outer left front contact of relay 2301, conductor 621, back contact of relay 2504, conductor 2505, upper contacts of cam 3819, conductor 3832, right operated contact of key 2128, conductor 3831, lower left contact of cam 3803 to ground. Current flow in this circuit gives to relay 6014 a non-operate test. Relay 3101 in the test circuit is also marginal and operates only in series with the resistance included in the fundamental circuit when selections are to be made. Therefore neither relay 3101 nor relay 6014 should operate at this time. This non-operate current is maintained for a measured length of time in order to give relay 6014 an opportunity to operate if the adjustment is such that it would operate on a long continued weak energization.

Relay 3606 does operate, indicating that this trunk test circuit is complete, both in the sender and in the test circuit and closes a circuit from battery through the winding of relay 3607, front contact of relay 3606, upper right and lower left contacts of cam 3704 of the class sequence switch to ground. Relay 3607 locks over its right front contact, conductor 3618 to ground at the upper left contact of cam 3801, and connects ground at its left front contact over conductor 3617, upper contacts of cam 3813, left contacts of cam 3822, conductor 3833 to interrupter 3605, and thence over the back contact of relay 3603, to the winding of relay 3601 and battery. Relay 3601 operates in this circuit and closes a locking circuit for itself through the winding of relay 3603, front contact of relay 3601 to ground over conductor 3618 as above traced. When the interrupter 3605 opens its contact, relay 3603 operates transferring the circuit controlled by the interrupter over the front contact of relay 3603, back contact of relay 3604 to the winding of relay 3602. Relay 3602 operates at the second closure of interrupter 3605 and locks through the winding of relay 3604, left front contact of relay 3602, conductor 3618 to ground. Relay 3604 operates when the interrupter opens its contact and transfers the circuit to the winding of relay 3619 which operates at the third closure of the interrupter and locks over its inner left contact to grounded conductor 3618. Relay 3619 in operating closes a circuit extending from battery over the lower contacts of cam 3709 through resistance 3610, and the inner right front contact of relay 3619, to conductor 3616 and the left operated contact of key 3600 thereby closing a shunt around the windings of relays 3101 and 3606 and resistance 3110, and applying an operate current to relay 6014.

Relay 6014 in operating closes a circuit from ground at its contacts through the winding of relay 6007 to battery. Relay 6007 locks as before and closes a circuit from ground at its outer left front contact over the lower contacts of cam 6406, right back contact of relay 6504 to the winding of sequence switch 6400 advancing the sequence switch to position 8 in which position the selection control circuit is established for making incoming brush selections. The fundamental circuit in the sender during this selection is the same as for office selections except that resistance 5626 is included alone as in the trunk test circuit. The advance of sequence switch 6400 opens the locking circuit of relay 6007 which releases. It also opens the locking circuit for the relays of registers 6520 and 6610.

When the sender establishes the fundamental circuit for selection control, relay 3101 operates in spite of the shunt around its winding and closes a circuit from battery through the winding of sequence switch magnet 3800, upper left contact of cam 3823, conductor 3834, outer left back contact of relay 3003, outer right front contact of relay 3619, conductor 3620, front contact of relay 3101, conductor 3112, upper contacts of cam 3724, inner lower normal contact of key 3000, conductor 241, upper right contact of cam 217 to ground. Sequence switch 3800 advances to position 7 in this circuit, opening the locking circuit for relays 3601 to 3604, 3607 and 3619. Sequence switch 3800 is immediately advanced out of position 7 in a circuit over the upper right contact of cam 3823 and conductor 3835 to ground at the upper right contact of cam 1324.

If relay 6014 in the sender operates on the non-operate current, it will establish the selection control circuit prematurely, operating relay 3101 which will thereupon close a circuit from ground over conductor 3112 as previously traced, front contact of relay 3101, conductor 3620, back contact of relay 3619, through the winding of relay 3003. Relay 3003 locks over its inner right contact to grounded conductor 3618. Relay 3003 in operating, opens the circuit previously traced for advancing sequence switch 3800 from position 6, thereby preventing the further operation of the test circuit. If relay 6014 fails to operate when the operate current is applied, relay 3101 in the test circuit will not operate and sequence switch 3800 can not advance out of position 6. While sequence switch 3800 stands in position 6, a circuit is closed from ground over the upper contacts of cam 3804, conductor 3836, right operated contact of key 3600, conductor 3621, to the armature of relay 3003. With the relay unoperated, the circuit extends through lamp 3002 and with the relay operated through lamp 3001 and thence over conductor 3027 to the inner left contact of key 2700. If the call is blocked because the sender relay operates on the non-operate current so that relay 3003 is operated, lamp 3001 will be lighted by the operation of key 2700 indicating that fact whereas if the test is blocked because of the non-operation of relay 6014, the circuit of lamp 3002 is prepared to indicate that fact.

The successful check of the district and office selections, advancing sequence switch 3800 to position 6 to prepare for the trunk test, also completes the circuit for operating relay 315 for transmitting the thousands digit. This circuit may be traced from battery through the winding of relay 315 to the upper right contact of cam 216 as before, lower left contact of cam 202, conductor 242 to ground at the upper right contact of cam 3803. Similar circuits extending from other cuttings of cam 202 over conductors 243, 244 and 245 are completed over cam 3802 in positions 9, 11 and 13, respectively of sequence switch 3800 for controlling the transmission of the hundreds, tens and units digits respectively.

Since it was assumed that the test number was to be 3678, the thousands digit will be recorded on register 5700 by operating relays 5704 and 5705 following the operation of relays 5401 and 5406 in the manner previously described. For recording the hundreds digit relay 5712 will be operated to connect the receiving register 5400 to the hundreds register 5710. Relays 5401 and 5410 will be operated in the manner previously described as well as relay 5411, which it will be remembered locked through relay 5412 independently of the remaining counting relays, and together with relays 5409 and 5410 is locked up at the end of the fifth impulse. The sixth impulse is transmitted back to relay 5401 which operates and locks through the winding of relay 5402. With relays 5401, 5402, 5409 and 5410 operated, conductors 5431 and 5435 are grounded, thereby operating register relays 5714 and 5717. In registering the digit 7 for the tens digit the operation is the same through the sixth impulse, the seventh impulse causing the operation of relays 5903 and 5904 which opens the locking circuit for relays 5401, 5402, 5409 and 5410 thereby permitting relay 5412 to operate. With relay 5404 operated, relay 5410 released and relay 5412 operated, ground is connected to conductors 5432 and 5434 causing the operation of relays 5725 and 5727 in the tens register 5720. The registration of the digit 8 for the units digit is essentially the same as previously described, the additional impulse operating relays 5405 and 5406 thereby also grounding conductor 5431 so that relays 5804, 5805 and 5807 are operated in the units register 5800. Since no stations digit is to be transmitted none of the relays of register 5810 will be operated.

Sequence switch 200 is advanced through position 12 which corresponds to a possible stations digit since the circuit over conductor 245 is maintained closed through positions 11 and 12 thereby holding relay 316 operated until position 13 is reached where it releases bringing sequence switch 200 to rest. Sequence switch 200 is immediately advanced to position 14 in a circuit from battery through sequence switch magnet 200, upper left contact of cam 201, to ground at the left back contact of relay 708. When the sequence switch 200 leaves position 13, the dialing circuit as previously traced is opened at the upper right contact of cam 204, but a substitute holding path for relay 5424 is provided extending from the tip conductor to conductor 733, as before and thence over the right contacts of cam 3720, conductor 3729, right normal contact of key 701, conductor 262, left contacts of cam 204 to conductor 1332 and back to the ring conductor.

When thousands digit is registered on register 5700 operating relay 5701, the circuit above traced for relay 6201 is completed and the relays of register 5700 are connected to the relays of register 6510 for the purpose of transferring the thousands designation to the selection control registers. It will be remembered that relays 5704 and 5705 of register 5700 were operated. Therefore, when relay 6201 operates, a circuit is closed from ground at the middle right contact of relay 5704, outer right front contact of relay 6201, winding of relay 6514 to battery. A second circuit is closed from grounded conductor 6017, inner left front contact of relay 5701, inner right front contact of relay 5705, middle right front contact of relay 6201, conductor 5741, to the right winding of relay 6511 and battery. With relay 6511 operated, the counting relay circuit extends from ground over the contact of relay 6000 to conductor 6435, inner left back contact of relay 5936, lower contacts of cam 6419, left back contact of relay 6513, left back contact of relay 6512, right front contact of relay 6511, to conductor 6541 and thence to the winding of relay 5917 so that two revertive pulses are required to satisfy the sender for incoming brush selection. Relay 6514 is used in making incoming group selection.

With sequence switch 3800 in positions 6 to 17 relay 3020 is operated. Therefore the counting relay circuit in the testing circuit extends for incoming brush selection from ground to conductor 3024 as previously traced and thence over the left front contact of relay 3020, conductor 3022, right back contact of relay 2901, conductor 2922, left back contact of relay 2418, interrupter 2419, conductor 2424, left back contact of relay 2908, conductor 2923, right back contact of relay 2418, conductor 2425, inner left back contact of relay 3942, right back contact of relay 3940, conductor 3952, right front contact of relay 3020, right back contact of relay 3018, conductor 3951 to the front contact of relay 3933 over the lower left contacts of cams 3816 and 3815, conductor 1123, right contacts of cam 1105, conductor 3957, back contact of relay 3911, winding of relay 3901 to battery, thereby indicating that two pulses are required to satisfy the test condition. It will be observed that the current flow through the interrupter is reversed at this time. Otherwise the test of the selection is essentially the same as those previously described. If the test is successful, sequence switch 3800 is advanced to position 9 and sequence switch 6400 is also advanced to position 9.

In coming group selection is the product of both the thousands and hundreds digits, therefore it can not take place until both digits have been recorded in the sender. When relay 5701 operates at the conclusion of the thousands digit, it also closes a circuit for relay 5730 which operates to supply ground for the locking circuits of relays 5711, 5721, etc. Therefore, when relay 5711 operates after the registration of the hundreds digit, a circuit is closed from ground at the front contact of relay 5730, inner left front contact of relay 5711, conductor 6442, upper contacts of cam 6421, conductor 6212, winding of relay 6202, conductor 6550 to battery. Relay 6202 connects the relays of hundreds register 5710 to certain of the relays of registers 6520 and 6600. Since relays 5714 and 5717 were assumed to be operated, a circuit is closed from ground at the right contact of relay 5714, outer right front contact of relay 6202, conductor 5731, right winding of relay 6521 to battery. A circuit is also closed from ground at the inner right contact of relay 5717, inner right front contact of relay 6202, conductors 5781, right winding of relay 6601 to battery. Since relay 6514 is operated, a circuit is closed from grounded conductor 5450, outer left front contact of relay 6201, right front contact of relay 6514, right back contact of relay 6513, conductor 5782, to the winding of relay 6602 and battery. Relay 6202 also closes a circuit from ground over its middle right front contact, upper right contact of cam 6401, to the winding of sequence switch magnet 6400 advancing the sequence switch to position 10 in preparation for making incoming group selection. With sequence switch 6400 in position 10, the fundamental circuit is established for incoming group selection and extends over the same path as traced for incoming brush selection. The counting relay circuit extends as previously traced to the lower left contact of cam 6419 and thence over the upper left contact of that cam, front contact of relay 6601, front contact of relay 6602, conductor 6543, back contact of relay 5914 to the winding of relay 5913 and battery. Therefore, four revertive impulses are required to satisfy the sender, after which the sequence switch 6400 is advanced to position 11. When sequence switch 6400 leaves position 10, relay 6201 releases in turn releasing the relays of registers 6510.

In position 11 the fundamental tip is connected to the fundamental ring to discharge any static charge which may have accumulated thereon before starting final sections. The circuit, for this purpose, extends from conductor 5448, front contact of relay 5423, back contact of relay 6504, through resistance 6425, left contacts of cam 6403, resistance 6426, right back contact of relay 5931 to conductor 5447. Since relay 6202 is operated, sequence switch 6400 is immediately advanced to position 12 where the fundamental circuit is reclosed for final brush selection.

The check of incoming group selection is also delayed in the test circuit until the dial sequence switch reaches position 10, following the transmission of the hundreds digit. This is accomplished by applying ground to interrupters 2419 and 3017 over the upper left contact of cam 215, upper right contact of cam 212, conductor 3837, and the left contacts of cam 3810 in position 9 instead of directly from the lower right contact of cam 3811. This is to prevent interference with synchronizing circuits which will be described hereinafter. Since incoming group selection is under the control of both the thousands and hundreds digits, the counting relay circuit extends from the No. 3 counting relay 3903 over the back contact of relay 3913, conductor 3958, left contacts of cam 1022 of the hundreds register and the upper left and lower right contacts of cam 1104 of the thousands register, conductor 1124, lower right contact of cam 3815, lower left contact of cam 3816 to the front contact of relay 3933 whence it extends as previously described.

The counting relay circuit for final brush selection in the sender extends from ground over the lower left and upper right contacts of cam 6408, conductor 6430, front contact of relay 6000, conductor 6020, upper contacts of cam 6407, conductor 6435, inner left back contact of relay 5936, lower left and upper right contacts of cam 6419, right front contact of relay 6521, back contact of relay 6522, conductor 6541 to the winding of relay 5917 so that the second brush set of the final selector would be taken for use. It will be noted that the circuit over the contact of the stepping relay is now reversed to save wear on the contact. As before the operation of relay 5929 advances sequence switch 6400, this time to position 13. The advance of the sequence switch releases relay 6202 and the relays of registers 6520 and 6600. The counting relay circuit in the testing circuit extends from the winding of relay 3901, back contact of relay 3911, conductor 3957, over the right contacts of cam 1023, being dependent solely on the hundreds digit, conductor 3838, over the lower left contact of cam 3814 and thence as previously traced. Following the check of final brush selection, sequence switch 3800 is advanced to position 11 from which it is immediately advanced to position 12 over its local cam.

Final tens selection is checked in position 12 of sequence switch 3800 under the control of the tens key after sequence switch 200 has reached position 11 where it furnishes ground for the interrupters. Sequence switch 3800 is also advanced through position 13 over its local cam. Final units selection is checked in position 14 through the units key after the dial control switch 200 reaches position 14. Following this check sequence switch 3800 is advanced in the usual manner to position 15. In position 13 of sequence switch 6400, relay 6203 is operated as soon as the reception of the tens digit causes the operation of relay 5721. Relay 6203 connects the tens register 5720 with the relays of register 6610 which now becomes the final tens register. Since relays 5725 and 5727 were operated, circuits are closed from ground over the right contacts of these relays and relays 6612 and 6614 are operated to control the final tens selection. The operation of relay 6203 also advances sequence switch 6400 to position 14 to close the fundamental circuit for making final tens selection. At the completion of final tens selection, sequence switch 6400 is advanced to position 15 where a circuit is prepared for relay 6301 which is completed as soon as the units digit is received. This relay functions in the same manner as relay 6203 to transfer the designation from the units register to register 6600 and to advance the sequence switch 6400 into position for making final units selection which takes place in position 16.

Following final units selection sequence switch 6400 advances to position 17 where the fundamental circuit is reestablished for receiving reverse battery which normally comes from the incoming selector. With sequence switch 3800 in position 15 the fundamental tip conductor 5448 is extended as previously traced to conductor 3826 and extends over the upper contacts of cam 3821 to ground at the right front contact of relay 3103 as previously traced for the fundamental ring conductor. The fundamental ring conductor 5447 extends as previously traced to conductor 2505 and thence over the lower contacts of cam 3719, conductor 1333, lower contacts of cam 1311, conductor 622, right back contact of relay 611, conductor 3839, left contacts of cam 3820, and thence to the winding of relay 3004 as previously traced for the fundamental tip conductor. Current flow in the fundamental circuit is therefore reversed. Relay 3004 operates in this circuit and closes a circuit from ground over the right contacts of cam 3704, inner left front contact of relay 3004, conductor 3617, left contacts of cam 3813, to interrupter 3200 which at its first closure completes a circuit over the back contact of relay 3202 to the winding of relay 3201 and battery. Relay 3201 locks through the winding of relay 3202, over the right contact of relay 3201, conductor 3840 to ground over the right contacts of cam 3804. Relay 3202 operates when the interrupter contact opens and extends the circuit controlled by the interrupter over the front contact of relay 3202, left front contact of relay 3201 through the winding of relay 3205. This relay operates when the interrupter closes its contact for the second time and locks over its left contact and conductor 3840 to ground. It also connects ground over its right contact, upper right contact of cam 3824 to the winding of sequence switch magnet 3800 and battery, advancing the sequence switch to position 16.

In the sender both relays 6000 and 5925 are operated in this reverse battery circuit. Relay 5925 in operating closes a circuit from ground at its contact over the left contacts of cam 6411 through the left winding of relay 5925 to battery holding the relay operated. It also closes a circuit over the upper left and lower right contacts of cam 6411, winding of relay 5935 to battery. With relay 5935 operated, the operation of relay 6000 closes a circuit from ground over its front contact to conductor 6435 as previously traced, outer left front contact of relay 5935, winding of relay 5919 to battery. Relay 5919 operates and locks as before described through the windings of relays 5920 and 5929. The contacts of relay 5935 are so arranged that the outer left contact should close before the inner left contact closes. The outer left contact in cooperation with relay 6000 closes the usual circuit for operating the No. 0 counting relay 5919. The inner left contact closes a circuit through the winding of relay 5919, through relays 5920 and 5929 in parallel, and over the right back contact of relay 5932 to ground over the upper right contact of cam 6416, but this circuit is ineffective if the circuit controlled by the stepping relay 6000 closes first as it should, since the circuit of relay 5919 controlled thereby is in shunt of the windings of relays 5920 and 5929.

In position 16 of sequence switch 3800, a circuit is closed from 48-volt battery over the left contacts of cam 3709, conductor 1214, resistances 3107 and 3106 which are of equal value, conductor 3113 to ground at the upper left contact of cam 3803. The fundamental tip extends in this position of sequence switch 3800 as previously traced to the upper left contacts of cam 3821 and thence over the lower left contacts of cam 3821, conductor 3841, through the winding of relay 1800, conductor 1806 to the point between resistances 3106 and 3107 so that, in effect, it is connected to 24-volt battery. The fundamental ring extends to the upper left contact of cam 3819 as previously traced and over the lower left contact of that cam, conductor 3842, winding of relay 1205, to conductor 1214 so that the fundamental ring has 48-volt battery connected to it. If the sender has operated correctly, and the fundamental circuit is held closed until relay 3205 operates, the advance of sequence switch 3800 opens the reverse battery circuit permitting relay 6000 to release, relay 5925 being held operated in its locking circuit. The release of relay 6000 opens the initial operating circuit for relay 5919 and permits the series circuit through the three relays to become effective, whereupon relay 5920 further opens the fundamental circuit and relay 5929 closes a circuit from ground over its front contact, right front contact of relay 5935, winding of relay 5931 to battery. Relay 5931 operates locking over its inner left front contact to grounded conductor 5938. Relay 5931 opens the fundamental ring conductor at its right contact. Relay 5929 also closes a circuit from ground at its front contact over the right front contact of relay 5935, lower contacts of cam 6412, right contacts of cam 5512 through the winding of relay 5932 to battery. Relay 5932 closes a circuit from battery through the winding of relay 5928, right front contact of relay 5932, upper right contact of cam 6416 to ground. Relay 5928 locks over cam 6405, operates relay 5927, and releases relays 5926, 5919, 5920 and 5929. When relay 5929 releases, it closes a circuit over the back contact of relay 5929, front contact of relay 5928, upper left contact of cam 6401 to magnet 6400 advancing the sequence switch to position 18. Relays 5925 an 5935 release. Relay 5931 remains locked and holds relay 5932 operated. Relay 5928 also releases and closes a circuit for relay 5926 over the upper left contact of cam 6416 to ground. If relay 5935 does not close its contacts in the proper order so that relay 5920 opens the circuit of relay 3004 before relay 3205 has operated, the release of relay 3004 disconnects ground from interrupter 3200 and prevents the operation of relay 3205 and the advance of sequence switch 3800 to position 16 blocking the test.

With sequence switch 3800 in position 16 a test is made for false grounds or short circuits on the wiring of the sender fundamental circuit. With the circuit arrangement above described a false ground connected to either the fundamental tip or the fundamental ring would operate either relay 1800 or relay 1205, while a short circuit between the fundamental tip and fundamental ring would cause the operation of both these relays. If relay 1800 operates, it connects ground over the left back contact of relay 1801 to conductor 1807 and if relay 1205 operates it connects ground from the right back contact of relay 1801, front contact of relay 1205, and the left back contact of relay 1801 to conductor 1807 and thence to the winding of relay 3003 which is the false ground relay. This relay if operated locks over its right front contact to grounded conductor 3618. It also closes a circuit from ground over conductor 3113, over the inner left front contact of relay 3003, conductor 3028 through lamp 2800, resistance 2701 and battery.

At the same time that the fundamental circuit is being tested for false ground or cross-connections a test is made for slow advance of the sender. The operations which occur in the sender in response to the release of relay 6000 by the advance of sequence switch 3800 should take place within a given minimum length of time. Therefore when sequence switch 3800 reaches position 16 ground is connected over the lower right contact of cam 3801, conductor 3833, to interrupter 3605. Relays 3601, 3603, 3602, 3604 and 3619 operate in succession as previously described. The operation of relay 5932, as above described, opens the shunt around the high resistance winding of relay 6006 including this resistance in the circuit of relay 3103 of the test circuit. Relay 3103 releases, closing a circuit from ground at its right back contact, conductor 3114, winding of relay 613, conductor 623, upper right and lower left contacts of cam 1614 to battery. Relay 613 operates and, if neither relay 3003 nor relay 3619 has operated, closes a circuit from ground over its outer right front contact, conductor 624, right front contact of relay 3602, left back contact of relay 3619, outer left back contact of relay 3003, conductor 3834, right contacts of cam 1321, conductor 1334, lower right contact of cam 3823 to the winding of sequence switch magnet 3800 and battery, advancing sequence switch 3800 to position 17. If relay 3619 operates before relay 613 operates, the circuit for advancing sequence switch 3800 is opened and the test is blocked in position 16. If no ground is found but the call is blocked by the operation of relay 3619, the circuit formerly traced over the inner left front contact of relay 3003 for lamp 2800 extends over the back contact of that relay to lamp 2801. If the circuit operates promptly the advance of sequence switch 3800 disconnects relays 1205 and 1800 from the fundamental circuit and releases relays 3601 to 3604 and 3619.

The advance of sequence switch 3800 to position 17 closes a circuit from ground over the lower right contact of cam 3803, conductor 331, outer left contact of relay 317, lower left contact of cam 219, winding of sequence switch magnet 200 to battery, advancing the dial control sequence switch 200 to position 15. When sequence switch 200 advances from position 14, it opens the circuit over which relay 5424 has been held operated. The opening of this circuit causes the release of relay 5424 which in turn releases relays 5416, 5413, 5414, and 5415. With sequence switch 200 in position 15, the dialing tip conductor is extended over the lower left and upper right contacts of cam 221 to the winding of relay 304 and battery. Relay 304 operates in this circuit from ground at the outer right back contact of relay 5937, closing a circuit from battery through the winding of sequence switch magnet 200, lower left contact of cam 201 to ground at the inner right front contact of relay 304 advancing sequence switch 200 to position 16. When sequence switch 200 reaches position 15¾ in advancing to position 16, battery is connected over the lower contacts of cam 205 to the circuit of relay 6006 to give a maximum current flow through that relay before releasing it.

With sequence switch 200 in position 16, a circuit is closed from ground over the upper left contact of cam 215, lower left contact of cam 217, to interrupter 713 which, on first closing its contact extends ground over the normal contact of relay 709 and through its winding to battery through resistance 711. Relay 709 operates in this circuit locking over its right front contact to ground over the lower left contact of cam 212. It also closes a circuit from battery through resistance 712 and the winding of relay 710, right front contact of relay 709 to ground over cam 212, but relay 710 cannot operate as long as the interrupter contact is closed, since the battery through resistance 712 is shunted over the back contact of relay 710. When the interrupter opens its contact, relay 710 operates. The operation of relay 710 closes a circuit from battery through the winding of relay 311, right front contact of relay 710, conductor 264, to ground at the upper left contact of cam 217. Relay 311 locks over its inner left front contact to grounded conductor 264. The operation of relay 311 opens the shunt over its left normal contact which, up to this time, has been closed around the windings of relays 309 and 310. It also connects ground from conductor 264 over its outer left contact to conductor 330 and the winding of relay 310. This ground is in shunt of battery through resistance 265 connected to the circuit of relay 6006, thereby causing the release of relay 6006. In the sender the connection of ground to the circuit of relay 6006 causes the release of that relay, in turn releasing relay 5934. With relay 5934 released a circuit is closed from ground over its outer right back contact, outer left contact of relay 5933, winding of relay 6005 to battery. Relay 6005 locks over its outer right front contact to ground over conductor 5445. It also connects ground in shunt of battery through resistance 6004 so that relay 5933 also releases. The connection of relay 6005 to conductor 5445 causes the operation of relay 310, but relay 309, which is marginal, does not operate. In the meantime the second closure of interrupter 713 connects ground to resistance 711 in shunt of the winding of relay 709, causing that relay to release. It also closes a holding circuit for relay 710 over the normal contact of relay 709 when that relay releases. With relay 710 operated and relay 709 released, a circuit is closed from battery through resistance 716, winding and left normal contact of relay 714, inner right front contact of relay 710, left back contact of relay 709, to ground over the lower left contact of cam 212. Relay 714 locks in a manner similar to that described for relay 709, closing an energizing circuit for relay 715 which is ineffective until relay 710 releases when the interrupter contact opens a second time.

The operation of relay 310 closes a circuit from ground over the lower left contact of cam 217, front contact of relay 310, left outer back contact of relay 715, winding of relay 305 to battery. Relay 305 locks over its inner right front contact, contact of key 303, upper left and lower right contacts of cam 220, conductor 237, left contacts of cam 1606, conductor 2212 to ground over the upper right contact of cam 1608. Relay 305 closes a circuit from battery through the winding of sequence switch magnet 200, lower right contact of cam 201, conductor 246, inner left front contact of relay 305, left contacts of cam 215 to ground. Sequence switch 200 advances to position 17 where the locking circuit of relay 305 is opened and that relay releases, bringing sequence switch 200 to rest in position 17. The interval between the advance of sequence switch 200 to position 16 and the operation of relay 715 is a minimum of half a second, during which time the sender should release relay 6006 and remove ground from the tip side of the dialing circuit. If it fails to do so the operation of relay 715 opens the circuit over which relay 305 is operated and thereby blocks the advance of sequence switch 200.

With sequence switch 200 in position 17 and relay 5934 released, the circuit for checking talking selection is completed, extending in the test circuit from the winding of relay 3004 as traced for previous selections to conductor 5448 and in the sender over the front contact of relay 5423, lower contacts of cam 6422, winding of relay 6000, back contact of relay 5920, front contact of relay 5926, right winding of relay 5925, resistance 5930, inner right back contact of relay 5934 to ground. Relay 6000 closes the counting relay circuit from ground as previously traced to the upper right contact of cam 6420, lower left contact of that cam, back contact of relay 5924, front contact of relay 6010, front contact of relay 6021, 6541, back contact of relay 5918, winding of relay 5917 to battery. As in previous selections, relay 3004 connects ground to interrupters 2419 and 3017, operating the counting relays and transmitting impulses to the sender. The counting relay circuit for this selection may be traced through the winding of relay 3901, back contact of relay 3911, conductor 3957, inner left operated contact of key 1551, conductor 1575, upper left contact of cam 3814 and thence as previously traced to ground, thereby simulating the positioning of the district selector in the second talking position. If this selection is performed correctly, relays 3608 and 3609 operate as previously described. When relay 5929 operates at the completion of the talking selection, it closes a circuit from ground at its front contact over the right back contact of relay 5935, left contacts of cam 6418, to the winding of relay 5937 and battery, and over the left contacts of cam 6423, left back contact of relay 5934, to conductor 5447 whence it extends in the testing circuit as previously traced to the upper left contact of cam 3819 and thence over the upper right contact of that cam, conductor 3832, inner right front contact of relay 311, conductor 2831, marginal relay 2827 to battery. Relay 2827 locks over its left front contact and conductor 2832 to ground over the upper left contact of cam 3807. With relay 2827 operated, the operation of relay 3609 closes a circuit from grounded conductor 3613, left front contact of relay 3609, conductor 2427, right front contact of relay 2827 to the winding of relay 2822 and battery.

With sequence switch 3800 in position 17 prior to the operation of relay 2827, ground over conductor 2832 extends over the back contact of relay 2827, back contact of relay 2821, through lamp 2813 to conductor 3027 and the inner left contact of key 2700. The operation of relay 2827 opens the circuit of lamp 2813. With sequence switch 3800 in position 17, a circuit is also closed from ground over the lower contacts of cam 3311, conductor 3843, back contact of relay 2822, back contact of relay 2821, through the talking selection lamp 2802, right contact of the talking selection key 1551, through lamp 1541, conductor 1573 to the outer right contact of key 2700, preparing the circuit for lighting the talking selection lamp and the No. 1 lamp to indicate the selection should failure occur.

With relay 2822 operated the circuit from grounded conductor 3843 is extended over the front contact of relay 2822, conductor 2833, outer left normal contact of key 701 to the armature of relay 309. The operation of relay 5937 in the sender disconnects ground from conductor 5443 thereby releasing relay 304. When relay 5937 operated, it opened the circuit of relay 6001 connecting battery through resistance 6002 over the outer left front contact of relay 5937 and the inner right front contact of relay 6005 to conductor 5445 in parallel with relay 6005. Resistance 6002 is sufficiently low in value to permit relay 309 to operate in series with it. Relay 309 extends the ground which was connected to its contact as previously traced over the right back contact of relay 304, upper left contact of cam 219 to the winding of sequence switch magnet 200 and battery, advancing sequence switch 200 to position 18. The advance of sequence switch 200 from position 17 disconnects ground from the windings of relays 310 and 309 thereby releasing them and relay 6005. With relays 6005 and 5414 released a circuit is closed from battery through the winding of sequence switch magnet 6400, lower right contact of cam 6401, lower contact of relay 5414, back contact of relay 5933, back contact of relay 6005 to ground. Sequence switch 6400 advances in this circuit to position 1 thereby disconnecting battery at cam 6424 from the various conductors associated therewith and ground at cam 6416 from conductor 5938 which in turn releases relay 6003. The disconnection of ground from conductor 5938 releases relay 5526 which controls the time measure switch restoring that switch to normal. When sequence switch 200 reaches position 18 a circuit is closed from battery through the winding of magnet 3800, lower left contact of cam 3824, conductor 3844, outer lower left operated contact of key 2200, conductor 2216, right contacts of cam 1301, conductor 1335, upper right contact of cam 214 to ground, advancing sequence switch 3800 to normal.

With sequence switch 200 in position 18 a circuit is closed from battery through the winding of sequence switch magnet 1600, lower left contact of cam 1603, right normal contact of key 2207, inner upper normal contact of key 2300, conductor 2332, right contacts of cam 208 and thence over conductor 1021, and the normal checking path as previously traced to ground, thereby advancing sequence switch 1600 to position 6. Since relay 2203 is unoperated at this time, sequence switch 1600 is immediately advanced to position 7 over the upper right contact of cam 1604 to ground at the right back contact of relay 2203. If the sender has restored to normal, battery through resistance 6002 will again be connected over the left back contact of relay 6003 to conductor 5446, again establishing a circuit for relays 2323 and 2209 which function as previously described to indicate that the sender has been restored to normal, causing the operation of relay 2201, which in turn advances sequence switch 1600 to position 8. When sequence switch 1600 left position 5 the locking circuit of relays 2205 and 2301 was opened and those relays released. When relay 2205 releases a circuit is closed from conductor 3027 through lamp 1622, lower contacts of cam 1602, left back contact of relay 2205, right normal contact of key 2210, conductor 2213, contacts of cam 1322, conductor 1330, lower right contact of cam 214 to ground, preparing lamp 1622 for lighting if the test should be blocked at this time. With sequence switch 1600 in position 6, ground is connected over the upper right and lower left contacts of cam 1607, conductor 246, lower right contact of cam 201 through the winding of sequence switch magnet 200 and battery, advancing sequence switch 200 to position 1.

With sequence switch 1600 in position 8 a circuit is closed from battery through the winding of sequence switch magnet 1600, upper contact of cam 1605, inner right back contact of relay 2202, left back contact of relay 2203, upper right contact of cam 1612 to ground, advancing sequence switch 1600 to position 9.

With sequence switch 1600 in position 9 ground is connected over brushes 1713 and 1703 of the master selectors, left contacts of cam 1616, back contact of relay 2206, inner right upper operated contact of key 2200, brush 1716 to the winding of magnet 1727 and battery. The circuits previously traced through the winding of relay 1623 in parallel with magnet 1727 and in shunt of that relay over the back contact of magnet 1727 are completed as previously traced. When the sender selector magnet opens its contact, relay 1623 operates advancing sequence switch 1600 to position 10 or 1 in the manner previously described. The advance of sequence switch 1600 disconnects ground from magnet 1727 permitting that magnet to release and advance the sender selector to the next sender. The advance of sequence switch 1600 from position 1 and the test for busy or idle condition of the sender, as well as the complete test of the sender, take place as described for the first sender. These tests then continue until all of the full mechanical senders have been tested. While it is obvious that a large number of senders would require testing, for simplification of the drawings only two sender selectors have been shown.

When the test circuit has tested the last full mechanical sender, the last sender selector will be advanced to the first spare set of terminals corresponding to position 16 of switch 1720. Sequence switch 1600 is advanced from position 1 over the normal checking path formerly traced, and when it reaches position 2 with the sender selector engaging its first spare terminal, a circuit is closed from battery through the winding of relay 2311, contact of brush 1726, brush 1715, conductor 1756, contacts of cam 1611, to ground through the test relays 2209 and 2323 as previously traced. Relay 2311 operates but the test relays do not. Relay 2311 closes a circuit for relay 2204. Relay 2204 in operating connects ground over its outer left front contact, brush 1715, to brush 1726 thereby holding relay 2311 operated and maintaining its own operated condition. With relay 2204 operated, a circuit is closed from ground over the lower right contact of cam 1612, inner right back contact of relay 2203, outer right front contact of relay 2204, upper right contact of cam 1603 to the winding of sequence switch magnet 1600 and battery, advancing the sequence switch to position 8 from which it is advanced to position 9 by ground over the back contact of relay 2203 and cam 1605. In position 9 magnet 1727 is operated in cooperation with relay 1623 advancing sequence switch 1600 to position 10 or 1 and the sender selector to the first of the strapped spare terminals. With brush 1726 engaging the strapped terminals relay 2204 is locked to ground at its own outer left front contact, magnet 1727 is energized in a self-interrupting circuit over its interrupter contact, and sender selector 1730 is advanced to terminal 21. Sequence switch 1600 cannot advance from position 1 since the circuit for that purpose is now opened at the contact of relay 2204.

When brush 1726 engages its twenty-first terminal, relay 2204 releases and a circuit is closed from battery through the winding of relay 2307, contact of group key 2306 which was operated at the beginning of the test, the twenty-first terminal of the sender selector brush 1726, brush 1715, cam 1611, conductor 1628 and thence as previously traced through the windings of relays 2209 and 2323 to ground at the contact of start key 2200. Relay 2307 closes a circuit for lamp 2308 to indicate that the last full mechanical sender has been tested, since the keys must be reset before testing key pulsing operator's senders.

When the keys have been reset, group key 2306 is released. A circuit is thereupon closed from battery through the winding of relay 2203, normal contact of key 2306, the twenty-first terminal of brush 1726 to ground through the test relays and key 2200. Relay 2323 cannot operate in the high resistance of this circuit. The release of relay 2204 permits the advance of sequence switch 1600 to position 2 over the normal checking path. The operation of relay 2203 advances sequence switch 1600 to position 3 where ground at the left back contact of relay 2201 advances to position 4. In positions 3 and 4, with relay 2203 operated, magnet 1727 is again operated in cooperation with relay 1623 and advances switch 1720 to its twenty-second or normal position at the same time that sequence switch 1600 is advanced to position 5. With relay 2203 operated, sequence switch 1600 advances through position 5 immediately and in position 6 the master selectors 1700 and 1710 are energized and advanced to the next sender selector, the connector sequence switch 1600 being advanced to position 7 and thence to position 8 under the control of relay 2203. Sequence switch 1600 is advanced from position 8 over the upper left contact of cam 1603, normal contact of brush 1736, brush 1715, outer left front contact of relay 2203, to ground at the upper right contact of cam 1612. As sequence switch 1600 advances to position 9 the next sender selector magnet is energized and relay 1623 operated advancing the connector sequence switch to position 10 or 1 as the sender selector takes one step.

If the master selector advances to a terminal to which no sender selector is connected, ground through brush 1713 will be connected to the interrupter contact and winding of magnet 1717, and over brush 1704 to the winding and interrupter contact of magnet 1707 thereby advancing the master selectors either to normal or to a connected sender selector. When the last sender has been tested and the last sender selector advanced to its twenty-first terminal, sequence switch 1600 is advanced to position 2 in the manner previously described. Relay 2203 operates as above in series with the test relays 2323 and 2209. The operation of relay 2203 advances sequence switch 1600 to position 3 and relay 2201, being normal, advances it to position 4. With relay 2203 operated in position 4, the sender selector magnet and relay 1623 function, advancing the sender selector to normal and the sequence switch to position 5. Relay 2203 then advances sequence switch 1600 to position 6 where the master selector magnets are energized, advancing the master selectors to normal and sequence switch 1600 to position 7. Relay 2203 then advances sequence switch to position 8. With the master selectors normal, ground over brush 1713 advances sequence switch 1600 to position 9, where a circuit is closed for lamp 1627 over the upper right and lower left contacts of cam 1617 to ground over brush 1704, indicating that the test has been completed. When key 2200 is restored, relay 1623 operates in a circuit over the lower right and upper left contacts of cam 1616, outer right lower normal contact of key 2200, to ground at the left back contact of relay 2204, and advances sequence switch 1600 to position 10 or 1 where relay 2203 releases and lamp 1627 is extinguished. If the cycle of tests is to be restarted, the key 2200 must be reoperated.

If it is desired to test the full mechanical senders for other test calls before proceeding to test the operator's senders, key 2200 will be restored. The master and sender selectors will be restored to normal by operating key 2210 and advancing the selectors by the operation and release of the master and sender selector keys 1708, 1718 and 1728. These keys receive ground from the left back contact of relay 2204, lower right contact of key 2200, and the right operated contact of key 2210. When the master and sender selectors have been restored to normal, connections are reestablished for the first full mechanical sender to be tested in the manner previously described.

*Full mechanical call—Incoming selector to overflow*

The test circuit is also arranged to test the ability of the sender to handle other typical full mechanical calls. One other type of test call is one which simulates the action of the incoming selector when that selector goes to overflow, for example, because of an all-trunks-busy condition. For this test the class key 1562 is operated advancing the class sequence switch 3700 to position 2. Talking selection key 1553 is also operated since, if the sender responds correctly, it will direct the call to an operator's position and establish a corresponding talking condition, rather than the talking condition indicated by the test number, otherwise the keys may be the same as operated for the full mechanical call just described. The code digits will be transmitted and checked exactly as previously described and the thousands and hundreds digits as well. Incoming brush and incoming group selections will be checked leaving sequence switch 3800 in position 9, sequence switch 200 in position 10 and the sender sequence switch 6400 in position 12 ready for making final brush selection. At the termination of group selection, relay 3608 is held operated in a circuit over conductor 3614, lower right and upper left contacts of cam 3818, lower right contact of cam 3710 to ground, so that sequence switch 3800 is advanced to position 15 before relay 3608 releases bringing it to rest. Since relay 3608 is operated, relay 3004 is held deenergized to prevent the transmission of any false pulses during this advance.

As sequence switch 3800 passes through position 13, a circuit is closed from ground over the lower right contact of cam 3808 through the winding of relay 3940 to battery over the lower left contact of cam 3703 and the lower right contact of cam 3709. Relay 3940 closes a circuit from battery through the winding of relay 3943 to ground at the inner right contact of relay 3940. Relay 3940 disconnects ground from the fundamental ring conductor. When sequence switch 3800 reaches position 15, a circuit is closed from battery through the winding of relay 3941, inner left front contact of relay 3940, to ground over the lower right contact of cam 3907. Relay 3941 operates relay 3942 and relay 3942 in turn operates relay 3946. Relay 3946 closes a circuit from ground at its inner right front contact, outer left contact of relay 3941, back contact of the No. 8' counting relay 3918, inner left front contact of relay 3941, to battery through the winding of relay 3944. When sequence switch 3800 reaches position 15, relays 3608 and 3609 release so that the operation of relay 3946 now closes a circuit from battery through coil 3947, winding of relay 3945, inner left front contact of relay 3943, conductor 3954, inner right back contact of relay 3609, conductor 3614 to ground at the inner right front contact of relay 3946. However, until relay 3909 operates, a shunt is closed around the winding of relay 3945 over the outer left front contact of relay 3943 and the back contact of relay 3909. Relay 3946 also closes a circuit from ground at its inner right front contact, conductor 3614, inner right back contact of relay 3609, conductor 3954, outer right front contact of relay 3943, conductor 3024, left front contact of relay 3020, conductor 3022, right back contact of relay 2901, conductor 2922, left back contact of relay 2418, interrupter 2419, conductor 2424, left back contact of relay 2908, conductor 2923, right back contact of relay 2418, conductor 2425, inner left front contact of relay 3942, right front contact of relay 3944, back contact of the No. 3' counting relay 3913 to the winding of No. 3 counting relay 3903, and thence to battery as previously traced. Relays 3903, 3902, 3901 and 3900 with their corresponding relays therefore operate in succession under the control of interrupter 2419. Since relay 3946 is operated, the operation of relay 3910 extends the circuit controlled by interrupter 2419, over the front contact of relay 3910, outer right front contact of relay 3946, back contact of relay 3919, to the No. 9 counting relay 3909 which also operates under the control of the interrupter followed by relays 3908 and 3918.

When relay 3932 operates in the open period of interrupter 2419 the fundamental circuit is prepared from battery through the winding of relay 3004, conductor 3021, back contact of relay 3934, conductor 3950, left back contact of relay 3608, conductor 3612, left contacts of cam 3820, conductor 3839, right back contact of relay 611, conductor 622, upper contacts of cam 3719, resistance 3008, back contact of relay 3007, conductor 2505 and thence as previously traced to the fundamental ring conductor through the sender where the fundamental circuit is established for final brush selection, back to the fundamental tip conductor which extends as previously traced to conductor 3826, upper left and lower right contacts of cam 3821, conductor 2925, left back contact of relay 2904, right back contact of relay 2829, conductor 2132, through left contact of compensating resistance key 2128, conductor 3832, outer left front contact of relay 3944, outer right front contact of relay 3942, conductor 3025, left back contact of relay 3018, interrupter 3017, conductor 3955, inner right front contact of relay 3943, left front contact of relay 3946, front contact of relay 3932, inner left front contact of relay 3944, to ground, but is held open at the contact of interrupter 3017, whose open period coincides with that of interrupter 2419. When interrupter 2419 closes, operating relay 3909, interrupter 3017 closes the fundamental circuit. The operation of relay 3909 opens the shunt around relay 3945 which operates and closes a shunt around interrupter 3017 which may be traced from the outer left front contact of relay 3944 over the contact of relay 3945, back contact of relay 3908, conductor 3623, right back contact of relay 3609, conductor 3614 to ground at the inner right front contact of relay 3946 holding the fundamental circuit closed during the open period of the interrupter. The operation of relay 3918 opens the circuit of relay 3944 which releases, opening the fundamental circuit and terminating the reverse battery closure, which simulates the action of a selector at tell tale. If the compensating resistance included in this circuit is as great as 1600 ohms, the sender overflow relay 5925 is tested both for adjustment and sticky back contact. With relay 3908 operated, relay 3608 is operated in a circuit over the right back contact of relay 3944, inner right front contact of relay 3941, front contact of relay 3918, outer left front contact of relay 3941, to ground at the inner right front contact of relay 3946. Relay 3608 operates relay 3609 which advances sequence switch 3800 to position 16 where the release of relay 3103 is awaited.

In the sender the reverse battery closure causes the operation of relay 5925 as well as relay 6000. Relay 5925 locks over its left front contact, left contacts of cam 6411, and right winding of relay 5925 to battery. It also closes a circuit over the upper contacts of cam 6411, through the winding of relay 5924, which locks over its middle left contact to conductor 5938. It also closes a circuit over the upper right and lower left contacts of cam 6411 through the winding of relay 5935 to battery. With relay 5935 operated, the operation of relay 6000 closes a circuit from ground over the lower left and upper right contacts of cam 6408, conductor 6430, front contact of relay 6000, conductor 6020, upper contacts of cam 6407, conductor 6435, outer left front contact of relay 5935, winding of relay 5919 to battery. When the reversed battery is disconnected from the fundamental circuit, relays 5920 and 5929 operate as previously described in the locking circuit of relay 5919. Relay 5929 in operating closes a circuit from ground over its front contact, right front contact of relay 5935, winding of relay 5931, to battery. Relay 5931 locks over its inner left front contact to grounded conductor 5938. It also opens the fundamental ring conductor and connects ground over its outer left front contact, upper right contact of cam 6402 to the winding of sequence switch magnet 6400 and battery, advancing the sequence switch to position 17. The advance of sequence switch 3800 permitted the completion of the transmission of the wanted number by sequence switch 200 and the advance of the timing switch 5500 beyond position 8. Therefore relay 5932 is operated in a circuit from battery through its winding, over the right contacts of cam 5512, lower contacts of cam 6412, right front contact of relay 5935, to ground at the front contact of relay 5929. Relay 5932 opens the shunt around the high resistance right winding of relay 6006 introducing that resistance into the circuit of relay 3103 which thereupon releases. With relay 5932 operated, a circuit is closed from battery through the winding of relay 5928, right front contact of relay 5932, to ground at the upper right contact of cam 6416. Relay 5928 in turn operates relay 5927, which releases relay 5926 and the operated counting relays 5919, 5920 and 5929. With relay 5928 operated, and relay 5929 released, sequence switch 6400 is advanced to position 18, where the circuit for talking selection is established. Since relay 5924 is operated, the circuit for talking selection as closed by relay 6000, extends as previously traced to conductor 6435 and thence over the upper right and lower left contacts of cam 6420, inner right front contact of relay 5924, to the No. 3 counting relay 5913 thereby requiring the transmission of four impulses to satisfy the condition set up in the sender. This would be effective to advance the district selector to the overflow position where a signal would ordinarily be returned to the subscriber to indicate that the call had not been completed properly.

The release of relay 3103 in response to the increase of resistance in its circuit causes the advance of sequence switch 3800 to position 17 through the operation of relay 613. The test of the release of the sender relay 6006 and of the talking selection under the control of the No. 3 key 1553 take place in the same manner as for the first call traced.

*Full mechanical call—Office selector to overflow*

Another type of test call is one which simulates the action of the sender when an office selector goes to overflow. For this test the key 1563 is operated advancing sequence switch 3700 to position 3. This test may be made in connection with either a full mechanical or call indicator type of test call, but if it is desired to test the ability of the sender to shunt the trunk test relay under such conditions it is necessary to use a test call corresponding to a full mechanical call such as the one first described. Selections up to and including office group selection are tested as described for the full mechanical call. The further operation is the same as described for incoming overflow test. In the test circuit following the check of district and office selections relays 3608 and 3609 when operated in position 5 following office group selection are held locked over the circuit previously traced to the lower right contact of cam 3818 and thence over the upper right contact of cam 3818 to ground at the upper right contact of cam 3710 advancing sequence switch 3800 to position 15. In position 15 the previously traced reversed battery circuit is closed over the fundamental circuit through relay 3004, but relay 3004 can not operate in series with the trunk test relay 6009 and trunk test resistance.

In the sender following office group selection sequence switch 6400 is advanced to position 7 where the trunk test circuit is established. At this time, the reverse battery closure by the test circuit operates the trunk guard relay 6014 but relay 5925 does not receive sufficient current to operate. Relay 6014 in turn operates relay 6007. Relay 6007 advances sequence switch 6400 to position 8 in which position the fundamental circuit is established in the sender for incoming brush selection. Relay 5925 operates in this circuit together with the stepping relay 6000. Relay 5925 locks as previously described and operates relay 5924 which also locks independently of relay 5925. Relay 5925 also operates relay 5935. Relay 5924 advances sequence switch 6400 to position 10. Relay 5924 closes a circuit extending from the fundamental ring conductor over the left front contact of relay 5924, upper right and lower left contacts of cam 6422, to the winding of relay 6000 until sequence switch 6400 leaves position 8¾ maintaining the circuit of that relay closed and holding the reversed battery circuit long enough to permit the operation of any two-wire selector which might be included in the circuit. The operation and release of relay 6000 in combination with the operation of relay 5935 operates relays 5920, 5919 and 5929 as previously described advancing sequence switch 5400 to position 17.

The advance of sequence switch 6400 to position for making incoming brush selection, removing the high resistance of relay 6014 and the test resistance from the fundamental circuit, permits relay 3004 to operate. The operation of relay 3004 closes a circuit from battery through the winding of relay 3205, right contacts of cam 3714, left contacts of cam 3813, conductor 3617, inner left front contact of relay 3004, to ground over the right contacts of cam 3704. Relay 3205 locks over its left front contact and conductor 3840 to ground over the right contacts of cam 3804 and connects ground over its right contact and the upper right contact of cam 3824 to the winding of sequence switch magnet 3800 and battery advancing the sequence switch to position 16. The advance of sequence switch 3800 to position 17 and the remainder of the test continues as described for full mechanical calls.

Full mechanical call—Permanent signal

The next type call for which the sender is to be tested is that of a permanent signal, which occurs when the subscriber removes the receiver from the switchhook and fails to dial. For this type of call, key 1564 is operated advancing sequence switch 3700 to position 4. The proper district brush and district group keys must be operated in addition to the skip office key 1425, the No. 3 talking selection key 1553, compensating resistance key 2128 and permanent signal key 616. The numerical keys may be operated in any desired combination since these digits are neither dialed nor checked, but it is necessary to advance sequence switches 1000 and 1100 in order to complete the initial normal checking path. The dial control sequence switch 200 is advanced to position 3 in the manner previously described. It is then advanced from position 3 to position 13 in a circuit which may be traced from battery through the winding of sequence switch magnet 200, upper right contact of cam 201, conductor 2423, inner left back contact of relay 2411, conductor 321, right back contact of relay 317, to ground at the right operated contact of key 1564. Therefore, sequence switch 200 is advanced through the dialing positions without transmitting any digit to the sender. It is advanced to position 14 over the back contact of relay 708 as usual. When sequence switch 200 reaches position 7, sequence switch 3800 is advanced to position 2 where it awaits the closure of the fundamental tip in the sender for district brush selections. When sequence switch 200 reaches position 13, a circuit is closed from battery through the winding of relay 610, inner upper contact of key 616, to ground over the lower right contact of cam 211. With relay 610 operated ground is disconnected from conductor 620 thereby disabling the time alarm circuit of Fig. 23, since the time consumed by the sender in response to a permanent signal condition exceeds that allowed by the usual timing operation in the test circuit. Ground over the left back contact of relay 612 is extended over the right front contact of relay 610, to interrupter 608 which controls the circuit of magnet 607 and advances the stepping switch 600 one step each seven seconds. If selections are attemped prematurely, by the sender and sequence switch 3800 reaches position 13 before switch 600 has advanced beyond terminal 1, a circuit is closed for relay 3102 from battery through its right winding, conductor 3115, outer upper contact of key 616, brush 604 in position 1, conductor 3845, over the upper right and lower left contacts of cam 3812 to ground. Relay 3102 in turn operates relay 612 and removes ground from interrupter 608. If sequence switch 3800 is slow in advancing and has not gotten beyond position 3, when the switch 600 reaches position 8, relay 3102 operates over the circuit previously traced to brush 604 and thence to ground over conductor 3846 and the left contacts of cam 3812.

In the sender relay 5424 is operated in a manner previously described as well as relays 6006, 6003, 5934 and 5933, connecting ground to conductor 5938 in the manner previously described. The connection of ground to conductor 5938 operates relay 5526 over the contacts of cam 5512, relay 5526 locking to conductor 5938 independent of cam 5512. Sequence switch 5500 is advanced to position 2 under the control of relays 5526 and 5527 and in this position the timing operation starts. Relays 5531 and 5533 operate under the control of interrupter 5521 to measure off a time interval during which the first digit is expected to be received as described in the above identified patent to R. Raymond et al. Relay 5528 is operated when relay 5531 operates at the third closure of interrupter 5521 and locks through the winding of relay 5527 which operates when relay 5533 also operates at the opening of the interrupter. Relay 5527 advances sequence switch 5500 to position 3 where the timing relays release. In position 3 a circuit is closed from battery through the upper winding of permanent signal relay 5425, lower left and upper right contacts of cam 5513 to ground at the back contact of relay 5527. Relay 5425 locks over its second lower contact and grounded conductor 6017, operates relay 5421 over its inner lower contact and connects ground over its upper front contact to conductor 5649. Relay 5421 initiates the operation of the decoder connector and decoder, while the grounding of conductor 5649 causes the operation of the permanent signal relay in the decoder which thereupon functions to determine the setting for the selection control registers of the sender which will connect the subscriber with a permanent signal trunk to an operator's position. Relay 5425 also connects ground over its lower front contact, lower front contact of relay 5421, upper contacts of cam 5501 to the left winding of relay 5527 advancing sequence switch 5500 to position 14. In position 14 a ten second interval is measured for the release of the sender, interrupter 5521 operating relay 5531 which in turn operates relay 5528 which locks in series with relay 5527, and the operation of relay 5533 following the opening of the interrupter permitting the operation of relay 5527 to advance sequence switch 5500 to position 15. If the sender is released, sequence switch 5500 is restored to position 1. If the sender is not released, relay 5425 is still operated and relay 5527 is operated in position 15 advancing the sequence switch 5500 to position 18. In position 18, ground is connected over the left back contact of relay 5527, upper contacts of cam 5513 to conductor 5543 which operates the stuck sender signal at the sender-make-busy frame. Likewise as sequence switch 5500 passes through positions 14¾ to 15¾ ground is connected from conductor 5938 over the right contacts of cam 5514 to make a record of the sender on a stuck sender recorder. However, if the permanent signal relay 5425 is properly operated and the decoder also operates in the proper manner, the district selections necessary to direct the call to a permanent signal trunk will be made by the sender.

Sequence switch 3800 checks these selections in the manner previously described, while the fact that the skip office key 1425 is operated, holds relays 3608 and 3609 through the office selection positions which are thus skipped. Ground for holding these relays is furnished over the lower right contact of cam 3818, upper right contact of cam 3818, and upper right contact of cam 3710 in positions 5 to 14 of sequence switch 3800, so that sequence switch 3800 is advanced to position 15. In this position the reversed battery circuit previously traced is completed over the fundamental circuit of the sender which thereupon completes the circuit for trunk test causing the operation of relay 3004 which advances sequence switch 3800 to position 16. Talking selection and the release of the sender take place and are checked in the manner previously described. Since the sender is expected to wait a definite length of time, before setting up the permanent signal condition, the circuit is so arranged that, if the fundamental circuit for district brush selection is completed prior to the advance of sequence switch 200 to position 13, a circuit is closed from battery through the winding of relay 317, right back contact of relay 318, right contacts of cam 218, conductor 250, inner upper normal contact of key 3000, conductor 3032, lower contacts of cam 3715, upper right contact of cam 3803 to ground. The operation of relay 317 opens the circuit for advancing sequence switch 200 and prevents its advance to position 13 thereby blocking the test. If the call progresses properly, it will be completed as previously described and relay 610 will release when sequence switch 200 leaves position 17. If sequence switch 200 does not advance beyond position 17, relay 3102 operates over a circuit extending as previously traced to brush 604, and thence with that brush in position 9 to ground at the inner right front contact of relay 610. Relay 3102 in turn operates relay 612 which blocks the call, and reconnects ground to conductor 620 so that an alarm will be sounded when the time alarm of Fig. 23 completes its operation.

*Call to special service or zero operator*

To test the ability of the sender to control the establishment of a connection to a special or zero operator, class key 1465 is operated advancing the class sequence switch 3700 to position 5 and any numerical digit keys desired, in order to close the normal checking path. The talking selection key 1552 is operated and the skip office key 1425 is also operated. Key 3600 will not be operated as the marginal trunk test relay 6014 is not used on calls to operator's positions. The digit zero is transmitted to the sender with sequence switch 200 in position 4. With key 1465 operated, following the transmission of the A code digit zero, sequence switch 200 is advanced from position 4 to position 13, since relay 316 is held operated over its outer right front contact, conductor 323, upper left contact of cam 216, lower left contact of cam 206, conductor 251 to ground at the right contact of key 1465. In the sender the ten pulses corresponding to the digit zero cause the operation of relays 5401 to 5410 in the manner previously described followed by the operation of relay 5411 and the reoperation of relays 5401 to 5404 whereupon relay 5412 is operated and subsequently the relays 5405 to 5410. Therefore at the termination of the digit zero ground is connected over the inner lower front contact of relay 5410 and the inner lower front contact of relay 5412, conductor 5435, inner right front contact of relay 5602, which is operated during the reception of the first code digit, through the right winding of relay 5603 and battery. Relay 5603 locks through its left winding and inner left contact and the winding of relay 5601. It also connects ground from conductor 5939 over its right front contact to the winding of relay 5421 and battery. Relay 5421 connects battery from conductor 5539 over the back contact of relays 5538 and 5536, normal contact of relay 5423, inner lower front contact of relay 5421, to conductor 5630 and the decoder for causing the connection of a decoder to the sender. None of the registering conductors leading to the decoder is grounded, and the decoder responds to this action to set the selection control registers in such a manner as to direct calls to the zero operator's position which is connected directly to the district selector bank.

Therefore district selections are checked by sequence switch 3800 and when the sequence switch arrives in position 3, relays 3608 and 3609 are held operated by the skip office key 1425 from positions 3 to 5 and from positions 5 to 13 the locking circuit extends to ground over the upper right contact of cam 3710 so that these relays are held operated, although the circuit for advancing sequence switch 3800 is opened at the contact of cam 3811 in position 6 so that the sequence switch comes to rest in that position. Sequence switch 6400 is advanced to position 7 following the completion of the district selections, where the trunk test circuit is established in the manner previously described. With the sequence switch 3800 in position 6 the fundamental circuit is closed in the test circuit from the fundamental tip to the right contacts of cam 3820, conductor 3830, left normal contact of key 3600, resistance 3111, winding of relay 3100, right back contact of relay 3102, winding of relay 3606, to battery over the lower contacts of cam 3709 and the fundamental ring extends to the upper contacts of cam 3819, conductor 3832, right contact of compensating resistance key 2128, conductor 3831 to ground over the lower left contact of cam 3803.

In the sender, relay 6009 is operated in the trunk test circuit in place of relay 6014, since class relay 6504 is operated on all but full mechanical calls. Relay 6009 in turn operates relay 6008 which operates relay 6007. Relay 6007 closes a circuit from ground at its left front contact, lower contacts of cam 6406, right front contact of relay 6504, back contact of relay 6502, winding of relay 5921 to battery. Relay 5921 locks to grounded conductor 5938 and extends ground over its inner left contact, upper left contact of cam 6402 to the winding of sequence switch magnet 6400 and battery advancing the sequence switch to position 10. As the sequence switch passes through position 9¾ a circuit is closed from battery through the winding of relay 5931, left contacts of cam 6412, outer left front contact of relay 5921 to grounded conductor 5938, operating relay 5931 whch also locks to conductor 5938. Relay 5931 advances sequence switch 6400 to position 17 where relay 5932 is operated as previously described, in turn operating relay 5928 and advancing sequence switch 6400 to position 18. In this position talking selection takes place. Since this call is for an operator, neither relay 6010 nor 6021 will be operated and the circuit controlled by relay 6000 at this time will extend as previously traced to the lower left contact of cam 6420, back contact of relay 5924, back contact of relay 6010, back contact of relay 5916 to the winding of relay 5915 and battery, and it requires three revertive pulses to satisfy the sender. Otherwise the operation is the same as previously described. The operation of relay 6009 in the sender and the advance for talking selection, causes the insertion of high resistance in the circuit of relay 3103 which thereupon releases causing the operation of relay 613 which supplies ground over conductor 624 and the upper contacts of cam 3716 for advancing sequence switch 3800 to position 7. It also supplies ground over the right contacts of cam 3716 to the circuit controlled by relay 3609 for advancing sequence switch 3800 which is thereby advanced to position 15, and over the upper right and lower left contacts of cam 3716 to the upper right contact of cam 3824 advancing the sequence switch 3800 to position 16. It also connects ground over the upper contacts of cam 3716, conductor 3834, left contacts of cam 1321 and conductor 1334 for advancing sequence switch 3800 to position 17.

*Full mechanical call—To three-digit operator*

The test circuit is so arranged that the sender may also be tested for handling calls to operators reached by means of a three digit code, usually of the form XII. In making such a test, key 1466 is operated, advancing sequence switch 3700 to position 6 and the digit keys 511 and 521 must also be operated. The operation of key 1466 also supplies battery for the fundamental circuit in place of the battery supplied in the former tests over the lower contacts of cam 3709. The skip office key 1425 will or will not be operated according as the particular operator is reached through an office selector or not in the office where the test circuit is established. Otherwise the test is practically the same as that for zero operator except, of course, that proper district brush and group selection keys must be operated.

*Full mechanical call—Unassigned or restricted code*

When an unassigned code is dialed, the decoder immediately reroutes the call to an operator or if a denied code is dialed, the class information transmitted from the sender to the decoder indicates that the call must be so rerouted. In either event the decoder operates and locks relay 6501 which in turn operates relay 6504. With relay 6504 operated the fundamental circuit extends for a trunk test in the same manner traced for relay call indicator calls as traced hereinafter and, similarly, can not be established until a complete number has been received, since dial pulses incoming to the sender might falsely vibrate the supervisory relay of the district selector if the call were extended through to the operator before pulsing was completed. The call is set up in the test circuit in the same manner as the full mechanical call first described. Key 1467 is also operated thereby advancing the class sequence switch to position 7. Key 1467 also supplies ground for the operation of the pickup relay 315 and the locking of relay 316 so that the code digits and the hundreds, tens and units digits are transmitted independently of switch 3800. However, the transmission of the thousands digit depends on the advance of sequence switch 3800 to position 6 in the manner previously described. When sequence switch 3800 reaches position 6 following the check of district and office selections, the fundamental circuit is established for trunk test as described and the operation of relay 3606 grounds the interrupter 3605 and a test is made of the trunk guard relay 6009. From position 6 the advance is similar to that described in the test call to the zero operator. As in the first full mechanical test, the use of the interrupter 3605 and the delayed closure of the operating circuit for the trunk guard relay 6009 is a test to determine whether the sender waits for the dialing of a units or stations digit which is to be expected where the subscriber dials a restricted or unused code. All of the unused codes should be tested, of course, with the class sequence switch 3700 in this position to determine that the decoder recognizes them and that the sender responds properly.

*Full mechanical call—Abandoned after partial dialing*

Another type of test call is that simulating a full mechanical call abandoned after the dialing of the thousands digit. For this call, key 1468 is operated, advancing sequence switch 3700 to position 8. The remaining keys will be operated as for any other full mechanical call. The code digits are transmitted and the district and office selections checked as described for the full mechanical call. The thousands digit is dialed immediately after the third code digit, since ground is supplied for dialing the digits over the upper left contact of cam 3721 in position 8, conductor 258, and the upper right contact of cam 203. This circuit remains closed from position 8 through position 13 of sequence switch 200 so that, as soon as the thousands digit has been dialed, sequence switch 200 is immediately advanced to position 14. The dialing circuit which in previous tests was held closed over the right contacts of cam 3720, in position 8 of sequence switch 3700 is held closed over the right contacts of cam 3822 only until sequence switch 3800 reaches position 6 following the check of district group selection. Following the reception of the thousands digit in the sender and the completion of district group selection, the trunk test circuit is established as previously described.

When sequence switch 3800 reaches position 6 opening the dialing circuit, relay 5424 is released. The release of relay 5424 also releases relays 5416, 5413, 5414 and 5415 in turn. The release of relay 5415 closes a circuit from ground over its upper back contact, upper contacts of cam 5502, to the left winding of relay 5527 which operates, advancing sequence switch 5500 to position 8 where relay 5527 releases, which is normally an indication that dialing has been completed. A circuit is thereupon closed from battery through the winding of relay 5936, left back contact of relay 5932, contacts of cam 5511, inner right front contact of relay 5526, upper back contact of relay 5414, upper back contact of relay 5424, to ground at the inner right back contact of relay 5937. Relay 5936 locks over its middle right front contact to grounded conductor 5938 and closes a circuit from battery through the winding of relay 5937 to grounded conductor 5938. Relay 5937 disconnects ground from the armature of relay 5424 to prevent the reoperation of relay 5915 in case the receiver should be again removed from the hook before the dialing leads are opened. Another contact of relay 5937 disconnects ground from the dialing tip conductor. Relay 5937 connects ground from conductor 5938 over its inner left front contact to the upper winding of relay 5422 to release the decoder if it should not have released at this time. Relay 5936 closes a shunt from ground at its inner left front contact over the front contact of relay 6001 to the point between the middle and left windings of relay 6006 thereby shunting the second one of the windings of relay 6006 leaving only the very low resistance middle winding in the circuit of relays 3103 and 2402. The operation of relay 5937 disconnects battery from the winding of relay 6001 so that this shunt is maintained only during the releasing time of the slow to release relay 6001. This low resistance serves to operate a relay in the district to indicate that the call can be released.

In the test circuit it operates marginal relay 2402, which locks through its left winding and left front contact to conductor 1572 and ground over the lower left contact of cam 3801. Relay 2402 also closes a circuit from grounded conductor 1572 over its left front contact to the winding of relay 2411 and battery, causing relay 2411 to operate. Relay 2411 in operating connects ground from the upper left contact of cam 3801, conductor 3618, inner right front contact of relay 2411 to the armatures of relays 3100 and 3101. With sequence switch 3800 in position 6, the trunk test circuit is established as previously traced and trunk test is completed as in the full mechanical call. The operation of relay 3100 closes a circuit over the left back contact of relay 3619, left back contact of relay 3003, to the upper left contact of cam 3824 advancing sequence switch 3800 to position 7 whence it is advanced by ground over the upper right contact of cam 1324, to position 8.

The sender responds to trunk test by advancing to position for incoming brush selection which it attempts, but since relay 5936 is operated, the counting relay circuit cannot be closed, the sender cannot be satisfied and the fundamental circuit is maintained closed. Therefore, when the sequence switch 3800 advances to position 8, relay 3004 is again operated over the fundamental circuit, grounding interrupters 2419 and 3017 to transmit pulses to the sender and to the counting relays. When relay 3932 operates in response to the pulses transmitted to the counting relays, it closes a circuit from battery through the winding of relay 3608, conductor 3615, outer left front contact of relay 3004, upper left and lower right contacts of cam 3701, upper right and lower left contacts of cam 3809, conductor 3827, back contact of relay 2902, conductor 2924, over the left back contact of relay 3946, contact of relay 3932, left back contact of relay 3942, conductor 3953, right contact of key 3204 to ground over the lower left contact of cam 3810 and the lower right contact of cam 3811. Relay 3608 locks in the usual manner, operating relay 3609 and releases relay 3932 which closes a circuit over its back contact, conductor 3613, front contact of relay 3609, conductor 2427, right contact of class key 1468, lower left contact of cam 3823 to the winding of sequence switch magnet 3800 and battery, advancing the sequence switch to position 15. In this position reverse battery is connected to the fundamental circuit, in which relay 3004 operates closing a circuit from ground at the right contacts of cam 3704, inner left front contact of relay 3004, conductor 3617, left contacts of cam 3813, right contacts of cam 3714, to the winding of relay 3205 and battery. Relay 3205 locks over its left front contact, to ground over the lower right contact of cam 3804, and closes a circuit from ground over its right contact, upper right contact of cam 3824 to the winding of sequence switch magnet 3800 and battery, advancing sequence switch 3800 to position 16.

The reverse battery circuit closed by the test circuit causes the same operations in the sender as was described for overflow except that, since sequence switch 5500 has reached position 8, relay 5932 is operated immediately following the operation of relay 5926 without being obliged to wait for the time measure switch to advance to that position. Since relay 5414 is released, sequence switch 6400 is advanced to position 1 without waiting for talking selection, as soon as relays 5923 and 6005 release. In the test circuit, the release of relay 3103 causes the advance of sequence switch 3800 to position 17. The advance of sequence switch 3800 to position 17 closes a circuit for advancing sequence switch 200 to position 15. Since sequence switch 3700 is in position 8, a circuit is closed from battery through the winding of sequence switch magnet 200, over the lower left contact of cam 201, upper right and lower left contacts of cam 3712 to ground over the left contacts of cam 215 whereby sequence switch 200 is advanced to position 16. In position 16, ground is connected over the lower left contact of cam 217 to the armature of relay 310 and to interrupter 713 which operates as previously described. After an interval determined by that interrupter, a circuit is closed for relay 311, which locks and connects ground over its left contact to the circuits of relays 310, 309 and 6006 thereby releasing the relay 6006 in the sender which is followed by the connection of high resistance battery to the circuit of relay 310, which thereupon operates, operating relay 305 and advancing sequence switch 200 to position 17. In position 17 ground is supplied to the armature of relay 309 over the left contacts of cam 3720 and when low resistance battery is connected to the circuit of relay 309 that relay operates advancing sequence switch 200 to position 18. The restoration of the test circuit is the same as traced for full mechanical calls previously described.

*Full mechanical call-register control test*

It will be remembered in the description of the full mechanical call that a number of operations take place in the sender between the reception of the last pulse of one digit and the reception of the first pulse of the next digit. When the last pulse of the digit is received, relays 5424 and 5416 remain operated for an appreciable length of time. The circuit of relay 5418 is thereby opened and the circuit closed from battery through the winding of relay 5420, normal contact of relay 5418 to ground at the front contact of relay 5415. Relay 5420 closes a holding circuit for itself under the control of relay 5416. It also provides an operating circuit for the transfer relay in series with the locking circuit of the register relay, which in turn locks to conductor 6017. All of these operations must take place in order to prepare for the reception of the next digit.

In order to test whether these relays operate fast enough to insure that no pulses are lost in the transfer, a test is provided with class key 1469 operated, which advances the sequence switch 3700 to position 9. This test consists in the rapid transmission of four zeros for the numerical designation, since this gives the minimum time between digits when using the dialing interrupter. A full mechanical code is set up on the test code keys and zero is registered as each of the numerical digits for checking purposes. Key 401 is operated so that interrupter 432 is used in place of interrupter 431, since this interrupter has longer open periods, making a more severe test of the relays in the sender and permitting a maximum saturation of relay 5418. Key 705 is also operated to include resistances 731 and 732 in the circuit and increase the severity of the test.

The check is carried out in exactly the manner described for full mechanical calls, the difference between this call and the full mechanical call being in the manner of transmitting the numerical digits. After the code digits have been transmitted in positions 4, 5 and 6 of sequence switch 200, the locking circuit of relay 316 is extended over conductor 323, upper left contact of cam 216, upper left contact of cam 206, conductor 259, to ground over the upper left contact of cam 3722, so that the relay is held operated until sequence switch 200 leaves position 13 causing the advance of the sequence switch in the manner previously described. With sequence switch 3700 in position 9, and sequence switch 200 in position 14, a circuit is closed from ground over the upper left contact of cam 212, conductor 2929, lower contacts of cam 3711, conductor 333, through the winding of relay 302 and battery. With relay 302 operated, a circuit is closed from ground at the inner left contact of relay 302, conductor 323, left contact of key 700, left normal contact of relay 316, which releases when sequence switch 200 reaches position 14, winding of relay 315, to battery through resistance 728 but relay 315 is shunted in the usual manner to delay its operation until the interrupter is in the proper position. The dialing circuit extends from the sender as previously traced to conductor 1337 over the right operated contact of key 705, resistance 732, conductor 727, left back contact of relay 315, in parallel with the contact of key 401 and interrupter 432, resistance 731, left contact of key 705, conductor 733, right contacts of cam 3720, conductor 3729, right normal contact of key 701, left contacts of cam 204, to the ring conductor as previously traced. The operation of relay 315, in the circuit above described, opens the shunt around interrupter 432, which now transmits four series of ten pulses each to the sender. With relay 315 operated a circuit is also closed from grounded conductor 323, over interrupter 443, inner right front contact of relay 315, conductor 320, lower right and upper left contacts of cam 3718, conductor 252, upper right and lower left contacts of cam 210, right normal contact and winding of relay 709 to battery through resistance 711. Interrupter 443 closes as previously described after the last of the impulses have been sent for the first numerical digit, closing the circuit for relay 709 which operates and locks, and closes the circuit of relay 710. When interrupter 443 opens, interrupter 432 immediately transmits the second series of ten impulses corresponding to the second zero. At the termination of this digit interrupter 443 closes, shunting the winding of relay 709 and causing the release of that relay, but holding relay 710 operated. With relay 710 operated and relay 709 released, a circuit is closed from battery through resistance 716, winding and normal contact of relay 714, right front contact of relay 710, left back contact of relay 709, to ground over the lower left contact of cam 212. At the termination of the second closure of interrupter 443, relay 710 also releases. The third zero is then transmitted, at the end of which relays 709 and 710 are reoperated followed by the fourth zero at the end of which relay 709 is released and relay 710 again held operated. Relay 714 in operating closes an operating circuit for relay 715 which does not become effective until relay 710 releases following the transmission of the second zero. When relay 710 reoperates following the transmission of the third digit, relay 714 is shunted but relay 715 is held operated.

With relay 714 released, the next closure of the interrupter 443 completes the circuit for operating relay 316 which extends over its right normal contact, conductor 3726, upper contacts of cam 3717, conductor 3730, right back contact of relay 311, to the inner right front contact of relay 715, right back contact of relay 714, right front contact of relay 302, interrupter 443, conductor 323 to ground at the outer left contact of relay 302. Relay 316 now operates and locks directly to ground over conductor 323. With relay 316 operated, relay 315 is held operated until interrupter 443 opens its contact. Since relay 316 is held operated to the front contact of relay 302, no further digits can be transmitted and the check of the selections controlled by the registration is completed as previously described.

*Call indicator call-tandem*

For a test call simulating a call to a manual office leading through a full mechanical tandem sender, assume that the test number is CHelsea 10459 and that the first code digit C identifies a two digit code so that only the first two digits of the office name will be dialed, that is, the letters C and H which are the equivalent of the digits 2 and 4. To establish the condition for making this test, the following keys will be operated. The No. 2 A-code key 502, the No. 0 B-code key 510, the No. 4 C-code key 524, the No. 0 thousands key 900, the No. 4 hundreds key 914, the No. 5 tens key 825 and the No. 9 units key 839, and key 941 corresponding to the digit 1 in the ten thousands place but located in the same column with the stations digit which is never used when a five digit number is used. Likewise the No. 2 district brush key 1502 and the No. 6 district group key 1416 are operated, indicating that the corresponding district group and brush will be used. The skip office key 1425 is operated indicating that no office selections are to be made. Talking selection key 1459 and class key 2113 are operated, as well as compensating resistance keys 2107 and 2116. Link class key 2304 is also operated. Following the operation of these keys the start key 2200 is operated as before and sequence switches 1000 and 1100 are advanced to positions 1 and 5, respectively, to correspond to the setting of keys 900 and 914. The operation of class key 2113 closes a circuit from ground over its left contact, conductor 2133, right contact of cam 3706 to the winding of sequence switch magnet 3700 and battery advancing the class sequence switch to position 13 which corresponds to the call indicator type of call.

The transmission of the test number to the sender takes place in a very similar manner to the transmission of the number for full mechanical calls. Relay 3005 is operated over conductor 3029, outer left contact of ten thousands key 941, conductor 950, to ground at the lower right contact of cam 217 as soon as sequence switch 200 advances to position 2. In position 3 the preliminary pulse will or will not be transmitted according to the position of key 225. In position 4 the circuit for the pull-up relay 315 extends as previously traced to conductor 323 and thence over the left contacts of cam 216 and conductor 254 to ground at the left normal contact of key 404 which is not operated since the test number employs a two digit code. This circuit remains closed in positions 4 and 5 so that the operation of relay 316 causes the advance of sequence switch 200 to position 6 where the second code digit is transmitted under the control of key 524 in position 6. The circuit for the pull-up relay 315 in positions 6, 7, 8 and 9 extends from conductor 323 over the upper contact of cam 216, lower right contact of cam 203, conductor 248, inner right front contact of relay 3005, to ground over the upper right contact of cam 3722 in the class sequence switch. In position 7, a single pulse is transmitted and the remaining pulses are shunted over the inner left contact of the ten thousands key 941 and the lower left contact of cam 224. The thousands and hundreds digits are transmitted in positions 8 and 9 as previously described. The tens digit is not transmitted until district and office selections have been completely checked as indicated by the advance of sequence switch 3300 to position 6.

If a number under 10,000 had been used, relay 3005 would not have been operated and the circuit for relay 315 would have extended over the lower left contact of cam 203, conductor 256 and the inner right back contact of relay 3005 in positions 8, 9 and 10 of sequence switch 200, during which the thousands, hundreds and tens digits are transmitted. Switch 200 waits in position 11 before transmitting the units and possible stations digits. With relay 3005 not operated a circuit is closed as soon as sequence switch 200 reaches position 6 from battery through the winding of relay 226 over the left back contact of relay 3005, conductor 257, left contacts of cam 203 to ground over conductor 256. Relay 226 connects ground from the upper left contact of cam 207 to the winding of sequence switch magnet 200, advancing the switch to position 7 while the last code digit is being transmitted. It also provides a circuit for lighting lamp 229 after position 7 is reached, and holds the circuit for dialing the code digit closed in position 7.

The circuit for operating the pick-up relay 315 in position 10 of sequence switch 200 extends as previously traced to the upper right contact of cam 202 whence it extends over conductor 244, outer right front contact of relay 3005, right contacts of cam 3702, conductor 3750, to ground over the upper right contact of cam 3319. When relay 316 operates with sequence switch 200 in position 10, a circuit is closed from battery through the winding of relay 318, over the inner right front contact of relay 316, lower left and upper right contacts of cam 209, conductor 248, to ground as previously traced. Relay 318 locks over its inner right front contact, conductor 3750, to ground over the upper right contact of cam 3319. Ground for transmitting the units digit is controlled by relay 2909 in the manner to be described hereinafter. This ground also causes the advance of sequence switch 200 out of position 12. Assuming that the sender is not a coin sender, ground from the left back contact of relay 708 advances sequence switch 200 to position 14, where it remains until sequence switch 3300 reaches position 18.

The operation of the sender in response to its seizure by the test circuit is the same as that previously described except that, since key 2304 is operated, ground from the lower right contact of cam 215 through resistance 249 is extended over conductor 270, inner operated contact of key 2304, to the fundamental tip conductor and thence over the back contact of relay 5423 through the right winding of relay 6106 and battery, and ground over the lower left contact of cam 1309 is connected through resistance 1208, outer lower left normal contact of key 1206, conductor 1213, outer operated contact of key 2304, conductor 2331, back contact of relay 619, conductor 621, and thence to the fundamental ring conductor extending in the sender over the outer left back contact of relay 6003 to battery through the right winding of relay 6107. Relays 6106 and 6107 lock in a circuit from battery over cam 6424, conductor 6429, left windings and left front contacts of relays 6106 and 6107 to grounded conductor 5938.

The first digit 2 will be recorded on register 5600 and, since relay 5605 is operated, relay 6102 will be operated from the front contact of relay 5605, and relay 6101 over cross-connecting rack 6100, back contact of relay 6103, front contact of relay 6102, back contact of relay 5604, to grounded conductor 6017. With relay 6101 operated, the operation of relay 5601 closes a circuit from battery through the winding of relay 5622, back contact of relay 5621, front contact of relay 6101, to conductor 5939 which is grounded over the inner front contact of relay 5601. The second digit is therefore recorded on register 5620, operating relay 5626. The remaining digits will be recorded on the numerical registers in the usual manner, relays 5704, 5713, 5726, 5807, 5816 and 5817 being operated.

Following the operation of the decoder the following register relays are operated: relays 6621 and 6624 in the compensating resistance register, relay 6502 in the class register, relay 6512 in the district brush register, relays 6601 and 6604 in the district group register and no relays in the office brush register 6520 or the office group register 6610. At the same time, talking selection relay 6010, stations delay relay 5820 and skip office relay 6823 are operated, as well as relay 6022 which indicates that a full mechanical tandem office is to be included in the circuit. Likewise relays 6205 and 6021 are operated from the zone relays of the decoder. In addition relay 6502 closes a circuit from battery through the winding of relay 6504, middle left front contact of relay 6502 to grounded conductor 5450. Relay 6504 disconnects battery from the windings of relays 6201, 6202, 6203 and 6301 to prevent their operation on this class of call and to perform other functions as described hereinafter.

The operation of relay 5422, following the setting of the selector control registers, releases the decoder and establishes the fundamental circuit to make district selections. These selections take place in the manner previously described except that the selection of the second district brush and the sixth group of outgoing trunks is simulated under the control of relay 6512 and relays 6601 and 6604, respectively. Since relay 5823 was operated to indicate that no office selector was to be included in the connection, when relay 5928 operates in position 3 of sequence switch 6400 following district group selection, it is locked over the lower contacts of cam 6405, conductor 6433, outer right contact of relay 5823, conductor 5824, lower contacts of cam 6408, to ground through positions 3 to 6. Relay 5928 causes the advance of sequence switch 6400 out of position 3 in the usual manner. With relay 5928 held operated by the skip office relay 5823, sequence switch 6400 is advanced to position 7 where relay 5928 releases. In position 7 relay 5823 supplies ground from the lower right contact of cam 6409, conductor 6434, outer left contact of relay 5823, conductor 5826, to the armature of relay 5928, permitting relay 5926 to immediately reoperate without waiting for the release of relay 5927.

In the test circuit, with sequence switch 200 in position 7, a circuit is closed from ground over the upper right contact of cam 217, conductor 241, key 3000, upper left and lower right contacts of cam 3724, conductor 3329, upper left contact of cam 3301 to the winding of sequence switch magnet 3300 and battery advancing the call indicator check switch to position 2. The check of district selections in the test circuit is approximately the same as for the full mechanical call previously traced except that the circuit of relay 3004 extends over the lower left and upper right contacts of cam 3305 instead of over the contacts of cam 3820. The operation of relays 3608 and 3609 advances sequence switch 3300 from position 2 and position 3 instead of sequence switch 3800. The skip office key 1425 closes a circuit from ground over the left contact of key 1425, conductor 1481, upper right and lower left contacts of cam 3313, to conductor 3614, supplying ground for advancing sequence switch 3300 to position 6.

It will be remembered that in making district selections only the tip side of the fundamental circuit is employed. During these selections the fundamental ring is used to transmit a signal to the district selector to indicate the charge zone in which the called line lies. With relay 6205 operated this circuit may be traced from battery over the right contacts of cam 6424 through low resistance 6427, conductor 6436, front contact of relay 6205, back contact of relay 6204, inner left back contact of relay 6302, right front contact of relay 5926, left contacts of cam 6414, back contact of relay 5931 to the fundamental ring conductor 5447. In the test circuit relay 2421 is operated in a circuit from battery through the winding of that relay over the left back contact of relay 2414, conductor 2427, left front contact of relay 3609 to grounded conductor 3613 when relay 3609 operates at the completion of district brush selection. With relay 2421 operated, the zone registering circuit extends over brushes 1721 and 1711, conductor 1754, outer left front contact of relay 2301, conductor 621, right back contact of relay 2504, right front contact of relay 2421, conductor 2430, outer right operated contact of key 1459, conductor 1480, left winding of relay 2413, right winding of relay 2403, conductor 2431, to ground at the inner left back contact of relay 612. Both relays 2403 and 2413 operate, relay 2403 locking over its left winding and inner left front contact and relay 2413 locking from battery through its right winding and inner right front contact, to conductor 2432 and ground at the upper left contact of cam 3316. Relay 2403 in operating prepares a circuit for lamp 2404. With both relays 2403 and 2413 operated a circuit is closed from battery through the winding of relay 2414, outer left front contact of relay 2403, outer left front contact of relay 2413, conductor 2433, outer left operated contact of key 1459 to grounded conductor 1572. Relay 2414 thereupon locks over its right front contact to grounded conductor 5072, remaining operated until sequence switch 3300 leaves position 18. The operation of relay 2414 and the advance of sequence switch 3300 to establish the fundamental circuit for district group selection therefore is a check that the correct zone potential has been transmitted from the sender towards the district selector. Relay 2414 also releases relay 2421 and disconnects the zone relays from the fundamental ring conductor.

When sequence switch 6400 left position 3, the locking circuit of relay 6205 was opened and that relay released so that in position 6, relays 6302 and 6206 are operated as before. Therefore when sequence switch 6400 reaches position 7, a trunk test is made in the usual manner except that with relay 6504 operated, the fundamental circuit now extends from conductor 5448, over the front contact of relay 5423, left front contact of relay 6504, right contacts of cam 6403, conductor 6431, front contact of relay 6206, conductor 6210, back contact of relay 6625, winding of relay 6009, back contact of relay 5920, inner left front contact of relay 5926, right winding of relay 5925, right contacts of cam 6417, back contact of relay 6623, resistance 6626, front contact of relay 6624, lower contacts of cam 6414, back contact of relay 5931 to conductor 5447. This circuit differs from the full mechanical trunk test circuit in that resistance 6425 was not included in the circuit and relay 6009 was used in place of relay 6014.

Call indicator offices are of four classes, namely:
1. Offices employing numbers above 9999 and stations digits;
2. Offices with numbers above 9999, without stations digits;
3. Offices with numbers below 10,000 without stations digits;
4. Offices with numbers below 10,000 and stations digits.

If a five digit number may be employed as in cases 1, 2 and 4 above, the sender is arranged to wait for an eighth digit for at least three seconds before closing the trunk test circuit, but to close the circuit immediately following the dialing of the units digit in the third case above mentioned. The ability of the sender to do this is tested in the test circuit through the use of key 2818 and relays 2909 and 2903. Whenever a code or a number is set up for a test number which would cause the expectation of a delay, key 2818 must be operated.

With switch 3300 in position 6, ground is applied over the upper right contact of cam 3319, conductor 3750, right contacts of cam 3702, outer right operated contact of relay 3005 to conductor 244 and the upper right contact of cam 202 for transmitting the tens digit. Following the transmission of the tens digit, that is the fourth digit of the number, relay 318 is operated and locked as above described. With this relay operated, a circuit is closed from ground at the left back contact of relay 2903, conductor 2926, lower left and upper right contacts of cam 3308, conductor 3330, interrupter contact 444, outer left front contact of relay 318, left back contact of relay 720, conductor 3957 and thence to the upper back contact of relay 3911 and the winding of relay 3901 and battery. When the interrupter opens its contact, relay 3911 operates in the locking circuit of relay 3901 in the usual manner. The second closure of the interrupter contact causes the operation of relay 3900, and, the second opening, the operation of relays 3910 and 3932. The third closure of the interrupter contacts closes a circuit which extends over the front contact of relay 3910, conductor 3959, right back contact of relay 2916, to the winding of relay 2909 and battery over conductor 2935 and the left contacts of cam 3310. Relay 2909 locks to ground at its inner left front contact. The operation of relay 2909 occurs approximately two seconds after the completion of the transmission of the fourth numerical digit. The operation of relay 2909 closes a circuit from ground at the lower left contact of cam 3710, conductor 2927, middle right front contact of relay 2909, conductor 245, lower left contact of cam 202, and thence to the winding of the pull up relay 315 for causing the transmission of the fifth or units digit.

The four classes of manual offices mentioned previously are indicated to the sender by the operation or non-operation of relays 5820 and 5821. For Class 1 neither relay 5820 nor 5821 would be operated, for Class 2, relay 5820 alone, for Class 3, both relays, and for Class 4, relay 5821 alone. For the third class no fifth numerical digit is ever used, but for the other classes it may or may not be necessary to await a fifth digit.

When sequence switch 6400 reaches position 7, the establishment of the trunk test circuit awaits the release of relay 5928 which is held operated over one or more of a plurality of circuits depending on the stations delay condition indicated by relays 5820 and 5821, the number registered and the position of the impulse sequence switch 6700. Under the assumed conditions relay 5822 is operated over the back contact of relay 6105, (which operates from relays 5705 and 5707 to mark those thousands digits such as 3 and 6 for which relay 5704 is also operated), the zero relay 5713 of hundreds register 5710 and the No. 1 relay 5704 of the thousands register. Therefore, the locking circuit of relay 5928 extends over its inner right front contact, left contacts of cam 6405, from whence the circuit extends either over the right back contact of relay 5821 and the right front contact of relay 5822, lower contacts of cam 5506, left back contact of relay 6201 to grounded conductor 5450, or over the right contacts of cam 6720, right back contact of relay 6501, inner left front contact of relay 6502, to grounded conductor 5450.

The operation of the counting switch 5500 which is described in detail in the above identified patent of Raymond et al. may be briefly described as follows. The connection of ground to conductor 5938 operates relay 5526 which in turn operates relay 5527 and advances sequence switch 5500 to position 2. The time intervals are chiefly measured by means of interrupter 5521 and relays 5531 and 5533. The first closure of interrupter 5521 operates relay 5531, the first opening operates relay 5533; the second closure of the interrupter, about ten seconds later, releases relay 5531 and holds relay 5533 while the second opening of the interrupter releases relay 5533. This cycle of operations may occur whenever ground is connected to interrupter 5521. Sequence switch 5500 during a normal call is advanced to position 4 in response to the operation of relay 5601 to indicate that the first digit has been dialed. When the fourth numerical digit has been recorded on the units register causing the operation of relay 5801, sequence switch 5500 is advanced to position 6. In this position relays 5531 and 5533 are placed under the control of the fast interrupter 5520 which closes its contact at half minute intervals for the purpose of measuring the stations delay. Relays 5531 and 5533 are operated by the first cycle of interrupter 5520. Relay 5531 releases at the second closure of that interrupter. At this time relay 5528 operates and locks. When relay 5533 releases at the second opening of the interrupter contact, relay 5527 operates advancing sequence switch 5500 to position 7. In the advance from position 6 to position 7, relays 5531 and 5533 release. In position 7 the same cycle of operations is performed and sequence switch 5500 is advanced to position 8 about three seconds after the reception of the fourth or tens digit. When the timing switch reaches position 8, one locking circuit for relay 5928 is opened. If relay 5811 is operated by the reception of a fifth numerical digit sequence switch 5500 is immediately advanced to position 8.

With class relay 6502 operated the sender is prepared for call indicator operation. Therefore, when relay 5422 operates following the positioning of the selection control registers, a circuit is closed from battery through the winding of relay 6011, left back contact of relay 6501, outer lower front contact of relay 5422, outer left front contact of relay 6502, lower left contact of cam 6409 to ground. Relay 6011 operates in this circuit and prepares a locking circuit for itself which is not effective at the present time. It also closes a circuit from ground over its outer right front contact, through the windings of relays 6013 and 6012 to battery. Relay 6013 closes a locking circuit for relays 6012 and 6013 which also becomes effective later. Relay 6012 also closes a circuit from battery through the winding of sequence switch magnet 6700, upper left contact of cam 6723, middle right front contact of relay 6011, lower left contact of cam 6702, to ground, advancing sequence switch 6700 beyond position 2 whence it is moved to position 5 over its local cam. When sequence switch 6700 reaches position 4, the locking circuit of relay 6011 over its inner right front contact is extended over the lower right and upper left contacts of cam 6722 to ground over the lower left contact of cam 6416. From the foregoing it is apparent that the locking circuit for relay 5928 is probably also open at the impulser sequence switch at the time that it is opened at the timing sequence switch. The time measured by the test circuit is slightly less than that to be measured by the timing circuit of the sender so that the transmission of the units digit should operate relay 5811 permitting the establishment of the fundamental circuit for trunk test.

In the test circuit under the present conditions, the fundamental tip extends as previously traced to conductor 3826 over the right contacts of cam 3305, conductor 3333, right back contact of relay 2910, outer left back contact of relay 2829, conductor 3830, over the left normal contact of key 3600, resistance 3111, winding of relay 3100, right back contact of relay 3102, winding of relay 3606, to battery over the lower contacts of cam 3709, while the fundamental ring conductor extends as previously traced to conductor 621, right back contact of relay 2504, conductor 2505, right contacts of cam 3306, conductor 3832, left operated contacts of key 2116, resistances 2120 and 2127, conductor 2132, right back contact of relay 2829, left normal contact of relay 2904, conductor 2925, right contacts of cam 3821, left back contact of relay 3940, conductor 3956, to ground at the right front contact of relay 3103. Therefore, when the sender establishes the fundamental circuit for trunk test, relay 3606 operates in turn operating relay 3607 which locks over conductor 3618 to ground at the upper left contact of cam 3323. Relay 3607 connects ground over its left front contact, conductor 3617, upper right and lower left contacts of cam 3813, conductor 730, left back contact of relay 721, right back contact of relay 708, conductor 2928, left back contact of relay 2916, winding of relay 2903, conductor 3331, to battery over the upper right and lower left contacts of cam 3310. Relay 2903 locks to ground at its inner left front contact. If the trunk test circuit is established in the sender prior to the elapse of the time measured by the test circuit, that is, relay 2903 operates before relay 2909, the operating circuit for relay 2909 is opened and the progress of the test is arrested.

In the sender, relay 6009 operates in the trunk test circuit, in turn operating relay 6008 and relay 6007. Relay 6007 closes a circuit from ground at its left front contact, lower contacts of cam 6406, right front contact of relay 6504, front contact of relay 6504, front contact of relay 6502, outer right back contact of relay 5924, winding of relay 5923 to battery. Relay 6007 locks over conductor 6434, as long as sequence switch 6400 remains in position 7. In combination with relay 5923 it closes a holding circuit for relay 6009 in parallel with the contact of relay 6206 and the contacts of cam 6403, this holding circuit remaining closed after sequence switch 6400 leaves position 7, and thereby also holds relay 6007 operated under the control of the test circuit. Relay 5923 closes a circuit from ground at its outer right contact over the lower left contact of cam 6401 to the winding of sequence switch magnet 6400 and battery, advancing the sequence switch to position 15. Relay 5923 also closes a locking circuit for itself over the back contact of relay 5924, middle left contact of relay 5923, to grounded conductor 5938.

When relay 2909 operates at the end of the measured stations delay interval, if relay 2903 has not operated, a circuit is closed from battery over the left contacts of cam 3310, conductor 2935, winding of relay 2917, left normal contact of key 2817, right back contact of relay 2903, inner right front contact of relay 2909, left operated contact of key 2818, conductor 2834 to ground at the inner left back contact of relay 317. Relay 2917 locks over its left front contact. When relay 2903 operates in the trunk test circuit, a circuit is closed from ground at the right contact of relay 2917, over the inner right contact of relay 2903, winding of relay 2826 to battery. Relay 2826 closes a circuit from battery through the winding of sequence switch magnet 3300, lower left contact of cam 3302, conductor 3828, outer right front contact of relay 2826, conductor 2835, upper contacts of cam 3715 to ground. Sequence switch 3300 advances to position 8 in this circuit. With sequence switch 3300 in position 8, a circuit is closed from battery through the winding of relay 2902, lower right contact of cam 3319 to ground. Relay 2902 closes a circuit from battery through the left winding of relay 2901, inner right front contact of relay 2902, conductor 2929, upper left contacts of cam 212, to ground. With relay 2901 operate a circuit is closed from battery through the winding of relay 2904, inner right front contact of relay 2901, conductor 2937, lower left contact of cam 3322, to ground. Relay 2904 locks to this same ground independent of relay 2901. With relays 2904 and 2901 operated, a plurality of circuits are closed extending from ground at the upper left contact of cam 212, conductor 2929, inner right front contact of relay 2902, to the left contacts of relay 2901, thence extending over the middle left contact of relay 2901, inner left contact of relay 2904, conductor 3955, right back contact of relay 3943, conductor 3024, left back contact of relay 3020, conductor 3952, right back contact of relay 3940, inner left back contact of relay 3942, conductor 2425, right back contact of relay 2418, conductor 2923, left back contact of relay 2908, conductor 2424, interrupter 2419, left back contact of relay 2418, conductor 2922, outer right front contact of relay 2901, conductor 2936, right back contact of relay 3946, back contact of relay 3919, winding of relay 3909, to battery. A branch of the circuit just traced extends from conductor 3955 to interrupter 3017, and over conductor 3031 to the inner left front contact of relay 2826. However, the interrupter is shunted for the time being over a circuit which extends from ground as above traced to the middle left front contact of relay 2901, over the outer right front contact of relay 2902, conductor 3614, outer right back contact of relay 3609, conductor 3623, back contact of relay 3907, conductor 3960, to the inner right front contact of relay 2826 whence the circuit extends over the outer left front contact of relay 2826, resistance 2825, conductor 2838, lower left contacts of cams 3304 and 3303, conductor 3335, outer left front contact of relay 2904, inner right back contact of relay 2829, conductor 2132, resistances 2127, 2120, left operated contact of key 2116, conductor 3832, right contacts of cam 3306 to conductor 2505 and thence as previously traced to the fundamental ring conductor of the sender. A circuit is also closed from ground at the upper left contact of cam 212 as previously traced to the left contacts of relay 2901 and thence over the left back contact of relay 2900, winding of relay 2823, conductor 2839, resistance 3325, to battery over the lower contacts of cam 3310. However, the winding of relay 2823 is shunted for an interval over a circuit which may be traced from the middle left contact of relay 2901 over the circuit previously traced to conductor 3623, over the back contact of relay 3906, conductor 2839, to resistance 3325 and battery over the lower contacts of cam 3310. It will be noted that with relay 2826 operated, the high resistance 2824 is now shunted by lower resistance 2825 giving an operate test to the trunk guard relay in the sender.

The circuit traced through interrupter 2419 to the winding of relay 2909 causes the successive operation of the counting relays starting with the No. 9 counting relay. When the No. 7 counting relay 3907 operates, the shunt around interrupter 3017 is opened and when that interrupter also opens it holds the fundamental circuit opened for a period of .05 seconds to test the ability of the trunk guard circuits in the sender to hold over a short opening of the trunk circuit. As soon as the No. 6 counting relay 3906 has operated under control of interrupter 2419, the circuit for relay 2823 is effective and that relay connects ground directly to resistance 2824 rendering the fundamental circuit independent of interrupter 3017. The counting relays continue to operate under the control of interrupter 2419 and when the last pair has operated including relay 3932, the circuit controlled by the interrupter is extended over the front contact of relay 3932, left back contact of relay 3946, conductor 2924, left front contact of relay 2902, left back contact of relay 2900, to the winding of relay 2911 and battery. Relay 2911 locks over its outer left front contact to ground over conductor 2937 and the lower left contact of cam 3322. Relay 2911 connects ground from conductor 2937 over its inner left front contact to the fundamental ring conductor in shunt of the compensating resistance thereby further increasing the current flow through the trunk guard relay 6009 in the sender. It also closes a circuit from ground over its outer right contact, over the lower left contact of cam 3301 to the winding of sequence switch magnet 3300 and battery advancing that sequence switch to position 9. Relay 2911 also connects battery through resistance 2930 to conductor 3830 and the fundamental tip conductor, in parallel with the winding of relay 3100.

The advance of the sequence switch 3300 to position 9 connects ground to interrupter 2913 over the lower right contact of cam 3320. Relays 2906 and 2912, 2915 and 2914 operate in succession under the control of interrupter 2913, locking to ground at the lower right contact of cam 3320. Relay 2914 closes a substitute ground for the ground at the front contact of relay 2823. With relay 2914 operated the next closure of the interrupter 2913 completes a circuit over the outer right front contact of relay 2914, conductor 3728, upper contacts of cam 3711, conductor 2836, outer right back contact and winding of relay 2829 to battery. Relay 2829 locks over its outer right front contact to ground over conductor 3336 and the lower left contact of cam 3321. Relay 2829 in operating opens the fundamental ring conductor in simulation of the assignment by the manual operator. The delay measured by relays 2906, 2912, 2914 and 2915 is for the purpose of producing a wrong display if the trunk guard relay in the sender releases falsely during the short interruption of the fundamental circuit previously described.

The opening of the fundamental circuit by the operation of relay 2829 causes relay 6009 to release, in turn releasing relay 6007. The release of relay 6007 places the fundamental circuit under the control of the impulse switch 6700. The release of relay 6007 also closes a circuit from ground at the left back contact of relay 6007, outer left front contact of relay 5923, through the winding of relay 5922 and battery. Relay 5922 closes a circuit from ground at its left contact, upper contact of cam 6724, winding of sequence switch 6700 to battery advancing sequence switch 6700 in its first revolution.

It is well known that the call indicator code consists of a train of light negative pulses, upon which light positive and heavy negative pulses are superimposed under the control of the registered designation. The light positive pulses are generated by the connection of ground to the ring conductor and battery through a high resistance to the tip conductor, while the light negative pulses are generated by connecting ground to the tip conductor and battery through a high resistance to the ring conductor, the heavy negative pulses being generated by connecting battery through a low resistance in parallel with the high resistance battery to the ring conductor. The fundamental circuit for the first impulse of the first office code digit extends from conductor 5447, back contact of relay 5931, lower contacts of cam 6414, front contact of relay 6624, through resistance 6626, back contact of relay 6623, inner right front contact of relay 5923, outer right back contact of relay 6007, right front contact of relay 6012, upper left and lower right contacts of cam 6719 to ground and from conductor 5448, front contact of relay 5423, inner left front contact of relay 5923, inner right back contact of relay 6007, left front contact of relay 6012, inner left front contact of relay 6011 to the lower left contact of cam 6705. With sequence switch 6700 in position 5, this circuit extends over the upper left contact of cam 6705, to the outer left armature of relay 5606 in the first office code register 5600, over the back contact of that relay, back contact of relay 5604, which is also not operated, conductor 6730, upper left contact of cam 6702, lower contacts of cam 6703 to ground. While this circuit is not actually closed in position 5, it overlaps the position slightly to insure the discharge of the cable and prevent the false registration of a pulse when none is to be transmitted. When relay 6700 reaches position 6, ground is disconnected from conductor 5447 and connected over the right contacts of cam 6719, left contacts of cam 6718 to the inner right back contact of relay 6007 and thence to conductor 5448. In this position, battery is connected through resistances 6208 and 6207, conductor 6725, upper contacts of cam 6714, to the outer right contact of relay 6007, and conductor 5447, while a branch of this circuit extends from conductor 6725, outer left front contact of relay 6011, lower contacts of cam 6704, inner right front contact of relay 5605, which is operated, to conductor 6732, upper right and lower left contacts of cam 6709, front contact of relay 5922, outer left back contact of relay 5936, right contacts of cam 6708, conductor 6436, low resistance 6427, right contacts of cam 6424 to battery. Therefore, a heavy negative impulse is transmitted in this position. In position 7 the same circuits are closed as in position 5, while in position 8 the circuit for generating the light negative impulse is closed but the circuit giving the heavy negative impulse prepared over the right contacts of cam 6701, middle right front contact of relay 6011, right contacts of cam 6721 to the front contact of relay 5607, is opened at the contact of relay 5607. Therefore, the first digit transmitted corresponding to the registered code letter C consists of a heavy negative impulse followed by a light negative impulse.

It will be remembered that no digit was recorded on the second register in the sender, therefore, none of the relays of register 5610 are operated. The circuits for the two light negative impulses are completed as above traced in positions 9 and 11 of sequence switch 6700 since they are independent of the registers. In positions 13 to 16 the second office code digit 8, recorded on register 5620, is transmitted.

Having transmitted the last of the office code digits, it becomes necessary to determine in what order the remaining digits are to be transmitted. Some offices have five digit numbers lying between 10,000 and 10,499. Some offices have party lines and party line designations while other offices may have both or neither. In addition the number recorded may or may not lie in this five digit range and may or may not have a party letter. A five digit number will be transmitted in the order recorded, that is, ten thousands, thousands, hundreds, tens and units which are recorded on the thousands, hundreds, tens, units and stations registers, respectively, while for all other numbers the stations digit, or zero if no stations digit was recorded, will be transmitted before the thousands digit. It has been assumed that the wanted office has five digit numbers as indicated by the non-operation of relay 5821. Relay 5822 is operated as above described to indicate that the hundreds digit is zero and the thousands digit one.

Relay 6104 is operated following the reception of the last digit in a circuit over the right front contact of relay 5811, normal contact of relay 5727, left front contact of relay 5822, left back contact of relay 5821 to grounded conductor 5450. The circuits for transmitting the numerical designation are carried over contacts of relay 6104 so that with this relay operated, the digits are transmitted in the order ten thousands, thousands, hundreds, tens and units. These digits are transmitted in substantially the same manner as the code digits.

When sequence switch 6700 leaves position 17, the locking circuit of relay 6011 is opened and that relay releases. When sequence switch 6700 reaches position 1, the circuit closed by relay 5922 is opened. However, the locking circuit of relay 6013 is closed in this position and a circuit is completed from battery through the winding of sequence switch magnet 6700, lower right contact of cam 6723, right front contact of relay 6013 to ground at the left front contact of relay 5922 so that sequence switch 6700 proceeds to advance into the second revolution. When sequence switch 6700 leaves position 10 in the second revolution, the locking circuit of relays 6012 and 6013 is opened and these relays release. At the end of last pulse, ground on the tip conductor is extended to position 16½ of sequence switch 6700 over the back contact of relay 6012, upper contacts of cam 6722, and the lower left contact of cam 6416. In passing through position 17 an open pulse is transmitted. In positions 17¼ to 18¼ a heavy positive pulse is transmitted. For this purpose the tip conductor is extended over the left back contact of relay 6012, left contacts of cam 6708 to battery over conductor 6436, while the ring conductor extends over the right back contact of relay 6012 and the right contacts of cam 6703 to ground. This heavy pulse is used for controlling a two-wire office selector if such a selector is included in the connection.

With relay 2829 operated the fundamental circuit is first closed for checking the ground pulses which precede an open first pulse. This circuit may be traced as before from the fundamental ring conductor 5447 to the inner right armature of relay 2829 whence it extends over the inner right front contact of relay 2829, outer left back contact of relay 2820, right back contact of relay 2921 to the winding of relay 2920, and from the fundamental tip conductor 5448, as previously traced to the upper right contact of cam 3305, over the lower right contact of that conductor 3333, right back contact of relay 2910, left front contact of relay 2829, inner right back contact of relay 2820, left back contact of relay 2921, to the winding of relay 2919 and battery. These relays 2919 and 2920 serve to test whether the ground has been connected to the fundamental tip and fundamental ring momentarily as described above. Assuming that the momentary ground is correctly connected to the fundamental circuit, relays 2919 and 2920 operate, relay 2920 locking over conductor 3336 and the lower left contact of cam 3321 to ground. Relay 2919 in operating closes an obvious circuit for relay 2918 which locks to the front contact of relay 2920. Since the ground is merely momentary, relay 2919 releases and a circuit is closed from ground over the inner right front contact of relay 2920, back contact of relay 2919, front contact of relay 2918, to the winding of relay 2921. With relay 2921 operated, the fundamental circuit is transferred so that it extends from the fundamental ring as above to the right front contact of relay 2921, conductor 2934, left back contact of relay 4110, through the windings of positively polarized relay 4111, negatively polarized relay 4113 and marginal relay 4112 in series, right back contact of relay 4110, conductor 2933, right front contact of relay 2921, and thence to the fundamental tip conductor as above traced. The test circuit is therefore prepared to receive the designation from the sender.

Ground is supplied to the armatures of relays 4111, 4112 and 4113, to the switching relays 3510 and 3512 and to certain of the locking circuits over conductor 3336 and to the remaining locking circuits over contacts of relay 4109 which operates over conductor 3336.

When the first pulse is positive, which occurs when the A-code digit is 1, 3, 6 or 8, for tandem calls and when the ten thousand digit is 1 or the stations letter is R on direct calls, relays 2919 and 2920 are not connected to the fundamental circuit, but relay 2921 is operated directly. The circuit for relay 2921 may be traced over conductor 2938, right contacts of the Nos. 1, 3, 6 or 8, A-code key, conductor 534, right contact of either class key 1477 or 2113, which indicate tandem calls, conductor 3336 to ground at the lower left contact of cam 3321. For direct call indicator calls relays 3508 and 3509 are operated under the control of keys 1574, 1475 and 1476 which indicate such calls, and relay 2921 is operated over conductor 2938, inner right front contact of relay 3005, which operates when the No. 1 ten thousands key is operated, conductor 3033 to the inner left front contact of relay 3509 and its operating circuit, or over conductor 2938, outer left contact of the R stations key 943 to conductor 3033.

In response to the first impulse received from the sender, which is a heavy negative impulse, negatively polarized relay 4113 and marginal relay 4112 operate. Relay 4112 closes a circuit from ground over its contact, left back contact of relay 4107, left back contact of relay 3512, right back contact of relay 3509, left back contact of relay 3504, to the left winding of relay 3402 and battery. Relay 3402 locks to ground supplied by relay 4109. Relay 4113 closes a circuit from ground over its contact, inner right back contact of relay 4107, conductor 4117, left normal contact and winding of relay 3510, resistance 3511 to battery. Relay 3510 locks over its inner left front contact to ground at the middle left contact of relay 4109 and prepares an operating circuit for relay 3512. However, relay 3512 is shunted by the operating circuit of relay 3510 over its own right back contact. When relay 4113 releases at the end of the heavy negative impulse, relay 1512 operates. At the light negative impulse following, relay 4113 is operated alone, connecting ground to conductor 4117, which now extends over the right front contact of relay 3512, to resistance 3511 in shunt of the winding of relay 3510 which now releases, opening the operating circuit of relay 3512, but the circuit of relay 3512 is held closed over the normal contact of relay 3510 to grounded conductor 4117 until relay 4113 releases at the termination of the impulse. When relay 3510 operates, a circuit is closed from grounded conductor 3336, right front contact of relay 3510, inner right back contact of relay 3508, right back contact of relay 3504 to the winding of relay 3500 and battery. Relay 3500 closes a locking circuit for itself through the winding of relay 3504, left front contact of relay 3500, to ground at the middle left contact of relay 4109, but relay 3504 does not operate until relay 3510 releases at the termination of the second impulse. Relay 3500 transfers the recording circuit for the first impulse to the control of relay 3501 while relay 3504 transfers the circuits for recording the remaining three impulses to the control of relay 3505 so that the second digit may be recorded on the register 3410. Relay 3504 cannot operate until relay 3512 releases since a parallel circuit is closed over the inner left front contact of relay 3512 holding relay 3504 shunted until the termination of the last negative impulse.

The registers of Figs. 34 and 40 and the transfer relays of Figs. 35 and 41 operate in essentially the same manner as the well known relay call indicator in receiving the designation from the sender. Relay 4108, which operates whenever relay 4004 operates, is used to simplify the circuit connections necessitated by the thousands code. Transfer relays 3501 and 3505 are operated during the reception of the second digit, and relays 3502 and 3506 during the third code digit. Since the number used for the test call was indicated to be in an exchange in which numbers above 9999 were used, the first numerical digit was one, the second zero and the third below five, and a fifth digit was dialed as set forth above, the next digit to be received will be the ten thousands digit instead of the stations digit which is usually received at that time. However, this will be recorded on the stations register 3430 and the remaining digits will be recorded on the registers usually used for that purpose. Following the registration of the units digit, relays 4103 and 4107 are operated. Relay 4107 reverses the direction of current flow through the windings of relays 4111, 4112 and 4113 whereby the negative relay 4113 responds to the positive pulse transmitted by the sender and relay 4112 is operated because the pulse is a heavy one. A circuit is closed from ground over the front contact of relay 4112, left front contact of relay 4107, contact of relay 4113, inner right front contact of relay 4107, right back contact of relay 2820, winding of relay 2819 to battery. At the termination of the pulse, relay 2820 operates in the locking circuit of relay 2819 which extends through the winding of relay 2820 to grounded conductor 3336.

Relay 2820 prepares the circuits for testing the fundamental circuit for false grounds or crosses. It extends the fundamental tip conductor over its right front contact to conductor 3841 and the winding of relay 1800 and extends the fundamental ring conductor over its outer left front contact to conductor 3842 and the winding of relay 1205. Battery is connected over cam 3709 to relay 1205 and through resistance 3107 to relay 1800 and when sequence switch 3300 reaches position 17 ground is connected over the upper right contact of cam 3323 to conductor 3113 completing the potentiometer arrangement previously described. If either relay 1800 or 1205 operates, it operates relay 3003 which opens the circuit for advancing sequence switch 3300 from position 17 and blocks the test.

As soon as the last pulse of a digit has been received which is indicated by the operation of the transfer relay of the next digit, a testing path is closed for that digit. For example, when relay 3501 operates, a circuit is closed, assuming that relay 3402 was operated as previously described, from battery through the winding of relay 2712, conductor 2713, right back contact of relay 2411, conductor 2434, upper contacts of cam 3311, left back contact of relay 3404, conductor 3440, right contact of key 502, inner right back contact of relay 507, the No. 2 checking conductor 4052, right back contact of relay 3401, left front contact of relay 3402, right back contact of relay 3403, inner right front contact of relay 3501, upper contacts of cam 3314, resistance 3326 to ground. Relay 2712 operates in this circuit and closes a circuit from battery through the winding of sequence switch magnet 3300, front contact of relay 2712, left back contact of relay 2905, conductor 2931 to ground at the right back contact of relay 2402. As soon as sequence switch 3300 leaves position 9, the circuit of relay 2712 is opened and that relay releases bringing the sequence switch to rest in position 10. When the second code digit has been received and recorded on register 3410, that digit is checked in position 10 of sequence switch 3300 and so on throughout the remaining digits. When the units digit has been checked, sequence switch 3300 will have arrived in position 17.

Circuits are closed in the test circuit in parallel with the checking paths for lamps 3520 to 3529 so that in case of a failure to check, a lamp is lighted indicating the digit actually received from the sender. Lamps 3520 to 3524 are connected over back contacts of relays 3514 and 3515 to the checking conductors 4050 to 4054 respectively, while lamps 3525 to 3529 are connected over front contacts of relays 3514 and 3515 to the same conductors. Relays 3514 and 3375 operate from the fourth register relays such as relays 3404, etc. which add 5 to the registration set up on the other relays of the register. The checking conductors receive ground over the upper contacts of cam 3314 and the contacts of the register relays. Therefore, a lamp will be lighted to indicate the digit received, while relay 2712 can operate only if that digit is the correct one.

When sequence switch 6700 passes through positions 18¾ to 20, after completing the transfer of the designation, a circuit is closed from ground over the left contact of relay 5922, back contact of relay 6013, contacts of cam 6706, winding of relay 5931 to battery. Relay 5931 locks over its inner left contact to grounded conductor 5938 and further opens the fundamental circuit which is opened by sequence switch 6700 in passing through positions 19 and 20. When sequence switch 6700 again reaches position 1, no circuit is closed for operating the magnet and the sequence switch comes to rest. Relay 5931 closes a circuit from ground over its left front contact, upper right contact of cam 6402, to the winding of sequence switch magnet 6400 and battery, advancing the sequence switch to position 17. In this position a circuit is closed from battery through the winding of relay 5932, right contacts of cam 5512, lower contacts of cam 6412, front contact of relay 5931 to grounded conductor 5938. Relay 5932 closes a circuit from battery through the winding of relay 5928, right front contact of relay 5932, upper right contact of cam 6416 to ground. Relay 5928 closes a circuit from ground over the back contact of relay 5929 front contact of relay 5928, upper left contact of cam 6401, winding of sequence switch magnet 6400 and battery, advancing the sequence switch to position 18, where relay 5928 releases.

In this position the circuit for talking selection is established as previously described. Relay 6000 closes a circuit from ground to conductor 6435 as previously traced, upper right and lower left contacts of cam 6420, back contact of relay 5924, front contact of relay 6010, front contact of relay 6021, conductor 6541, back contact of relay 5917, winding of relay 5918 to battery. It therefore requires two pulses to satisfy the talking selection condition. This talking selection in combination with the zone indication given by relay 6205 would cause the district selector to make proper charge. The operations of the sender following talking selection are the same as for the full selector call previously traced.

In advancing to the talking selection position, the sender connects high resistance ground to conductor 5445 as previously described permitting the release of relay 3103 which closes a circuit from ground over its right back contact, conductor 3114, through the winding of relay 613, conductor 623 to battery over the upper right and lower left contacts of cam 1614. Relay 613 closes a circuit from ground over its outer right contact, conductor 624, upper contacts of cam 3716, conductor 3834, contacts of cam 1321, conductor 1334, upper left contact of cam 3302, through the winding of sequence switch magnet 3300 to battery, advancing the sequence switch to position 18. In position 18 a circuit is closed from battery through the winding of sequence switch magnet 200, lower left contact of cam 219, left back contact of relay 317, conductor 331, left contacts of cam 3313, lower right contact of cam 3321 to ground, advancing sequence switch 200 to position 15. Relay 304 is operated in position 15 of sequence switch 200 over conductor 5443 from ground at the outer right back contact of relay 5937 and advances sequence switch 200 to position 16, in which position battery through resistance 265 is connected over the lower contacts of cam 205 to conductor 5445. As in the case of a full mechanical call, relays 309 and 310 and 2402 are connected in parallel with relay 3103, relays 309 and 310 being shunted over the left normal contact of relay 311. With sequence switch 200 in position 16, ground is supplied to interrupter 713 which causes the sequential operation of relays 709 and 710 followed by relay 311, which connects ground over its inner left front contact directly to the windings of relays 310 and 309 in shunt of the battery through resistance 245, thereby releasing relay 6006, which results as previously described in the connection of battery to conductor 5445. Relay 310 operates in this circuit from battery indicating that the sender relays have released promptly. The operation of relay 310 in turn operates relay 305 which advances sequence switch 200 to position 17. Should the relay 6006 fail to release or any of the relays controlled thereby, when the release of relay 709 occurs on the second closure of the interrupter 713, relay 715 operates and opens the path for operating relay 305 thus blocking the test.

The release of relay 6006 in the sender causes the establishment of the fundamental circuit for talking selection which is checked in the same manner as district selection with sequence switch 3300 in position 18. The release of relay 3004 and the operation of relay 3609 at the completion of the check, connects ground from conductor 3613 over the front contact of relay 3609, conductor 2427 to the right front contact of relay 2827. Relay 2827 is operated in a circuit from battery through its winding, conductor 2831, right front contact of relay 311, conductor 3832, right contacts of cam 3306, over the fundamental ring conductor as previously traced, left back contact of relay 5934 which is released by the release of relay 6006, left contacts of cam 6423, left contacts of cam 6418, right back contact of relay 5935 to ground at the left front contact of relay 5929, when relay 5929 operates at the completion of talking selection. Relay 2827 locks over its left front contact, conductor 2832, left contacts of cam 3308, conductor 2926, to ground at the left back contact of relay 2903 which released when sequence switch 3300 left position 9. With relay 2827 operated, the ground connected to its left front contact by relay 3609 is extended to the winding of relay 2822 which operates in turn. Relay 2832 extinguishes the talking selection lamp 2802 and closes a circuit from ground over the lower right contact of cam 3323, front contact of relay 2822, conductor 2833, outer left normal contact of key 701, to the armature of relay 309. When the sender relay 5937 has operated, it disconnects ground from conductor 5443 releasing relay 304 and connects battery through 270 ohm resistance 6002 to conductor 5445 in parallel with the winding of relay 6005. Relay 309 operates in series with this low resistance and extends the ground connected to its contact, over its front contact, left back contact of relay 304, upper left contact of cam 219, to the winding of sequence switch magnet 200 and battery advancing sequence switch 200 to position 18. The advance of the sequence switch 200 to position 18 closes a circuit from battery, winding of magnet 3300, upper right contact of cam 3301, conductor 3344, lower left operated contact of key 2200, conductor 2216, right contacts of cam 1301, conductor 1335, upper right contact of cam 214 to ground, advancing sequence switch 3300 to position 1. The test circuit is advanced to the test of the next sender as previously described for the full mechanical call.

In testing the sender for its abilty to wait for a proper length of time for a fifth numerical digit, it must be remembered that four classes of office exist as enumerated above. Whenever stations are to be expected, the sender should supply the delay and key 2818 must be operated if the code indicating such an office is used as the test code. Similarly, the key must be operated if the code indicates an office with numbers above 9999 and the digits one and zero are used for the first two digits of the numerical designations. Where neither stations digits nor numbers above 9999 are employed, the sender will not measure a delay and key 2818 must not be operated. With key 2818 not operated and no delay in the sender, the establishment of the trunk test circuit by the sender should cause relay 2903 to operate before relay 2909, closing a circuit for operating relay 2917 which may be traced from battery over the left contacts of cam 3310, conductor 2935, winding of relay 2917, left normal contact of key 2817, right front contact of relay 2903, left back contact of relay 2909, left normal contact of key 2818, conductor 2834, to ground at the inner left back contact of relay 317. Otherwise, the circuit functions as previously described. If the establishment of the trunk test circuit is delayed so that relay 2909 operates before relay 2903, the advance of the test is blocked by the opening of the circuit of relay 2917.

Key 2817 is used to test the ability of the sender to respond to a very short closure of the trunk circuit prior to operation of the assignment key at the call indicator operator's position. This test may be made under one of the following three conditions: When a stations digit is dialed; when the sender waits for a stations digit but it is not dialed; and when the stations digit is neither dialed nor does the sender wait for it. If a stations digit is dialed, the test is made as follows, remembering that key 2818 is always operated when a stations or fifth digit is to be expected. Under these circumstances, when relay 2909 operates as previously described for stations delay test, a circuit is closed from battery through the winding of relay 2900, left operated contact of key 2817, right back contact of relay 2903, inner right front contact of relay 2909, left operated contact of key 2818, conductor 2834, to ground at the inner left back contact of relay 317. Relay 2900, in turn, closes an obvious circuit for relay 2901 which, in turn, closes a circuit from battery through the winding of relay 2904, inner right front contact of relay 2901, to grounded conductor 2937. Relay 2904 locks to this same ground independent of relay 2901. The operation of relay 2904 opens the fundamental circuit at its left contact holding it open to prevent the establishment of the trunk test circuit until the test circuit is also ready. Relay 2904, in operating, closes a circuit from battery through the winding of sequence switch magnet 3300, lower left contact of cam 3302, conductor 3828, outer left back contact of relay 2411, conductor 2426, left back contact of relay 3102, conductor 3109, right front contact of relay 2904, lower left contact of cam 3323 to ground, advancing sequence switch 3300 to position 7. The advance of sequence switch 3300 to position 7 releases relays 3900, 3901, 3910, 3911 and 3932. Sequence switch 3300 is advanced from position 7 in a circuit over the upper left contact of cam 3302, conductor 3835, to ground at the upper right contact of cam 1324.

With sequence switch 3300 in position 8, a circuit is closed from battery through the winding of relay 2902, lower right contact of cam 3319, to ground. A circuit is also closed from battery through the winding of the No. 9 counting relay 3909, back contact of relay 3919, right back contact of relay 3946, conductor 2936, outer right front contact of relay 2901, conductor 2922, left back contact of relay 2418, interrupter 2419, conductor 2424, left back contact of relay 2908, conductor 2923, right back contact of relay 2418, conductor 2425, inner left back contact of relay 3942, right back contact of relay 3940, conductor 3952, left back contact of relay 3020, conductor 3024, right back contact of relay 3943, conductor 3955, inner left front contact of relay 2904, left contact of relay 2901, inner right front contact of relay 2902, conductor 2929, to ground at the upper left contact of cam 212. The counting relays therefore operate under the control of interrupter 2419 to measure off a time interval. When the No. 0 counting relays and relay 3932 operate, ground is connected over the upper right contact of cam 3321, right normal contact of key 3204, conductor 3953, outer left back contact of relay 3942, front contact of relay 3932, left back contact of relay 3446, conductor 2924, left front contact of relay 2902, left front contact of relay 2900, lower left contact of cam 3301, to the winding of sequence switch magnet 3300 and battery advancing sequence switch 3300 to position 9. In position 9, ground is connected over the lower right contact of cam 3320 to interrupter 2913 which, at its first closure, operates relay 2906 and at its first opening permits the operation of relay 2912 in the locking circuit of relay 2906; at its second closure, operates relay 2915, and at its second opening permits the operation of relay 2914 in the locking circuit of relay 2915. Relay 2914 connects ground to the fundamental ring conductor through resistance 2824 to make an operate test of the trunk guard relay 6009 in the sender. At the next interrupter closure two-tenths of a second later, relay 2829 is operated as previously described, which opens the trunk test circuit and simulates the operation of the assignment key. If the sender trunk guard relay has functioned properly within the time allowed, the cable discharge closure and the call indicator pulses will be checked.

When the sender waits for a stations digit which is not dialed, a delay will be introduced to insure that the sender is ready for assignment before the test circuit simulates that action. This delay is introduced in position 8 of sequence switch 3300 by transferring from interrupter 2419 to interrupter 2907. This is brought about by the operation of relay 2908 which is operated from the No. 0 stations key. When this operate test of the trunk guard relay is made in connection with a test call which does not have a stations delay, relay 2910 is operated over the right normal contact of key 2818 and the right operated contact of key 2817, lower contacts of cam 3309, from ground at the No. 0 stations key. This relay provides a substitute circuit for operating relay 2900 and prevents the application of the test resistance current to the trunk guard relay 6009 until sequence switch 3300 reaches position 9 in which position relay 2910 is released and a momentary operating circuit is furnished for relay 6009. The check of stations delay is ineffective in this case. Relay 2917 which controls the test of the ability of the sender to hold over a short interruption of the trunk test circuit operates under the control of relay 2909 if key 2818 is operated and under the control of relay 2903 if the key is normal. If relay 2910 is operated, relay 2917 operates immediately thereafter.

If it is desired to determine whether the impulsing sequence switch of the sender is connecting the discharge ground to the fundamental circuit at the beginning of open pulses, as should be the case, key 2124 is operated connecting condenser 2125 between the compensating resistance and the pulsing relays at the contact of relay 2921 so that if the grounding closure does not follow a pulse, the condenser which has been charged by this pulse, discharges through the pulsing relays which operate and register a wrong number, thus blocking the test.

Call indicator call—Direct

The operation for testing the sender with a direct call indicator test call is very similar to the test with a tandem call indicator test call except that key 1574 is used in place of key 2113, the class switch 3700 being in position 13 in both instances. Relays 3508 and 3509 are operated in a circuit over conductor 3530, right contact of key 1574, conductor 3336, to ground at the lower left contact of cam 3321 as soon as sequence switch 3300 reaches position 6 after checking the district and office selections. When sequence switch 3300 reaches position 9 in readiness to check the first code digit, relay 3509 closes a circuit from battery through the winding of relay 2916, inner right front contact of relay 3509 to ground at the lower right contact of cam 3320. Relay 2916 closes a circuit from battery through the winding of sequence switch magnet 3300, lower right contact of cam 3301, inner left front contact of relay 2829, to ground at the inner left front contact of relay 2916 advancing sequence switch 3300 from position 9 to position 12 passing through the positions in which the code digits are checked on a tandem call. Relays 3508 and 3509 also transfer the registering circuits controlled by relays 4111 and 4112 from the A transfer relays to the stations transfer relays so that the designation is recorded properly on the numerical registers.

Call indicator call—Abandoned—No distant office selector

The early release of call indicator calls involving a distant office selector differs from that of a call established directly, in that a heavy positive pulse is necessary for restoring the distant office selector to normal. Therefore, tests must be provided for testing the reaction of the sender to a release condition under both circumstances. With key 1475 operated, sequence switch 3700 is advanced to position 14 where the sender is tested for its ability to react to a release condition with no district office selector. For this type of call, the test number is set up and dialed in the manner previously described. The district and office selections are checked by sequence switch 3300. Ground for dialing the code digits and the thousands, hundreds and tens digits is supplied over the upper right contact of cam 3722, inner right back contact of relay 3005, conductor 256, and the lower left contact of cam 203, while ground for the units digit is supplied from ground at the upper right contact of cam 3319, conductor 3750, lower right and upper left contacts of cam 3702, conductor 253, and the lower right contact of cam 216, while the zero stations digit is used and ground for this purpose is obtained over the operated contact of key 940, conductor 245, and the lower right contact of cam 202, from the same ground as used for the units digit. If a key other than the zero stations key is operated, ground for the stations digit waits for the operation of relay 2909 as previously described, ground being supplied over the lower left contact of cam 3710, conductor 2927, middle right contact of relay 2909 to conductor 245 for the stations digit. Sequence switch 200, being advanced to position 14 over the back contact of relay 708, the dialing circuit is opened at the contacts of cam 204, but is held closed over the right contacts of cam 3307 until sequence switch 3300 leaves position 6.

Following the check of district and office selections, the trunk test circuit is established in the sender as previously described and also in the test circuit advancing sequence switch 3300 from position 6 and opening the dialing loop permitting relay 5424 to release. The operating circuit for relay 2829 is opened with sequence switch 3700 in position 14 and therefore no assignment can take place. In the sender, the release of relay 5424 causes the release of relays 5416, 5415, 5414 and 5413 as previously described. Relays 6009, 6008 and 6007 and 5923 are held operated. Sequence switch 3300 is advanced from position 6 to position 9 as previously described, after testing the ability of the sender to wait for a stations digit and the trunk test relays to hold over a slight interruption of the circuit. Relay 5936 is operated over the back contact of relay 5414 and locks to conductor 5938, in turn operating relay 5937 which disconnects ground from the dialing tip conductor.

Sequence switch 6400 is advanced to position 15 in the usual manner. As soon as sequence switch 6400 reaches position 9, a circuit is closed from battery through the winding of relay 5931, back contact of relay 5415, right back contact of relay 6022 which is not operated on direct calls, upper right and lower left contacts of cam 6406, to ground at the left front contact of relay 6007. Relay 5931 locks over its inner right contact to conductor 5938 and advances sequence switch 6400 to position 17 where relay 5932 is also operated. Relay 5932 causes the advance of sequence switch 6400 to position 18. Relay 5936 connects ground to the middle winding of relay 6006 thereby connecting low resistance ground to the circuit of relay 2402 which operates. The operation of relay 5932 opens the shunt around the high resistance winding of relay 6006 and closes a high resistance in series with relay 2402 and relay 3103 so that relay 3103 releases, relay 2402 remaining locked. The release of relay 3103 causes the advance of sequence switch 3300 to position 18 under the control of relays 3601 to 3604 and 3619 which time the release of the sender. The further release of the test circuit and sender are the same as described for ordinary call indicator calls.

*Call indicator call—Abandoned—Through distant office selector*

In position 15 of the class sequence switch 3700 the sender is tested for its ability to handle a call through a distant office selector when it is released prematurely. Key 1476 is used for advancing the sequence switch to this position. The call is set up and dialed the same as for a direct call indicator call and release is simulated by the opening of the dialing circuit when sequence switch 3300 leaves position 6 in the manner described for the previous test. Sequence switch 3300 under these conditions is advanced from position 6 by means of a circuit which may be traced from ground over the upper left contact of cam 3319, conductor 625, lower right and upper left contacts of cam 3715, conductor 2835, outer right front contact of relay 2826 which is operated in the manner previously described, conductor 3828, lower left contact of cam 3302 to the winding of sequence switch magnet 3300 and battery.

Relays 5936 and 5937 are operated in response to the release signal as previously described, relay 5936 shunting the high resistance winding of relay 6006 in order to connect low resistance ground to the circuit of relay 2402 which operates in turn operating relay 2411. Sequence switch 3300 is advanced out of position 7 over the contacts of cam 1324. With sequence switch 3300 in position 8, the same operations take place as described in connection with the previous call. While in the previous case this tests the ability of the sender to hold over a short interruption of the fundamental circuit, in the present case it tests whether the sender waits as it should for an assignment. Where a distant office selector is included in the outgoing trunk, it is necessary to transmit a heavy positive pulse through that selector in order to release it. Therefore, assignment must either take place or the sender be released manually. After the interval measured by the operation of the counting relays, relay 2829 is operated to indicate an assignment.

In the sender, the time measure switch 5500 is advanced to position 8 by the reception of stations digit, and is advanced immediately to position 11. With switch 5500 in position 11 and relay 5022 operated to indicate that a two-wire office selector is included in the connection, a period of seventy seconds is measured off. Relays 5531 and 5533 are operated as previously described. When relay 5531 is released after the second closure of interrupter 5521, relay 5525 is operated and when relay 5531 operates at the third closure of interrupter 5521, relay 5528 is operated followed by relay 5527 when the interrupter opens. Relay 5527 advances sequence switch 5500 to position 12 where relays 5525, 5527 and 5528 release, but relays 5531 and 5533 do not. In position 12 if neither relay 6022 nor relay 5923 has been operated, a circuit will be closed for relay 5527 advancing sequence switch 5500 to position 13. If either of these relays is operated, as is the present case, relays 5531 and 5533 are released at the fourth closure and opening of interrupter and are reoperated at the fifth closure and opening of the interrupter. When relay 5531 operates relay 5525 again operates. When both relays 5531 and 5533 have released, relay 5528 is operated and when relay 5531 reoperates, relay 5527 operates to advance sequence switch 5500 to position 13.

If assignment has not taken place by this time, relay 5529 operates over the right contacts of cam 5513 to the back contact of relay 5527. It performs the same function as described in position 5 except that since relay 5531 is already operated, the interval before operating relay 5525 and therefore, relays 5527 and 5528 is slightly shorter. The operation of relay 5527 advances sequence switch 5500 to position 14. Relay 5529 is locked through positions 13 to 16 advancing sequence switch 5500 to position 16. When sequence switch 5500 passes through positions 14¾ to 15¼, the stuck sender recorder functions over conductor 5542 and in positions 14 to 15¼, ground is connected to the left winding of relay 6006.

However, the operation of relay 2829, simulating assignment becomes effective before the stuck sender indications have been given. Since relay 5937 is operated, battery is disconnected from resistance 6531 and no positive pulses can be transmitted. Since relay 5936 is operated, battery through low resistance 6427 is disconnected at the back contact of relay 5936 so that no heavy pulses can be generated. Therefore, the sender transmits only a group of light negative pulses which are the equivalent of zeros. Since relay 2411 is operated, the circuit of relay 2712 which tests the digits as received and advances sequence switch 3300, is extended over the front contact of relay 2411 to the zero conductor 4050 which extends over the back contacts of the incoming register relays to ground over the contacts of cams 3314 and 3315 whenever the circuit is properly closed. Talking selection is omitted and ground is connected over the left contacts of cam 3720 to the armature of relay 309 as described for the call completed in position 8 of sequence switch 3700, otherwise the restoration of the sender is checked in the usual manner.

*Call indicator call—To operator through tandem office*

Certain operators' positions may be reached through a tandem office. If such calls are possible in the office in which the test circuit is established, the senders may be tested for that type of call by setting up the appropriate code on the code registers which would consist of some numerical digit and the two digits 1—1. The No. 0 numerical keys will be operated in each case while the selection checking keys will, of course, be operated as necessary to correspond to the routing employed in reaching the tandem office through which such calls would be completed. Class key 1477 is used for this type of call and advances sequence switch 3700 to position 16. Ground for transmitting the digits is supplied over the upper left contact of cam 3722, conductor 259 and the upper left contact of cam 206 so that after the code digits have been transmitted, relay 316 is locked up and advances sequence switch 200 to position 14 directly. Otherwise, the call is checked exactly as the tandem call indicator call.

TESTS OF OPERATORS' SENDERS

After the full mechanical senders have been tested, the master selectors and sender selector are advanced to connection with the first of the A operators' senders. This sender is arranged to work with trunks of different characters so that connections may be established to any desired location. For example, certain of the trunks served by the sender terminate in district selectors; others in incoming selectors; still others in office selectors at distant offices; and still others in district selectors of full mechanical tandem offices. Any one of these trunk circuits when taken for use becomes automatically associated with the sender. In the completion of a toll connection, for example, no district selector or office selector is necessary and a trunk terminating in an incoming selector would be used and only the numerical designation of the wanted line would be recorded on the sender. Since, in this case, no office code digits are recorded in the sender, no translation is required and therefore it does not become necessary to associate the decoder with a sender. In order that the sender may operate correctly under these circumstances, a discriminating signal is transmitted to the sender when it is seized from the trunk, which signal prevents the attachment of a decoder and also modifies the sender circuit so that the numerical digits will be recorded directly on the numerical registers, and that the district and office selection control exercised by the sender is omitted. Similarly, if the sender is to be used in connection with a trunk extending to a full mechanical tandem district selector, a different discriminating signal must be transmitted since in this case neither is the translation necessary nor are the district and office selections necessary since the number will be transmitted to the distant sender exactly as recorded by means of the call indicator impulser. If the sender is to control a call extending over a distant office selector, the use of the decoder is necessary and an office code will be registered, but no district selections are made and the circuits of the sender must be modified correspondingly. The fourth class of trunks with which the senders are used are those terminating in local district selectors in which case no discriminating signal is sent to the sender and it operates in the normal manner. An additional feature of the sender is that if the operator sends more or less digits than the class of trunk indicates should be received, a reorder signal is transmitted to cause her to establish the connection again.

In general, the sender functions in a manner similar to the subscribers' senders just described except that the designations are recorded by means of light and heavy negative and positive pulses over two wires from an operator's key set instead of by means of decimal digits. It is, therefore, to be expected that operation of the test circuit in testing these senders differs chiefly in the manner in which the designation is transmitted to the sender. In testing the A operator's senders, sequence switch 1300 is used for controlling the transmission of the designations and for certain other functions, instead of sequence switch 200, while sequence switches 3800 and 3300 are employed for checking full mechanical or call indicator calls in a manner very similar to that used for the full mechanical sender. Key 1206 must be operated to transfer certain of the circuits from the full mechanical testing equipment to the key pulsing testing equipment. The link class keys 2317, 2305 and 2304 are used for transmitting the discriminating signals to the sender in this case as well as in the full mechanical case, although in the case of a full mechanical sender, these keys indicate the class of subscriber assumed to be making a call, while in the present case they indicate the type of trunk over which the call is to be extended. If no code is to be registered, as indicated by the link class key, no code keys or any code keys that may happen to be operated are used, since they will not be employed in the establishment of the connection. If district selections are to be checked, the proper district brush and group keys must be pressed, otherwise the no district key 1405 must be operated. If office selections are to be checked, the proper office brush and group keys must be depressed, otherwise skip office key 1425 must be operated. A key should be operated in each numerical row including the stations keys. A proper compensating resistance should also be set up. Since no talking selection is made in connection with the key pulsing senders, the zero talking selection key 1550 must also be operated. The thousands and hundreds sequence switches 1000 and 1100 are advanced to positions corresponding to the thousands and hundreds keys in the manner previously described.

It will be remembered that the normal checking path extends from ground over the left back contact of relay 2204, outer lower right operated contact of key 2200, conductor 2211, left contacts of cam 3307 in position 1, lower left and upper right contacts of cam 3817 in position 1, conductor 3825, back contact of relay 3611 which is operated whenever sequence switch 3700 is being advanced, conductor 3632, operated thousands key and corresponding contact of cam 1111, 1112, or 1113, operated hundreds key and contact of cam 1003, 1002 or 1001 to conductor 1021, lower contacts of cam 208 in position 1, normal contact of brush 601, conductor 626 to the inner upper contact of key 1206. Since key 1206 is now operated, the normal checking path extends over the upper left contact of cam 1318, to the winding of sequence switch magnet 1300 and battery, advancing the key pulsing sequence switch to position 2. With sequence switch 1300 in position 2, the circuit extends from ground as traced to conductor 626, over the contacts of cam 1312, independent of key 1206, conductor 1210, upper left contact of cam 1604 to the winding of sequence switch magnet 1600 and battery, advancing that sequence switch to position 2.

Assuming that switch 1730 is at present engaging the first of the operators' senders, this sender is now tested for busy or idle condition. A busy operator's sender is indicated by the absence of either ground or battery connected to conductor 1766, whereas an idle sender is characterized by battery connected to that conductor. Assuming then, that the first key pulsing sender is idle, a circuit will be closed from battery through resistance 4802, left back contact of relay 4801, inner right back contact of relay 4800, conductor 1736, brush 1736, master selector brush 1715, conductor 1756, contacts of cam 1611, conductor 1628, lower right operated contact of key 1206, conductor 1215, to the right winding of relay 2329. The advance of sequence switch 1300 to position 2 closes a circuit from ground over the upper left contact of cam 1316 through the winding of relay 2328 to battery, so that the test circuit therefore extends through the right winding of relay 2329, over the contacts of relay 2328, middle winding of relay 2329, right contact of cam 1610 to ground. Relay 2328 also closes a circuit from battery through the left winding of relay 2329, and its outer right contact to ground through the middle winding of relay 2329, making that relay quick to operate, but also preventing its operation in parallel with any link test relay. Relay 2329 closes a circuit from ground at its right contact through its right winding, to battery in the sender circuit, thereby holding operated as long as the sender maintains battery on conductor 1766. It also closes a circuit from ground over the upper left contact of cam 1608, left front contact of relay 2329, to the winding of relay 2201. Relay 2201 advances sequence switch 1600 to position 3. With sequence switch 1600 in position 3, relay 2201 supplies ground over the left contacts of cam 1601, outer right back contact of relay 2202, for operating relays 2205 and 2301, which lock over the lower left and upper right contacts of cam 1601, inner right front contact of relay 2205, right normal contact of key 2210, conductor 2213, contacts of cam 1322, conductor 1330, to ground over the lower right contact of cam 214. As before, relays 2301 and 2205 connect the remaining conductors from the sender to the test equipment.

FULL MECHANICAL CALL—TRUNK TO INCOMING SELECTOR

With relay 2301 operated, a circuit is closed from ground through the windings of relay 4300, conductor 1761, brush 1735, brush 1705, conductor 1755, inner right front contact of relay 2301, upper contacts of cam 1620, conductor 1331, resistances 1326 and 1325, lower left contact of cam 1303 to battery. Relay 4300 should operate in this circuit and close a circuit from ground at its front contact, over conductor 4301, through the winding of relay 4500 and battery, which in turn causes the operation of relay 5102, over conductor 4501, and connects battery to the off-normal battery conductor 4502. Relay 5102 upon operating connects ground at its outer right front contact to off-normal ground conductor 5103, thereby causing the operation of relay 4801, which in turn removes battery through resistance 4802 from conductor 1766 to mark the sender as busy. At its next to outer right front contact, relay 5102 closes an obvious circuit for relay 5100 which locks to ground on conductor 5103. With ground on conductor 5103, the operating circuit of relay 4900 extends over conductor 4901, inner left back contact of relay 4701 to conductor 5103 and the operating circuit of relay 5104 extends over the back contact of relay 5105 to conductor 5103, relays 4900 and 5104 both operating. A circuit is also closed from ground on conductor 5103, left contacts of cam 5002, conductor 5003, left back contact of relay 5106, conductor 5107 to battery through the left winding of relay 5200. The operation of relay 5200 at this time prevents the sender control switch 5000 from moving off-normal if the call is abandoned before selections are started.

When relay 4801 disconnects battery from conductor 1766, relay 2329 releases, in turn releasing relay 2201, thereby removing ground from conductor 1766, contrary to the practice with subscribers' senders where a busy condition of 440 ohms to ground is maintained on this conductor. This difference is caused by the fact that the key pulsing senders receive a release signal of ground over conductor 1766. The further advance of the connector sequence switch 1600 to position 5 is the same as for the subscriber's sender.

When sequence switch 1300 moved to position 2, it transferred some of the leads not previously changed by key 1206. Relays 505, 506 and 518 are operated from the contacts of cams 1324 and 1323 with sequence switch 1300 in positions 2 to 6, inclusive, relay 505 operating relays 507 and 515, relay 506 operating relays 516 and 508 and relay 518 operating relay 517. These relays, when operated, extend the key pulsing leads to the code and numerical keys and open the circuits previously traced for the subscribers' senders.

When sequence switch 1600 reaches position 5, the circuit of relay 4300 is extended over the lower left contact of cam 1620, conductor 1632, outer upper right operated contact of key 1206, through the winding of relay 1200 to battery and over the upper contacts of cam 1311 to the right winding of relay 1201 and battery. Relays 1200 and 1201 correspond respectively to relays 3103 and 2402 as used for the subscribers' senders. Relay 1201, which is marginal, cannot operate but relay 1200 does operate in series with relay 4300, closing a circuit from battery through the winding of relay 3103, conductor 239, left contacts of cam 205, conductor 330, left contacts of cam 1308 to ground at the inner right front contact of relay 1200. Relay 1200 also closes a circuit from ground at the right back contact of relay 2329, left front contact of relay 1200, upper right contact of cam 1318 to the winding of sequence switch magnet 1300 and battery, so that the advance of sequence switch 1300 from position 2 to 3 is effected jointly by the operation of relay 1200 over the circuit of relay 4300 and the release of relay 2329 by the removal of battery from the test conductor.

While sequence switch 1300 is moving to position 3, ground is closed over the upper left and lower right contacts of cam 1309, resistance 1209, lower left operated contact of key 1206, conductor 1213, to the right contacts of keys 2304 and 2305 preparatory to connecting ground to the fundamental ring conductor if the corresponding key is operated. At the same time ground is connected over the upper left contacts of cams 1309 and 1310, outer upper left operated contact of key 1206, resistance 1207, conductor 270, to the inner right contact of key 2304 and the right contact of key 2317 preparatory to connecting ground to the fundamental tip conductor, depending on which of the keys is operated. Assuming that the first test call is to be one simulating the use of a trunk extending to an incoming selector, key 2317 will be operated and ground will be connected as traced over the right contact of key 2317, the middle left contact of relay 2301, conductor 1753, brush 1701, brush 1732, conductor 1764, inner back contact of relay 5100, conductor 5101 to battery through the left winding of trunk class registering relay 4700. Relay 4700 operates and locks over its right winding and right front contact to ground on conductor 5103 before relay 5100 operates as previously described to open its initial operating circuit. Relay 4700, upon operating, closes an operating circuit over its outer left front contact for relay 4702 which in turn operates and closes the circuit of relay 4703 over its right front contact.

Relay 4703 establishes a circuit for relay 5301 extending from battery through the right winding of relay 5301, conductor 5302 to ground at the outer right front contact of relay 4703. Relay 5301 locks over its left winding and inner left front contact to ground on conductor 5103 and closes a circuit for relay 5106, extending over conductor 5108, the inner left front contact of relay 5301 to grounded conductor 5103. Relay 5106, upon operating, releases relay 5200. Relay 4703 also closes a circuit extending from ground over the lower contacts of cam 5004, conductor 5005, inner left contact of relay 4703, conductor 4704, right winding of relay 5300 to battery. Relay 5300, upon operating, locks over its left winding and inner left front contact, conductor 5303, left contacts of cam 5006, conductor 5007 to ground at the right front contact of relay 5106. A circuit is also established from battery through the left winding of relay 4302, conductor 4303, outer left front contact of relay 4703, to grounded conductor 5005, relay 4302 locking over its right winding and inner left front contact, conductor 4304, lower right and upper left contacts of cam 5006, conductor 5007 to ground at the right front contact of relay 5106. The operation of relays 4302, 5106 and 5300 at this time indicates that district and office selections are to be skipped and that the association of a decoder will not be required.

With relays 4700 and 4801 operated, a circuit is established from battery, windings of transfer relays 4400 and 4401 in series, back contact of transfer relay 4402, conductor 4403, left back contact of relay 4705, inner left front contact of relay 4700, conductor 4706, inner right back contact of relay 4305, conductor 4306, inner left contact of relay 4801 to ground. Relays 4400 and 4401 lock in series over the back contact of relay 4402, outer right front contact of relay 4400, conductor 4306 to ground at the inner left front contact of relay 4801. The operation of relays 4400 and 4401 at this time indicates that the first digit received from the operator's key set, or, in this case, from the test circuit, will be registered on the relays of the thousands register, since only four digits will be transmitted. With relay 4400 operated, a circuit is established for relay 4309 extending from battery through the winding of relay 4309, conductor 4310, inner right front contact of relay 4400, conductor 4306 to ground at the inner left front contact of relay 4801. Relay 4309 locks directly to ground on conductor 4306 over its inner left front contact and closes, over its outer left front contact, an obvious circuit for relay 4305. At its right front contact, relay 4305 opens the initial operating circuit of relays 4400 and 4401. When relay 5100 operated as previously described, the fundamental tip conductor 4119 and the fundamental ring conductor 4133 were disconnected from the windings of the trunk class register relays 4700 and 4705 and these conductors are thereby made free for controlling fundamental selections.

When relay 5106 operated, as previously described, it opened the circuit for relay 5200 which released and with relays 4702 and 4302 operated, a circuit is closed from battery on conductor 4502, winding of counting relay 4200, windings of counting relays 4201 and 4202 in parallel, conductor 4203, inner left front contact of relay 4702, conductor 4707, right front contact of relay 4302, conductor 4307, left back contact of relay 5200, conductor 5201, left front contact of relay 5106, conductor 5003, left contacts of cam 5002 to ground on conductor 5103. Relays 4200, 4201 and 4202 operate, relay 4202 closing a circuit from ground over its contact, conductor 4204, outer left back contact of relay 5202, conductor 5203, upper contacts of cam 5008, winding of magnet 5000 for advancing control switch 5000 into position 3. Upon reaching position 3, with the skip office relay 5300 operated, relays 4200, 4201 and 4202 lock over the front contact of relay 4200, conductor 4205, right contacts of cam 5009, conductor 5010, the outer left front contact of relay 5300, conductor 5303 and the left contacts of cam 5006, conductor 5007 to ground at the right front contact of relay 5106. Relays 4200, 4201 and 4202 remain operated until switch 5000 leaves position 6. Relay 4201 at its contact holds the fundamental control circuit opened and when switch 5000 reaches position 3 with relay 4202 operated, a circuit is established from battery, winding of magnet 5000, contact of cam 5001, upper right contact of cam 5011, conductor 5012, outer left front contact of relay 4302, conductor 4308, lower left and upper right contacts of cam 5008, conductor 5203, left back contact of relay 5202, conductor 4204, to ground at the contact of relay 4202. A circuit is also established at this time for relay 5111 from battery, left winding of relay 5111, conductor 4308 and thence to ground at the contact of relay 4202 as just traced. Relay 5111 operates and locks over its right winding and right contact, inner left back contact of relay 5112, conductor 5303, left contacts of cam 5006, conductor 5007 to ground at the right contact of relay 5106, relay 5111 remaining operated until control switch 5000 reaches position 7. Switch 5000 advances into position 4, releasing relay 4302 as it leaves position 3 and is advanced from position 4 into position 6 over a circuit extending from battery, winding of magnet 5000, conductor 5013, inner right front contact of relay 5300, conductor 5304, upper contacts of cam 5002 to ground on conductor 5103. Upon reaching position 6, with relay 5300 operated, relay 4302 released and relay 4202 operated, a circuit is established from ground over the contact of relay 4202, conductor 4204, left back contact of relay 5202, conductor 5203, upper right and lower left contacts of cam 5008, conductor 4308, left back contact of relay 4302, conductor 5014, outer right front contact of relay 5300, conductors 5015 and 5012, upper right contact of cam 5011, contacts of cam 5001 to battery through the winding of relay 5000 advancing the sequence switch 5000 into position 7. Until all of the digits are registered, relays 4200, 4201 and 4202 remain locked in a circuit extending from the windings of these relays, contact of relay 4200, conductor 4205, and the lower right and upper left contacts of cam 5009, conductor 5016, right back contact of relay 4701, conductor 4709 to ground at the left back contact of relay 5204 or over conductor 5016, left back contact of relay 5205, conductor 5206, left back contact of relay 4511, to conductor 4523, conductor 4709 to ground at the left back contact of relay 5204.

Since key 2317 was operated to indicate that no code was to be dialed, ground over the left contact of key 2317 is connected to the no-district relay 1804 which receives battery over the upper contacts of cam 1303 as soon as sequence switch 1300 advanced from normal. With sequence switch 1600 in position 5, a circuit is closed from ground over the lower left contact of cam 1612, lower right contact of cam 1320 to the winding of sequence switch 1300 and battery, advancing the sequence switch to position 4. With relay 1804 operated, a circuit is closed from battery through the winding of sequence switch magnet 1300, lower left contact of cam 1318, left front contact of relay 1804, left back contact of relay 1805 to ground over the lower contacts of cam 1317 advancing sequence switch 1300 to position 6.

When the sender is ready to receive the designation, it transmits a signal to the operator's key set by connecting ground to the dialing ring conductor. With sequence switch 1300 in positions 4 to 6, the test circuit tests for this ground by closing a circuit from battery over the right back contact of relay 2606, conductor 1339, lower contacts of cam 1314, conductor 2215, inner right front contact of relay 2205, conductor 1752, brush 1712, brush 1733, to the dialing ring conductor 1762 of the sender, where it extends over the outer right back contact of relay 4206, right normal contact and winding of relay 4207, left back contact of relay 4208, outer left back contact of relay 4206, conductor 4209 to ground at the middle left front contact of relay 5102. Relay 4207 operates, locking to battery through resistance 4210 independent of battery supplied from the back contact of relay 2606 and extends the ring conductor 1762 over the right back contact of relay 4206, inner left front contact of relay 4207 through the windings of relays 4221, 4222, and 4223, conductor 4224, inner left front contact of relay 4305 to 24-volt battery. Relay 4207 also closes a circuit from ground at the right front contact of relay 1804, conductor 2610, through the winding of relay 2607 and its normal contact, conductor 1338, right contacts of cam 1313, conductor 2214, outer left front contact of relay 2205, conductor 1751, brush 1702, brush 1734, dialing tip conductor 1769, inner left back contact of relay 4206, outer left front contact of relay 4207 in series through the windings of relays 4211, 4212 and 4213 over conductor 4214 and the outer left front contact of relay 4305 to 24-volt battery. The connection of the dialing tip conductor to battery permits the operation of relay 2607 which locks to battery at its right front contact and closes an obvious circuit for relay 2606, disconnecting battery from the tip conductor. With relay 2606 operated, the tip conductor is extended from the right contacts of cam 1313, conductor 1338, inner right front contact of relay 2606, to the inner left contact of relay 1901 and interrupter 1905 for the transmission of pulses, while the ring conductor is extended from the lower contacts of cam 1314 over conductor 1339, right alternate contact of relay 2606, conductor 2612, to the inner right contact of relay 1901 and interrupter 1906. The tip conductor also extends to battery through the winding of relay 2603 and the ring conductor extends to battery through the winding of relay 2605 but these relays are so polarized as to be unresponsive to current flow during pulsing.

As soon as sequence switch 1300 reaches position 6 a circuit is closed from battery through the windings of the thousands transfer relays 2015 and 2016, left back contact of hundreds transfer relay 2023, right back contact of the over-ten-thousand relay 2003, left back contact of the nonumerical-digits relay 2000, right back contact of relay 1901 to ground over the upper right contact of cam 1317. Relay 2015 closes a locking circuit for itself and relay 2016 over the back contact of relay 2023, right front contact of relay 2015, conductor 2134, left back contact of relay 2123, left back contact of relay 2130, to ground at the lower right contact of cam 1323. With relay 2016 operated and sequence switch 1300 in position 6, relay 1900 operates in a circuit over the back contact of relay 1903, outer right back contact of relay 1910, left back contact of relay 1901, interrupter 1904, inner left front contact of relay 2606, to ground at the inner right contact of relay 2016 as soon as the interrupter closes its contact. Relay 1900 locks in a circuit over the back contacts of relays 1903 and 1910, winding of relay 1901, contact of relay 1900 to ground at the lower right contact of cam 1323 but relay 1901 does not operate until the interrupter contact opens. Relay 1901 extends the tip and ring conductors over interrupters 1905 and 1906 to contacts of relay 2016 which completes the circuits for the thousands digit. It also places the transfer relays under the control of interrupter 1904. The three interrupters 1904, 1905 and 1906 operate simultaneously.

It will be assumed that the first test number is 1379. Therefore keys 901, 913, 827 and 839 will have been operated, and sequence switches 1000 and 1100 set in positions 4 and 2, respectively. The first closure of interrupter 1905 following the operation of relay 1901 extends the tip conductor over conductor 1912, inner left contact of relay 2016, upper contacts of cam 1106, of the thousands register to ground through low resistance 527. At the same time interrupter 1906 extends the ring conductor over conductor 1913, outer right front contact of relay 2016, left contacts of cam 1101, to ground through high resistance 530. The closure of interrupter 1904, which occurs at this time, completes a circuit from ground as previously traced over the interrupter, outer left front contact of relay 1901, left back contacts of relays 2001, 2004 and 2009, inner right back contact of relay 2003, left front contact of relay 2015, right contacts of cam 1307, lower contacts of cam 3723, assuming that the class switch is in position 1, winding of relay 2022 to battery. Relay 2022 closes a locking circuit for itself through the winding of the hundreds transfer relay 2023, over the left back contact of relay 2105, right front contact of relay 2022, conductor 2134, and thence to ground as traced for relays 2015 and 2016. When interrupter 1904 opens, relay 2023 operates in this locking circuit. The operation of relay 2023 opens the locking circuit of relays 2015 and 2016 causing them to release and open the pulsing circuit to the sender.

In the sender, since low resistance ground was connected to the tip conductor extending to relays 4211, 4212 and 4213, sufficient current flows to operate both the sensitive relay 4213 and the marginal relay 4212. The polarized relay 4211 does not receive current in the proper direction through its winding to cause its operation. Relay 4213 upon operating, with transfer relay 4400 operated, establishes a circuit from ground over its contact, over conductor 4215, left back contact of transfer relays 4311 and 4312, conductor 4313, left back contact of transfer relay 4404, left front contact of transfer relay 4400 to battery through the winding of transfer relay 4405. Relay 4405 operates and locks in series with the winding of relay 4402, back contact of relay 4406, left front contact of relay 4405 to ground on conductor 5103, but relay 4402, being shunted as long as relay 4213 remains operated, does not operate at this time. Relay 4212 upon operating closes a circuit extending from ground at its contact over conductor 4216, inner left contact of relay 4401, which it will be recalled was operated in series with relay 4400 to indicate that the digit was to be recorded on the relays of the thousands register, to battery through the left winding of the thousands register relay 4497. Relay 4497 upon operating locks over its right winding and inner left front contact, conductor 5109 to ground at the inner right front contact of relay 5102. When relays 2015 and 2016 release in the test circuit, relays 4212 and 4213 release in the sender, relay 4213 opening the shunt around the winding of relay 4402 whereupon relay 4402 operates in the locking circuit of relay 4405, opening at its right contact the locking circuit of relays 4400 and 4401 whereupon these relays release. Relay 4401 disconnects the operating circuits for the relays of the thousands register from the contacts of impulse relays 4211, 4212, 4221 and 4222, and relay 4402 upon operating connects the contacts of the impulse relays to the windings of the hundreds register relays.

With relays 2022 and 2023 operated, the next closure of interrupters 1905 and 1906 connects the tip and ring pulsing conductors to the inner left and right front contacts of relay 2023, respectively. The tip conductor is extended over the left front contact of relay 2023, upper left contacts of cams 1018 and 1019 to battery through low resistance 529 and the ring conductor is extended over the right contact of relay 2023, left contacts of cam 1013 to ground through high resistance 530. With these circuits closed the direction of current flowing through the windings of relays 4211, 4212 and 4213 is such as to operate polarized relay 4211 and due to the strength is sufficient to operate relay 4212 as well as relay 4213. Relay 4213 upon operating, with transfer relay 4400 released and transfer relay 4505 operated, closes a circuit from ground as traced to conductor 4313, thence over the left back contacts of relays 4404 and 4400, right front contact of relay 4405 to battery through the winding of transfer relay 4407. Relay 4407 operates and locks in series through the winding of relay 4406, over conductor 4408, back contact of relay 4503, conductor 4504, left front contact of relay 4407, to ground on conductor 5103, but relay 4406, being shunted as long as relay 4213 remains operated, does not operate at this time. Relay 4212 upon operating closes a circuit extending from ground at its contact over conductor 4216, inner left contact of relay 4402 to battery through the right winding of hundreds register relay 4409. Relay 4409 upon operating locks over its left winding and inner left front contact, to conductor 4411, winding of relay 4803 to ground on conductor 5109. Relay 4211 upon operating closes a circuit extending from ground at its contact over conductor 4217, next inner left contact of relay 4402, right winding of register relay 4410 to battery. Relay 4410 upon operating locks over its left winding and inner left front contact, conductor 4411, winding of relay 4803 to ground on conductor 5109.

With relay 2022 operated the closure of interrupter 1904 which accompanies the transmission of the hundreds digit completes a circuit from battery through the winding of the transfer relay 2104, left front contact of relay 2022, back contacts of relays 2015, 2003, 2009, 2004, 2001, outer left front contact of relay 1901 to ground through interrupter 1904. Relay 2104 locks through the winding of relay 2105 over the back contact of relay 2112, and conductor 2134 as previously traced, but relay 2105 does not operate until the interrupter opens its contact. When this occurs the locking circuit of relays 2022 and 2023 is opened and these relays release, terminating the hundreds pulse. With relay 2105 operated, the circuits controlled by interrupters 1905 and 1906 extend over the inner right front contact of relay 2105, outer right contact of key 827, outer right front contact of relay 515 to battery through high resistance 528 and over the outer right front contact of relay 2105, inner right contact of key 827, inner right front contact of relay 516, to ground through low resistance 531.

At the termination of the hundreds digit, relays 4211, 4212 and 4213 release, relay 4213 opening the shunt around the winding of relay 4406 whereupon relay 4406 operates in the locking circuit of relay 4407, opening at its back contact the locking circuit of relay 4405 and 4402 whereupon these relays release, relay 4402 disconnecting the operating circuits of the relays of the hundreds register from the contacts of impulse relays 4211, 4212, 4221 and 4222, and relay 4406 upon operating connecting the contacts of these impulse relays to the windings of the tens register relays. When the circuits above traced through interrupters 1905 and 1906 are completed, the connection of battery through high resistance 529 over the tip conductor to 24-volt battery through the windings of relay 4211, 4212 and 4213 produces a current the direction of which is such as to operate the polarized relay 4211. Since the high resistance has been included in the impulsing path, marginal relay 4212 does not operate, but relay 4213 operates. Relay 4213 upon operating, with transfer relay 4405 released, and transfer relay 4407 operated, closes a circuit from ground as traced to conductor 4313, left back contacts of relays 4404 and 4400, right back contact of relay 4405, right front contact of relay 4407, conductor 4412 to battery through the winding of transfer relay 4505. Relay 4505 operates and locks in series with the winding of relay 4503, right contact of relay 4506, outer left front contact of relay 4505, to ground on conductor 5103, but relay 4503 being shunted as long as relay 4213 remained operated, does not operate at this time. Relay 4211 upon operating closes a circuit extending from ground at its contact over conductor 4217 and next inner left contact of relay 4406 to battery through the right winding of relay 4413 of the tens register. Relay 4413 upon operating locks over its left winding and inner left front contact to ground on connector 5109. Low resistance ground connected over the ring impulsing path to 24-volt battery through the windings of impulse relays 4221, 4222 and 4223 produces a current which is not in the proper direction to operate polarized relay 4221, but since a low resistance has been included in the impulsing path, is sufficient to operate both the sensitive relay 4223 and the marginal relay 4222. Relay 4223 merely duplicates the function of relay 4213 already described, but relay 4222 connects ground at its contact over conductor 4218, outer left contact of relay 4406, conductor 4414 to battery through the right winding of relay 4804 of the tens register. Relay 4804 upon operating locks over its left winding and inner left front contact to ground on conductor 5109.

With relay 2104 operated, this closure of interrupter 1904 causes the operation of relay 2111 in a circuit similar to that traced for relay 2104. Relay 2111 locks through the winding of relay 2112 over the back contact of relay 2118 and conductor 2134 in a manner similar to the tens transfer relay, but relay 2112 does not operate until the interrupter opens at the termination of the tens digit. When relay 2105 releases, impulse relays 4211, 4213, 4222 and 4223 release, relays 4213 and 4223 opening the shunt around the winding of relay 4503 whereupon relay 4503 operates in the locking circuit of relay 4505, opening at its right contact the locking circuit of relays 4406 and 4407, whereupon these latter relays release, relay 4406 disconnecting the operating circuits of the relays of the tens registers from the contacts of the impulse relays and relay 4503 connecting the contacts of the impulse relays to the windings of the units register relays.

With relay 2112 operated, the following closure of interrupters 1905 and 1906 connects the tip conductor over the left contact of relay 2112, over the inner right contact of relay 2112 to the outer right contact of units key 839 and thence over the outer left front contact of relay 515 to ground through high resistance 530, and the ring conductor over the outer right front contact of relay 2112, inner right contact of key 839, outer left front contact of relay 516, to battery through low resistance 529. Therefore, due to the connection of battery through a low resistance to the windings of relays 4221, 4222, 4223, all three of these impulse relays operate. Relay 4223 upon operating connects ground at its contact as previously traced to conductor 4313, left back contacts of transfer relays 4404 and 4400, right back contacts of transfer relays 4405 and 4407, conductor 4415, inner left front contact of transfer relay 4405 to battery through the winding of transfer relay 4507. Relay 4507 operates and locks through the winding of relay 4506, inner back contact of relay 4508, outer front contact of relay 4507, to ground on conductor 5103, but relay 4506 being shunted as long as relay 4223 remains operated, does not operate at this time. Relay 4221 upon operating closes a circuit extending from ground at its contact, over conductor 4219, next to outer left contact of relay 4503, conductor 4509, right winding of units register relay 4902 to battery. Relay 4902 upon operating locks over its left front contact, conductor 5110 to ground at the inner left front contact of relay 5102. Relay 4222 upon operating closes a circuit extending from ground at its contact over conductor 4218, outer left contact of relay 4503, conductor 4510 to battery through the right winding of units register relay 4903. Relay 4903 operates and locks over its left winding and inner left front contact to ground on conductor 5110. The connection of ground through the windings of impulse relays 4211, 4212 and 4213 causes the current flow of such strength and direction that only relay 4213 operates, duplicating the function of impulse relay 4223 already described.

The resistances which have been applied by the test circuit through the sender registers during registration are intended to make operate tests of the polarized and sensitive relays included in the tip and ring conductors and operate and non-operate tests of the marginal relays. Over a series of tests, the test numbers used should be such that all of the relays are tested. Interrupters 1904 and 1905 and 1906 operate simultaneously giving pulses of about .300 of a second open and .500 of a second closed. From the previously traced operations it will be apparent that, while the first digit is being registered during the interrupter closure following the operation of relay 1901, ground through interrupter 1904 is operating the first of the transfer relays belonging to the next digit, while during the next open period the corresponding cut-in relay operates and the register is prepared for the next digit. Each cut-in relay upon operating releases the previously used pair of relays.

Since no stations digit was included in the test number, the zero stations key 940 will be operated and relay 1907 is operated from ground at the outer left contact of key 940 as soon as relay 2606 operates. With relay 1907 operated, the operation of relay 2111 closes a circuit from battery through the winding of relay 2122, front contact of relay 1907, left front contact of relay 2111, back contacts of relays 2104, 2022, 2015, 2003, 2009, 2004, 2001, left front contact of relay 1901 to interrupter 1904. Relay 2122 closes a circuit through the winding of relay 2123 over its right contact and the back contact of relay 2130 to ground as previously traced, but relay 2123 can not operate until relay 2111 releases at the termination of the digit. With relay 1907 normal, the stations transfer relay 2117 would be operated and relay 2122 would await the operation of relay 2117 when it would be operated over the back contact of relay 2003 and the front contact of relay 2117. With relay 2123 operated the tip conductor is extended at the closure of interrupter 1905 over the inner left front contact of relay 2123 to ground through resistance 2131 and the ring conductor is extended on the closure of interrupter 1906 over the inner right contact of relay 2123, to battery through high resistance 528. This transmits the start signal to the sender, the code being different from any of the codes used for registration.

The connection of battery to the ring conductor causes current to flow through the windings of relays 4221, 4222 and 4223 in such a direction as to operate polarized relay 4221 and of sufficient strength to operate sensitive relay 4223, but not to operate marginal relay 4222. Relay 4223 at its contact connects ground to conductor 4415 as previously traced and thence over the inner left back contact of transfer relay 4505, inner front contact of relay 4507, strap 4517 to battery through the winding of transfer relay 4511 which operates and locks through the winding of relay 4508, the left front contact of relay 4511, to ground on conductor 5103, but relay 4508, being shunted as long as relay 4223 remains operated, does not operate. Relay 4221 closes an obvious circuit for relay 4220 and closes a circuit from ground over conductor 4219, the next outer left contact of relay 4506, conductor 4512 to battery through the right winding of stations register relay 4904. Relay 4904 upon operating locks over its left winding and inner left front contact to ground on conductor 5110 and at its outer contact closes an obvious circuit for register relay 4905. The connection of ground through low resistance 2131 to the tip conductor creates current flow which does not operate polarized relay 4211, but does operate sensitive relay 4213 and marginal relay 4212. Relay 4213 upon operating duplicates the function of relay 4223. Relay 4212 upon operating closes a circuit for relay 4225 over the front contact of relay 4220, relay 4225 locking to ground on conductor 5103. Relay 4212 also closes a circuit from ground over conductor 4216, inner left contact of relay 4506 to battery through the left winding of relay 4513. Relay 4513 operates and locks over its right winding and inner left front contact to ground on conductor 5110 and extends a holding ground over conductor 4514, middle front contact of register relay 4904, conductor 4906 to battery through the winding of relay 4515 thereby operating relay 4515.

With relay 2123 operated the closure of interrupter 1904 completes a circuit from battery through the winding of relay 2129 over the outer right front contact of relay 2123, back contacts of relays 2003, 2009, 2004 and 2001, outer left front contact of relay 1901 to interrupter 1904 and ground as previously traced. Relay 2129 locks through the winding of relay 2130, right front contact of relay 2129, to ground at the lower right contact of cam 1323. When the interrupter opens, relay 2130 operates in this locking circuit, and opens the locking circuit of relays 2122 and 2123 to terminate the start impulse. At the termination of the start impulse, relays 4221, 4223, 4212 and 4213 release. Relay 4221 in turn releases relay 4420 which at its back contact contacts ground from conductor 5103, over the front contact of relay 4225, back contact of relay 4220, conductor 4226 to battery through the winding of start relay 4701. Relays 4213 and 4223 upon releasing remove the shunt from the winding of relay 4508 which now operates in the holding circuit of relay 4511, opening at its inner right back contact the holding circuit of relays 4506 and 4507 which now release.

Had the test number been over 9999 or a numerical designation followed by stations letter, then a fifth digit would have been transmitted before the start impulse. In that case the relays of the stations register would have been operated in accordance with the fifth digit transmitted and then the transmission of the start impulse would have operated start relay 4701 in the manner described. In exchange areas where only four and seven digit numbers are used, the operator's position and the sender may be modified so as to start automatically without the use of the start key. This is described in the above identified patent to W. B. Strickler.

Since this has been assumed to be a full mechanical call, completed over incoming and final selectors, the class sequence switch 3700 will have been positioned in position 1 and the arrival of sequence switch 1300 in position 5 closes a circuit from battery through the winding of sequence switch magnet 3800, lower right contact of cam 3824, left contacts of cam 3724, inner lower normal contact of key 3000, conductor 241, lower left contact of cam 1305 to ground, advancing sequence switch 3800 to position 2. Since the no district key 1405 was operated, a circuit was closed in positions 2 and 3 of sequence switch 1300 from battery through the winding of relay 3608, conductor 3615, upper right and lower left contacts of cam 1302, left contact of no district key 1405, conductor 1482, upper contacts of cam 3309, conductor 3332, to ground over the lower left contact of cam 3808. Relay 3608 locks over its outer right contact, conductor 3614 and the lower contacts of cam 1302 to the same ground holding relay 3608 until sequence switch 3800 leaves position 3. It also operates relay 3609 from the same ground. When sequence switch 3800 reaches position 2, relay 3609 closes the usual operating circuit for magnet 3800, advancing that sequence switch out of position 2 and since relay 3609 is held operated, it also advances it out of position 3, and into position 4. Since the skip office key 1425 is also operated, ground over the left contact of that key, conductor 1481, and the lower contacts of cam 3818 is connected to conductor 3614 holding relays 3608 and 3609 operated through position 5 thereby advancing sequence switch 3800 to position 6 where they release.

When the start relay 4701 of the sender operates, a circuit is established from battery, winding of relay 4206, inner right normal contact of relay 4208, conductor 4228, outer left front contact of relay 4701, conductor 4708 to ground at the inner right front contact of relay 4801. Relay 4206 releases relay 4207, connects 48-volt battery through resistance 4229, over its outer right front contact to the ring impulsing path and 48-volt battery through the winding of marginal relay 4208 over its inner left front contact to the tip impulsing path as a release signal to the operator's key set. In the test set the impulsing paths are connected respectively to polarized relay 2605 and 24-volt battery and polarized relay 2603 and 24-volt battery. The current flow through these relays is now in the operative direction and both operate. With relays 2603 and 2605 operated a circuit is closed from ground over the right front contacts of relays 2605 and 2603, normal contact and winding of relay 2400 to battery. Relay 2400 locks over its inner right contact and the lower contacts of cam 1317 to ground. When sequence switch 1300 reached position 4, a circuit was closed from ground over the lower contacts of cam 1317, left back contact of relay 2400 to the winding of relay 2415 and battery. Relay 2415 closed an obvious circuit for relay 2408. The operation of relay 2400 opens the operating circuit of relay 2415 which releases, in turn releasing relay 2408, but both of these relays are slow to release, so that for an interval relays 2408 and 2400 are both operated, and ground through resistance 2407 is connected to the pulsing tip conductor, as an indication that the release signal has been received, thereby operating marginal relay 4208 in the sender, which locks over its inner right contact to ground on conductor 4228 and opens the circuit of relay 4206 which releases. When relay 2408 closes its back contact, ground over the front contacts of relays 2603 and 2605 is connected to the winding of relay 2608 which operates, locking to ground over the lower contacts of cam 1317. Relay 4206 upon releasing opens the operating circuits of relays 2603 and 2605, relay 2605 now releasing, but relay 2603 being held by relay 2608. Relay 2605 upon releasing closes a circuit from ground at its back contact, outer left contact of relay 2608, winding of relay 2609 to battery. Relay 2609 operates and connects ground over its right contact, upper left contact of cam 1319, to the winding of sequence switch magnet 1300 and battery advancing the sequence switch to position 7. The advance of sequence switch 1300 to position 6 releases relays 2400, 2608, 2603 and 2609.

With sequence switch 3800 in position 6 the trunk test circuit previously traced is established in the test circuit. With selection control switch 5000 in position 7, a circuit is closed for operating relay 4805 extending from battery, winding of relay 4805, inner left back contact of class relay 4806, conductor 4807, upper left contact of cam 5017 to ground at cam 5004. With relay 4805 operated, assuming the thousands register relay 4497 operated, a circuit is closed transferring the thousands registration to relay 5306. This circuit extends from battery through the winding of relay 5306, conductor 5307, outer left front contact of relay 4805, conductor 4808, inner left front contact of thousands register relay 4497 to ground on conductor 5109.

With start relay 4701 operated or relay 4511 operated, the locking circuit for relays 4200, 4201 and 4202 is opened and these relays release. Relay 4201 closes the fundamental circuit in the sender. Since for a call of the class assumed, relays 5205, 5211, 5212 and 5220 of the class register and class relay 4806 are not operated and relays 5213 to 5217 of the compensating resistance register have not been set, the fundamental circuit may be traced from battery through relay 3004 in the sender and thence as previously traced to brush 1732, conductor 1764, left back contact of relay 5113, outer left back contact of relay 5112, conductor 5114, right contacts of cam 5019, conductor 5020, outer left back contact of relay 4806, conductor 4812, resistance 5018, lower left and upper right contacts of cam 5021, conductor 5022, back contact of compensating resistance relay 5217, conductor 5218, winding of trunk test relay 5144, conductor 5116, back contact of counting relay 4201, conductor 4230, left winding of overflow relay 5117, conductor 5118, upper contacts of cam 5023, conductor 5024, back contact of compensating resistance relays 5215 and 5216, conductor 5219, right contacts of cam 5025, conductor 5026, right back contact of relay 5113, conductor 1763, brush 1731 and thence to ground at the right front contact of relay 3103. Relay 5144 operates in this circuit but relay 5117 does not operate. Relay 5144 causes the operation of relays 5119 and 5120, relay 5120 locking over conductor 5121 to ground over the lower right contact of cam 5027 and the lower left contact of cam 5004 until control switch 5000 leaves position 9, closing a circuit for relay 5112 extending from battery, winding of relay 5112, conductor 5122, right back contact of relay 4806, conductor 4813, right back contact of relay 5220, conductor 5221, left contacts of cam 5028, conductor 5029, outer right front contact of relay 5120 to ground on conductor 5103. Relay 5112 upon operating establishes a new fundamental circuit traceable as previously described from the tip conductor 1764 to the outer left front contact of relay 5112, thence over conductor 5123, right contacts of cam 5030, conductor 5031, winding of stepping relay 5115, conductor 5116, back contact of counting relay 4201, conductor 4230, left winding of overflow relay 5117, conductor 5118 and thence as traced to the ring trunk conductor 1763. It will thus be noted that the operation of relay 5112 is effective at this time to remove the trunk test relay 5144 and resistance 5018 from the fundamental circuit, thereby reducing the resistance of the circuit to such a degree as to cause the operation of relay 3004 in the test circuit and the operation of relay 5115 in the sender. Polarized overflow relay 5117 does not receive current in the proper direction to operate at this time. Relay 5144 now releases followed by the release of relay 5119. Relay 5112 upon operating also releases relay 5111 which at its left back contact shunts the left winding of overflow relay 5117 by the resistance 5124. The sender is now conditioned for controlling the incoming selector in its brush selecting movement.

Incoming and final selections and the operation of the test circuit take place as described for subscribers' senders up to the point of incoming advance causing reverse battery closure. The operation of the sender which is very similar to that for the subscriber's sender in its control of selectors is described fully in the above identified Strickler patent and therefore will not be described in detail here. The reverse battery circuit is established in position 15 of sequence switch 3800 as previously described except that the fundamental ring conductor extends as previously traced over the lower contacts of cam 3719, conductor 1333 through the winding of relay 3104, conductor 622, back contact of relay 611, conductor 3839, left contacts of cam 3820 to the winding of relay 3004 instead of over the lower contacts of cam 1311 as traced when testing subscribers' senders. Relay 3104 operates in this reverse battery circuit operating relay 3105 which locks over its right contact, left front contact of relay 1200 to ground at the right back contact of relay 2329. Relay 3004 operates as before to ground interrupter 3200, which in turn operates relays 3201, 3202 and 3205 to advance sequence switch 3800 after the reverse battery closure has been maintained for a predetermined interval. Relays 5115 and 5117 in the sender also operate in the reverse battery circuit, relay 5117 locking from battery through its right winding, conductor 5127, upper left and lower right contacts of cam 5049, conductor 5050 to ground at the front contact of relay 5117. Relay 5117 also operates relay 5202 which at its back contact opens the operating ground for the counting relays and, with stepping relay 5115 operated, closes a circuit for operating the No. 0 counting relay 4200. As soon as the reverse battery is disconnected in the test circuit, relay 5115 releases and counting relays 4201 and 4202 lock in series with the winding of relay 4200. Relay 4201 upon operating opens the fundamental circuit and relay 4202 operates relay 5113. The circuit of relay 5113 may be traced from ground at the front contact of relay 4202, conductor 4204, outer left front contact of relay 5202, conductor 5226, to battery through the winding of relay 5113. Relay 5113 upon operating closes a circuit for relay 5128 over the front contact of relay 5104, conductor 5129, upper left and lower right contacts of cam 5045, conductor 5203 to ground at the inner left front contact of relay 5113. With relay 5128 operated the fundamental tip conductor 1764 is connected through 500 ohm resistance 5130, front contact of relay 5138, to ring conductor 1763 of the fundamental circuit, thus simulating the trunk closure which is usually made when a district selector is employed in an established connection.

A satisfactory test of the reverse battery closure which takes place as described for subscribers' senders, advances sequence switch 3800 to position 16. With sequence switch 3800 in position 16 the trunk closure by the sender above described is tested, since the fundamental tip conductor is extended over the left contacts of cam 3821 to conductor 3841, winding of relay 1800, conductor 1806, to the point of junction between resistances 3106 and 3107 while the fundamental ring conductor is extended over the left contacts of cam 3819, conductor 3842, winding of relay 1205, conductor 1214, to the opposite terminal of resistance 3107. The circuit traced for full mechanical calls from battery over the right contacts of cam 3709, conductor 1214, through resistances 3107 and 3106, to ground over the upper left contact of cam 3803 is reestablished in position 16 of sequence switch 3800 and the connection of the tip and ring conductors to the opposite terminals of resistance 3107 produces a potentiometer arrangement such that a short circuit established in the sender will operate both relays 1800 and 1205, but a ground on either one of these conductors will operate only one of the relays. With sequence switch 1300 off-normal, ground over the left contacts of cam 1317 and conductor 1336 is connected to the winding of relay 1801 so that the joint operation of relays 1800 and 1205 now closes a circuit from ground over the front contact of relay 1800, front contact of relay 1205, right front contact of relay 1801, left back contact of relay 1802, winding of relay 1803 to battery. Relay 1803 locks over its left contact, to grounded conductor 1336.

The connection of the fundamental tip and ring in the sender is maintained under the control of the test circuit. Relay 5128, which makes the trunk closure in the sender, upon operating also extends its operating ground to battery through the winding of relay 5105 which locks over its left front contact to ground on conductor 5103 locking relay 5128 operated. Relay 5105 opens the circuit of slow release relay 5104 which releases. With relay 5105 operated, when relay 5104 releases, ground on conductor 5103 is extended over the left front contact of relays 5105 and 5128, normal contact of relay 5104, right front contact of relay 5105, right back contact of relay 5131, conductor 5132 to battery through the winding of relay 4710. Relay 4710 upon operating locks over its right contact to ground on conductor 5103 and at its left back contact opens the shunt around the high resistance winding of relay 4300. The current now flowing through the windings of relay 4300, 1200 and 1201 is not of sufficient strength to maintain relay 1200 operated and it releases.

The interval between trunk closure and the connection of high resistance to the circuit of relay 1200 is measured by the test circuit. When the reverse battery circuit is opened, by the advance of sequence switch 3800 to permit trunk closure by the sender, relay 3104 which was included in the fundamental circuit releases and extends the locking ground from relay 3105 over the back contact of relay 3104, to the winding of relay 2418. Relay 2418 in operating connects ground to conductor 3614, supplying ground to the locking circuit of relays 3608 and 3609. It also connects ground over its outer right contact to conductor 2923 which is extended over the back contact of relay 2908 and conductor 2424, to interrupter 2419 which, with relay 2418 operated is connected over the outer left contact of relay 2418, to the back contact of relay 3916 and the winding of relay 3906. Relays 3906 and 3916 and the remaining counting relays operate in succession under the control of interrupter 2419 and when relay 3910 operates, a circuit is closed from the grounded interrupter over the front contact of relay 3910, conductor 3959, inner left front contact of relay 2418, outer right front contact of relay 1200 if that relay is still operated, winding of relay 1802 to battery. The operation of relay 1802 therefore is the test of the minimum time interval between the closure of the short circuit in the sender and the connection of high resistance in series with relay 1201 and 1200. Relay 1802 operates, locks over its right contact to ground on conductor 1336. When relay 1200 does release due to the connection of high resistance in its circuit, a circuit is closed from battery through the winding of sequence switch magnet 1300, upper right contact of cam 1320, left front contact of relay 1802, right front contact of relay 1803, left back contact of relay 1200, to ground at the right back contact of relay 2329, advancing sequence switch 1300 to position 8. Sequence switch 1300 is then advanced to position 9 in a circuit over the upper left contact of cam 1320, left back contact of relay 1204, right back contact of relay 1203, inner right back contact of relay 1201, conductor 1216, left back contact of relay 1902, conductor 1911 to ground over the lower contacts of cam 3704. With sequence switch 1300 in position 9, a circuit is closed from battery through the winding of sequence switch magnet 3800, lower left contact of cam 3824, conductor 3844 outer lower left alternate contact of start key 2200, conductor 2216, right contacts of cam 1301, conductor 1335, to ground at the upper right contact of cam 214. Sequence switch 3800 advances to position 1, restoring the normal checking path from ground to conductor 1021. With sequence switch 1300 in position 9, a circuit is closed from battery through the winding of sequence switch magnet 1600, lower left contact of cam 1603, right normal contact of key 2207, inner upper normal contact of key 2300, conductor 2332, left contacts of cam 1306 to conductor 1021 and ground over the restored normal checking path. Sequence switch 1600 is advanced to position 6 in this circuit and from there to position 7 since relay 2203 is not operated. In position 7 relay 2329 is again connected to conductor 1766 to test for the reconnection of battery to that conductor in the sender.

When the circuit previously traced through the windings of relay 4300 is opened, relay 4300 releases in turn releasing relays 4500 and 5102. Relay 5102 upon releasing disconnects off-normal ground from conductor 5103 and relay 4500 disconnects off-normal battery from conductor 4502 whereupon all operated relays of the sender release. At its back contact relay 4500 closes a circuit from ground over conductor 4524, upper left contact of cam 5011, contact of cam 5001 to battery through the winding of magnet 5000 thus advancing sequence switch 5000 to normal position. All operated apparatus in the sender is now in normal condition and battery is again connected to conductor 1766 from the back contact of relay 4801.

The operation of relay 2329 advances sequence switch 1600 to position 8. In position 8 a circuit is closed from battery through the winding of sequence switch magnet 1600 over the upper contact of cam 1605, inner right back contact of relay 2202, left back contact of relay 2203, to ground over the upper right contact of cam 1612 advancing sequence switch 1600 to position 9. In this position the sender selector magnet is energized and in cooperation with relay 1623 advances the sender selector one step and the connector sequence switch to position 1. When the ground over the left contact of cam 1610 advances sequence switch 1300 to position 10, which is the equivalent of position 1, sequence switch 1300 is advanced from that position in the manner previously described over the normal checking path, and the busy test and succeeding operations are performed in connection with the next sender.

Full mechanical call-trunk to distant office selector

Full mechanical connections may also be established where the trunk seized terminates in a distant office selector. To test the ability of the sender to establish such connections, it is necessary to set up in the test circuit a code and appropriate office selection registration although the no-district key 1405 will still be operated. In the sender upon its association with the test circuit, relays 4300 and 4500, 5102, 4801, 5100, 4900, 5104 and 5200 operate as previously described. Key 2305 is operated to indicate to the sender that the call is one to a distant office selector. With key 2305 operated, as soon as relay 2301 is operated, ground is connected to conductor 1763, outer left back contact of relay 5100, conductor 5133, right winding of trunk class register relay 4705 to battery. Relay 4705 operates and locks over its left winding and inner left front contact to ground on conductor 5103 before relay 5100 operates as previously described to open its initial operating circuit. At its right front contact relay 4705 establishes an obvious circuit for relay 4711. In this case the previously traced circuits for operating relays 4703, 5106, 5300, 5301 and 4302 are not established.

With relay 4801 operated and relay 4700 not operated, a circuit is established from battery, windings of transfer relays 4311 and 4314 in series, back contact of relay 4315, conductor 4316, back contact of relay 4700, conductor 4706, inner right back contact of relay 4305, conductor 4306, inner left front contact of relay 4801 to ground. Relays 4311 and 4314 lock in series over the back contact of relay 4315, conductor 4316, back contact of relay 4700, conductor 4706, outer right front contact of relay 4311, conductor 4306 to ground at the front contact of relay 4801. The operation of relays 4311 and 4314 at this time indicate that the first digit transmitted from the test circuit will be registered on the relays of the first or A code register. With relay 4311 operated, a circuit is established for relay 4305 extending from battery, winding of relay 4305, conductor 4317, inner right front contact of relay 4311, conductor 4306 to ground at the contact of relay 4801. At its right back contact, relay 4305 opens the initial operating circuit of relays 4311 and 4314. When relay 5100 operates as previously described, the fundamental tip conductor 1764 and the fundamental ring conductor 1763 are disconnected from the windings of the trunk class register relays 4700 and 4705 and these conductors are thereby made free for fundamental selection.

When relay 4801 operated, it removed battery through resistance 4802 from conductor 1766. Relay 2329 releases to advance the test as previously described. Since key 2317 is not operated, relay 1804 also is not operated. Relays 1200 and 3103 are operated as previously described advancing sequence switch 13 to position 3. When sequence switch 1600 arrives in position 5, sequence switch 1300 is advanced to position 4 as previously described. In this position a circuit is closed from battery through the windings of relay 2001 and 2002 in series, left back contact of relay 2005, left back contacts of relays 1804 and 1805, to ground over conductor 1336. These relays lock over the front contact of relay 2001, and the left back contact of relay 2010, conductor 2134 to ground as previously described. Relay 2001 extends its locking ground over its inner right front contact, to the right winding of relay 1805 and battery. Relay 1805 locks over its inner left contact, to ground over conductor 1336. Relay 1805, which is the start pulsing relay, supplies ground to the circuit of relay 2607 which operates over the pulsing tip conductor from the sender as previously described. Relay 2607 in turn operates relay 2606 which establishes the pulsing circuit. As before, the first closure of interrupter 1904 operates relays 1900 and 1901 which lock over the lower right contact of cam 1323. The code digits are now transmitted to the sender in the manner described for the transmission of the numerical digits, except that the appropriate code keys are used in determining the codes to be employed. Since the sender and the test circuit are arranged for either two or three digit codes, the circuit of relay 2004 is carried through the contact of key 404 which is normally operated for all three digit codes, extending over the outer right upper operated contact of key 404 to the front contact of relay 2001, the outer left contact of relay 1901 and interrupter 1904 to ground. Where only a two digit code is to be transmitted and key 404 is normal, the circuit from ground over the interrupter would extend over the outer upper normal contact of key 404 to the winding of relay 2009 so that no B code digit would be transmitted. However, assuming that key 404 is operated and that three code digits are to be transmitted, relay 2004 will be operated locking through the winding of relay 2005, which operates when the interrupter opens its contact in the manner previously described in connection with the trasmission of the numerical designation. In a similar manner relays 2009 and 2010 are operated under the control of relay 2004 for the transmission of the third code digit. The operation of relay 2005 opens the locking circuit of relays 2001 and 2002 and the operation of relay 2010 releases either relays 2001 and 2002 or 2004 and 2005 depending upon which was the previously operated pair. Since relay 2000 is not operated and a full designation is to be transmitted, a circuit is closed from battery through the winding of relay 2129, back contact of relay 2000, left front contact of relay 2009 and thence over the back contacts of relay 2004 and 2001 to interrupter 1904 so that relays 2129 and 2130 operate after the transmission of the third digit. Relay 2130 in operating closes a circuit from ground over its right contact, lower right contact of cam 1319 through the winding of sequence switch magnet 1300 to battery, advancing the sequence switch to position 5. When sequence switch 1300 leaves position 4, relays 1900 and 1901 release stopping the transmission of pulses. The advance of sequence switch 1300 to position 5 advances sequence switch 3800 to position 2. Relays 3608 and 3609 are operated under the control of the no-district key 1405 and advance switch 3800 to position 4. Office selections are checked in the manner previously described advancing sequence switch 3800 to position 6. The arrival of sequence switch 3800 in position 6 advances sequence switch 1300 into position 6.

When sequence switch 1300 arrives in position 6, a circuit is closed from battery through the windings of relays 2015 and 2016 in series, back contact of relay 2023, back contact of relay 2003, back contact of relay 2000, right back contact of relay 1901, to ground at the upper right contact of cam 1317. Relay 2016 in operating closes a circuit for operating relay 1900 under the control of interrupter 1904 and this relay operates followed by relay 1901 to cause the transmission of the numerical digits in the manner previously described.

In the sender the three code digits are registered on the A, B and C code registers in a manner similar to the registration of the numerical designation. The operation of transfer relay 4400 in response to the registration of the third code digit operates relay 4309 which locks to conductor 4306 closing a holding circuit for relay 4305 which has been previously operated. Relay 4309 connects battery over conductor 5134 to the decoder connector for initiating the connection of a decoder with a sender. The decoder functions the same in connection with a key pulsing sender as it does with a full mechanical sender and receives the code digit registration, translates and returns it to the selection registers in a manner fully described in the above identified patent to Raymond et al. When the decoder has completed its operation, it connects ground over conductors 4428 and 5302 to battery through the winding of relay 5301 which operates and locks over its middle left front contact to ground on conductor 5103 and extends locking ground over conductor 5108 to battery through the winding of relay 5106, thereby causing the operation of relay 5106. Relay 5106 upon operating removes the battery from the start conductor 5134 extending to the decoder connector whereupon the decoder connector releases and breaks the connection between the decoder and the sender. Relay 5106 at its right front contact connects locking ground over conductor 5007, left contacts of cam 5006, conductor 5303 for locking the operated office brush and office group relays and over the upper contacts of cam 5006 and conductor 5054 to lock the operated relays of the compensating resistance and class registers. The same ground is connected over conductor 5007 and the upper left and lower right contacts of cam 5006 to conductor 4304 serving to lock relay 4302 and the district brush and group register relays which for the call under consideration are not operated.

At its outer left back contact relay 5106 also opens the circuit of relay 5200 which releases and with relay 4302 operated from the decoder to indicate that district selections are to be skipped a circuit is established from battery on conductor 4502, winding of counting relay 4200, windings of counting relays 4201 and 4202 in parallel, conductor 4203, inner left front contact of relay 4711, next to inner left back contact of relay 4702, conductor 4707, right front contact of relay 4302, conductor 4307, left back contact of relay 5200, conductor 5201, left front contact of relay 5106, conductor 5003, left contacts of cam 5002 to ground on conductor 5103. Relays 4200, 4201 and 4202 operate, relay 4202 closing a circuit from ground over its contact, conductor 4204, outer left back contact of relay 5202, conductor 5203, upper contacts of cam 5008, winding of magnet 5000 to battery to advance the switch 5000 into position 3. Relay 4201 at its contact holds the fundamental circuit opened until after sequence switch 5000 leaves position 3. In position 3 with relay 4302 operated, a circuit is established from battery, winding of magnet 5000, contact of cam 5001, upper right contact of cam 5011, conductor 5012, outer left front contact of relay 4302, conductor 4308, lower left and upper right contacts of cam 5008, conductor 5203, outer left back contact of relay 5202, conductor 4204 to ground at the contact of relay 4202. A circuit is also established at this time for relay 5111 from battery, left winding of relay 5111, conductor 4308 and thence to ground at the contact of relay 4202 as just traced, relay 5111 locking over its right winding and contact, inner left back contact of relay 5112, conductor 5303, left contacts of cam 5006, conductor 5007 to ground at the right contact of relay 5106 and remaining operated until switch 5000 leaves position 7.

Switch 5000 advances into position 4, releasing counting relays 4200, 4201 and 4202, relay 4201 upon releasing in turn releasing relay 4302 and closing the fundamental circuit extending to the test circuit for office test. A circuit for simulating the office trunk is established in the test circuit as described for a subscriber's sender. In the sender it extends from the tip trunk conductor 1764, left back contact of relay 5113, outer left back contact of relay 5112, conductor 5114, upper right and lower left contacts of cam 5019, resistance 5018, lower left and upper right contacts of cam 5021, conductor 5022, right front contact of compensating resistance relay 5217, assuming that relay to have been operated, conductor 5236, winding of trunk test relay 5136, conductor 5116, back contact of counting relay 4201, conductor 4230, left winding of overflow relay 5117, conductor 5118, left contacts of cam 5023, conductor 5056, right front contact of compensating resistance relay 5213, assuming that relay to have been operated, 600 ohm resistance 5228, right back contact of compensating resistance relay 5214, conductor 5230, left and upper right contacts of cam 5025, conductor 5026, right back contact of relay 5113, to the ring conductor 1763.

Relay 5136 operates in the trunk test circuit operating relay 5120 which locks over conductor 5121 until the control switch 5000 leaves position 5, and closes a circuit for relay 5112. Relay 5112 establishes a new fundamental circuit traceable as previously described from the tip conductor to the outer left front contact of relay 5112, thence over conductor 5123, right contacts of cam 5030, conductor 5031, winding of stepping relay 5115, conductor 5116, back contact of counting relay 4201, conductor 4230, left winding of overflow relay 5117, conductor 5118, left contacts of cam 5023, conductor 5056, right front contact of relay 5213, resistance 5228, back contact of relay 5214, conductor 5230, left and upper right contacts of cam 5025, conductor 5026, right back contact of relay 5113, to the ring conductor. It will be noted that the operation of relay 5112 is effective at this time to remove the trunk test relay 5136 and resistance 5018 from the fundamental circuit thereby reducing resistance in the circuit to such a degree as to permit the operation of the test circuit relay 3004 and the advance of the test circuit.

Office brush and group selections take place in the sender in the same manner as occur in the subscriber's sender previously described. When sequence switch 5000 reaches position 7, the incoming trunk test circuit is established in the usual manner and from this point to the completion of the test the operations are the same as described for the previous test.

*Full mechanical call-local district selector*

On a full mechanical call simulating the use of a local district, none of the trunk class keys is operated and no trunk class registration is set up in the sender. Therefore the entire designation is registered, the decoder is employed, and all of the selections are made in a manner similar to office selections. Since neither of the trunk class register relays 4700 nor 4705 are operated for this type of call, relays 4702, 4703, 4711, 5106, 5300 and 5301 are not operated and the circuit for advancing the control sequence switch 5000 through the positions corresponding to district selections is not closed and these take place as described for subscribers' senders. Otherwise the operation is the same as for the calls previously traced.

*Full mechanical call-incoming selector to overflow*

In testing the key pulsing sender for its operation in response to the simulation of an incoming selector going to overflow, the preparation is the same as for the complete full mechanical call, except that the No. 2 class key 1562 is operated as in making the similar test for the subscriber's sender, so that sequence switch 3700 is advanced to position 2. The checking of selections takes place as previously described for the subscriber's sender through the connection of reverse battery to the fundamental circuit in simulation of the incoming selector at overflow. In the sender the reverse current over the fundamental circuit operates relays 5115 and 5117. Relay 5117 upon operating locks over its right winding, conductor 5127, upper left and lower right contacts of cam 5049, conductor 5050 to ground at the front contact of relay 5117 and extends its locking ground over the right contacts of cam 5049 to conductor 5051 thereby operating relay 5202, and over the lower left contact of cam 5049 to conductor 5068, winding of relay 5131, to battery on conductor 4502. Relay 5131 upon operating locks to ground at its middle left front contact. When relays 5115 and 5202 operate, relay 4200 operates over a circuit from battery through its winding, conductor 5040, middle contact of relay 5202, conductor 5036, right and lower left contacts of cam 5035, conductor 5034, contact of relay 5115, conductor 5033, lower right contact of cam 5017 to ground at cam 5004, locking through the windings of relays 4201 and 4202. When the test circuit opens the reverse battery closure, relay 5115 releases permitting relays 4201 and 4202 to operate. A circuit is now established from ground at the contact of relay 4202 over conductor 4204, front contact of relay 5202, conductor 5226, to battery through the winding of relay 5113. Relay 5113 then advances control switch 5000 to position 17. With switch 5000 in position 17 and relay 5113 operated a circuit is closed for relay 5128, over the front contact of relay 5104, conductor 5129, upper left and lower right contacts of cam 5045, conductor 5203 to ground at the inner left contact of relay 5113. Relay 5128 extends its operating ground to battery through the winding of relay 5105 which locks itself and relay 5128 to ground over conductor 5103 and opens the circuit of relay 5104 which releases.

Relay 5131 also closes a circuit from ground at its inner left front contact, conductor 5150, right front contact of relay 4701, conductor 4733, outer right front contact of relay 4208, inner right back contact of relay 4206, conductor 4267 to battery through the winding of relay 4734. Relay 4734 operates closing a shunt from ground at its left front contact, conductor 4735 to ground through the right winding of relay 4300 and since the high resistance left winding of relay 4300 is at the time shunted by the left back contact of relay 4710, the resistance of relay 4300 is reduced to five ohms, whereby the current flowing over conductor 1761 to battery through the windings of relays 1200 and 1201 is increased to such an extent as to cause the operation of marginal relay 1201 in the test circuit. Relay 1201 in operating closes a locking circuit for itself through its left winding and inner left front contact to grounded conductor 1336. The operation of relay 5128 closes the fundamental circuit in simulation of trunk closure in the manner described, thereby operating relays 1800 and 1205. These relays operate and a circuit is closed for relay 1803 which operates as previously described and locks. Relay 4734 also opens the operating circuit of relay 4760 which, being slow to release, closes its left contact only after an interval to complete a circuit for relay 5204. The operation of relay 5204 closes a circuit extending from battery through the winding of relay 4710, conductor 5132, right front contact of relay 5204, conductor 5245, right front contact of relay 5105, normal contact of relay 5104 and thence to ground over the locking circuit of relay 5105. Relay 4710 upon operating locks over its right front contact and at its left back contact opens a shunt around the left high resistance winding of relay 4300, thereby increasing the resistance in the circuit of relays 1200 and 1201 so that relay 1200 releases. Relay 1201 remains operated because it is locked as previously described. Relay 1801 is operated over conductor 1336 as previously described but relay 1802 is not operated since sequence switch 3700 is not in position 1. With sequence switch 3700 in any position other than 1, advance of sequence switch 1300 to position 7 following the transmission of the key release signal closes a circuit from battery, upper left contact of cam 3703, winding of relay 3006, to ground at the upper contacts of cam 1309. With relays 1803 and 3006 operated, the release of relay 1200 closes a circuit from battery through the winding of magnet 1300, upper right contact of cam 1320, front contact of relay 3006, right front contact of relay 1803, back contact of relay 1200, to ground at the back contact of relay 2329, advancing sequence switch 1300 to position 8. Sequence switch 1300 advances to position 9 in a circuit over the upper left contact of cam 1320, back contacts of relays 1204 and 1203, right front contact of relay 1201, to ground at the upper right contact of cam 3721. The restoration of the sender and test circuit to normal and the advance to the next sender take place as described hereinbefore.

*Full mechanical call-office selector to overflow*

With class key 1563 operated, the sender is tested for its ability to handle a call on which the office selector goes to overflow. For this class of call the registration takes place as for a full mechanical call and the check takes place as described for a subscriber's sender, sequence switch 3700 being in position 3 while release and restoration are the same as when incoming selectors go to normal.

*Call to three-digit operator*

With class key 1466 operated, sequence switch 3700 is advanced to position 6 and the sender is tested for its ability to handle calls to three digit operators. With sequence switch 3700 in position 6, relay 2000 receives battery over the lower right contact of cam 3703 and ground from the off-normal conductor 1336, thereby operating. The operator's code is set up on the code keys and these digits are transmitted to the sender in the manner previously described. With relay 2000 operated, the operation of relay 2009 closes a circuit from battery through the winding of relay 2122, front contact of relay 2000, left front contact of relay 2009, back contacts of relays 2004 and 2001 to ground over the outer left contact of relay 1901 and interrupter 1904. Relay 2122 locks through the winding of relay 2123 as previously described and the start signal is transmitted immediately following the third code digit. Relays 2129 and 2130 operate following the operation of relay 2123 and advance sequence switch 1300 to position 5. The check of the selections is similar to the same type of call for subscribers' senders. At the completion of selections, relays 3608 and 3609 operate in the usual manner and are held operated over the upper right contact of cam 3818 to ground over the upper right contact of cam 3710, advancing sequence switch 3800 to position 15 where the reverse battery closure is made. Sequence switch 1300 is advanced to position 6 when sequence switch 3800 reaches position 6, and when relay 2609 operates as described for a full mechanical call advances sequence switch 1300 to position 7. The remainder of the test is completed exactly as the full mechanical call.

*Full mechanical call-release with partial dialing*

In order to test the sender for its reaction to a release before the completion of dialing and following the completion of district selections, class key 1468 is operated advancing sequence switch 3700 to position 8. With sequence switch 3700 in position 8, the check of district selections takes place as previously described. Office selections are skipped or checked and trunk test made in the usual manner. When relay 2015 operates for transmitting the thousands digit, the circuit controlled thereby for operating relay 2022 is opened at the lower left contact of cam 3723 and extends over the upper left contact of that cam to the winding of relay 1910 and battery. Relay 1910 locks over its inner left contact to ground at the upper right contact of cam 1316 and therefore no digits are transmitted following the transmission of the thousands digit.

Sequence switch 1300 is advanced from position 6 in a circuit from battery through the winding of the sequence switch magnet, upper left contact of cam 1319, outer left front contact of relay 1910, conductor 258, to ground over the upper left contact of cam 3721.

With sequence switch 1300 in positions 4 to 7 and relay 1910 not operated ground is connected over the upper left contact of cam 1324, through resistance 1909, inner right back contact of relay 1910, contacts of cam 1618, conductor 1756, brushes 1715 and 1736, conductor 1766, back contact of relay 4800, outer left front contact of relay 4801, conductor 4825, inner right front contact of relay 4305, conductor 4336 to battery through the left winding of relay 5244 as a non-operate test of that relay. The operation of relay 1910 transfers the circuit of relay 5244 over the front contact of relay 1910, through resistance 1908, to ground at the back contact of relay 1902. Relay 5244 operates in series with resistance 1908 and closes an obvious circuit for relay 5204 without waiting for the release of relay 4760. With relay 5204 operated the counting relay circuit is opened so that on the attempted incoming selection, none of the counting relays will be operated and the fundamental circuit will not be opened in the sender. When relay 3932 operates, it operates relay 3603 in a circuit from battery through the winding of relay 3608, conductor 3615, outer left front contact of relay 3004, held operated in the fundamental circuit, upper left and lower right contacts of cam 3701, upper right and lower left contacts of cam 3809, conductor 3827, back contact of relay 2902, conductor 2924, left back contact of relay 3946, front contact of relay 3932 to ground as previously traced. Relay 3609 operates as before and advances the sequence switch 3800 to position 15, where reverse battery is applied to the fundamental circuit as from a selector at overflow. With relay 3004 operated in the fundamental circuit relay 3205 is operated as soon as sequence switch 3800 reaches position 15 in a circuit from battery through its winding, right contacts of cam 3714, left contacts of cam 2813, conductor 3617, inner left front contact of relay 3004 to ground at the upper right contact of cam 3704. Relay 3205 advances sequence switch 3800 to position 16.

The premature operation of relay 5131 does not cause the operation of relay 4734 in this case, since, with dialing incomplete, the start relay 4701 was not operated. Trunk closure follows causing the operation of 1803. When high resistance is connected to the circuit of relays 1200 and 1201, these relays release, relay 1200 advancing sequence switch 1300 to position 8 from which it is advanced in a circuit over the upper left contact of cam 1320, back contacts of relays 1204, 1203, 1201 and 1902, conductor 1911, to ground at the lower left contact of cam 3704. The restoration of the circuit to normal and the advance to the next sender is the same as described for the full mechanical call.

*Call indicator call trunk to tandem district selector*

In testing the operator's sender for a call indicator call, key 1574 is operated if the call is a direct call indicator call and key 2113 if the call is a tandem call indicator call, either one serving to advance sequence switch 3700 to position 13. Registration takes place exactly as for a full mechanical call. Sequence switch 3300 is used for checking the district and office selections, if used, the same as in checking similar selections during the testing of subscribers' senders although the district and office selections may be skipped through the use of the no-district and skip office keys in the same manner as described for a full mechanical call. The ability of the trunk guard relay to hold or to operate may be tested the same as for the subscribers' senders except that no stations delay is introduced by the key pulsing sender and therefore this may not be checked on this type of sender, key 2818 remaining normal throughout such tests. At the completion of trunk test, sequence switch 3300 is advanced to position 9. For direct calls relays 3508 and 3509 are operated, while for tandem calls these relays are not operated. If they are operated, they transfer the circuits controlled by the code relays 4111, 4112 and 4113 from the A code register to the stations register and also advance sequence switch 3300 directly to position 12. Relay 2829 simulates the assignment by the district operator and initiates the transmission of the call indicator pulses. If these are received satisfactorily, sequence switch 3300 is advanced to position 17 where restoration to normal and advance to the next sender are similar to the full mechanical call.

If no stations are to be transmitted, the zero stations key 940 is operated, in turn operating the no stations relay 1907. This relay causes the operation of relays 2122 and 2123 immediately after the transmission of the units digit as indicated by the operation of relays 2111 and 2112. The sender will transmit zero for the stations digit. If a stations digit is to be transmitted, relay 1907 is normal and a digit corresponding to the operated stations key is transmitted under the control of relays 2117 and 2118, which digits will be recorded on the stations register as transmitted from the sender. If a number greater than 9999 is to be used the No. 1 key in the stations column, namely key 941 will be used, although this key corresponds to a ten thousand digit. When no ten thousands digit is used, the thousands digit is zero, that is key 940 must be operated. With key 941 operated a circuit is closed from battery through the winding of relay 2003, right contacts of cam 1306, conductor 3029, outer left contact of key 941, conductor 950, to ground over the left contacts of cam 1301 as soon as sequence switch 1300 reaches position 2. Relay 3005 is also operated over conductor 3029 in parallel with relay 2003. Relay 2003 closes a circuit for relay 1907. With relay 2003 operated, when sequence switch 1300 reaches position 6, a circuit is closed from ground over the upper right contact of cam 1317, outer right back contact of relay 1901, back contact of relay 2000, outer right front contact of relay 2003, back contact of relay 2016, through the windings of relays 2118 and 2117 in series to battery thus operating these relays ready to transmit the stations digit as soon as relays 1900 and 1901 make the interrupters 1905 and 1906 operative. The operation of relay 2117 closes a circuit from battery through the winding of thousands transfer relay 2015, outer left front contact of relay 2003, outer left front contact of relay 2117, inner right front contact of relay 2003, back contacts of relays 2009, 2004 and 2001, outer left front contact of relay 1901 to interrupter 1904. Therefore the thousands digit is transmitted following the stations digit instead of the start signal. When relay 2111 operates for the transmission of the units digit, a circuit is closed from battery through the winding of relay 2122, front contact of relay 1907, front contact of relay 2111, back contacts of relays 2104, 2022, 2015, back contact of relay 2117, inner right front contact of relay 2003, and thence over the back contacts of relays 2009, 2004 and 2001 to ground over the interrupter contact so that the start signal is transmitted immediately following the transmission of the units digit.

The operation of the operator's sender in completion of call indicator calls is similar to that of the full mechanical sender. One type of trunk which would demand call indicator operation would be a trunk terminating in a tandem district selector in which case trunk class key 2304 would be operated, connecting ground to both the tip and ring conductors and operating both trunk class register relays 4700 and 4705. Relay 4700 causes the operation of relays 4702, 4703, 4302, 5106, 5300 and 5301, as described in connection with the first type of call discussed, and relay 4705 causes the operation of relay 4711 as described in connection with a previous call. The operation of relays 4302, 5106 and 5300 at this time indicates that district and office selections are to be skipped and that the association of a decoder will not be required. Relay 4711 upon operating, with relay 4703 operated, closes a circuit from ground at cam 5004, conductor 5005, next to outer front contact of relay 4703, middle right front contact of relay 4711, conductor 4721, right winding of class register relay 5212 to battery. Relay 5212 locks over its left winding and outer left front contact, conductor 5054, upper contacts of cam 5006, conductor 5007 to ground at the right front contact of relay 5106. The operation of relay 5212 indicates that the call is to be routed to a tandem office. Relay 5212 at its inner left front contact closes a circuit from ground over conductor 5231 for operating relay 4806. With relays 5212 and 5301 operated, a circuit is established from battery through the winding of relay 5137, conductor 5138, left back contact of class register relay 5211, conductor 5232, outer front contact of relay 5301, conductor 5322, outer right front contact of class register relay 5212, conductor 5233, upper right contact of cam 5027 to ground at cam 5004. Relay 5137 closes a circuit for operating relays 4253 and 4254 in series over conductor 4255 to ground at the inner right front contact of relay 5137. These relays lock over the right contact of relay 4254, conductor 4256, upper left and lower right contacts of cam 4602 of impulser switch 4600 to conductor 4603, upper left contact of cam 5027 to ground over cam 5004, after sequence switch 5000 reaches position 7 and until after the impulser switch 4600 leaves position 10 of its first revolution. Relay 5137 also closes a circuit for advancing the impulser switch 4600 out of position 1 into position 5. When the impulser switch 4600 reaches position 4 and switch 5000 reaches position 7 a locking circuit is closed for relay 5137. Relay 5137 remains operated until the impulser switch 4600 leaves position 17 in its first revolution.

With relays 4801, 4700 and 4705 operated, the transfer relays 4311 and 4314 are operated to indicate that the first digit to be received will be registered on the relays of the A code register. When the complete designation has been received, the start relay 4701 is operated. When relay 5106 operated following the operation of relay 4700, the sender control switch 5000 was advanced into position 7 in the manner previously described in connection with the call over an incoming selector, thus passing by the positions in which district and office selections are usually made. With switch 5000 in position 7 the fundamental circuit is closed for trunk test and extends from battery in the test circuit to conductor 1764 over the left back contact of relay 5113, outer left back contact of relay 5112, conductor 5114, right contacts of cam 5019, conductor 5020, outer left front contact of relay 4806, conductor 4821, upper contacts of cam 5021, conductor 5022, back contact of relay 5217, conductor 5218, winding of trunk test relay 5144, conductor 5116, back contact of counting relay 4201, conductor 4230, left winding of overflow relay 5117, conductor 5118, upper contacts of cam 5023, conductor 5024, back contact of relay 5215, back contact of relay 5216, conductor 5219, right contacts of cam 5025, conductor 5026, right back contact of relay 5113, to conductor 1763 and thence to ground in the test circuit. Relay 5144 operates in the trunk test circuit and in turn causes the operation of relays 5119 and 5120. Relay 5120 upon operating does not, in this case, cause the operation of relay 5112 since the circuit for that relay is opened at the right back contact of class relay 4806. With class relay 5212 operated, when relay 5120 operates, a circuit is closed for the call indicator relay 5139 which operates and locks to ground on conductor 5103 and closes a circuit through the winding of sequence switch magnet 5000 advancing it to position 17. As soon as relay 5139 operates, the fundamental circuit is extended from conductor 1764, left back contact of relay 5113, inner right front contact of relay 5139, outer left front contact of relay 5120, conductor 5141, left back contact of relay 5220, conductor 5218, winding of relay 5144, conductor 5116, back contact of relay 4201, conductor 4230, left winding of relay 5117, conductor 5118, upper contacts of cam 5023, conductor 5024, right back contacts of relays 5215 and 5216, conductor 5219, right contacts of cam 5025, conductor 5026, right back contact of relay 5113 to conductor 1763 until the proper trunk closure condition is established in the test circuit, relay 5144 remaining operated and the left winding of overflow relay 5117 shunted over the inner right front contact of relay 5120, middle right front contact of relay 5139, conductor 5062, and the lower right and upper left contacts of cam 5023 to prevent a false overflow condition. Condenser 5143 and resistance 5145 are connected in shunt of the winding of relay 5144 to prevent the discharge from relay 5144 from causing a false call indicator impulse to be transmitted.

When battery and ground are removed by the test circuit and the circuit through relays 4111, 4112 and 4113 is substituted as heretofore described, relay 5144 releases followed by the release of relays 5119 and 5120. With relay 5139 operated and relay 5120 released, a circuit is closed for operating relay 4251 which in turn closes a circuit through the winding of magnet 4600 of the impulse switch. Sequence switch 4600 after starting from its starting position 5 makes the remainder of the first revolution and a second revolution during which it transmits impulses corresponding to the designation set up on the incoming registers. Impulser sequence switch 4600 on leaving position 17 opens the locking circuit of relay 5137 which releases. The sequence switch is advanced from position 1 over the front contact of relay 4254 and from position 2 a circuit is maintained over the front contact of relay 4251 which permits the completion of the second revolution. On leaving position 10 of the second revolution the locking circuit of relays 4253 and 4254 is opened and these relays release. Therefore when sequence switch 4600 reaches normal at the end of the second revolution it can not advance further.

During its advance from position 5 of the first revolution to the end of the second revolution, sequence switch 4600 is instrumental in transmitting code impulses for setting the registers of the tandem sender corresponding to the setting of the registers of the sender. With a numerical designation having but four digits or having a stations digit, the stations letter is transmitted before the numerical designation, a zero being substituted for the stations letter if none is employed. If a five place designation is received, so that the first digit is one and the second digit 0, indicating a number between ten thousand and ten thousand nine hundred and ninety-nine, then thousands register relay 4497 will be operated; no register relays of the hundreds register will be operated and consequently relay 4803 will not be operated; and the stations register relays will be operated to register the units digit so that the start combination is not registered on the stations register and relay 4515 is not operated. The circuit of relay 4722 is therefore extended from battery through the winding of that relay, conductor 4728, inner right front contact of relay 4508, which operates following the reception of units digit, conductor 4531, back contact of relay 4730, conductor 4729, back contact of relay 4803, conductor 4823, right back contact of relay 4515, back contact of relay 4532, conductor 4533, left back contact of thousands register relay 4811, conductor 4808, left front contact of thousands register relay 4497, to ground on conductor 5109. The operation of relay 4722 indicates that the first set of code impulses for the ten thousands digit 1 of the numerical designation is to be received on the stations registers of the tandem sender and must be sent in the stations code. The units digit which is recorded on the stations register and may have any value from zero to 9 is to be received on the units register of the tandem sender and must be sent in the regular units code instead of the stations code. This translation is brought about by providing extra stations register relays. The manner of generating these pulses and the codes employed is clearly described in the patent to W. B. Strickler above identified and need not be described in detail here.

When switch 4600 passes from position 16½ to position 16¾ of the second revolution, the fundamental ring conductor 1763 and the fundamental tip conductor 1764 are both connected to ground. As the sequence switch passes from position 16¾ the fundamental tip conductor is opened until the switch reaches position 17¼. From position 17 to position 18¾ the fundamental ring conductor extends to ground and the fundamental tip conductor extends through low resistance 4262 to battery thus generating a heavy positive impulse. In passing through positions 19 and 20, the fundamental circuit is opened. As switch 4600 reaches position 18¾ with relay 4254 released, a circuit is established from battery through the windings of counting relays 4200, 4201 and 4202, conductor 4203, left contacts of cam 4663, conductor 4664, left back contact of relay 4254, conductor 4607, lower contacts of cam 4601 to ground. These relays operate and lock to ground at the lower contact of cam 5009. From this point the sender functions as previously described.

In order to provide means for taking care of trouble conditions which may arise in the sender, when the operations do not progress fast enough, a time measure arrangement is provided consisting of two timing circuits one for measuring the allowable interval from the time the sender is seized until all the digits have been registered and the other for measuring the allowable interval for making selections, starting from the time that all the digits have been registered. The first timing circuit consists of relays 4828, 4827, 4826 and interrupter 4829 and is started from relay 4801 when the sender is seized. The second counting circuit consists of relays 4923, 4830, 4831, 4832 and 4833 and interrupter 4834 and is started from the start relay 4701 or from relay 4827 when operated.

As soon as relay 4801 operates following the seizure of the sender and interrupter 4829 closes its contact, relay 4826 operates in a circuit extending over the back contact of relay 4827, contacts of interrupter 4829, outer left back contact of start relay 4701, conductor 4708 to ground at the inner right front contact of relay 4801, locking through the winding of relay 4827, front contact of relay 4826, thence to ground at the front contact of relay 4801. Relay 4827 does not operate in this locking circuit until interrupter 4829 opens its contacts. On the next closure of the interrupter relay 4828 operates and locks. If all the digits have been registered and start relay 4701 is operated before the above described operations are completed, relay 4828 does not operate and relays 4826 and 4827 release. If the start relay 4701 has not operated, relay 4828 causes the transmission of the key release signal, in response to which relay 4208 is operated. Relay 4208 in turn operates relay 4734, which shunts the second winding of relay 4300 to produce the reorder signal described hereinbefore.

If the start combination is transmitted and relay 4701 is operated on time, indicating that all digits have been received, a circuit is established for operating the relays of the second timing circuit. At the first closure of the contacts of interrupter 4834, relay 4923 operates and locks through the winding of relay 4830 to ground on conductor 4835, but relay 4830 is not operated until the interrupter contacts open. On the next closure of interrupter contacts, relay 4831 is operated and locks through the winding of relay 4832 to ground on conductor 4835, relay 4832 operating when the interrupter breaks its contact. If neither relay 5240 nor 5139 is operated at this time indicating that the call does not involve a distant office selector, or the transmission of call indicator code impulses, a circuit is established for relay 4833. If either relays 5240 or relay 5139 is operated, the circuit of relay 4833 is not established directly upon the operation of relay 4832, but it is delayed until after the contacts of interrupter 4834 close and open again. This is brought about as follows: When the interrupter contacts close following the operation of relay 4832, a circuit is closed through the left winding of relay 4830 for holding relay 4830 operated and in shunt of relay 4923 releasing the latter relay. When the interrupter contacts reopen the holding circuit of relay 4830 is opened and that relay also releases. A circuit is now closed for relay 4833 over the left back contact of relay 4830, the front contact of relay 4832, back contact of relay 4800 to ground at the inner left front contact of relay 4801 and relay 4833 operates. Thus for calls involving a distant office selector or full mechanical tandem equipment a longer time interval is measured before relay 4833 operates.

When relay 4833 operates, it closes a circuit for relay 4734 which in turn shunts the right winding of relay 4300 to cause the advance of the district selector or the trunk to a reorder position. Relay 4833 also connects ground to the contact of interrupter 4829 thereby starting the operation of the timing relays 4826, 4827, and 4828, which after a period of thirty to sixty seconds light the stuck sender lamp 4839 if the sender does not restore in the meantime.

*Call indicator call—Abandoned—Without distant office selector*

As in the case of the subscriber's sender, the test circuit is arranged to make two release tests, one simulating the use of a distant office selector and the other without such a selector so as to determine whether the sender makes the proper time discrimination. The operation of the sender also differs in that, if a distant office selector is required, the sender must wait following release for assignment since a heavy positive pulse is necessary for controlling the distant office selector, whereas if the selector is absent, release takes place without waiting for assignment. For testing the sender for a released call indicator call without a distant office selector, sequence switch 3700 is advanced to position 14 by the operation of key 1475. A full set of digits is recorded in the sender and the selections checked or passed by in the manner previously described. When sequence switch 1300 reaches position 7 a circuit is closed from battery through the winding of relay 1910, left contacts of cam 1307, lower left contact of cam 3721 to ground. Relay 1910 locks over its inner left contact to ground at the upper right contact of cam 1316. Relay 1910 connects ground through resistance 1908 to conductor 1766 in the manner described for the release of a full mechanical call, operating relay 5244 which in turn operates relays 5204 and 5237, thereby releasing the sender in the manner previously described. The release of relays 1200 and 3103 causes the advance of sequence switch 3300, which is used for checking call indicator calls, to position 17 and then to position 18 and advances sequence switch 1300 to position 8. Since relay 1201 has not been operated, this relay advances sequence switch 1300 to position 9 from whence the restoration takes place as previously described. The operation of relay 5237 closes a circuit for operating relay 5113 which includes the right contact of relay 5240 which is not operated since the call simulates one in which neither a distant office selector nor full mechanical tandem equipment is included. Relay 5113 advances sequence switch 5000 to position 17 where it is restored to normal in the manner described.

*Call indicator call—Abandoned—With distant office selector*

With key 1476 operated, sequence switch 3700 is advanced to position 15 in preparation for checking the sender for abandoned call indicator calls in which a distant office selector is employed. This is indicated to the sender by the operation of key 2305 which results in the operation of relay 5240. With relay 5240 operated, the circuit above traced for relay 5113 can not be closed and that relay does not operate. The sender is advanced to position 17 by the completion of the trunk test circuit in the usual manner and continues to await assignment. As described for the similar test of the subscriber's sender, the time interval is measured off and the assignment is simulated, whereupon the relay 5120 in the sender is released and the transmission of impulses started. However, since relay 5237 is operated, the low resistance battery lead used for changing the even numbered pulses to heavy negative pulses is opened and only light negative pulses can be transmitted. Likewise the high resistance battery lead used for transmitting positive pulses is also opened so that the result is the transmission of zeros for all the numbers of the designation which the test circuit is prepared to check in the manner described for subscribers' senders.

*Call to three-digit operator through distant office selector*

In testing the sender for a call simulating a call to a three-digit operator through a distant office selector, key 2106 is operated, advancing sequence switch 3700 to position 6. Trunk class key 2305 will be operated causing the operation of trunk class register relay 4705 which locks and operates relays 4711. Class relay 5205 is operated from the decoder in turn operating relay 5242. Relay 5240 is operated from the decoder to indicate that a distant office selector is to be employed and therefore when sequence switch 5000 reaches position 2, a circuit is closed from battery through the winding of relay 5220, right front contact of relay 5240, conductor 5243, left and upper right contacts of cam 5065, conductor 5066, inner right front contact of relay 5205, back contact of relay 5212, conductor 5054, upper contacts of cam 5006, conductor 5007, to ground at the right front contact of relay 5106. Relay 5220 locks to ground on conductor 5054. Selections are made as previously described and on trunk test relays 5144, 5119 and 5120 operate in succession. When relay 5120 operates, it closes a circuit from ground at the outer right contact of relay 5102, outer right front contact of relay 5120, conductor 5029, left contacts of cam 5028, conductor 5221, right front contact of relay 5220, conductor 4265, winding of relay 4258, to battery. Relay 4258 locks over its inner left front contact to off normal ground on conductor 5103. Relay 4258 in operating closes a circuit from battery through the winding of relay 5139, left back contact of relay 5131, conductor 5148, outer left front contact of relay 4258 to grounded conductor 5103. Relay 5139 in operating advances sequence switch 5000 to position 17. When the switch leaves position 9 relay 5120 releases and connects reverse battery to the fundamental circuit to advance the distant office selector. The circuits for this purpose may be traced from battery on conductor 4502, resistance 4262, inner right front contact of relay 4258, conductor 5142, outer left back contact of relay 5120, inner right front contact of relay 5139, left back contact of relay 5113, to the fundamental tip conductor 1764 and from ground over the outer right front contact of relay 4258, conductor 4260, inner right back contact of relay 5120, middle right front contact of relay 5139, conductor 5052, right contacts of cam 5023, conductor 5024, back contacts of relays 5215 and 5216, conductor 5219, right contacts of cam 5025, conductor 5026, right back contact of relay 5113 to the fundamental ring conductor 1763. As sequence switch 5000 passes through positions 12 to 16, a circuit is established for operating relay 5113, extending from battery through the winding of that relay, right contacts of cam 5065, conductor 5066, inner right contact of relay 5205, left back contact of relay 5212, conductor 5054, upper contacts of cam 5006, conductor 5007, to ground at the right front contact of relay 5106. Relay 5113 locks to ground on conductor 5103 and opens the fundamental circuit. When switch 5000 reaches position 17, a circuit is closed for relay 5128 over the front contact of relay 5104, conductor 5129, upper left and lower right contacts of cam 5045, conductor 5203, to ground at the left front contact of relay 5113. Relay 5128 upon operating extends its operating ground to battery through the winding of relay 5105 which locks over its left front contact to ground on conductor 5103, holding relay 5128 operated and opening the circuit of relay 5104 which now releases. With relay 5105 operated and relay 5104 released, ground on conductor 5103 is extended over the left front contacts of relays 5105 and 5128, normal contacts of relay 5104, right front contact of relay 5105, right back contact of relay 5131, conductor 5132, to battery through the winding of relay 4710. Relay 4710 upon operating locks over its right contact to ground on conductor 5103 and at its left back contact opens the shunt around the high resistance left winding of relay 4300. The current now flowing from ground through the windings of relay 4300 permits the release of relay 1200 as previously described.

When sequence switch 3800 reaches position 6 following the completion of office selections, the test circuit prepares to test the trunk and reverse battery closures by the sender. For this purpose the fundamental circuit is extended from the tip conductor as previously traced over the right contacts of cam 3820, right operated contact of key 2106, left back contact of relay 2600, resistance 2601, left windings of relays 2401 and 2409 to battery. The fundamental ring conductor may be traced over the upper contacts of cam 3819, conductor 3832, through the compensating resistance to conductor 3831 and ground at the lower left contact of cam 3803. At the same time a circuit is closed from ground over the back contact of relay 2409, through the right winding of relay 2401, conductor 2135, outer left operated contact of key 2106, conductor 1340 to battery over the upper contacts of cam 1303 polarizing relay 2401 against the current flowing in its left winding. A similar circuit exists from battery over conductor 2135 through resistance 2410, right winding of relay 2409 to ground over the lower right contact of cam 1316 polarizing relay 2409 to operate quickly in response to the current flow in its left winding. When the fundamental circuit is established for trunk closure in the sender as above traced, relay 2409 operates if the circuit established in the sender is a dry bridge as it should be. In operating, relay 2409 disconnects ground from the winding of relay 2401 extending that circuit through resistance 2435 and condenser 2436 to ground. Condenser 2436 will therefore be charged from the battery connected to the winding of relay 2401 and, depending on the constants of the resistance and the condenser, an appreciable time will be required during which charging current flows through the right winding of relay 2401 maintaining the polarization of that winding which prevents its operation. When the condenser is fully charged and the charging current decreases to zero, the left winding of relay 2401 becomes effective and the relay operates. While sequence switch 1300 was in positions 2 and 3 a circuit was closed from battery on conductor 2135 through the winding of relay 2417 to ground over the upper right contact of cam 1315, relay 2417 locking over its left front contact to ground at the back contact of relay 2401. Relay 1203 also operates in parallel with relay 2417 to ground at the upper left contact of cam 1323, locking over its left contact to ground at the right back contact of relay 2502. With relay 2417 operated, ground is connected over the front contact of that relay to conductor 2437 to hold relay 1203 operated. Likewise a circuit is closed for lamp 2416 to indicate the type of test being made.

If relay 2401 operates properly, it releases relay 2417 and disconnects ground from relay 1203, but relay 1203 is held operated by relay 2502. Relay 2409 in operating closes a circuit from ground over its left front contact, left back contact of relay 2600 to the winding of relay 2602 and battery. Relay 2602 locks through the winding of relay 2600 and the front contact of relay 2602, over the front contact of relay 1203, back contact of relay 1201, back contact of relay 1902, conductor 1911, to ground over the lower contacts of cam 3704. Following the successful establishment of the dry bridge, the sender opens the fundamental circuit closing a reverse battery circuit as above traced. Therefore, relays 2409 and 2401 release, opening the operating circuit for relay 2602 and permitting relay 2600 to operate. Relay 2600 opens the circuit of relay 2401 and 2409 and the operating circuit for relay 2602 and closes a circuit from ground at its right contact through the winding of relay 2504 to battery. Relay 2504 opens the fundamental ring conductor as formerly traced and connects it over its front contact, through the right winding of relay 2500, resistance 2503, right winding of relay 2502, outer left contact of relay 2504, to the tip conductor as traced over the right contact of key 2106. This circuit is free from battery and ground in the test circuit. In the same manner as described for relays 2401 and 2409, a circuit is closed from battery to conductor 2135 and the windings of relays 2500 and 2502, extending through resistance 2501 and the winding of relay 2500 to ground over the right contact of cam 1610 and through the left winding of relay 2502 to ground at the right back contact of relay 2500, thereby electrically polarizing relays 2500 and 2502 so that relay 2500 is free to operate in a correctly established reverse battery circuit in the sender, but relay 2502 can not. As described for relays 2401 and 2409, when the reverse battery circuit is established in the sender, relay 2500 operates removing the shunt from resistance 2506 and condenser 2507 and the polarizing current continues to flow through resistance 2506, until condenser 2507 is charged, when the current reduces to zero and relay 2502 may operate as a simple relay. Relay 2502 in operating removes the locking ground from relay 1203 as an indication that the reverse battery circuit was established correctly as to direction and duration of establishment. If either the trunk closure or reverse battery closure is not maintained until relay 2401 or relay 2502 operates, the test can not advance.

When relay 1203 releases, it opens the locking circuit for relays 2600 and 2602, and these relays release. The release of relay 2600 in turn releases relay 2504 which restores the fundamental ring conductor to its former closure. When the sender connects high resistance ground to the winding of relay 1200 and that relay releases, relay 3103 is also released in turn causing the operation of relay 613 which advances sequence switch 3800 from position 6. It is advanced out of position 7 from ground over the upper right contact of cam 1324. Relays 3608 and 3609 at the termination of office selections remain locked over the right contacts of cam 3818 and the upper left contact of cam 3710 and become effective in position 3 of sequence switch 3800 to advance that sequence switch to position 15. Ground from the front contact of relay 613 is connected over conductor 624, the upper right and lower left contacts of cam 3716 and the upper right contact of cam 3824 to advance sequence switch 3800 to position 16 in which the fundamental circuit is connected through the windings of relays 1205 and 1800, which effect the further restoration of the sender and test circuit to normal, as previously described.

*Timed-out call*

As previously mentioned the sender is arranged to allow an interval of from 30 to 60 seconds during which the digits are to be registered which interval is measured by interrupter 4829 and relays 4828, 4827 and 4826. If these relays complete their operation so that relay 4828 operates before the last digit is received, it transmits a reorder signal to the district by shunting all but the low resistance winding of relay 4300. To test the sender for its ability to wait the proper length of time before transmitting the reorder signal and also for its ability to make the reorder signal, key 2100 is operated, advancing sequence switch 3700 to position 18. With sequence switch 3700 in position 18 the time alarm interval is extended thirty seconds as will be described hereinafter. When relay 2009 operates during the transmission of the second digit, it closes a circuit from battery through the left winding of relay 1903, outer right operated contact of key 2100, inner right front contact of relay 2009, to ground over conductor 2134. Relay 1903 locks through its right winding and inner right front contact to grounded conductor 1336, and opens the holding circuit for relays 1900 and 1901 so that these relays release stopping the transmission of digits. At this time either two digits will have been registered in the sender or, if a two digit code has been set up, only one digit will have been recorded. In the sender the timing circuit will function as previously described to operate relay 4828 which locks independent of the interrupter contact. Relay 4828 in turn operates relay 4206 which releases relay 4207 and disconnects the impulse relays 4211, 4212, 4213, 4221, 4222 and 4223 from the tip and ring impulsing conductors, and connects them to 48-volt battery through the winding of relay 4208, and through resistance 4229 respectively. Relays 2603 and 2605 operate from this 48-volt battery, relay 2605 in turn operating relay 2400 followed by relay 2608 which locks to ground at the lower right contact of cam 1317 and connects ground through resistance 2604 to the pulsing tip to operate relay 4208. Relay 4208 upon operating locks to ground applied to conductor 4228 by relay 4828, opens the operating circuit of relay 4207 to prevent its reoperation, releases relay 4206 and closes a circuit extending from ground at the middle right front contact of relay 4828, conductor 4733, outer right front contact of relay 4208, inner right back contact of relay 4206, conductor 4267, winding of relay 4734 to battery. Relay 4734 upon operating shunts the right winding of relay 4300 as previously described and as the left winding of relay 4300 is at this time also shunted at the back contact of relay 4710, the resistance of relay 4300 is reduced to such an extent that relay 1201 can operate and lock, in turn operating relay 1910 over key 2100. Relay 1910 in operating closes ground through resistance 1908 to conductor 1766, operating relay 5244 as before described. Relay 5244 in turn operates relays 5204 and 5237. Relay 5204 also closes a circuit extending from battery, winding of relay 4710, conductor 5132, right front contact of relay 5204, conductor 5245, right front contact of relay 5105, normal contact of relay 5104, thence to ground over the locking circuit of relay 5105. Relay 4710 locks over its right front contact and at its left back contact opens the shunt around the left high resistance winding of relay 5300. This high resistance releases relay 1200 and relay 3103 thereby advancing sequence switch 1300 to position 8 where the operated condition of relay 1201 advances it to position 9. If relay 1201 fails to operate, relay 1300 remains in position 8 and lamp 2812 is lighted from ground at the inner left front contact of relay 2821, lamp 2812, to battery over the contact of key 2700, relay 2821 operating over the lower right contact of cam 1310 with sequence switch 1300 in position 8.

*Operator's errors—Trunk to distant office selector*

Since the operator served by this key pulsing sender has the choice of four different types of trunks, some of which require complete designations and others of which require only the numerical designation, it is possible that the operator may select the wrong type of trunk for the number she wishes to record. The sender is therefore equipped to transmit a reorder signal whenever the operator sets up a type of call, which the trunk seized is incapable of completing. The test circuit must therefore test the sender for its ability to give the recorder signal under these conditions. Three test calls are arranged for, one simulating a call over a trunk to an office selector using key 2017, sequence switch 3700 in position 18 and transmitting a code which does not call for the use of an office selector, while key 2305 is operated to indicate the trunk class information to the sender. The second test is one simulating a call through a tandem district selector for which no code is transmitted although key 2304 is operated to indicate that such a trunk has been seized and the third test simulates the use of a trunk through an incoming selector in which a stations key other than zero is operated while key 2317 is operated to indicate the class of trunk, it being realized that full mechanical calls over incoming selectors never use stations digits.

In the first operator's error test call, key 2017 is operated advancing sequence switch 3700 to position 18 as previously mentioned. Sequence switch 1300 is advanced to position 4, where the transmission of the code digits is the same as previously described, advancing switch 1300 to position 5. Ground over the outer right operated contact of key 2017 advances sequence switch 1300 to position 6 where the numerical digits and start signal are transmitted. In the sender, trunk class register relay 4705 is operated in turn operating relay 4711. The decoder in operating translates the code set up, which is not the code of an office reached through a distant office selector, and relay 4302 will not be operated. The non-operated condition of relay 4302, together with the operated condition of relays 4705 and 4711, prevents selections from starting and closes the circuit of relay 4152 extending over conductor 5153, outer left alternate contact of relay 4711, inner left back contact of relay 4702, conductor 4732, right back contact of relay 4302, conductor 4307, back contact of relay 5200, conductor 5021, left front contact of relay 5106, conductor 5003, left contacts of cam 5002 to ground on conductor 5103, relay 5200 having released and relay 5106 having operated as soon as the decoder had transferred to the translated office code to the sender. Relay 5152 upon operating prepares a circuit from ground at its right contact over the outer right front contact of start relay 4701, conductor 4733, outer right front contact of relay 4208, inner right back contact of relay 4206, conductor 4267 to battery through the winding of relay 4734. This circuit is completed at the same time that the key release signal is transmitted. Relay 4734 as previously described shunts the right winding of relay 4300 thereby reducing the resistance of the circuit previously traced through the winding of marginal relay 1201 so that that relay operates, locking over its inner left contact as previously described.

In the test circuit the key release signal after in interval measured by the releasing times of slow relays 2408 and 2415 advances sequence switch 1300 to position 7. The reorder signal should be received during this interval. If relay 1201 does not operate before sequence switch 1300 is advanced to position 7 by the completion of the setting of the sender, a circuit is closed from battery through the winding of relay 1204, inner right operated contact of key 2017, back contact of relay 1201 to ground at the upper left contact of cam 1310. Relay 1204 locks over its inner left contacts to ground on conductor 1336 and supplies ground over its outer right contact for advancing sequence switch 1300 to position 8, where the operating circuit of relay 1201 is opened and the circuit for advancing sequence switch 1300 is opened at the contact of relay 1204. Lamp 2812 is lighted as previously described.

If functioning properly, following the reorder signal the sender connects high resistance ground to the windings of relays 1200 and 1201 so that relay 1200 releases closing a circuit from ground at the back contact of relay 2329, left back contact of relay 1200, inner left operated contact of key 2017, upper right contact of cam 1320 to the winding of sequence switch magnet 1300 and battery advancing the sequence switch to position 8 where, with the relay 1201 operated, it is advanced to position 9.

*Operator's errors—Tandem district selector*

For the second type of operator's error test call, key 2011 is operated, advancing sequence switch 3700 to position 15. In addition the no-district key 1405, the skip office key 1425 and trunk class key 2304 are operated. With key 2011 operated a circuit is closed from battery, conductor 1340, winding of relay 1902, to ground at the inner left contact of key 2011. Relay 1902 closes a circuit from battery on conductor 1340, winding of relay 1804 to ground at the inner right contact of relay 1902. Relay 1804 opens the circuit of relay 2001, advances sequence switch 1300 to position 6, skipping the positions for transmitting the code digits, and prepares the circuit for relay 2607 as previously described. Keys 2011, 1425 and 1405 also provide circuits for operating and locking relays 3608 and 3609 and advancing sequence switch 3300 to position 6 where it awaits trunk test. The numerical digits are transmitted in position 6 of sequence switch 1300 which moves to position 7 following the key release signal from the sender. Since sequence switch 3700 is in position 15, when sequence switch 1300 reaches position 7 a circuit is closed from battery through the winding of relay 1910, left contacts of cam 1307 to ground at the lower left contact of cam 3721. Relay 1910 locks over its left contact to ground at the upper right contact of cam 1316 and connects ground through resistance 1908 to conductor 1766 as a release signal, operating relay 5244.

Since the sender is prepared to receive a complete designation, the transmission of the numerical designation followed by the start combination, results in the operation of relays 4406 and 4407 which operate and lock after the start combination is removed. When start relay 4701 operates in response to the key release signal, relay 4900 releases. Relay 4900 is slow to release to prevent false operation of relays 4508 and 4511 by holding the circuit open until after relay 4405 releases. With relay 4511 not operated, relay 5106 operated due to the operation of relay 4702, relay 4208 operated and relay 4206 released due to the operation of start relay 4701, a circuit is established from battery, winding of relay 4734, conductor 4267, inner right back contact of relay 4206, outer right front contact of relay 4208, conductor 4733, right back contact of relay 4828, conductor 4536, right back contact of relay 4511, conductor 4538, right contact of relay 4921, which releases following the release of relay 4900, conductor 4920, inner left back contact of class register relay 5205, conductor 5054, upper contact of cam 5006, conductor 5007, to ground at the outer right front contact of relay 5106. Relay 4734 in the manner previously described closes the shunt around the right winding of relay 4300, thus causing relay 1201 to operate to indicate that the reorder signal has been transmitted. The operation of relay 5244 causes the operation of relays 5204 and 5237 in the manner previously described. These relays prepare the call indicator pulsing circuit to send out zeros constituted by the transmission of light negative impulses only. The further completion of the test is the same as for released call indicator calls through a two-wire office selector, except that, since relay 1902 is operated, the circiut for advancing sequence switch 1300 out of position 8 extends over the back contact of relay 1204, back contact of relay 1203, inner right front contact of relay 1201, outer left front contact of relay 1902, conductor 1911, to ground at the lower contact of cam 3704.

Operator's errors—Incoming selector

The third type of operator's error test call is that which simulates a call over a trunk to an incoming selector where a stations digit is transmitted. For this call key 2006 is operated as well as keys 2317, 1405 and 1425 and some stations key other than zero, for example, key 942. Sequence switch 1300 is advanced to position 6 as in other classes of calls where no code is dialed. In this position four numerical digits and a stations digit are transmitted to the sender which recognizes an error when it receives the fifth digit with the trunk indication showing an incoming selector. Sequence switch 3800 is advanced to position 6 by the no-district and skip office keys 1405 and 1425 and makes trunk test when the sender has advanced to incoming trunk test position. Sequence switch 3800 is advanced to position 15 from position 7 by ground through key 2006 and applies reverse battery to the sender. In the sender since more than the four digits necessary are transmitted, the start combination is not registered on the stations register relays, consequently relay 4515 is not operated. Since for this type of call the trunk class register relay 4700 is operated and in turn operates relay 4702, then when relay 4511 operates in response to the reception of the extra digit, a circuit is established from ground at the right back contact of relay 4705, outer left front contact of relay 4702, conductor 4736, left back contact of relay 4515, right front contact of relay 4511, conductor 4536, right back contact of relay 4828, conductor 4733, outer right front contact of relay 4208, right back contact of relay 4206, relay 4208 having operated and released relay 4206 due to the operation of start relay 4701, conductor 4267 to battery through the winding of relay 4734. Relay 4734 operates to shunt the right winding of relay 4300 thus causing relay 1201 to operate. Following the reverse battery closure in the sender, the test circuit and the sender are advanced to normal in the manner previously described.

Other special tests may be made in combination with appropriate test calls.

SPECIAL TESTS

Tests of coin features

Neither of the senders shown is a coin sender, but the test circuit is capable of testing such senders. Coin senders are identified by the connection of relay 708 over the normal contact of key 703 to the terminal or terminals of master selector brush 1704 which corresponds to the sender selectors having access to coin senders. Therefore relay 708 is normally operated whenever the test circuit is connected to a coin sender. With relay 708 operated the ground which advanced the sequence switch 200 from position 13 is opened at the left contact of relay 708, and when sequence switch 200 arrives in position 13, sequence switch 3800 waits in position 14 or sequence switch 3300 waits in position 6 for coin test. With the class sequence switch 3700 in positions 2 to 7, 9 or 14 to 18, and sequence switch 200 in positions 13 and 14, ground through one thousand ohms is connected through resistance 3725, right contacts of cams 3713, conductor 3731, inner left front contact of relay 708, left contacts of cam 221 to the dial tip conductor so that the sender makes a preliminary coin test and proceeds without any delay.

With sequence switch 3700 in position 1 or position 13 and key 2817 normal, a circuit is closed for relay 719 from ground over the lower left contact of cam 212 through the winding of relay 719, resistances 726, 725 and 724, left normal contact of relay 718, conductor 735, lower contacts of cam 3713, conductor 3731, inner left front contact of relay 708, left contacts of cam 221 to the dialing tip conductor so that relay 719 operates when the sender connects one hundred and ten volt coin battery to that conductor. No operation results in the sender. Relay 719 in operating extends ground over its left front contact to the winding of relay 720, which locks over its inner right front contact to ground at the lower left contact of cam 212. Relay 720 prepares a circuit from battery under the control of key 2700 through the coin lamp 236 to ground at the middle left contact of relay 720. Ground is also connected from the lower left contact of cam 212 to interrupter 713 which controls relays 709 and 710 and through them relays 714 and 715. With relay 720 operated, ground through resistances 725 and 724 is connected to the tip conductor as a non-operate test of the coin test relay of the sender. The first closure of interrupter 713 operates relay 709 in the following open period, relay 710. The next closure releases relay 709 and operates relay 714 while the following open period releases relay 710 and operates relay 715. The third closure reoperates relay 709 and the following open period reoperates relay 710. The fourth closure releases relays 709 and 714 and operates relay 721 in a circuit which may be traced from battery through the winding of that relay, lower right and upper left contacts of cam 3717, conductor 3730, back contact of relay 311, right front contact of relay 715, right back contact of relay 714 to ground at the back contact of relay 302. The operation of relay 721 closes a circuit from battery through the winding of sequence switch magnet 200, upper left contact of cam 201, outer right front contact of relay 721, to ground at the left back contact of relay 317, advancing sequence switch 200 to position 14. In this position ground is connected over the middle right contact of relay 721 and the back contact of relay 722 to resistance 724 reducing the resistance in circuit with the tip test relay of the sender to approximately 2000 ohms making an operate test of that relay. If the relay operates falsely during the non-operate test, the advance of the sender to trunk closure or final units selection operates relay 317 over a circuit which may be traced from battery through the winding of that relay, back contact of relay 722, front contact of relay 708, back contact of relay 721, conductor 730, lower right and upper left contacts of cam 3813 to ground over the front contact of relay 3004, relay 3004 operating in the fundamental circuit. With relay 317 operated, the ground used for advancing the sequence switch is opened at the back contact of relay 317 and the call is blocked. The same functions of the sender, after the operation of relay 721 has applied the operate test, result in the advance to check stations relay of final units selection.

Coin senders are also provided with a relay which serves to detect a direct ground connected to the calling line which is known as the solid ground test relay. In order to make a non-operate test of this relay, keys 705 and 702 are operated. Relay 708 is operated as previously described and relay 719 connected to the tip conductor which operates when the sender connects one hundred and ten volt coin test battery to the tip conductor in turn operating relay 720 as described. With key 702 operated the operation of relay 720 closes a circuit from battery through the winding of relay 718, inner left front contact of relay 720, inner right operated contact of key 702 to ground at the contact of brush 1704. Relay 718 closes a circuit from ground at its right front contact over the left operated contact of key 702 to the winding of relay 722 and battery. With relay 718 operated, the tip conductor is transferred from relay 719 over the front contact of relay 718, right operated contact of key 702, resistance 734, to ground. Resistance 734 has approximately 500 ohm resistance. At the same time resistances 731 and 732 are included in the circuit due to the operation of maximum line key 705. The operation of relay 722 transfers the circuit controlled by relay 3004 to the winding of relay 723. Therefore if the sender advances to final units selection or trunk closure operating relay 3004, relay 723 operates and locks. If the sender operates falsely, when relay 721 operates, relay 3102 is operated in a circuit from battery through its right winding, conductor 3115, back contact of relay 723, front contact of relay 722, middle right front contact of relay 721, to ground at the lower left contact of cam 212. Relay 3102 locks to off-normal ground and operates relay 612 which opens the trunk test circuit and blocks the call. If is is desired to make an operate test of the solid ground relay of the sender, keys 705 and 701 are operated and relays 719 and 720 operate as above described. Key 701 closes a circuit over its outer right contact in parallel with the inner right contact of key 702 for the operation of relay 718. With relay 720 operated, the tip conductor is extended over the left contacts of cam 221, inner left front contact of relay 708, conductor 3731, lower contacts of cam 3713, conductor 735, left front contact of relay 718, to ground at the outer right normal contact of key 702. This same ground may be traced to the ring conductor over the contact of key 702, front contact of relay 718, conductor 735, cam 3713, conductor 3731, inner left front contact of relay 708, left contacts of cam 221, back contact of relay 315, resistance 731, left operated contact of key 705, upper right and lower left contacts of cam 204, to the ring conductor as previously traced. This low resistance ground should prevent the advance of the sender and relays 709, 710, 714 and 715 function as above described to measure off a time interval after which relay 721 is operated disconnecting the blocking ground and advancing sequence switch 200 to position 14. If the solid ground test relay should fail so that the sender does advance for trunk closure, relay 317 would operate preventing the advance of the test. The lead to the class switch which is normally closed at this time is now opened at key 701 and the sender should release connecting ground to the circuit of relays 3103 and 2402 thereby operating relay 2402 which advances sequence switch 200 and the test circuit to the next sender. If relay 2402 operates before the release, which follows the operation of relay 721, relay 714 is shunted preventing the operation of relay 721 and again blocking the test.

*Timed release tests—One digit dialed*

Fig. 6 is especially adapted for use in connection with senders of the type which attempt to release after a time interval. If, when testing such a sender, the sender fails, the test circuit will indicate a failure by remaining in connection with that sender with the time alarm lamp lighted. The sender may then be retested with the timed release feature disabled in order to locate the trouble which caused the test circuit to block. Key 2817 can not be used during such a test. The following tests are required to check the timed release feature and will indicate premature and delayed operations as closely as permitted by the variation between sender and test circuit interrupters. The operation for a permanent signal test call has been described heretofore.

The operation of the sender in response to partial dialing, for example, when only one digit has been dialed, may be tested by operation of key 617 while the class key 1465 is operated to advance sequence switch 3700 to position 5. In this class the test circuit does not send reverse battery to the sender and the sender should control talking selection for talking to an operator and therefore talking selection key 1552 should be operated. A first code digit other than zero or one is used and switch 200 advances to position 14, following the dialing of this digit under the control of key 1465. When sequence switch 200 reaches position 7, it advances sequence switch 3800 to position 2 where it awaits the closure of the fundamental tip in the sender for district brush selection. The keys should be set to check the same district selections as for the permanent signal call. Relay 610 is operated over the inner upper contact of key 617 to ground at the lower right contact of cam 211 and starts the time count as described for the permanent signal test call.

In the sender the timing sequence switch 5500 is advanced to position 2 in the usual manner.

The receipt of the first digit operates relay 5601 which advances switch 5500 to position 4. Relays 5525, 5528 and 5529 advance sequence switch 5500 to position 5 where a tone is connected to the dialing circuit as a release signal to the subscriber. The timing circuit continues to function and advances switch 5500 to position 6 where the partial dialing meter 5523 is operated and switch 5500 is advanced to position 11. In positions 6 and 7 the permanent signal relay 5425 is operated, resulting in the same operations as described for the permanent signal test call. If sequence switch 3800 advances prematurely due to faulty operation of the timing circuit and reaches position 13 before switch 600 has advanced beyond terminal 4, relay 3102 operates over a circuit which may be traced over conductor 3115, upper contact of key 617, brush 605, over the first four terminals of that brush to ground over conductor 3845 and the upper right and lower left contacts of cam 3812, while if selections are delayed and sequence switch 3800 has not gotten beyond position 3, when switch 600 reaches position 11, the relay 3102 operates over brush 605 in position 11, to ground over conductor 3846 and the left contacts of cam 3812. If these time limits are met, the call is completed as an operator call.

*Timed release—Three digits dialed*

For partially dialing where three digits have been dialed, key 614 is operated, key 1466 is operated advancing sequence switch 3700 to position 6 and a full selector code not involving distant office selections is set up. Any numerical digits may be used for the purpose of closing the normal checking path. In the sender, switch 5500 is advanced to position 4 by the receipt of the first digit. Since three digits are dialed, the decoder functions and district and office selections are made. Switch 5500 is advanced to position 5 after ten seconds and through positions 6 and 7 in about two seconds and then directly to position 11. In positions 11 and 12 a thirty second interval is measured and in position 13, relay 5529 shunts the winding of relay 6006, connecting low resistance to conductor 5445 as a release signal. Ground on conductor 5445 operates relays 2402, 2411 and 609, since key 614 is operated. If at the time this five ohm ground is applied, switch 600 has not advanced beyond terminal 4, ground over the inner left contact of relay 609 operates relay 3102 over the first four terminals of brush 603 and the outer lower contact of key 614 to indicate a premature closure of the five ohm ground. If relay 2402 has not operated when switch 600 reaches position 11, ground from the back contact of relay 2402 is extended over conductor 2931 and brush 603 to the winding of relay 3102. Ground from relay 609 advances sequence switch 200 beyond position 15 over terminals 6 to 10 of brush 602 and the back contact of relay 612. The sender connects battery to conductor 5445 in the manner previously described advancing sequence switch 200 to position 18, releasing relay 3103 which results in the advance of sequence switch 3800 to position 17. Restoration to normal takes place as on other calls.

*Timed release—Stuck sender—No distant office selector*

An additional type of test is one simulating a stuck sender where no distant office selector is used. For this a full mechanical call is set up, class key 1561 being operated to position class sequence switch 3700 in position 1 and key 615 is operated. A test call simulating a call indicator call where complete synchronized dialing is used may also be employed. Following the dialing of all the digits, relay 610 operates, and relay 611 operates in position 6 of sequence switch 200 and remains operated to position 17. Relay 611 opens the reverse battery path on a full selector test or the trunk test circuit on a call indicator test and causes the sender to fail. A sender should connect five ohm ground to conductor 5445 in forty to sixty seconds very much as described for the previous test. Premature closure of this ground is checked by closure of ground from the front contact of relay 2402 over key 701 and the front contact of relay 611 to the normal and the first nine terminals of brush 606 which results in the operation of relay 3102. In fifty to seventy seconds the sender connects high resistance ground to conductor 5445. If this high resistance ground is prematurely connected, it is checked by closure of ground from the inner right contact of relay 613 to terminal 10 of brush 606 which is connected over the outer lower contact of key 615, to the winding of relay 3102. If the five ohm ground has not been applied before switch 600 reaches terminal 17, ground from the back contact of relay 2402 is connected over brush 606 in position 17 and the outer lower contact of key 615 to the winding of relay 3102. Relay 613 closes a path over its left front contact, brush 602 in positions 12 to 17, back contact of relay 612, to the lower right contact of cam 219 to advance sequence switch 200 beyond position 15. If sequence switch 200 is in positions 3 to 15, when switch 600 reaches terminal 19, ground over the upper left contact of cam 211 is connected over terminal 19 and brush 606 and outer lower contact of key 615 to the winding of relay 3102, while, if relay 610 is not released, by the time brush 606 reaches terminal 20, a circuit is established for relay 3102 over the inner right front contact of relay 610.

*Timed release—Stuck sender—Distant office selector*

Where a distant office selector is included in the outgoing trunk, a sender which becomes stuck adds forty seconds to the usual releasing time for a stuck sender. Therefore an additional test condition is necessary for the test circuit. For this purpose, sequence switch 3700 is set either in position 1 or 13 by the operation of the proper class key and key 618 is operated. Relay 611 operates over contact of key 618, when sequence switch 200 reaches position 6, in parallel with relay 619 which has no function at the present time. Relay 611 performs the same functions as in the previous test. Relay 610 operates and starts the time count when sequence switch 200 reaches position 13. The sender connects low resistance ground to conductor 5445 in 80 to 100 seconds. Premature closure of this ground is checked by a circuit from the front contact of relay 2402 over the left front contact of relay 611 to terminals normal to 9 of brush 606, and the inner lower contact of key 618. After 90 to 110 seconds the sender attempts to release by placing high resistance on conductor 5445. Premature functioning of this circuit is disclosed by a circuit from the front contact of relay 613 and brush 606 in position 10. If relay 2402 has not operated, when switch 600 reaches position 17, ground from the back contact of relay 2402 and terminal 17 of brush 606 causes the operation of blocking relay 3102. The release of relay 3103 and the operation of relay 613 advance sequence switch 200 beyond position 15 through the terminals 12 to 17 of brush 602 while the completion of the test checks over terminal 20 of brush 606.

When the sender attempts to disconnect, a release tone is connected to the tip and ring conductors and the test man may test for this tone with key 705 operated. The operation of relay 610 connects receiver 307 between the tip and ring conductors at its outer left front contact so that the test man may listen for the tone by using the receiver 307.

Tests of synchronization

Synchronizing tests are provided for the purpose of checking the operation of synchronizing relays in the sender. For example, in the full mechanical sender, the fundamental circuit for a particular selection can not be established unless the designation covering that selection has been received. Relay 317 is provided in the test circuit which opens the path for advancing sequence switch 200, opens the path for operating the stations delay feature of Fig. 29, lighting lamp 314, and by blocking the test permits the trouble meter 1626, and the blocking relay 3102 to operate under the control of the time alarm. The circuit of relay 317 is carried over the back contact of relay 318 so that it will not operate with relay 318 operated. Relay 318 operates under the control of relay 316 during the dialing of the digits in classes 1 to 9 and also class 16, while dialing units in all regular call indicator calls when the number dialed is below ten thousand or while dialing tens in all regular call indicator calls when the number dialed is above ten thousand. When operated in any of the above classes, relay 318 locks to ground at sequence switch 3800 in positions 6 to 8, 9 to 10, 12 and 14 and also to ground at sequence switch 3300 in positions 6 to 9. The operation of this relay prevents the operation of relay 317 between the dialing of the digits, but the path for operating relay 317 is closed, irrespective of the position of relay 318, while the pull-up relay 315 is operated during the dialing of each digit. The relay 317 may operate from any of the following causes: During the dialing of each digit if relay 3004 operates in any position from incoming test to final units inclusive with the class switch in positions 1, 3, 8 or 9; during coin test if relay 3004 operates for the final units check or relay 3607 operates for call indicator trunk closure before relay 721 has opearted. As the class ground for a full mechanical call is not available for dialing the thousands digits until switch 3800 has arrived in position 6, for dialing the hundreds digit until position 9, for dialing the tens digit until switch 3800 has arrived in position 11 or for dialing units until it has arrived in position 13, it is apparent that the operation of relay 3004 during dialing indicates a false advance of the sender. The same conditions would apply if relay 317 operates during final units or call indicator trunk test before the coin test is completed.

Test for slow call indicator pulses

In order to determine whether the call indicator impulses are being transmitted at the proper rate, a direct call indicator test call is set up. With sequence switch 3300 in position 9, relay 2916 is operated and ground is connected to interrupter 2913 over the lower right contact of cam 3320, and relays 2906 and 2912 are operated under the control of the interrupter to start a time count when assignment has been completed. If relay 2819 is not operated, showing that the final heavy positive pulse or last negative pulse has been received, within two and a half seconds, relay 2905 is operated blocking the test and lighting lamp 2808.

Test of registration transfer relays

A special test of the decoder type senders is possible with the class sequence, switch 3700 in position 3. For this test, key 3000 must be operated. This cancel synchronizing key 3000, when operated, cancels the synchronizing check by the test circuit and permits the numerical digits to be transmitted before any selections are checked. The purpose of this test is to detect crossed contacts in decoder type senders on the relays which transfer the numerical registration such as relays 6201, 6202, 6203 and 6301 to the selection registers for incoming or final selections. A crossed contact results in the premature operation of a selection register relay thereby causing a wrong district or office selection, in the subscriber's sender. The cancel synchronizing key 3000 performs the following functions. It connects ground to the conductors 244, 253 and 256 to operate pull-up relay 315 in the several positions of sequence switch 200 so that the code and thousands, hundreds, tens and units may be dialed before any selections are checked. It connects ground over conductor 3034 to the lower right contact of cam 1318, to move sequence switch 1300 out of position 5 where district and office selections are normally checked so that all digits may be transmitted on a key pulsing call before any selections are checked. It opens the circuit of relay 317 and it transfers the circuits for advancing sequence switches 3800 and 3300 out of position 1 from cam 217 to cam 214 so that the check switches are not started until after the units digit has been registered.

To detect all crosses on transfer relays which might cause wrong numbers, all numerical register relays in the sender should be operated, by using the numbers 3333 and 9999 and district and office selections such that a cross will cause a wrong selection. Those contacts of the transfer relays which synchronize selections with registration will be detected when the cancel synchronizing key is normal. If a cross is present on one of these contacts, the test circuit will block with lamp 314 lighted.

Listening test of dial tone

If the tester wishes to test the intensity of the dial tone given to the subscriber by the sender, the dial tone key 319 is operated at the start of the test. Relay 305 operates over the right operated contact of key 319 to ground at the lower left contact of cam 1608, with sequence switch 1600 in positions 3 and 4 and locks over its inner right front contact, contact of key 303, upper left and lower right contacts of cam 220, conductor 237, left contacts of cam 1606 to ground at the upper right contact of cam 1608 thereby remaining operated when sequence switch 1600 arrives in the cut-through position 5. When a repeat test is being made, relay 305 operates over the left operated contact of key 319, lower contacts of cam 220 to conductor 237, as sequence switch 200 passes through positions 17¾ to 18¼. When the dialing circuit is established through relay 306 in the manner previously described, that relay connects ground to the armature of relay 305 as previously traced, but since relay 305 is operated, it extends this ground through lamp 308 to battery through resistance 2701 thus informing the test man that the dialing circuit has been closed and dial tone is to be expected. With relay 305 operated, receiver 307 is connected in parallel with relay 306 over the front contact of relay 305 through receiver 307, and back contact of relay 610, and the operator may therefore listen to determine the quality and strength of the dial tone. Key 303 is then momentarily operated to release relay 305, after which the ground from the front contact of relay 306 is extended over the back contact of relay 305 to the lower left contact of cam 201 and the winding of sequence switch magnet 200 in the usual manner to advance the sequence switch for the regular test.

*Translation of digit zero to letter "O"*

Because on the dial the digit zero and the letter "O" appear so much alike and the digit zero is reserved for an operator call from subscribers, the call indicator impulser in subscribers' senders is arranged to substitute the digit 6 for the digit zero as the second or third digit of the code, while the operator's sender does not. Relays 402 and 403 are operated during the test of an operator's sender from battery over the upper contacts of cam 1303 to ground over the inner contact of either the zero B code key or the zero C code key depending on which one is made zero. It will also be remembered that when a two digit code is recorded in the sender, the relays of the B registers remain unoperated so that in transmitting the call indicator code, the code for zero is transmitted for the B digit. The functions of relays 402 and 403 and key 404 will be more clearly understood by tracing the checking path for the B code digit. This circuit starts from battery through the winding of relay 2712, conductor 2713, right back contact of relay 2411, conductor 2434, upper right and lower left contacts of cam 3311, to the left armature of relay 3414 of the B register. This relay will be operated if the digit 6 is recorded but unoperated if the digit zero is recorded. The circuit from the back contact of the relay extends to the outer right front contact of relay 403 and the inner upper right normal contact of key 404, therefore, if the key 404 is normal indicating that no B digit was transmitted, the circuit will continue over the normal contact of that key, right operated contact of the zero B key 510, over the inner lower normal contact of key 404 to the zero checking conductor 4050, over the outer left back contact of relay 505, and thence over the back contacts of relays 3411, 3412 and 3413 to ground over the lower left and upper right contacts of cam 3314. If relay 403 is operated, indicating that we are dealing with a key pulsing sender which does not make this translation, the circuit extends over the outer left contact of relay 403, inner operated contact of relay 404, contact of zero B key 510, lower operated contact of key 404, inner left front contact of relay 403, to the back contact of relay 505 and conductor 4050 so that the digit zero is again checked. The checking circuit from the front contact of relay 3414 extends to the left normal contact of relay 403. Since this translation is not made with key pulsing senders, this checking circuit will therefore be opened if this relay is operated and the digit 6 is received. The circuit extends from the back contact of relay 403, operated contacts of keys 404 and 510 as traced, back to the inner left back contact of relay 403 and thence over the normal contact of relay 515 to conductor 4051 which extends over the front contact of relay 3411 and the back contacts of relays 3412 and 3413 to ground over cam 3314 as previously traced. Key 404 is not involved in the translation of the C digit, but relays 402 and 403 serve to transfer the checking circuit for this digit in a similar manner. Key 404 also transfers the path by which the lamp indicating the digit received is lighted. The operation of the sender in response to a two digit code is clearly set forth in both of the patents above referred to.

*Crossed counting relay contacts*

A cross between the contacts of a second or prime counting relay, a short-circuit around the protection of the stepping relay or a high resistance in the stepping relay contact leads will operate more than one pair of counting relays in the sender if the reverting pulse is sufficiently long. Since the normal pulsing rate of the test circuit is at a maximum speed, the test circuit will not always detect such a trouble. Slow revertive pulses are therefore furnished when key 3019 is operated. With the test sequence switch in a position for a full mechanical test, that is, position 1, and sequence switch 3800 in positions 6 to 16 in which numerical selections are checked, a circuit is closed from battery over the upper right contact of cam 3703, winding of relay 3018, contact of key 3019, to ground over the upper right contact of cam 3803, relay 3018 connecting ground from cam 3803 over its inner right contact, back contacts of relays 3015 and 3016 to the lower terminals of the windings of relay 3011. Battery is connected to the upper terminals of the windings of relays 3011, through resistance 3010, conductor 623, over the upper right contact of cam 1614 and battery is also connected over the lower contacts of cam 1614 and resistance 3013 to the lower terminals of the windings of relay 3011, but is now shunted by the ground connected thereto by relay 3018. Relay 3011 is both differentially wound and polarized. Relay 3011 operates in the above traced circuit closing a circuit from battery through the windings of relays 3015 and 3016 in parallel, contact of relay 3011, over the inner right front contact of relay 3018 to ground at cam 3803. With both relays 3015 and 3016 operated, the ground connected to the lower side of the windings of relay 3011 is opened and ground is connected to the upper side of relay 3011, over the right front contacts of relays 3015 and 3016 and the inner right contact of relay 3018 from cam 3803. Relays 3016 and 3015 in cooperation with relay 3018 simultaneously ground the local counting relay circuit and the fundamental circuit in a manner similar to the operation of interrupters 2419 and 3017. The connection of ground to the opposite sides of the windings of polarized relay 3011 causes the charge and discharge of condenser 3014 to delay both the operation and the release of relay 3011.

*Step-by-step dialing and checking*

To permit the dialing of one digit at a time, the dial step-by-step key 700 is left in the operated position before starting the test. This key opens the operating and shunting path for the pull-up relay 315 and closes a path from the class switch 3700 which normally operates the pull-up relay 315. This ground is used to operate and lock relay 313 after relay 312 has operated. When the tester is ready to dial a digit, the advance dialing key 704 is operated and released. The operation of key 704 closes a circuit for relay 312 which is followed by the operation and locking of relay 312. Relay 313 releases immediately as a result of the release of key 704. These functions first restore the shunting path and then the operating path of relay 315 which permits the operation of the relay and the dialing of the digit in the usual manner. The advance of the dial control switch at the end of the digit, which is accomplished in the usual manner, causes the release of relay 313.

In checking the selections step-by-step key 3204 is left in the operated position. This removes ground from the armature of relay 3932 which normally connects ground to the pulsing interrupters and also advances the test circuit upon the completion of a satisfactory check. The operation and release of the step-by-step advance key 3203 causes the operation of relay 3206 followed by the operation of relay 3207 assuming that the ground which normally controls the stepping circuit is available, a condition which will apply unless dialing and checking have gotten out of step. The operation and release of key 3203 permits the check of a particular digit or combination of digits and the release of relays 3206 and 3207 which follows the advance of the checking switch 3800 will prevent further check until key 3203 is again operated. The operation of relays 312 and keys 704 and 700 permit step-by-step control of both dialing and checking if keys 700 and 3204 are left operated. No means is provided for setting the key pulsing switchboard senders on a step-by-step basis.

*Time alarm*

The time alarm arrangement will next be described. When the time alarm key 2207 is in its normal position, relay 2318 is operated from ground at the outer upper contact of the start key 2200, conductor 2212, normal contact of relay 2320, winding of relay 2318, left normal contact of relay 2207, to battery through resistance 2310. Relay 2318 locks over its inner left front contact, to conductor 2330, contacts of cam 1304, conductor 1329, right contacts of cam 220, conductor 237, left contacts of cam 1606, to ground at the upper left contact of cam 1608, or the upper contact of key 2200. This ground is opened once during each test at the dialing switch 200, the key pulsing switch 1300 or the connector switch 1600, restoring the time alarm circuit to normal. Relay 2318 in operating connects ground from the back contact of relay 610, over conductor 620, left front contact of relay 2310 to interrupter 2319, which, when it closes its left contact, completes a circuit over the back contact of relay 2325 and the winding of relay 2320 and battery, relay 2320 locking over its inner right front contact to ground over the contact of relay 2318. When interrupter 2319 closes its right contact, a circuit is extended over the front contact of relay 2320, back contact of relay 2326 to the winding of relay 2325, which also locks under the control of relay 2318.

When relay 2325 operates, it connects ground over its right front contact and inner left back contact of relay 2326 to the automatic pass-busy conductor 2333 for automatically passing busy senders if key 2324 is operated. Ground connected to conductor 2333, with key 2324 operated, completes a circuit over the back contact of relay 2307 through the winding of the pass-busy meter 2322 to battery over the lower left contact of cam 1630, operating this meter. Meter 2322 connects ground over its front contact, to the winding of relay 2202, advancing the connector switch to position 8 and preventing the operation of relays 2205 and 2301. From position 8 the connector switch advances to test the next sender in the usual manner. With key 2324 operated the check of an open test lead is prevented so that at least a certain number of tests should be made with the key normal.

Relay 2325 also prepares a circuit for relay 2326 which operates when interrupter 2319 next closes its left contact, locking under the joint control of relays 2320 and 2318. At the second closure of the right contact of interrupter 2319, ground is extended over the front contact of relays 2320 and 2326 through the winding of relay 2327, which also locks under the joint control of relays 2320 and 2318. Relay 2327 in operating closes a circuit for relay 3102 which locks with either sequence switch 3800 or 3300 off-normal, operates the trouble meter 1626 and sounds an alarm. Relay 3102 will also open the path which is used to advance the check switches, and operates relay 612 which will remove ground from relays 2403, 2413 to prevent them from overheating. Whenever the test circuit is advanced by the operation of control advance key 2208 or by the release of the start key 2200, blocking relay 3102 is released. The time alarm period is from one to one and one half minutes. The alarm circuit may be restored to normal at any time by operating the time alarm key 2207 which should be left operated until the test is about to be resumed. The connector switch cannot be advanced to positions 5 or 14 to test the next sender until the time alarm key 2207 is restored to normal. This is done to insure that the time alarm is effective whenever a test is carried on.

During a permanent signal test the time alarm is ineffective since ground is removed from conductor 620 by the operation of relay 610. On a test of the sender timing out to send a reorder signal, thirty seconds is added to the time alarm period by the operation of relays 2312 and 2313. The circuit of relay 2312 extends from battery through resistance 2314, winding and normal contact of relay 2312, conductor 2334, outer left contact of time-out relay 1903, conductor 2335, back contact of relay 2325 to ground at the front contact of relay 2325. The operation of relay 2325 therefore operates relay 2312 which closes a circuit for relay 2313, but relay 2313 cannot operate, being shunted by the operating circuit of relay 2312. With relay 2313 not operated, and relay 2312 operated, battery through resistance 2310 is connected over the back contact of relay 2313 and the front contact of relay 2312, to ground over the lower right contact of cam 3722. This closure to ground shunts the winding of the alarm relay 2318 causing it to release and remove ground from the interrupter 2319 and the locking circuits of relays 2320, 2321, 2325, 2326 and 2327 thereby releasing these relays preparing them for reoperation.

*Group keys*

A group key such as key 2306 is always provided for the senders which are tested immediately before the key pulsing switchboard senders, as well as different groups of senders which require the depression of different keys to establish a different route for the same code or when a different test is applied for the same code.

Restoration of start key

If the start key 2200 is restored to normal during a test, sequence switch 200 advances to position 16 in the manner described, from where the test continues in the usual manner for the purpose of checking the restoration of the sender to normal. If key 2200 is restored while the circuit is standing on a busy sender, relay 2202 operates in a circuit over the lower right and upper left contacts of cam 1613, inner lower normal contact of key 2200, back contact of relay 2204, back contact of relay 2203, to ground over the lower right contact of cam 1612. Relay 2202 advances the test circuit in the same manner as when the control advance key 2208 is operated. Relay 2318 releases when sequence switch 1600 advances from position 9 or 18 and the operated time alarm relays release. The master and sender selectors remain on the terminals last tested and switches 1100 and 1000 and 3700 also remain in their last positions as determined by the keys. To restore the master and sender selectors to normal, it is necessary to operate particular circuit key 2210 and advance the senders by the operation and release of the corresponding keys 1708, 1718 and 1728.

Manual control of advance

The advance of the test circuit may be controlled from a distance by the operation of relay 2202. This relay may be operated by the operation of key 2208 with sequence switch 1600 in positions 2 to 9 or 11 to 18, that is, whenever it is off-normal, if key 2200 is operated and relays 2204 and 2203 are normal. It may also be operated by the operation of the pass-busy meter 2322, with sequence switch 1600 in position 2 or 11, if ground is connected to that meter over the automatic pass-busy lead 2333. Also relay 2202 may be operated from ground connected to the ring of the remote control jack 2309 if the repeat key 2300 is operated. When operated, relay 2202 locks through positions 2 to 7 or 11 to 16 of sequence switch 1600 and positions 2 to 8 or 11 to 17 of sequence switch 1300 and advances sequence switch 1600 to position 8 or 17 and sequence switch 1300 to position 9 or 18. If the operating ground has been removed, the release of relay 2202 in position 8 or 17 advances sequence switch 1600 to position 9 or 18 from where the test proceeds in the usual manner. The operation of relay 2202 prevents the operation of the complete test meter 2303 in position 6 or 15 and the operation of relays 2205 and 2301 in positions 3 to 5 or 12 to 14 of sequence switch 1600. The latter feature prevents possible interference with a sender that may become idle just after the pass-busy meter has operated relay 2202.

Repeat tests

Repeat key 2300 is provided to permit repeating tests on the same sender. With key 2300 operated, the normal checking path which was traced for advancing sequence switch 1600 from position 5 and is closed in position 18 of sequence switch 200 and 9 or 18 of sequence switch 1300 is transferred from the lower left contact of cam 1603 to the armatures of relays 2323 or 2329. This permits the operation of relay 2201 without advancing sequence switch 1600 from position 5. With key 2300 operated, also, the operation of the control advance key 2208 causes the operation of relay 2206 preventing the operation of the sender selector to advance to the next sender as would normally take place when key 2208 is operated. The operation of key 2300 also connects the ring of the remote control jack 2309 through the winding of relay 2206. Relay 2206 operates relay 2321 which in turn operates relay 2328 and prevents the advance of sequence switch 1300 from position 9 or 18. While testing with key 2300 operated, when sequence switch 200 enters position 18, a path is closed through the normal positions of sequence switches 3800 and 3300 and the thousands and hundreds registers 1100 and 1000 preventing the succeeding tests if the switches are not in the correct positions. When switch 200 advances from position 18, or switch 1300 from position 9, relays 2205 and 2301 release opening the leads to the sender with the exception of the test lead. This follows the operation, in connection with subscriber's senders, of relay 310 from the 270 ohms battery which is connected to the winding of that relay from the sender. Relay 2329 or relays 2209 and 2323, which remain connected to the test lead operate as soon as the sender returns to normal from the test battery on the test lead. This results in the operation of relays 2201, 2205 and 2301 which lock and permit the starting of the next test. A path is established for the operation of meter 2316 which records the repetition of single tests, while sequence switch 200 is passing through positions 3 to 5 or, in connection with a key pulsing sender test, while sequence switch 1300 is passing through positions 3 to 5 or 12 to 14.

Meters

A number of meters are provided to record the various operations of the test circuit. The repeat single test meter 2316 is effective only with the repeat key operated and is operated each time the dial control sequence switch 200 advances through positions 3 to 5 or the key pulsing switch 1300 advances through positions 3 to 5 or 12 to 14. This register records the number of times the particular test is completed. The circuits tested meter 2303 operates through the winding of relay 2302, lower left and upper right contacts of cam 1613, over the left back contact of relay 2202, inner lower right operated contact of key 2200, right back contact of relay 2204, inner right back contact of relay 2203 to ground over the lower right contact of cam 1612. These relays prevent false operation of the register if the test is being rechecked after a trouble or at the end of the cycle or when the sender or master selectors are being advanced. This register records the number of circuits tested. The trouble meter 1626 operates each time that relay 2327 operates. Sequence switch 1600 in this case is in a trouble test position and not in a busy test position. This register records usually the number of troubles encountered. The pass-busy meter 2322 is operated each time that relay 2325 operates connecting ground to conductor 2333, if sequence switch 1600 is in position 2 or 11 and the automatic pass-busy key 2324 is operated, that is, it records the number of busy senders which are passed without being tested. These senders may be made busy by a make-busy-plug or they may be busy because of trouble. Normally, because of the length of time required to ground the automatic pass-busy conductor 2333, they will not be senders engaged in establishing a subscriber's call.

What is claimed is:

1. In a telephone system, register senders having registers adapted to be positioned by dial pulses, other register senders having registers adapted to be positioned by code pulses, means in all of said senders for controlling selections in response to revertive pulses, means in all of said senders to transmit designations by means of code pulses, a testing device, means for associating said testing device with a sender to be tested, means in said testing device for transmitting simulated dial pulses, means in said testing device for transmitting code pulses, means for transmitting revertive pulses, means for receiving code pulses, a key set, and means including said key set for determining the value of all of said pulses.

2. In a telephone system, register senders having registers adapted to be positioned by code pulses arranged according to a first code, means in said senders to transmit designations by means of code pulses arranged according to a second code, a testing device, means for associating said testing device with one of said senders, means in said testing device for transmitting code pulses according to said first code, means for receiving code pulses according to said second code, a key set and means including said key set for determining the value of said pulses.

3. In a telephone system, register senders having registers adapted to be positioned by dial pulses, other register senders having registers adapted to be positioned by code pulses, a testing device, means for associating said testing device with said senders in succession, means in said testing device for positioning the registers of senders of each type, a key set, and means including said key set for determining the positions of said registers.

4. In a telephone system, register senders having registers adapted to be positioned by dial pulses, other register senders having registers adapted to be positioned by code pulses, a testing device, means for associating said testing device with said senders in succession, means in said testing device for positioning the registers of senders of each type, a key set, and means including contacts of the same keys for determining the positions to be assumed by corresponding registers in the two types of senders.

5. In a telephone system, register senders having registers adapted to be positioned by code pulses arranged according to a first code, means in said senders to transmit designations by means of code pulses arranged according to a second code, a testing device, means for associating said testing device with said senders in succession, means in said testing device for transmitting code pulses according to said first code, means for receiving code pulses according to said second code, a key set, and means including the same contacts in said key set for determining the value of the pulses transmitted and of the pulses to be received.

6. In a testing device, means for testing the time of a circuit closure comprising a pair of relays, means for including said relays in series with said circuit closure, circuits for electrically polarizing said relays in opposite directions, one of said relays being responsive to the current flow in said circuit, means responsive to the operation of said one relay to open the polarizing circuit of said other relay, and means to delay the removal of said polarization for a predetermined length of time.

7. In a testing device, means for testing the time of a circuit closer comprising a pair of relays, means for including said relays in series with said circuit closure, circuits for electrically polarizing said relays in opposite directions, one of said relays being responsive to the current flow in said circuit, means responsive to the operation of said one relay to open the polarizing circuit of said other relay, means to delay the removal of said polarization for a predetermined length of time, and means under the control of said other relay to indicate the time of said circuit closure.

8. In a telephone system, a circuit to be tested, a testing device, means in said testing device for determining whether said circuit is completed for more than a predetermined length of time, comprising a pair of relays, means for including said relays in series in said circuit, circuits for electrically polarizing said relays in opposite directions, one of said relays being responsive to the current flow in said circuit, means responsive to the operation of said one relay to open the polarizing circuit of said other relay, means to delay the removal of said polarization for a predetermined length of time, and means responsive to the operation of said other relay to indicate the proper closure of said circuit.

9. In a telephone system, a circuit to be tested, a testing device, means in said testing device for determining whether said circuit is completed for more than a predetermined length of time, comprising a pair of relays, means for including said relays in series in said circuit, circuits for electrically polarizing said relays in opposite directions, one of said relays being responsive to the current flow in said circuit, means responsive to the operation of said one relay to open the polarizing circuit of said other relay, means to delay the removal of said polarization for a predetermined length of time, said delaying means comprising a condenser normally short circuited by said first relay, and means responsive to the operation of said other relay to indicate the proper closure of said circuit.

10. In a telephone system, a circuit to be tested, a testing device, means in said testing device for determining whether said circuit is completed for more than a predetermined length of time, comprising a pair of relays, means for including said relays in series in said circuit, circuits for electrically polarizing said relays in opposite directions, one of said relays being responsive to current flow in said circuit, means responsive to the operation of said one relay to open the polarizing circuit of said other relay, means to delay the removal of said polarization for a predetermined length of time, said delaying means comprising a condenser in series with the polarizing winding of said other relay and normally short-circuited by said first relay, and means responsive to the operation of said other relay to indicate the proper closure of said circuit.

11. In a telephone system, a register sender, a control circuit in said sender comprising two branches, means in said sender to successively connect said branches together, disconnect them and connect them to battery and ground, a testing device, means to associate said testing device with said sender, means in said testing device to determine whether said circuit closures are sufficiently long comprising a pair of relays, circuits for electrically polarizing said relays in opposite directions, means for connecting said pair of relays in series with battery to one branch of said control circuit, means responsive to the closure of said circuit in said sender to operate one of said relays, means responsive to the operation of said one relay to open the polarizing circuit of said other relay, means for delaying the removal of said polarization for a predetermined length of time, means responsive to the opening of said circuit in said sender to cause the connection of a similar pair of relays across the branches of said circuit in said testing device, said relays responsive to the connection of battery and ground to said branches for a predetermined length of time to permit the release of said sender.

12. In a telephone system, register senders for use by subscribers, other register senders for use by operators, means for receiving a class of service indication in said first register senders, means for receiving a class of trunk indication in said other register senders, conductors incoming to said register senders, said indications being received over corresponding ones of said incoming conductors, a testing device, means to associate said testing device with the incoming conductors of said senders in turn, means in said testing device for transmitting an indication to the incoming conductors of an associated sender, and means operated in accordance with the type of sender under test to vary the preparation of the testing device to test the reaction in the sender to said indication.

13. In a telephone system, register senders for use by operators, means for receiving a class of trunk indication in said register senders, means in said senders for determining the number of selections to be controlled in accordance with said class of trunk indication, a testing device, means to associate said testing device with the incoming conductors of said senders in turn, means in said testing device for transmitting an indication to the associated sender, and means to modify the operation of said testing device to receive the corresponding selections.

14. In a telephone system, register senders for use by subscribers, other register senders for use by operators, means for receiving a class of service indication in said first register senders, said senders reacting to subsequently return a zone indication, means for receiving a class of trunk indication in said other senders, said other senders reacting to said indication to vary the number of selections to be performed, conductors incoming to said register senders, said indication being received over corresponding ones of said incoming conductors, a testing device, means to associate said testing device with the incoming conductors of said senders in turn, means in said testing device for transmitting an indication to the incoming conductors of an associated sender, and means operated in accordance with the type of sender under test to prepare said testing device to receive said zone indication or to vary the number of selections to be controlled.

15. In a telephone system, a register sender for use by operators, means in said sender for receiving telephone designations and class of trunk indications, means responsive to said indications to predetermine the number of selections to be made, means operated in accordance with said telephone designations to determine the nature of said selections, means effective if the number and nature of said selections do not correspond to transmit a release signal, a testing device, means for associating said testing device with said sender, means in said testing device for sending a telephone designation and a class of trunk indication to said senders, and means to prepare said testing device to receive either said selections or said release signal.

16. In a telephone system, a register sender, an outgoing circuit, means operative in accordance with particular registered office designations, to delay the establishment of said outgoing circuit for a predetermined period following the registration of a particular digit, means to cancel said delay either under control of certain of said registered office designation or under the joint control of others of said registered office designations and associated numerical designations, a testing device, means for associating said testing device with said sender, a switch in said testing device controlling in its various positions the application of tests to said senders, means effective in a single position of said switch for registering any one of said particular office designations in said sender, means for indicating to the testing device whether said designation should be effective in the sender to cancel said delay, and means under the control of said indicating means to stop the operation of said testing device if said delay is not canceled.

17. In a telephone system, a register sender, an outgoing circuit, means operative in accordance with particular registered office designations to delay the establishment of said outgoing circuit for a predetermined period following the registration of a particular digit, means to cancel said delay either under control of certain of said registered office designations or under the joint control of others of said registered office designations and associated numerical designations, a testing device, means for associating said testing device with said sender, a switch in said testing device controlling in its various positions the application of tests to said senders, means effective in a single position of said switch for registering any one of said particular office designations in said sender, means for indicating to the testing device whether or not said designation should be effective in the sender to cancel said delay, and means under the control of said indicating means to stop the operation of said testing device if said delay is or is not correspondingly canceled by said sender.

18. In a telephone system, a selection control circuit, register senders of a first type, means in senders of said first type operated in accordance with registered designations to delay the completion of said selection control circuit for a predetermined period following the registration of a particular digit, register senders of a second type, means in senders of said second type to complete said selection control circuit without delay independent of registered designations, a testing device, means for associating said device with senders of either type, means in said testing device effective when testing senders of the first type for stopping the operation of said testing device if said selection control circuit is completed without delay, and means for rendering said stopping means ineffective when testing senders of the second type.

19. In a telephone system, a register sender, a plurality of receiving registers in said sender, a plurality of selection control registers in said sender, means to position said selection control registers under the control of certain of said receiving registers to determine certain selections, a series of relays for associating others of said receiving registers with said selection control registers to determine other selections, means for operating said series of relays effective only after said certain selections have been completed, a testing device, means for associating said testing device with said sender, means in said testing device normally effective to position said certain receiving registers and respond to said certain selections prior to positioning said other receiving registers, and means to detect short-circuited contacts on said relays comprising means to cause said testing device to position all of said registers before permitting said selections to start.

20. In a telephone system, a register sender, a plurality of receiving registers in said sender, a plurality of selection control registers in said sender, means to position said selection control registers under the control of certain of said receiving registers to determine certain selections, a series of relays for associating others of said receiving registers with said selection control registers to determine other selections, means for operating said series of relays effective only after said certain selections have been completed, means for preventing the initiation of said other selections until one of said other receiving registers has been positioned, a testing device, means for associating said testing device with said sender, means in said testing device normally effective to position said certain receiving registers and to respond to said certain selections prior to positioning said other receiving registers, responsive means operative if said preventing means is effective to initiate the positioning of said other receiving registers, and means to detect short-circuited contacts on said relays comprising means to render said responsive means operative independent of said preventing means.

21. In a telephone system, a register sender, a plurality of receiving registers in said sender, a plurality of selection control registers in said sender, means to position said selection control registers under the control of certain of said receiving registers to determine certain selections, a series of relays for associating others of said receiving registers with said selection control registers to determine other selections, means for operating said series of relays effective only after said certain selections have been completed, means for preventing the initiation of said other selections until one of said other receiving registers has been positioned, a testing device, means for associating said testing device with said sender, means in said testing device normally effective to position said certain receiving registers and respond to said certain selections prior to positioning said other receiving registers, responsive means operative if said preventing means is effective to initiate the positioning of said other receiving registers, means to detect short-circuited contacts on said relays comprising means to render said responsive means operative independent of said preventing means, and means to delay said certain selections until all of said registers have been positioned.

22. In a telephone system, a register sender of a first type, means in said sender to register the digit zero as the second or third digit of office designations, means to transmit said office designation substituting the digit six for the digit zero in each such case, register senders of a second type, means in said sender to register the digit zero as the second or third digit of office designations, means to transmit said office designation as recorded, a testing device, means for associating said testing device with one of said senders, means in said testing device to transmit office designations including the digit zero to said sender, means in said testing device for receiving office designations from said sender, means to advance said testing device if the office designation received corresponds to the office designation transmitted, and means operated when a sender of the first type is associated with the testing device to modify the operation of said advancing means to respond to the reception of the digit six when the digit zero is transmitted as the second or third digit of an office code.

23. In a telephone system, a register sender of a first type, means in said sender to register the digit zero as the second or third digit of office designations, means to transmit said office designation substituting the digit six for the digit zero in each case, register senders of a second type, means in said senders to register the digit zero as the second or third digit of office designations, means to transmit said office designation as recorded, a testing device, means for associating said testing device with one of said senders, means in said testing device to transmit office designations including the digit zero to said sender, means in said testing device for receiving office designations from said sender, means to advance said testing device if the office designation received corresponds to the office designation transmitted, and means to vary the operation of said advancing means to render it effective in response to the reception of the digit six or to the digit zero for a transmitted digit zero as the second or third digit of an office code in accordance with the type of sender associated with the testing device.

OSCAR MYERS.